US007809632B2

(12) United States Patent
Chiulli et al.

(10) Patent No.: US 7,809,632 B2
(45) Date of Patent: Oct. 5, 2010

(54) SYSTEM AND METHOD FOR ASSIGNING RESPONSIBILITY FOR TRADE ORDER EXECUTION

(75) Inventors: Allan T. Chiulli, Highlands Ranch, CO (US); Tom H. Warren, Greenwood Village, CO (US)

(73) Assignee: UAT, Inc., Englewood, CO (US)

( * ) Notice: Subject to any disclaimer, the term of this patent is extended or adjusted under 35 U.S.C. 154(b) by 97 days.

(21) Appl. No.: 12/256,196

(22) Filed: Oct. 22, 2008

(65) Prior Publication Data

US 2009/0112775 A1 Apr. 30, 2009

Related U.S. Application Data

(63) Continuation-in-part of application No. 12/140,047, filed on Jun. 16, 2008, and a continuation-in-part of application No. 11/783,690, filed on Apr. 11, 2007, now Pat. No. 7,685,057.

(60) Provisional application No. 60/982,320, filed on Oct. 24, 2007, provisional application No. 60/945,196, filed on Jun. 20, 2007, provisional application No. 60/791,209, filed on Apr. 12, 2006, provisional application No. 60/899,393, filed on Feb. 5, 2007.

(51) Int. Cl.
*G06Q 40/00* (2006.01)

(52) U.S. Cl. .......................... 705/37; 705/38

(58) Field of Classification Search .............. 705/37–38
See application file for complete search history.

(56) References Cited

U.S. PATENT DOCUMENTS

| 5,132,899 A | 7/1992 | Fox |
| 5,136,501 A | 8/1992 | Silverman et al. |
| 5,873,071 A | 2/1999 | Ferstenberg |
| 5,918,218 A | 6/1999 | Harris |
| 5,926,792 A | 7/1999 | Koppes et al. |
| 6,018,722 A | 1/2000 | Ray |
| 6,161,098 A | 12/2000 | Wallman |
| 6,338,047 B1 | 1/2002 | Wallman |
| 6,360,210 B1 | 3/2002 | Wallman |
| 6,393,409 B2 | 5/2002 | Young et al. |

(Continued)

FOREIGN PATENT DOCUMENTS

| JP | 2004-133949 A | 4/2004 |
| KR | 10-2002-0019330 A | 10/2003 |

OTHER PUBLICATIONS

ITG—The Future of Trading http://www.itginc.com/about/itgstory.html Feb. 25. 2004, 4 pages.

(Continued)

*Primary Examiner*—Thu Thao Havan
(74) *Attorney, Agent, or Firm*—Plumsea Law Group, LLC

(57) ABSTRACT

An embodiment of the present invention provides a system and method for a sponsoring organization to: (1) utilize a rules-based computer system to capture trade orders from sub-advisors (money management firms) in order to implement a pre trade compliance review process, thereby enabling the sponsoring organization to prevent the execution of trade orders by a sub advisor that violates securities laws and/or account restrictions; and (2) determine and assign, based on expected market impact of a trade order to buy or sell securities, whether responsibility (discretion over the decisions related to how, when and with whom a trade order is executed) for executing the trade order is assigned to the money management firm for an investment portfolio or to the sponsoring organization of that portfolio. Trade orders are categorized in real-time as "high touch" (significant effort and market impact) or "low touch" (insignificant effort and market impact).

55 Claims, 56 Drawing Sheets

U.S. PATENT DOCUMENTS

| | | |
|---|---|---|
| 6,516,303 B1 | 2/2003 | Wallman |
| 6,601,044 B1 | 7/2003 | Wallman |
| 6,606,606 B2 | 8/2003 | Starr |
| 6,615,188 B1 | 9/2003 | Breen et al. |
| 6,947,901 B1 | 9/2005 | McCabe et al. |
| 7,110,981 B1 | 9/2006 | Sidikman et al. |
| 7,206,760 B1 | 4/2007 | Carey et al. |
| 2002/0143689 A1 | 10/2002 | Naylor |
| 2003/0093352 A1 | 5/2003 | Muralidhar et al. |
| 2003/0120574 A1 | 6/2003 | Wallman |
| 2003/0120575 A1 | 6/2003 | Wallman |
| 2003/0167221 A1 | 9/2003 | Kochansky |
| 2003/0208432 A1 | 11/2003 | Wallman |
| 2003/0212622 A1 | 11/2003 | Wallman |
| 2003/0229561 A1 | 12/2003 | Wallman |
| 2004/0024677 A1 | 2/2004 | Wallman |
| 2004/0024678 A1 | 2/2004 | Wallman |
| 2004/0024679 A1 | 2/2004 | Wallman |
| 2004/0039675 A1 | 2/2004 | Wallman |
| 2004/0064394 A1 | 4/2004 | Wallman |
| 2004/0111349 A1 | 6/2004 | Charnley, Jr. |
| 2005/0108120 A1 | 5/2005 | Malka et al. |
| 2005/0154662 A1 | 7/2005 | Langenwalter |
| 2005/0165671 A1 | 7/2005 | Meade et al. |
| 2006/0080199 A1 | 4/2006 | Tarbox et al. |
| 2007/0192170 A1 | 8/2007 | Cristol |

OTHER PUBLICATIONS

Investment Technology Group, Inc., 1995 Annual Report http://www.itginc.com/annrep/95/index.html Feb. 26, 2004, 30 pages.
Investment Technology Group, Inc., 1996 Annual Report http://www.itginc.com/annrep/96/ar96_process.html, 2 pages.
International Search Report dated Jan. 9, 2009.
International Preliminary Report on Patentability mailed May 6, 2010 in PCT Application No. PCT/US2008/012029.
International Search Report Dated Apr. 28, 2009.
International Preliminary Report on Patentability issued Dec. 22, 2009 and mailed by the International Bureau on Jan. 7, 2010 in PCT Application No. PCT/US2008/007526.

Figure 1

| Terminology Utilized in Investment Industry Products | | | | |
|---|---|---|---|---|
| Investment Type | Registered '40 Act Funds | Registered '40 Act Funds | Non-Registered '40 Act Funds | Institutional Investment Portfolios |
| Markets | Variable Insurance | Mutual Funds<br>Defined Contribution Plan<br>529 Plans | Hedge Funds<br>Group Annuities<br>Collective Investments<br>Deferred Compensation Plans | Institutional Accounts<br>Sep Accts of Insur Companies<br>Pension Plan, Endowments, Trusts |
| SEC Regulatory Act | Investment Company<br>Act of 1940 | Investment Company<br>Act of 1940 | Investment Company<br>Act of 1940 | Investment Advisors<br>Act of 1940 |
| Category | Mutual Funds | Mutual Funds | Mutual Funds | Private Investment Portfolios |
| Products | Variable Annuities<br>Variable Life | Mutual Funds<br>401(k), 403(b) and 457 Plans<br>529 Plans | Hedge Funds<br>Group Annuities<br>Collective Investments<br>Deferred Compensation Plans | Company Investment Accounts<br>Sep Accts of Insur Companies<br>Pension Plan, Endowments, Trusts |
| Fiduciary Responsibility | Advisor and Board Must<br>Control Investment Expenses | Advisor and Board Must<br>Control Investment Expenses | Advisor and Board Must<br>Control Investment Expenses | Administrator and Board Must<br>Control Investment Expenses |
| Asset Manager | Sub Advisor | Sub Advisor | Sub Advisor | Money Manager<br>(Externally Managed Assets) |
| Investment Portfolios | Sub Accounts<br>Variable Fund LLC<br>Registered Investment Comp | Mutual Funds | Hedge Funds<br>Group Annuities<br>Collective Investments<br>Deferred Compensation Plans | Private Accounts |
| Individual Investors | Shareholders or<br>Retail Investors | Shareholders or<br>Retail Investors | Shareholders or<br>Retail Investors | Beneficiaries |

Figure 8A

Fundamental Restrictions:
1. <= 33.33% securities lending
2. <= 15% illiquid securities
3. <= 75% Assets: <= 5% Any One Issuer
4. <= 75% Assets: <= 10% Out Vot Sec 1 Issu
5. <= 25% Assets in one particular industry
6. <= 300% Asset Cov; Borrow from Banks
7. Act as Underwriters
8. Real Estate - Prohibits purchase or sale
9. <55% Portfolio Value = 1 Issuer
10. <70% Portfolio Value = 2 Issuers
11. <80% Portfolio Value = 3 Issuers
12. <90% Portfolio Value = 4 Issuers
13. Each gov agent/instrum = sep issuer
14. All secu of one issuer = one investment

Prospectus Restrictions:
1. 10 or more non US countries
2. <=15% non US comp/sig US mkt
3. >= 80% US issuers/prin mkt is US
4. <= 10% ADRs
5. <= 15% equi issu ex US/Can, not in S&P 500
6. <= 10% non con debt rated Ba/BB or lower
7. >= 80% technology companies
8. <= 33% foreign securities
9. >= 80% fixed income (inclu derivatives)
10. <= 25% hi grad corp bond & cred def swap
11. >= 90% equities
12. <= 10% foreign investments
13. <= 10% fixed income
14. <= 25% foreign invest/fore curr & not US trad
15. <= 10% high yield bonds
16. No limit on foreign equity and debt securities
17. <= 35% high yield bonds
18. >= 80% equity/deriv in health sciences
19. Hea Sci: >= 50% of asset in Hea Sci
20. Hea Sci: >= 50% gross inc/net sales Hea Sci
21. >= 80% common stk in Russell Mid Cap Ind
22. <= 15% foreign equity and fixed income
23. <= 25% securities sold/held short
24. >= 65% common stocks/related securities
25. <= 35% foreign securities
26. >= non US comp w $3 BB mkt caps
27. <= 25% emerging markets
28. Non US comp: principal office ex US
29. Non US comp: principal trading mkt ex US
30. Non US comp: 50% rev or more ex US
31. Non US comp: 50% or more assets ex US
32. >= 80% equities in S&P 500
33. >= 80% equities in Russell 2000
34. >= 80% equities w mkt cap < $1.5 BB
35. <= 15% assets in short sales
36. >= 80% equities $100 MM - $2.5 BB mkt cap
37. <= 20% short term debt
38. <= 50% foreign securities
39. >= 80% equities in "emerging markets"
40. >= 80% fixed income
41. <= 10% high yield bonds
42. <= 30% secur denom in foreign currencies
43. >= 95% money market instruments
44. Average $-weighted term to matur <= 90 days
45. >= 80% lower and medium credit bonds
46. >= 80% inter to long term maturity bonds
47. >= 80% large cap companies
48. <= 20% foreign securities
49. <= 25% foreign securities
50. <= 35% high yield bonds
51. >= 80% equities $1-$2 BB or Russell Midcap
52. >= 80% in companies engaged in real estate
53. <= 10% foreign investments

SAI Restrictions: Funds may invest in:
1. $ wgted avg all Fix Inc: A or higher
2. $Dem Bk Ob: $10 BB/L75/braniUS
3. $Dem CD: $5BB US/$10 BB Fore
4. $Dem CDs: US/Foreign Bks
5. $Dem Foreign Debt
6. $Dem Foreign Sec
7. $Dem Ob: ForGov, Ag, Intl Ag
8. $Dem Securities Only
9. $DemCorpDebt:Dom/Foreig Baa/BB
10. ADR's
11. ARMs
12. Asset Backed Securities
13. Bank Oblig: 2 highest rating cat
14. Bank Obligations
15. Banker Acceptances
16. Borrow Money
17. Brady Bonds
18. Cash/Cash Equiv
19. CBOs
20. CDOs
21. Certificate of Deposits
22. CLOs

Figure 8B

23 Closed End Funds
24 CMOs
25 Comm Paper: Rate P1/A1-Aa/AA
26 Commercial Paper
27 Company: 50% Mkt Value Real Est
28 Company: 50% Rev/Prof Real Est
29 Convertible Bonds
30 Convertible Sec: 10% Maximum
31 Convertible Securities
32 Corp Bonds: $ Dem
33 Corp Bonds: Foreign Curr Dem
34 Custodial Receipts
35 DebSe fore iss/fore cur Baa/BBB
36 DebSec< Ba/BB or lower
37 DebSec<Baa/BBB
38 DebSec<Baa/BBB>C
39 DebSec<Baa/BBB>Caa/CCC
40 Debt Sec: Baa or BBB or higher
41 Debt Sec: Low Baa/BBB 10% Max
42 Debt Sec: Low Baa/BBB 15% Max
43 Debt Sec: Low Baa/BBB 35% Max
44 Debt Sec: Low Baa/BBB 5% Max
45 Debt Sec: Unsecured 5% Max
46 Debt Securities
47 Deferred Interest Bonds
48 Dividend Paying Common Stk
49 EDRs
50 Emerging Market Debt
51 Equity foreign issuer - fore exch list
52 Equity foreign issuer - US exch list
53 Equity Linked Securities
54 ETFs
55 Eurobonds
56 Event Linked Bonds: 5% Max
57 Firm Commitments
58 Foreign Country Debt>= Baa/BBB
59 Foreign Debt in Foreign Currency
60 Foreign Securities
61 Foreign Securities: 10% Max
62 Foreign Securities: 25% Max
63 GDRs
64 High Yield Bonds
65 HY Non-Conv, 5% Assets Max
66 Illiquid Sec
67 Index Linked Securities
68 Indexed Securities
69 Instru Supranat in Foreign Cur
70 Inverse Floaters
71 IPOs
72 Joint Ventures (equity interests)
73 LLCs (equity interests)
74 Loan Participations
75 Money Market Instruments
76 Money Mkt of Money Mgr
77 Mortgage Backed
78 Mortgage Dollar Roll Trans
79 Mortgage Related Securities
80 Multinational Companies
81 Munis
82 NonConv Fix Incom in Foreign Cur
83 OPALs
84 Open End Funds
85 Partnerships (equity interests)
86 Pass Through Securities
87 PIKs
88 Precious Metals Related Sec
89 Preferred Securities
90 Private Placements
91 REITs
92 REITs: Equity
93 REMICs
94 Repo
95 Reset Options
96 Restricted Securities
97 Reverse Repo
98 Rights
99 Rights up to 5% of assets
100 Sec of Affil Invest Companies
101 Sec of Other Invest Companies
102 Secur of Issuer Domiciled ex US
103 Semi-Government Sec
104 Short Term Corporate Debt
105 Short Term Instruments
106 Small Cap Stocks
107 SPDRs
108 Standby Commitments
109 Step Coupon Bond
110 Strip Bonds
111 Structured Notes
112 Structured Products

Figure 8C

113 Tender Option Bonds
114 Trust Certificates
115 Trusts (equity interests)
116 Unseasoned Comp(<3 Yrs Hist)
117 US Govt Securities
118 Vari/Flo Rate Sec: 2 high rat cat
119 Vari/Floating Rate Securities
120 Warrants
121 Warrants - 5% max non unit/sec
122 Warrants - Up to 10% of assets
123 When Issued
124 Yankee Bonds
125 Zeros
126 Zeros up to 10% of Assets Max

SAI Restrictions: Funds may engage in:
1 Caps (options)
2 Cash Set Opt on Equity Ind Swaps
3 Cash Set Opt on Int Rate Swaps
4 Collars (options)
5 Con Sec no Bk Oblg Lim
6 Floors (options)
7 Foreign Curr Spot Transactions
8 Foreign Currency K
9 Forward Currency K
10 Forward Foreign Currency K
11 Forward K
12 Fut K - Currency
13 Fut K - Financials
14 Fut K - Interest Rates
15 Fut K - Securities
16 Fut K - Stock Index
17 Fut K - US Traded
18 Fut K/Opt Fut K - Dom/For
19 Fut K/Opt Fut K - Foreign Exch
20 Fut K/Opt Fut K - US Exch
21 Futures
22 Lend Securities for Cash Mgmt
23 Opt: Foreign Curr
24 Opt: Fut K - Currency
25 Opt: Fut K - Interest Rates
26 Opt: Fut K - Securities
27 Opt: Fut K - US Traded
28 Opt: Interest Rate Index
29 Opt: Interest Rates
30 Opt: Stock Index Fut K
31 Opt: Yield Curve
32 Option Max: Agg Prem 5% Max
33 Option Max: Value 20% Assets
34 Options 35 Options on Futures
36 Options on Swaps
37 Pur P/C Stk Ind Trad Exch/OTC
38 Pur Put & Call Opt: Sec Index
39 Pur Put & Call Opt: Securities
40 Put/Sell Spread Transactions
41 Pur/Writ Cov Put/Call Currency
42 Pur/Writ Cov Put/Call Fut K
43 Pur/Writ Cov Put/Call Securities
44 Pur/Writ Cov Put/Call Stock Index
45 Pur/Writ Cov Put/Call YC Opt
46 Pur/Writ Put/Call - Foreign Exch
47 Pur/Writ Put/Call - US Exch
48 Pur/Writ Put/Call Foreig Cur Fut K
49 Pur/Writ Put/Call Foreign Curren
50 Pur/Writ Put/Call Foreign Sec
51 Pur/Writ Put/Call Foreign Stk Ind
52 Pur/Writ Put/Call Securities
53 Pur/Writ Put/Call Stock Index
54 Purchase Securities on Margin
55 Sh Sale ag Box <15% assets
56 Short Sales
57 Short Sales against Box
58 Spread Trans 5% Assets Max
59 Swaps
60 Swaps: Credit Default
61 Swaps: Currency
62 Swaps: Currency Exch Rate
63 Swaps: Equity Index
64 Swaps: Interest Rate
65 Swaps: Interest Rate Index
66 Swaps: Total Return
67 Write Covered Call
68 Write Secured Put Options

SAI Restrictions: Funds may not invest in:
1 Brady Bonds
2 Future Contracts
3 Issue Senior Sec
4 Loan Participations
5 Options on Future Contracts
6 Options on Securities
7 Private Placements
8 Reset Options
9 Restricted Securities
10 Reverse repos
11 Swaps
12 Vari/Floating Rate Sec
13 YC Options

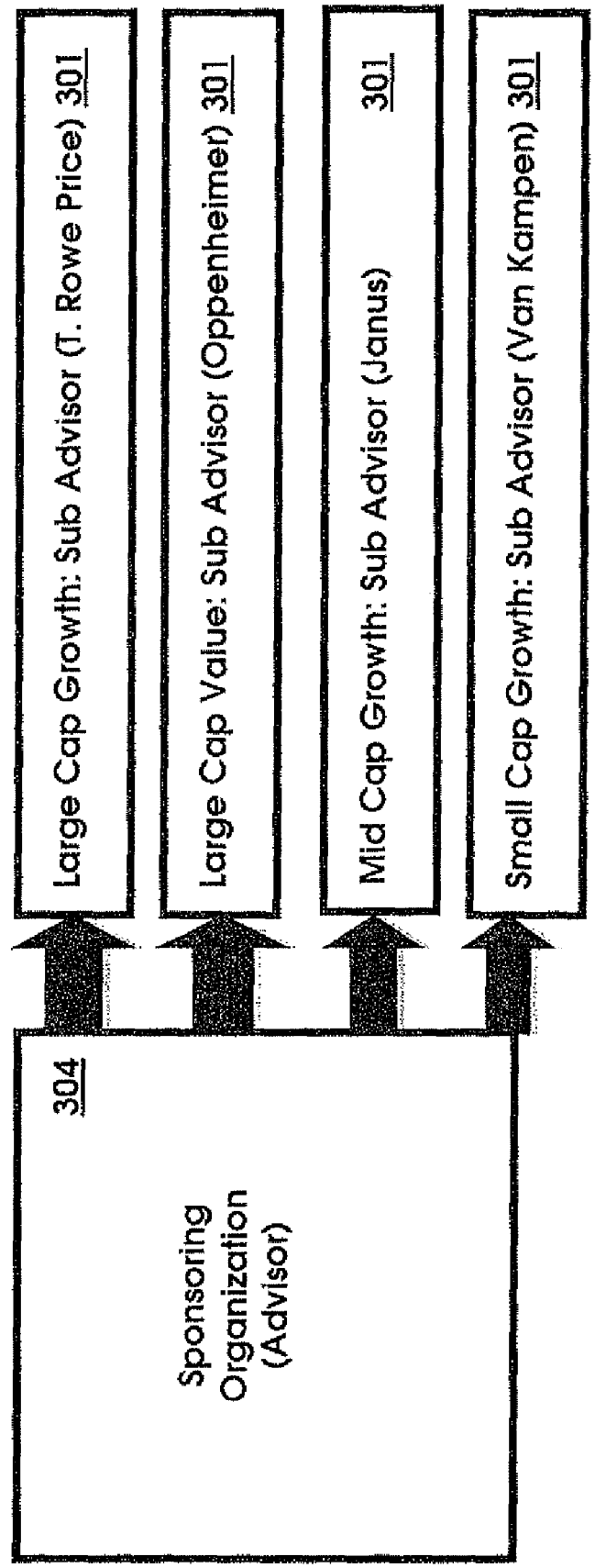

Execution Discretion Assignment Software Engine (EDASE) also referred to as the HiLo Engine (HLE)

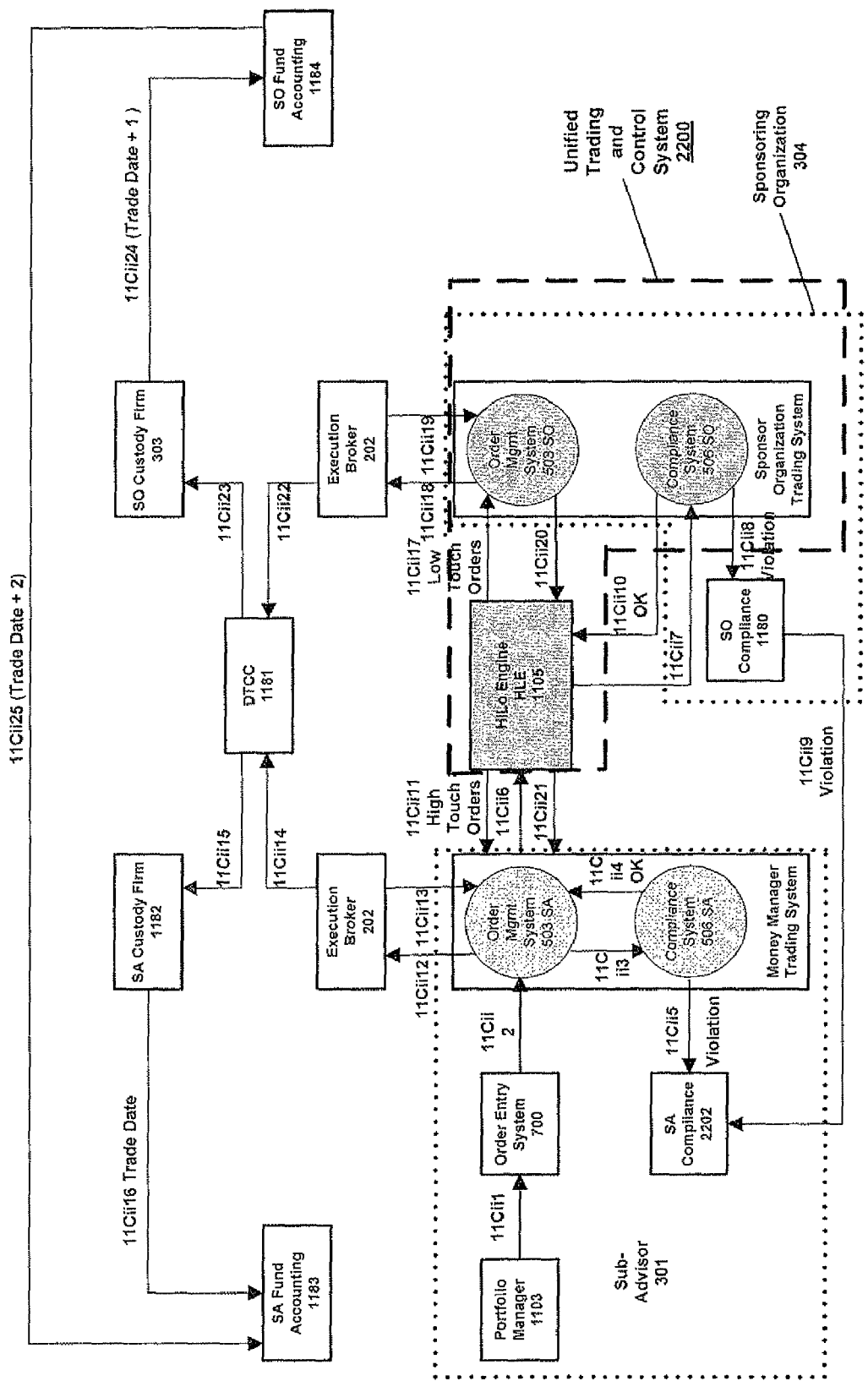
Figure 11Cii
Sponsor Organization Trading Process

HLE Operations Diagram

Global Pre Set Rules

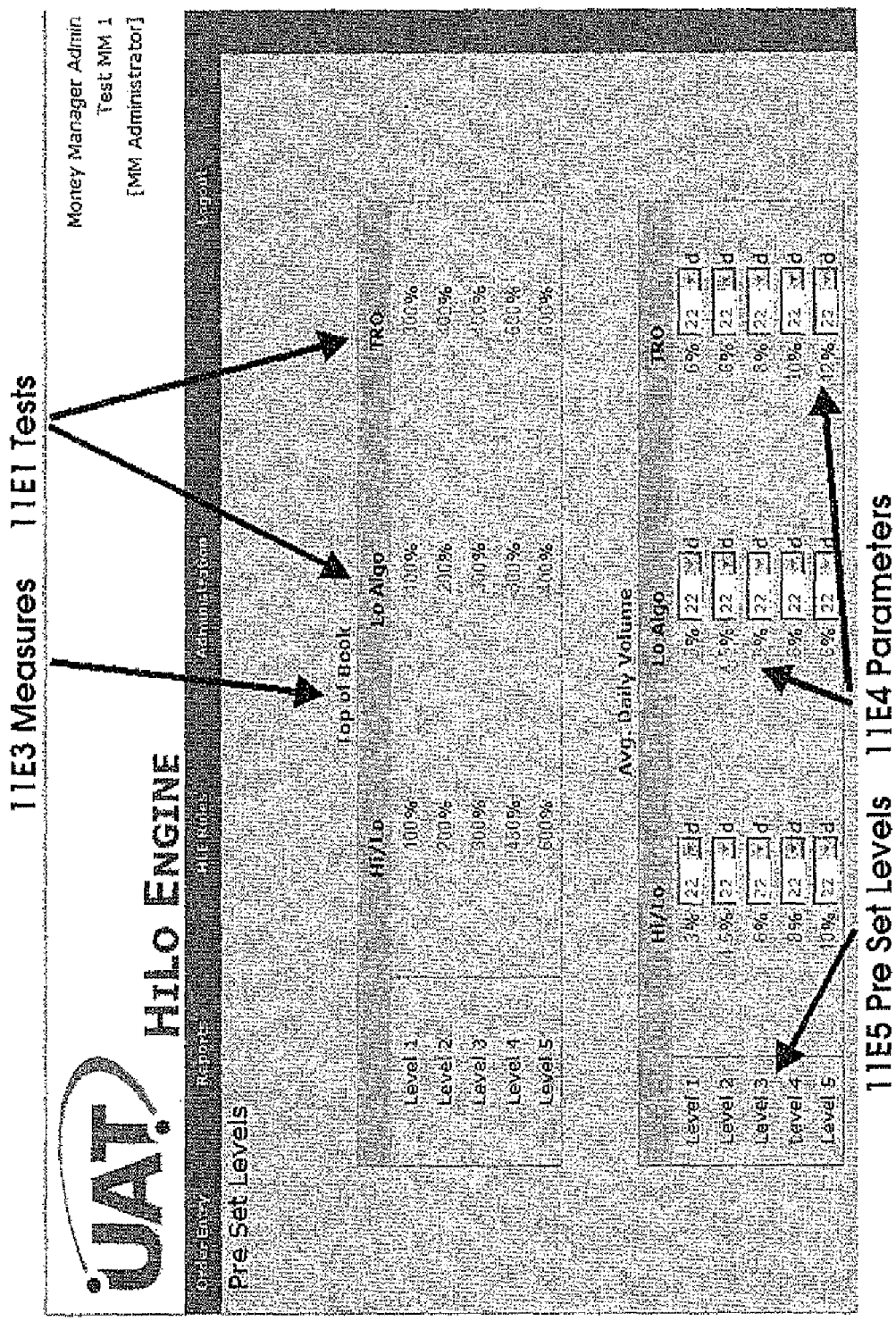

Exceptions to Rules

Exceptions: Symbol Groups

User GUI for Order Entry

Hi Lo Engine Results

Order Details

Figure 11L
User Roles

11L1 User Name    11L2 Security Role

| | User Name | Security Role | |
|---|---|---|---|
| Delete | Bob Jones | MM Administrator | Select |
| Delete | CMC Place Trader | MM Trader | Select |
| Delete | cmctrader379 | MM Trader | Select |
| Delete | MM Trader | MM Trader | Select |
| Delete | MM TRADER DEUCE | MM Trader | Select |
| Delete | MM4S45 ADMIN | MM Trader | Select |
| Delete | mmadmin379 | MM Administrator | Select |
| Delete | mmviewer379 | MM Viewer | Select |
| Delete | Money Manager Admin | MM Administrator | Select |
| Delete | Paul Krauss | MM Trader | Select |
| Delete | Simon Goldbroch | UAT Administrator | Select |
| Delete | SO 1 Administrator | SO Administrator | Select |
| Delete | SO Administrator | SO Administrator | Select |
| Delete | UATAdmin | UAT Administrator | Select |

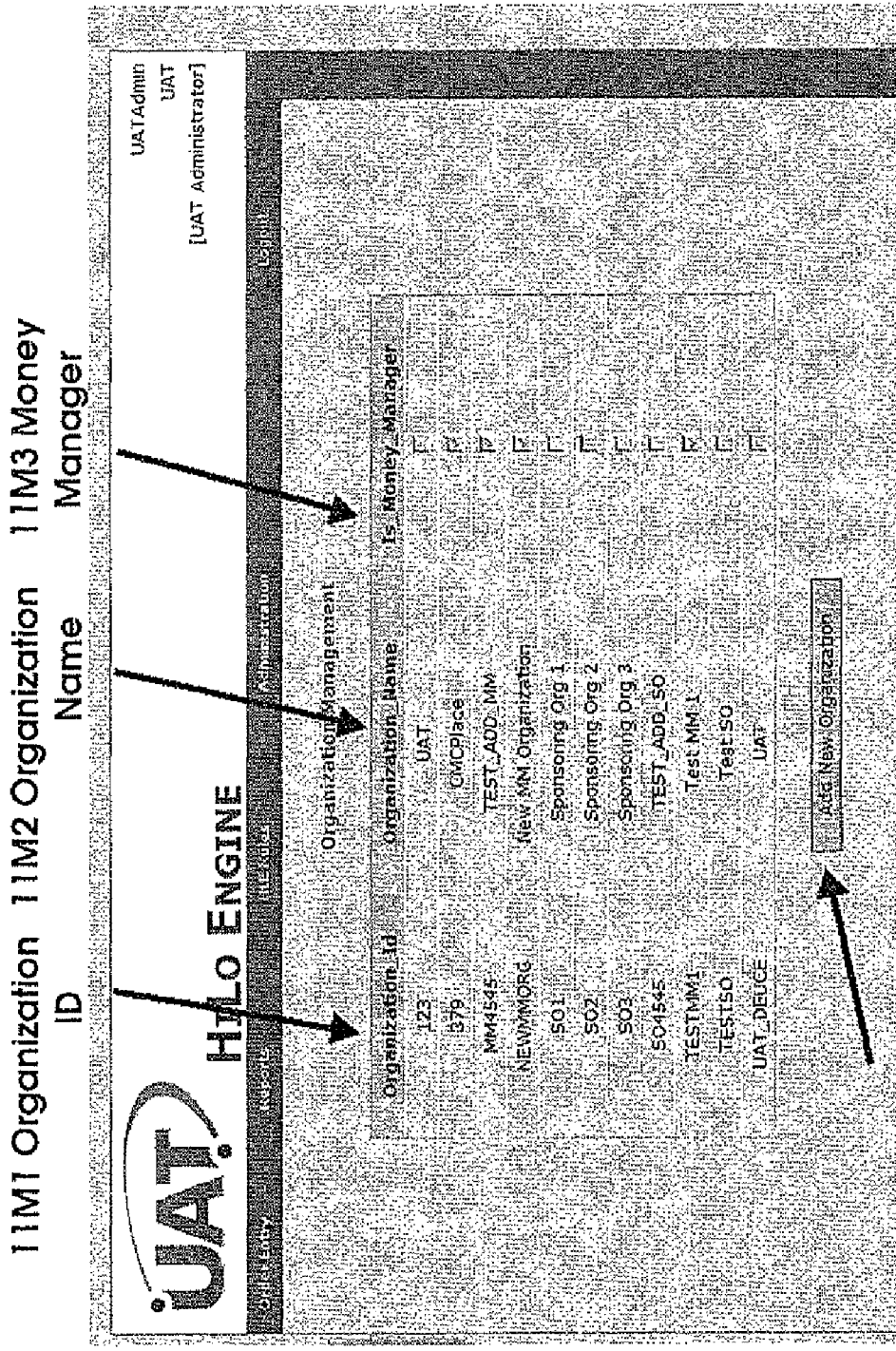

Account Administration

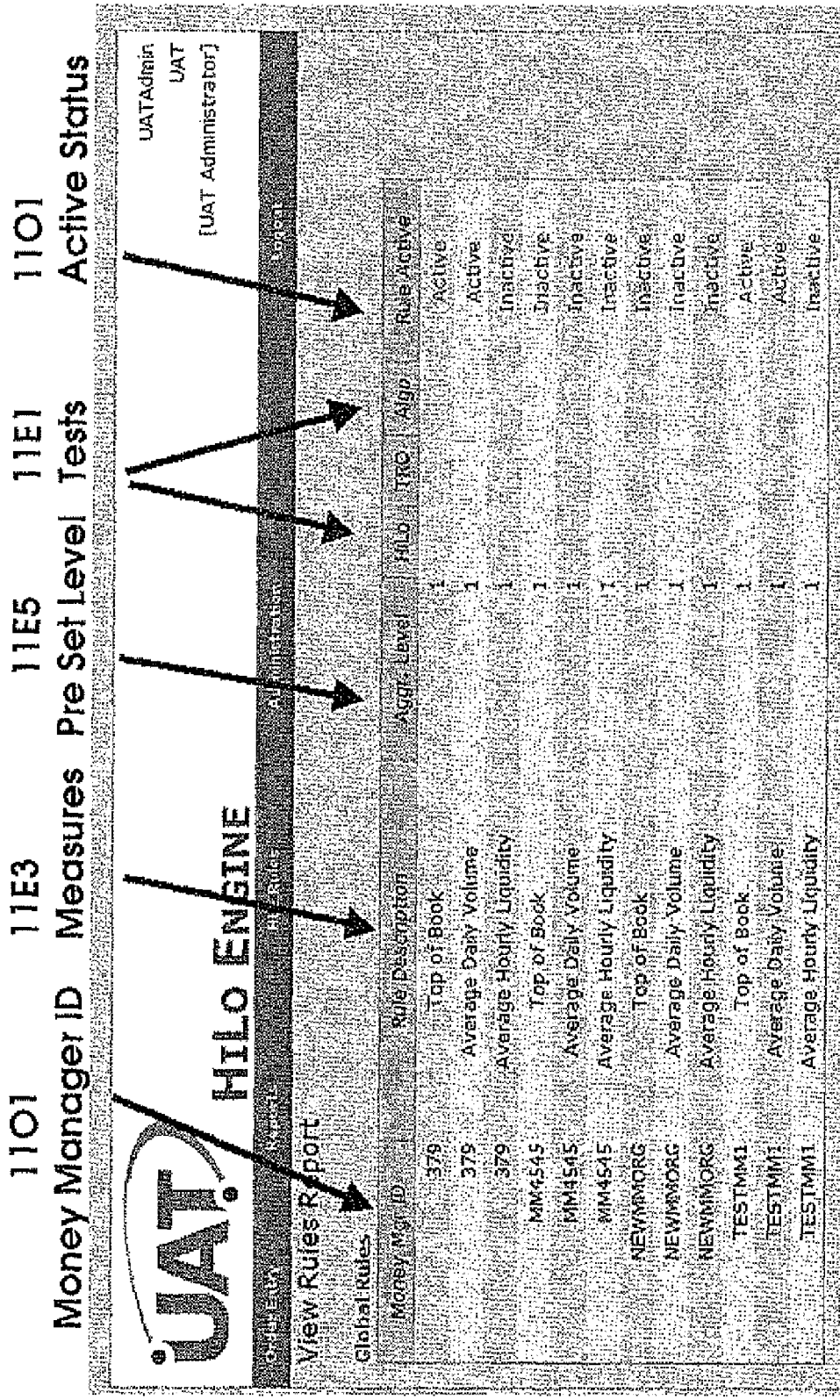

Reporting: Search Capability

Reporting: Usage Statistics

Figure 11R
HLE User Roles and Permissioning Structure

HLE User Structure and Permissions

| USER ROLES | Order Entry GUI Testing | Create or Delete User | Activate SOAP | Create Override | View Reports | Create MM and SO Admin Role | Delete MM and SO Admin(s) | Create Organization | Add MM to Account | Create Symbol Group |
|---|---|---|---|---|---|---|---|---|---|---|
| UAT | | | | | | | | | | |
| UAT Admin | ■ | All Users | ■ | ■ | All SO and MM | ■ | SO Admins | SO and MM | ■ | View |
| UAT Viewer | | | | View | All SO and MM | | | | | View |
| Money Manager (MM) | | | | | | | | | | |
| MM Admin | ■ | MMTrad/View | | | All SO | | | | | ■ |
| MM Trader | ■ | | | View | All SO | | | | | |
| MM Viewer | | | | View | All SO | | | | | View |
| Sponsoring Organizations (SO) | | | | | | | | | | |
| SO Admin | | SO Viewer | | View | All MM | | | | ■ | View |
| SO Viewer | | | | View | All SO | | | | | View |

Figure 12C

Market Parameters

| | | |
|---|---|---|
| Share Price: | $ 42.00 | per share |
| Order Size: | 4,500 | shares |
| Spread: | $ 0.0150 | per share |
| Market Velocity: | $ 0.0025 | per second |

Executing Broker Parameters 1226

| Executing Broker | Number of Shares | Share Price | Execution Cost Per Share | Price Improvement | Execution Speed |
|---|---|---|---|---|---|
| A | 2,000 | $ 42.00 | $ 0.0100 | 110% | 3.00 |
| B | 1,500 | $ 42.00 | $ 0.0050 | 50% | 2.00 |
| C | 1,000 | $ 42.00 | $ 0.0200 | 40% | 4.00 |

Expected Total Execution Cost Per Share 1227

| Executing Broker | Number of Shares | Share Price | Execution Cost Per Share | Price Improvement | Execution Speed | Total Execution Cost per Share | Total Execution Cost for Shares |
|---|---|---|---|---|---|---|---|
| A | 2,000 | $ 42.00 | $ 0.0100 | $ 0.0165 | $ 0.0075 | $ 42.0340 | $ 84,068.00 |
| B | 1,500 | $ 42.00 | $ 0.0050 | $ (0.0075) | $ 0.0050 | $ 42.0025 | $ 63,003.75 |
| C | 1,000 | $ 42.00 | $ 0.0200 | $ (0.0090) | $ 0.0100 | $ 42.0210 | $ 42,021.00 |
| | | | | | | | $ 189,092.75 |

Executing Broker Selection By:                                                          1229

| | | Criteria | |
|---|---|---|---|
| Liquidity | A | 2,000 | Shares |
| | B | 1,500 | Shares |
| | C | 1,000 | Shares |
| | | | |
| Broker Execution Cost | B | $ 42.0050 | Per Share |
| | A | $ 42.0100 | Per Share |
| | C | $ 42.0200 | Per Share |
| | | | |
| Total Execution Cost | B | $ 42.0025 | Per Share |
| | C | $ 42.0210 | Per Share |
| | A | $ 42.0340 | Per Share |

1230

| Number of Shares | Execution Method: Liquidity | Execution Cost | Total Exec Cost | Cost Penalty: Liquidity | Liquidity/Cost |
|---|---|---|---|---|---|
| 500 | $ 21,017.00 | $ 21,001.25 | $ 21,001.25 | $ (15.75) | $0.00 |
| 1,000 | $ 42,034.00 | $ 42,002.50 | $ 42,002.50 | $ (31.50) | $0.00 |
| 1,500 | $ 63,051.00 | $ 63,003.75 | $ 63,003.75 | $ (47.25) | $0.00 |
| 2,000 | $ 84,068.00 | $ 84,020.75 | $ 84,014.25 | $ (53.75) | $ (6.50) |
| 2,500 | $ 105,069.25 | $ 105,037.75 | $ 105,024.75 | $ (44.50) | $ (13.00) |
| 3,000 | $ 126,070.50 | $ 126,054.75 | $ 126,041.75 | $ (28.75) | $ (13.00) |
| 3,500 | $ 147,071.75 | $ 147,071.75 | $ 147,058.75 | $ (13.00) | $ (13.00) |
| 4,000 | $ 168,082.25 | $ 168,082.25 | $ 168,075.75 | $ (6.50) | $ (6.50) |
| 4,500 | $ 189,092.75 | $ 189,092.75 | $ 189,092.75 | $0.00 | $0.00 |

Figure 12E

Market Parameters _1231_

| | | |
|---|---|---|
| Share Price: | $ 42.00 | per share |
| Order Size: | 4,500 | shares |
| Spread: | $ 0.0150 | per share |
| Market Velocity: | $ 0.0025 | per second |

Executing Broker Parameters _1232_

| Executing Broker | Number of Shares | Share Price | Execution Cost Per Share | Price Improvement | Execution Speed |
|---|---|---|---|---|---|
| $ 42.00 per share | | | | | |
| A | 2,000 | $ 42.00 | $ 0.0100 | 110% | 3.00 |
| B | 1,500 | $ 42.00 | $ 0.0050 | 50% | 2.00 |
| C | 1,000 | $ 42.00 | $ 0.0200 | 40% | 4.00 |
| 42.02 per share | | | | | |
| D | 2,000 | $ 42.02 | $ 0.0100 | 60% | 2.00 |
| E | 1,000 | $ 42.02 | $ 0.0025 | 50% | 2.00 |

Expected Total Execution Cost Per Share _1233_

| Executing Broker | Number of Shares | Share Price | Execution Cost Per Share | Price Improvement | Execution Speed | Total Execution Cost per Share | Total Execution Cost for Shares |
|---|---|---|---|---|---|---|---|
| A | 2,000 | $ 42.00 | $ 0.0100 | $ 0.0165 | 0.0075 | $ 42.0340 | $ 84,068.00 |
| B | 1,500 | $ 42.00 | $ 0.0050 | $ (0.0075) | 0.0050 | $ 42.0025 | $ 63,003.75 |
| C | 1,000 | $ 42.00 | $ 0.0200 | $ (0.0090) | 0.0100 | $ 42.0210 | $ 42,021.00 |
| D | 2,000 | $ 42.02 | $ 0.0100 | $ (0.0060) | 0.0050 | $ 42.0290 | $ 84,058.00 |
| E | 1,000 | $ 42.02 | $ 0.0025 | $ (0.0075) | 0.0050 | $ 42.0200 | $ 42,020.00 |
| | | | | | | | $ 315,170.75 |

Figure 12F

Executing Broker Selection By:

_1234_

| Price/Liquidity | | Criteria | | |
|---|---|---|---|---|
| | A | $ 42.00 | 2,000 | Share Price / Number of Shares |
| | B | $ 42.00 | 1,500 | Share Price / Number of Shares |
| | C | $ 42.00 | 1,000 | Share Price / Number of Shares |
| | D | $ 42.02 | 2,000 | Share Price / Number of Shares |
| | E | $ 42.02 | 1,000 | Share Price / Number of Shares |

| Liquidity & Execution Cost | | | |
|---|---|---|---|
| | B | $ 0.0050 | Per Share |
| | A | $ 0.0100 | Per Share |
| | C | $ 0.0200 | Per Share |
| | E | $ 0.0025 | Per Share |
| | D | $ 0.0100 | Per Share |

| Total Execution Cost | | | |
|---|---|---|---|
| | B | $ 42.0025 | Per Share |
| | E | $ 42.0200 | Per Share |
| | C | $ 42.0210 | Per Share |
| | D | $ 42.0290 | Per Share |
| | A | $ 42.0340 | Per Share |

Comparison: Total Execution Cost

_1235_

| Number of Shares | Execution Method: Liquidity | Liquidity/Cost | Total Exec Cost | Cost Penalty: Liquidity | Liquidity/Cost |
|---|---|---|---|---|---|
| 500 | $ 21,017.00 | $ 21,001.25 | $ 21,001.25 | $ (15.75) | $0.00 |
| 1,000 | $ 42,034.00 | $ 42,002.50 | $ 42,002.50 | $ (31.50) | $0.00 |
| 1,500 | $ 63,051.00 | $ 63,003.75 | $ 63,003.75 | $ (47.25) | $0.00 |
| 2,000 | $ 84,068.00 | $ 84,020.75 | $ 84,013.75 | $ (54.25) | $ (7.00) |
| 2,500 | $ 105,069.25 | $ 105,037.75 | $ 105,023.75 | $ (45.50) | $ (14.00) |
| 3,000 | $ 126,070.50 | $ 126,054.75 | $ 126,034.25 | $ (36.25) | $ (20.50) |
| 3,500 | $ 147,071.75 | $ 147,071.75 | $ 147,044.75 | $ (27.00) | $ (27.00) |
| 4,000 | $ 168,082.25 | $ 168,082.25 | $ 168,059.25 | $ (23.00) | $ (23.00) |
| 4,500 | $ 189,092.75 | $ 189,092.75 | $ 189,073.75 | $ (19.00) | $ (19.00) |
| 5,000 | $ 210,107.25 | $ 210,102.75 | $ 210,088.25 | $ (19.00) | $ (14.50) |
| 5,500 | $ 231,121.75 | $ 231,112.75 | $ 231,102.75 | $ (19.00) | $ (10.00) |
| 6,000 | $ 252,136.25 | $ 252,127.25 | $ 252,119.75 | $ (16.50) | $ (7.50) |
| 6,500 | $ 273,150.75 | $ 273,141.75 | $ 273,136.75 | $ (14.00) | $ (5.00) |
| 7,000 | $ 294,160.75 | $ 294,156.25 | $ 294,153.75 | $ (7.00) | $ (2.50) |
| 7,500 | $ 315,170.75 | $ 315,170.75 | $ 315,170.75 | $0.00 | $0.00 |

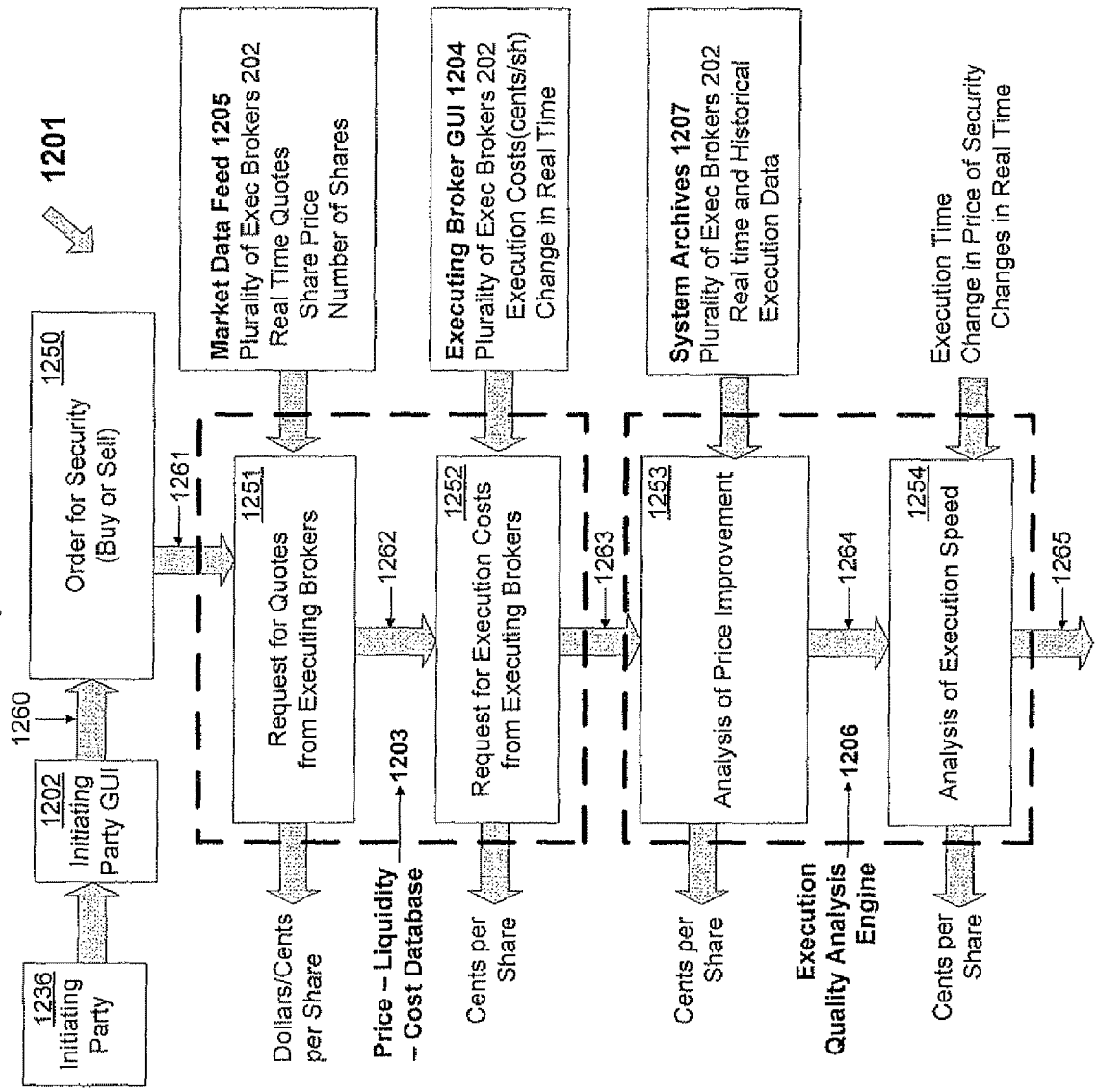

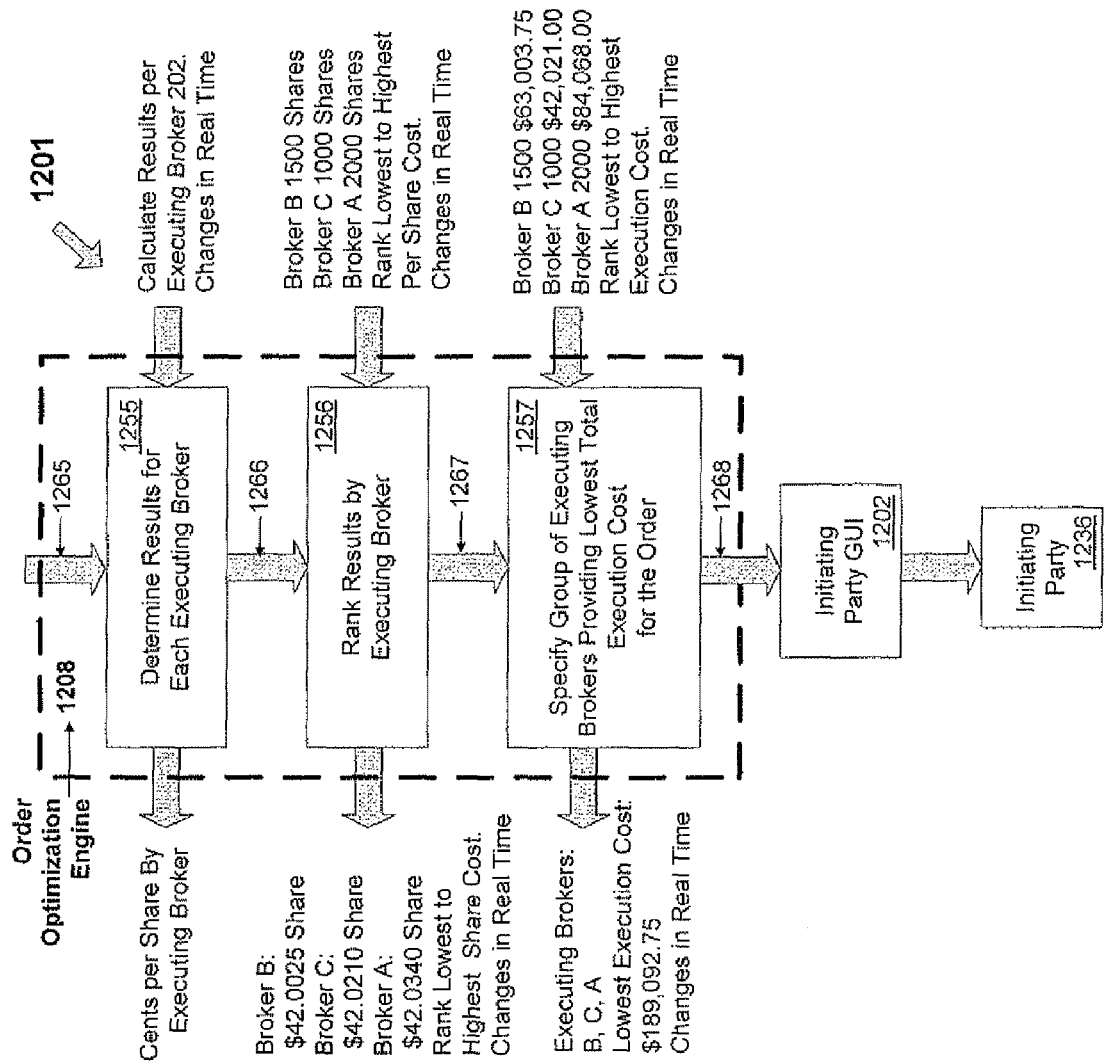
Figure 12G(ii)

| OVERALL IMPACT: Sub Advisors and Present Invention | |
|---|---|
| Positive | Negative |
| ☑ Lower Operational, Administration and Personnel Costs | ☒ Fewer Soft Dollars |
| ☑ Reduced Trade Aggregation and Allocation Error Cost | ☒ Implement Trade Rotation Order |
| ☑ Superior Fund Performance | ☒ Less Order Flow to Executing Brokers |
| ☑ Elimination of SEC Related Soft Dollar Issues | |
| ☑ No Reductions in Sub Advisory Fees | |
| ☑ Smaller Trading Blocks for Proprietary Accounts | |
| ☑ Eliminate Soft Dollar Accounting Group | |
| ☑ Portfolio Manager (PM) Retains Flexibility on Trade Strategies | |

AEGON/Transamerica
AIG/SunAmerica
Allianz
Allstate
American National
Ameritas
AXA Financial/MONY
Chase Insurance
Conseco
CUNA
Farmers
Fidelity Investments
Fidelity Insurance
First Investors Life
Genworth
Great West
Guardian Life
Hartford Life
Horace Mann Life IDS
ING
Integrity Life
Jackson National
John Hancock Manulife
Kansas City Life
Kemper Insurance
Lincoln Financial
Lincoln National
Massachusetts Mutual
Merril Lynch Life
Metropolitan Life
Midland
Minnesota Life
Mutual of America
Mutual of Omaha
National Life
Nationwide
New York Life Northwestern Mutual
Ohio National
Pacific Life
Penn Mutual
Phoenix Life
Principal Global
Protective Life
Prudential Insurance
RBC Insurance
Security Benefit
Southern Farm Bure
Sun Life/Keyport
Thrivent Financial
TIAA-CREF
Union Central Life
USAA Life

Figure 16A

| | | |
|---|---|---|
| AARP Funds | Chesapeake Funds | Flex Funds |
| Activa Funds | CitiFunds | FMI Funds |
| Adelante Funds | Citizens Funds | Forum Funds |
| Adirondack Funds | Claymore Funds | Forward Funds |
| Advantus Funds | Clipper Fund | 40/86 Funds |
| Advisors Inner Circle Funds | CM Advisors Funds | FPA Funds |
| Advisors Series Trust | CNI Charter Funds | Franklin Templeton Funds |
| AFBA Five Star Funds | Cohen & Steers Funds | Frontier Funds |
| AIM Funds | Columbia Acorn Funds | Gabelli Funds |
| Alger Funds | Columbia Funds | Gartmore Funds |
| Allegiant Funds | Columbus Funds | Gateway Funds |
| AllianceBernstein Funds | Commerce Funds | GE Funds |
| Allianz Funds | Concorde Funds | Goldman Sachs Trust |
| American Beacon Funds | Constellation Funds | Granum Trust |
| American Century Funds | Consulting Group Capital Funds | Green Century Funds |
| American Funds | CornerCap Funds | Greenspring Fund |
| American Growth Fund | Country Funds | GuideStone Funds |
| Aquila Funds | Coventry Group | Halter Pope USX China Fund |
| Ariel Funds | CRM Funds | Hansberger Institutional Funds |
| Artisan Funds | Cutler Trust | Harbor Funds |
| Aston Funds | Davis Funds | Hartford Funds |
| Atlantic Whitehall Funds | Dean Funds | Heartland Group |
| Atlas Funds | Delaware Funds | Henderson Global Funds |
| Ave Maria Funds | Deutsche Funds | Heritage Funds |
| Badgley Funds | DFA Funds | Highland Funds |
| Baird Funds | Diamond Hill Funds | HighMark Funds |
| Barclays Global Funds | Dividend Growth Trust | Hilliard-Lyons Funds |
| Baron Funds | Dodge & Cox Funds | Hillman Funds |
| Baxter Financial Funds | Domini Funds | Homestead Funds |
| BB&T Mutual Funds | Drake Funds | Hotchkis and Wiley Funds |
| BBH Funds | Dreyfus Founders Funds | HSBC Funds |
| Bishop Street Funds | Driehaus Funds | Huntington Funds |
| Bjurman, Barry Funds | Eaton Vance Funds | ICAP Funds |
| Blackrock Funds | Eclipse Funds | ICON Funds |
| BNY Hamilton Funds | Elfun Funds | ING Funds |
| Brandywine Funds | Elite Funds | Integrity Funds |
| Brazos Mutual Funds | Enterprise Funds | Ironwood Funds |
| Bridges Investment Fund | EquiTrust Funds | iShares Funds |
| Bridgeway Funds | E*TRADE Funds | Ivy Funds |
| Bullfinch Funds | Evergreen Funds | IXIS Funds |
| Burnham Investors Trust | Excelsior Funds | Janus Funds |
| Calamos Funds | Exeter Funds | Japan Fund |
| Calvert Funds | FAM Funds | JennisonDryden Funds |
| Capital One Funds | Federated Funds | John Hancock Funds |
| Capstone Funds | Fidelity Advisor Funds | Johnson Funds |
| Catholic Funds | Fidelity Funds | JPMorgan Funds |
| Causeway Capital Trust | First American Funds | Julius Baer Funds |
| Century Funds | First Eagle Funds | Kelmoore Funds |
| CGM Funds | First Investors Funds | Keystone Funds |
| Chaconia Funds | First Pacific Funds | Kobren Insight Funds |

Figure 16B

| | | |
|---|---|---|
| Kopp Funds | Oppenheimer Funds | State Farm Funds |
| Laudus Rosenberg Funds | Optimum Funds | STI Classic Funds |
| Lazard Funds | Pacific Advisors Funds | Strategic Partners Funds |
| Legg Mason Funds | Pacific Capital Funds | Stratton Funds |
| LKCM Funds | Paradigm Funds | Stratus Funds |
| Longleaf Funds | Parnassus Funds | streetTRACKS Funds |
| Loomis Sayles Funds | Pax World Fund | Summit Funds |
| Lord Abbett Funds | Payden Funds | Tamarack Funds |
| Lou Holland Trust | Pearl Funds | TCW Funds |
| Mainstay Funds | Penn Street Funds | TD Asset Management Funds |
| Mairs and Power Funds | Perritt Funds | Texas Capital Value Funds |
| Managers Funds | Phoenix-Engemann Funds | Third Avenue Funds |
| Market Vectors Trust | Piedmont Funds | Thomas White Funds |
| Marshall Funds | PIMCO Funds | Thompson Plumb Funds |
| Marsico Funds | Pinnacle Value Fund | Thornberg Funds |
| MassMutual Funds | Pioneer Funds | Tilson Trust |
| Masters Select Funds | PMFM Trust | Timothy Plan Funds |
| Matthew 25 Fund | PowerShares Trust | Touchstone Funds |
| Matthews Funds | Prairie Fund | Transamerica Funds |
| McMorgan Funds | Primary Trend Funds | T. Rowe Price Funds |
| Meehan Funds | PRIMECAP Odyssey Funds | Turner Trust |
| Mellon Funds | Principal Funds | Tweedy Browne Fund |
| MEMBERS Funds | Profit Funds | UBS Funds |
| Mercantile Funds | ProFunds | Ultra Series Funds |
| Merrimac Funds | Progressive Funds | UMB Scout Funds |
| MetLife Investment Funds | ProShares Trust | Unified Trust |
| Metzler/Payden Funds | Putnam Funds | Universal Institutional Funds |
| MFS/Compass Funds | Quant Funds | USAA Funds |
| MGI Funds | Rainier Funds | US Global Accolade Funds |
| Midas Funds | Regions Morgan Keegan Funds | Utopia Funds |
| Monteagle Funds | Reich & Tang Funds | Van Eck Funds |
| Morgan Keegan Fund | RiverSource Funds | Van Kampen Funds |
| Morgan Stanley Funds | Robeco Funds | Vanguard Funds |
| Mosiac Funds | Rochdale Funds | Vantagepoint Funds |
| MTB Funds | Roge Partners Funds | Victory Portfolios |
| Muhlenkamp Fund | Royce Funds | Viking Funds |
| Munder Funds | RS Funds | Volumetric Fund |
| Mutual of America Funds | Russell Funds | Waddell & Reed Funds |
| Navellier Funds | Rydex Funds | Wanger Funds |
| New Alternatives Funds | SA Funds | Wasatch Funds |
| New Century Funds | Salomon Brothers Funds | Weitz Funds |
| New Providence Trust | Saturna Capital Funds | Wells Fargo Funds |
| New River Funds | Schroder Funds | WesMark Funds |
| Nicholas-Applegate Funds | Schwartz Value Fund | Western Asset Funds |
| NCC Trust | Select SPDR Trust | Westwood Funds |
| North Track Trust | Selected Funds | William Blair Funds |
| Northern Funds | Seligman Funds | Wilmington Funds |
| Northern Lights Funds | Sentinel Funds | WM Funds |
| Nottingham Trust | Shepherd Street Funds | World Funds |
| Nuveen Funds | Sit Funds | Wright Funds |
| Oak Value Fund | Skyline Funds | |
| Oakmark Funds | SM&R Funds | |
| Oberweis Funds | SPARX Funds | |
| Olstein Funds | SSgA Funds | |

Figure 17

Advanced Financial Applications
Advent Software
Aegis Software
Anvil Software
Automated Trading Desk
Bank of America Direct Access Financial
Bank of New York Sonic
Bloomberg
Charles River Development
DST International
EZE Castle Software
Fidessa
Firefly
Future Trade
GL Trade
Goldman Sachs Rediplus
INDATA
Instinet
IRIS Financial
ITG JPMorgan Neovest
Kestral Technologies
Latent Zero
Linedata LongView
Linedata Services
Macgregor
Miletus Trading
Morgan Stanley Passport
Neonet
Orc Software
Reuters
Simcorp
SIS
SS&C Technologies
SunGard
Tethys Technologies
Tora Trading Software
Townsend Analytics
TradingScreen
UNX

Figure 18A

508 Securities
Abel/Noser Corporation 1,2,3,5
ABN Amro 7,8
Access Securities
Adams Harkness Hill
AG Edwards 8
Albert Fried & Co.
Allen & Company
American Technology Research
Automated Trading
Autranet 1,2,3,4,5
Avian Securities 8
Avondale Partners
Bank of America 1,2,8
Bank of Montreal
Bass Trading 8
BB&T Capital Markets
Bear Stearns 1,2,3,6,7,8
Benchmark Company LLC
Bidwell & Company
Bloomberg
Blue Trading
BNP Paribas Securities Corp.
BNY Brokerage, Inc. 1,2,6
Boenning & Scattergood Inc.
Boston Institutional Services
Brean Murray
Bridge Trading Co.
B. Riley & Co.
Brokerage America
Brown Brothers Harriman
Brut, LLC
Buckingham Research Group 8
Buckman, Buckman & Reid
Burlington Capital Markets
Butler Wick
Cabrera Capital Markets
CA Cheuvereux
Calyon Securities 8
Cantor Fitzgerald 1
Capital Institutional Services 1,6
Caris & Co.
Carlin Equities
Carnegie Investment Bank AB 7

1 = Program Trading   2 = Algorithmic Trading
7 = International   8 = IOIs

C.E. Unterberg, Towbin
Cheevers & Company, Inc.
CIBC World Markets
Citigroup Global Markets 1,7,8
CL King 8
Collins Stewart Tullett
Craig Hallum
Credit Suisse 1,2,5,6,7
Crowell Weedon
D.A. Davidson
DeMatteo Monness
Dermott Clancy
Deutsche Bank Securities 1,2,7,8
Direct Access Partners
Direct Trading International
Domestic Securities
E*Trade Securities Limited 7,8
Edgetrade Inc.
Ehrenkrantz King Nussbaumer (EKN)
Empire Financial Group
Fagenson & Co.
Farina and Associates
Felt & Co.
Ferris, Baker Watts Incorporated
Fidelity Capital Markets 6
Fig Partners
FinTech Securities
Firefly Capital
First Albany Corporation 8
First American Capital
First Clearing Corporation
First Southwest
Flagstone Securities
Fox Pitt Kelper
Friedman, Billings, Ramsey & Company 8
Fulcrum Global Partners
Future Trade Securities
G&L Partners
Gabelli Equities
Garban Corporates
Gardner Rich
GFI Securities
GGE7 LLC Inc.
Glenwood Securities 3 = DMA   4 = Smart Routing   5 = VWAP Engine Goldman Sachs & Company 1,6,7,8
Goldman Sachs Exec/Clear REDIplus
Gordon Haskett Capital Corp.
Great Eastern Securities
Glenwood Securities
Great Lakes Capital
Green Street Advisors
Greentree Brokerage Services, Inc.
Griswold Company, Inc.
Gunn Allen Financial
Guzman & Company
Hibernia Southcoast
Hill, Thompson, Magid
Howard Weill
HSBC 8
Hudson Securities
Instinet Corporation 1,4,7,8
International Correspondent Trading Inc.
International Strategy & Investment Group 8
International Trading
Interstate Group
ITG, Inc. 2,4
Janney Montgomery Scott 8
Jefferies & Company 1,2,8
JMP Securities
JNK Securities
John Selp & Co.
Johnson Rice
Jones Trading 8
J.P. Morgan Chase & Company 1,2,6,7,8
JP Turner
Kabrik Securities Corporation
Kaufman Bros LP
Keefe Bruyette & Woods
Kellogg Partners Institutional Services
Kepler Securities 7
Kevin Dann & Partners
Knight Securities
LaBranche Financial Services
Ladenburg Thalman
Lambright Financial
Lazard Capital Markets
Leerink Swann & Company 8
Lehman Brothers 1,2,7,8

6 = Allocations

Figure 18B

Loop Capital Markets
Lynch Jones Ryan
Magna Securities
Maxcor
Maxim Group, Inc.
Maximum Financial Investment Group
McDonald & Co. 1,8
Melvin Securities
Merrill Lynch 1,2,3,4,5,6,7
Merriman Curhan Ford & Co.
Midwest Research Securities Foundation
Midwood Securities
Mietus Trading
Miller Tabak
MKM Partners
Mogavero Lee & Co.
Montrose Securities
Moors & Cabot
Morgan Keegan
Morgan Stanley Dean Witter 1,5,7,8
M.R. BEAL
Muriel Siebert
NDX Trading
Needham and Company 8
NeoNet 7
Neuberger Berman
Nomura International
Nomura Securities
Northern Trust
Nutmeg Securities
Oppenheimer & Co. 8
OTA LLC
Pacific American Securities
Pacific Crest
Pacific Growth Equities, LLC
Pali Capital 8
Park Financial Group
Penson Financial Services
Petrie Parkman
Pickering Energy Partners
Pipeline Trading Systems LLC
Piper Jaffrey PolCari Weicker
Prime Executions
Princeton Securities Group
Prudential Securities
Pulse Trading, LLC
Punk, Ziegal & Company
Radnor Research & Trading
Raymond James 8
RBC Capital Markets 3
Reynders Gray
Reynolds Securities
Robbins Henderson
Rochdale Securities
Rodman & Renshaw
Rosenblatt Securities
Roth Capital
RW Baird 8
Ryan Beck 8
Sanders Morris Harris
Sandler O'Neill & Partners LP 8
Sanford C. Bernstein & Co. 2,7,8
Schonfeld IBS
Schwab Capital Markets L.P. 1,6
Schwab Institutional Services
SCORE Securities
Scotia Capital (USA) Inc.
Scott & Stringfellow
Screaming Eagle Trading
Seaboard Securities
SG Americas
SG Cowen 8
SIA S.p.A.
Sidoti & Company 8
Signal Hill Capital Group
Simmons & Company, International
Soleil Securities 8
Source Trading (Access Securities)
Southwest Securities 1
Standard & Poors
Stanford Group Company 8
State Street Global Markets LLC 8
Stephen M. Ferretti, Inc.

Stephens, Inc. 8
Sterne, Agee Capital Markets
Sterne, Agee & Leach, Inc. 8
Stifel Nicholas
Stuart Frankel
SunGard Institutional Brokerage, Inc. 4,6
SunTrust Robinson Humphrey 8
Susquehanna Financial Group
Svenska Handelsbanken 2,7
Sweney Cartwright 6
TD Ameritrade 6
Terra Nova Trading
Themis Trading
Think Equity Partners 8
Thomas Weisel Partners 1,8
Trade Manage
TradeTrek
Tradition Asiel Securities
UBS Financial Services
UBS Warburg 1,3,5,6,7
UNX 2,3
Vendham Securities
Vertical Group
V Finance Investment, Inc.
Visual Trader
Wachovia Securities
Wall Street Access 8
Wave Securities
Wedbush Morgan Securities 8
Weeden & Company 8
White Cap Trading
William Blair
William O'Neill
Williams Capital
Williams Financial Group
Williams Trading
Wilson Davis
WJT Soundview
WJ Bonfanti
WM V Frankel
W.R. Hambrecht & Co.
Yamner & Company, Inc.

1 = Program Trading  2 = Algorithmic Trading  3 = DMA  4 = Smart Routing  5 = VWAP Engine  6 = Allocations
7 = International  8 = IOIs

Figure 23

UAT Inc.
Trust Shareholder Savings - Various Execution Costs

| Trust | Assets | Execution Costs/ Annual Turn/Effective Turn Annual Shares Traded | Shareholder Savings at Execution Costs per Share: 1.00 Cents |
|---|---|---|---|
| AXA EQ Advisors Trust | $38.7 BB | 3.25 Cents/Share 52% Turn/123% 1.77 BB | $35.8 MM 9.24 bps |
| Great West Maxim | $3.5 BB | 2.83 Cents/Share 46% Turn/123% Turn 175 MM | $3.2 MM 10.05 bps |
| ING Investors Trust | $15.2 BB | 2.31 Cents/Share 81% Turn/271% Turn 2.0 BB | $12.7 MM 8.38 bps |
| ING Partners Trust | $9.7 BB | 1.87 Cents/Share 56% Turn/148% Turn 535 MM | $3.2 MM 3.29 bps |
| ING Variable Trust | $0.8 BB | 2.93 Cents/Share 100% Turn/253% Turn 130 MM | $1.3 MM 16.26 bps |
| JNL Series Trust | $5.3 BB | 3.00 Cents/Share 70% Turn/164% Turn 300 MM | $6.6 MM 12.42 bps |
| Met Life Series Trust | $12.7 BB | 3.29 Cents/Share 80% Turn/175% Turn 730 MM | $15.9 MM 12.51 bps |
| Pacific Life Series Trust | $18.9 BB | 2.65 Cents/Share 64% Turn/148% Turn 1.2 BB | $15.0 MM 7.94 bps |
| TA DIA Trust | $13.9 BB | 2.31 Cents/Share 84% Turn/185% Turn 960 MM | $12.9 MM 9.30 bps |
| TA IDEX Trust | $6.7 BB | 3.29 Cents/Share 56% Turn/194% Turn 475 MM | $6.6 MM 10.00 bps |
| TA Premier Trust | $1.0 BB | 3.63 Cents/Share 46% Turn/133% Turn 28 MM | $0.8 MM 7.54 bps |
| TA AIST | $12.4 BB | 3.14 Cents/Share 54% Turn/115% Turn 460 MM | $8.9 MM 7.19 bps |
| Vanguard | $228 BB | 3.26 Cents/Share 30% Turn/42% Turn 6.7 BB | $96 MM 4.23 bps |

Figure 24A

UAT Inc.
AXA EQ Advisors Trust

| Fund | Equity Assets | Fund Savings at $0.0100 | Bps (yrs) 1 | 3 | 5 | 10 |
|---|---|---|---|---|---|---|
| EQ/Alliance Common Stock | $9,544,061,017 | $5,499,920 | 0.0576% | 0.1730% | 0.2885% | 0.5778% |
| EQ/Alliance Growth and Income | $2,945,651,448 | $2,160,290 | 0.0730% | 0.2192% | 0.3655% | 0.7324% |
| EQ/Alliance International | $2,908,706,533 | $1,797,459 | 0.0618% | 0.1855% | 0.3094% | 0.6197% |
| EQ/Alliance Large Cap Growth | $1,084,968,184 | $884,096 | 0.0815% | 0.2447% | 0.4081% | 0.8179% |
| EQ/Alliance Small Cap Growth | $1,186,076,948 | $1,955,185 | 0.1648% | 0.4953% | 0.8269% | 1.6607% |
| EQ/Ariel Appreciation II | $8,800,422 | $4,565 | 0.0519% | 0.1557% | 0.2596% | 0.5199% |
| EQ/Bernstein Diversified Value | $3,384,894,280 | $1,908,036 | 0.0564% | 0.1692% | 0.2822% | 0.5651% |
| EQ/Boston Advisors Equity Income | $351,167,637 | $5,953,153 | 1.6952% | 5.1724% | 8.7685% | 18.3059% |
| EQ/Calvert Socially Responsible | $72,186,794 | $15,074 | 0.0209% | 0.0627% | 0.1045% | 0.2090% |
| EQ/Capital Guardian Growth | $288,290,179 | $139,181 | 0.0483% | 0.1449% | 0.2416% | 0.4838% |
| EQ/Capital Guardian International | $903,942,852 | $232,360 | 0.0257% | 0.0771% | 0.1286% | 0.2573% |
| EQ/Capital Guardian Research | $1,014,200,971 | $526,839 | 0.0519% | 0.1559% | 0.2600% | 0.5207% |
| EQ/Capital Guardian US Equity | $1,125,258,703 | $496,627 | 0.0441% | 0.1325% | 0.2209% | 0.4422% |
| EQ/Evergreen Omega | $183,521,896 | $394,271 | 0.2148% | 0.6459% | 1.0788% | 2.1692% |
| EQ/FI Mid Cap | $1,329,503,604 | $3,405,775 | 0.2562% | 0.7705% | 1.2874% | 2.5914% |
| EQ/FI Mid Cap Value | $1,670,919,567 | $1,841,669 | 0.1102% | 0.3310% | 0.5523% | 1.1077% |
| EQ/GAMCO M&A | $28,354,530 | $0 | 0.0000% | 0.0000% | 0.0000% | 0.0000% |
| EQ/GAMCO Small Company Value | $515,467,003 | $373,124 | 0.0724% | 0.2173% | 0.3624% | 0.7262% |
| EQ/International Growth | $71,562,554 | $0 | 0.0000% | 0.0000% | 0.0000% | 0.0000% |
| EQ/Janus Large Cap Growth | $348,036,345 | $180,374 | 0.0518% | 0.1556% | 0.2594% | 0.5195% |
| EQ/JPMorgan Value Opportunities | $590,377,574 | $620,643 | 0.1051% | 0.3157% | 0.5267% | 1.0563% |
| EQ/Lord Abbett Growth and Income | $36,036,775 | $159 | 0.0004% | 0.0013% | 0.0022% | 0.0044% |
| EQ/Lord Abbett Large Cap Core | $25,948,219 | $0 | 0.0000% | 0.0000% | 0.0000% | 0.0000% |
| EQ/Lord Abbett Mid Cap Value | $119,642,657 | $26,410 | 0.0221% | 0.0662% | 0.1104% | 0.2210% |
| EQ/Marsico Focus | $2,762,365,908 | $1,882,582 | 0.0682% | 0.2046% | 0.3412% | 0.6836% |
| EQ/Mercury Basic Value Equity | $2,721,029,640 | $2,979,284 | 0.1095% | 0.3288% | 0.5487% | 1.1003% |
| EQ/Mercury International Value | $1,377,985,653 | $373,193 | 0.0271% | 0.0813% | 0.1355% | 0.2712% |
| EQ/MFS Emerging Growth Companies | $891,935,789 | $1,524,287 | 0.1709% | 0.5136% | 0.8574% | 1.7222% |
| EQ/MFS Investors Trust | $334,166,185 | $221,151 | 0.0662% | 0.1987% | 0.3313% | 0.6635% |
| EQ/Montag & Caldwell Growth | $306,921,252 | $214,038 | 0.0697% | 0.2094% | 0.3492% | 0.6996% |
| EQ/TCW Advisors Trust | $297,491,133 | $71,006 | 0.0239% | 0.0716% | 0.1194% | 0.2389% |
| EQ/UBS Growth and Income | $165,864,516 | $105,372 | 0.0635% | 0.1907% | 0.3180% | 0.6371% |
| EQ/Van Kampen Comstock | $104,336,286 | $0 | 0.0000% | 0.0000% | 0.0000% | 0.0000% |
| EQ/Van Kampen Mid Cap Growth | $48,252,946 | $0 | 0.0000% | 0.0000% | 0.0000% | 0.0000% |
| EQ/Wells Fargo Montgomery Small Cap | $13,290,731 | $42,086 | 0.3166% | 0.9523% | 1.5922% | 3.2097% |
| Total | $38,761,246,711 | $35,818,178 | 0.0924% | 0.2775% | 0.4629% | 0.9279% |
| Weighted Average | | 0.0924% | | | | |
| Potential Fund Savings | | | | | | |

Figure 24B

UAT Inc.
Met Life Series Funds - Equity Funds and Positions

| Fund | Equity Assets | Fund Savings at $0.0100 | Bps (yrs) 1 | 3 | 5 | 10 |
|---|---|---|---|---|---|---|
| Blackrock Investment Trust | $1,787,332,622 | $1,499,624 | 0.0839% | 0.2519% | 0.4202% | 0.8422% |
| Blackrock Large Cap Value | $137,011,060 | $98,435 | 0.0718% | 0.2157% | 0.3597% | 0.7208% |
| Blackrock Legacy Lg Cap Growth | $538,765,164 | $859,327 | 0.1595% | 0.4793% | 0.8000% | 1.6065% |
| FI Value Leaders | $635,701,202 | $943,339 | 0.1484% | 0.4458% | 0.7442% | 1.4939% |
| Harris Oakmark Large Cap Value | $583,427,962 | $130,297 | 0.0223% | 0.0670% | 0.1117% | 0.2236% |
| Jennison Growth | $1,098,598,665 | $840,427 | 0.0765% | 0.2297% | 0.3831% | 0.7676% |
| T. Rowe Price Large Cap Growth | $434,589,971 | $209,491 | 0.0482% | 0.1447% | 0.2413% | 0.4831% |
| Blackrock Aggressive Growth | $1,000,849,928 | $1,592,435 | 0.1591% | 0.4781% | 0.7981% | 1.6025% |
| FI Mid Cap Opportunities | $1,078,017,892 | $2,197,660 | 0.2039% | 0.6128% | 1.0235% | 2.0574% |
| Harris Oakmark Focused Value | $1,815,679,185 | $695,921 | 0.0383% | 0.1150% | 0.1918% | 0.3839% |
| Neuberger Berman Mid Cap Value | $771,008,318 | $394,464 | 0.0512% | 0.1536% | 0.2561% | 0.5128% |
| Blackrock Strategic Value | $994,632,666 | $4,826,630 | 0.4853% | 1.4629% | 2.4500% | 4.9600% |
| Franklin Temple Small Cap Growth | $122,696,396 | $104,118 | 0.0849% | 0.2548% | 0.4250% | 0.8518% |
| Loomis Sayles Small Cap | $473,003,692 | $1,064,200 | 0.2250% | 0.6765% | 1.1300% | 2.2728% |
| Oppenheimer Global Equity | $304,431,952 | $0 | 0.0000% | 0.0000% | 0.0000% | 0.0000% |
| T. Rowe Price Small Cap Growth | $402,974,834 | $187,012 | 0.0464% | 0.1393% | 0.2323% | 0.4650% |
| FI International Stock | $597,672,090 | $339,681 | 0.0568% | 0.1706% | 0.2845% | 0.5698% |
| Total | $12,776,393,599 | $15,983,059 | 0.1251% | 0.3758% | 0.6271% | 1.2580% |

Figure 24C

UAT Inc.
Transamerica IDEX Mutual Funds

| Fund | Equity Assets | Fund Savings at $0.0100 | Bps (yrs) 1 | 3 | 5 | 10 |
|---|---|---|---|---|---|---|
| Amer Century International | $43,193,000 | $428,247 | 0.9915% | 3.0040% | 5.0566% | 10.3690% |
| Amer Century Large Comp Value | $264,983,000 | $84,257 | 0.0318% | 0.0954% | 0.1591% | 0.3184% |
| Clarion Global Real Estate | $222,480,000 | $0 | 0.0000% | 0.0000% | 0.0000% | 0.0000% |
| Evergreen Intl Small Cap | $387,163,000 | $0 | 0.0000% | 0.0000% | 0.0000% | 0.0000% |
| Great Companies - America | $91,966,000 | $159,342 | 0.1733% | 0.5207% | 0.8693% | 1.7462% |
| Great Companies - Technology | $72,950,000 | $156,599 | 0.2147% | 0.6454% | 1.0780% | 2.1675% |
| Janus Growth | $1,040,214,000 | $896,723 | 0.0862% | 0.2588% | 0.4318% | 0.8654% |
| Jennison Growth | $145,525,000 | $132,981 | 0.0914% | 0.2744% | 0.4577% | 0.9176% |
| Marsico Growth | $144,392,000 | $123,202 | 0.0853% | 0.2562% | 0.4274% | 0.8565% |
| Marsico International Growth | $364,147,000 | $820,079 | 0.2252% | 0.6771% | 1.1311% | 2.2750% |
| Protected Principal Stock | $46,412,000 | $31,955 | 0.0689% | 0.2067% | 0.3447% | 0.6906% |
| Salomon All Cap | $231,719,000 | $927,738 | 0.4004% | 1.2059% | 2.0180% | 4.0766% |
| Salomon Investors Value | $90,385,000 | $441,301 | 0.4882% | 1.4719% | 2.4652% | 4.9911% |
| Evergreen Health Sciences | $427,736,701 | $531,412 | 0.1242% | 0.3732% | 0.6227% | 1.2493% |
| T Rowe Price Small Cap | $30,802,000 | $89,972 | 0.2921% | 0.8789% | 1.4690% | 2.9597% |
| T Rowe Price Tax Efficent Growth | $17,272,000 | $1,786 | 0.0103% | 0.0310% | 0.0517% | 0.1034% |
| Templeton Great Comp Global | $285,352,000 | $531,385 | 0.1862% | 0.5597% | 0.9346% | 1.8779% |
| Mercury Large Cap Value | $400,962,000 | $0 | 0.0000% | 0.0000% | 0.0000% | 0.0000% |
| JP Morgan Mid Cap Value | $215,434,000 | $61,584 | 0.0286% | 0.0858% | 0.1430% | 0.2862% |
| UBS Large Cap Value | $183,371,000 | $111,796 | 0.0610% | 0.1830% | 0.3052% | 0.6113% |
| Van Kampen Small Comp Growth | $269,782,000 | $0 | 0.0000% | 0.0000% | 0.0000% | 0.0000% |
| Transamerica Balanced | $182,774,000 | $51,183 | 0.0280% | 0.0840% | 0.1401% | 0.2804% |
| Transamerica Equity | $648,062,000 | $114,723 | 0.0177% | 0.0531% | 0.0885% | 0.1772% |
| Transamerica Growth Opportun | $378,577,000 | $503,278 | 0.1329% | 0.3993% | 0.6665% | 1.3374% |
| Transamerica Small/Mid Cap Valu | $488,504,000 | $452,464 | 0.0926% | 0.2781% | 0.4640% | 0.9301% |
| Transamerica Value Balanced | $48,666,000 | $39,447 | 0.0811% | 0.2434% | 0.4059% | 0.8135% |
| Total | $6,722,823,701 | $6,691,453 | 0.0995% | 0.2989% | 0.4987% | 0.9998% |

Figure 24D

UAT Inc.
JNL SERIES TRUST

| Fund | Equity Assets | Fund Savings at $0.0100 | Bps (yrs) 1 | 3 | 5 | 10 |
|---|---|---|---|---|---|---|
| JNL/AIM Large Cap Growth | $356,477,000 | $437,174 | 0.1226% | 0.3684% | 0.6147% | 1.2332% |
| JNL/AIM Real Estate | $73,754,000 | $80,659 | 0.1094% | 0.3284% | 0.5480% | 1.0990% |
| JNL/AIM Small Cap Growth | $48,116,000 | $48,441 | 0.1007% | 0.3023% | 0.5044% | 1.0113% |
| JNL Alger Growth | $246,487,000 | $1,085,271 | 0.4403% | 1.3267% | 2.2209% | 4.4912% |
| JNL/Eagle Core Equity | $231,369,000 | $561,116 | 0.2425% | 0.7293% | 1.2185% | 2.4518% |
| JNL/Eagle Small Cap Equity | $157,970,000 | $311,847 | 0.1974% | 0.5934% | 0.9909% | 1.9917% |
| JNL/FMR Capital Growth (MC-Equit) | $209,228,000 | $605,370 | 0.2893% | 0.8705% | 1.4551% | 2.9313% |
| JNL/Franklin Temp Small Cap Value | $58,972,000 | $4,371 | 0.0074% | 0.0222% | 0.0371% | 0.0741% |
| JNL/Goldman Sachs Mid Cap Value | $83,665,000 | $46,251 | 0.0553% | 0.1659% | 0.2767% | 0.5542% |
| JNL/JP Morgan International Equity | $197,450,000 | $0 | 0.0000% | 0.0000% | 0.0000% | 0.0000% |
| JNL/JP Morgan International Value | $221,655,000 | $152,961 | 0.0690% | 0.2072% | 0.3455% | 0.6922% |
| JNL/Lazard Mid Cap Value | $220,007,000 | $304,551 | 0.1384% | 0.4159% | 0.6941% | 1.3929% |
| JNL/Lazard Small Cap Value | $193,671,000 | $489,418 | 0.2527% | 0.7600% | 1.2699% | 2.5560% |
| JNL/Oppenheimer Global Growth | $279,475,000 | $91,293 | 0.0327% | 0.0980% | 0.1634% | 0.3271% |
| JNL/Oppenheimer Growth | $28,062,000 | $21,048 | 0.0750% | 0.2252% | 0.3756% | 0.7526% |
| JNL Putnam Equity | $161,057,000 | $280,159 | 0.1739% | 0.5228% | 0.8728% | 1.7532% |
| JNL/Putnam Mid Cap Growth | $36,482,000 | $38,007 | 0.1042% | 0.3129% | 0.5220% | 1.0467% |
| JNL/Putnam Value Equity | $183,518,500 | $192,202 | 0.1047% | 0.3145% | 0.5248% | 1.0523% |
| JNL/Select Large Cap Growth | $214,991,000 | $184,100 | 0.0856% | 0.2571% | 0.4289% | 0.8596% |
| JNL/Select Value | $273,313,000 | $76,726 | 0.0281% | 0.0842% | 0.1404% | 0.2811% |
| JNL/T Rowe Price Estab Growth | $711,037,000 | $452,878 | 0.0637% | 0.1912% | 0.3189% | 0.6388% |
| JNL/T Rowe Price Mid Cap Growth | $605,567,000 | $235,782 | 0.0389% | 0.1169% | 0.1948% | 0.3900% |
| JNL/T Rowe Price Value | $532,338,000 | $213,818 | 0.0402% | 0.1205% | 0.2010% | 0.4024% |
| Total | $5,324,661,500 | $5,913,442 | 0.1111% | 0.3335% | 0.5565% | 1.1161% |

SYSTEM AND METHOD FOR ASSIGNING RESPONSIBILITY FOR TRADE ORDER EXECUTION

RELATED APPLICATIONS

This application claims the benefit of U.S. Provisional Application No. 60/982,320, filed Oct. 24, 2007, which is herein incorporated by reference in its entirety. This application is also a continuation-in-part of U.S. patent application Ser. No. 12/140,047, filed Jun. 16, 2008, which claims the benefit of U.S. Provisional Application No. 60/945,196, filed Jun. 20, 2007 and is a continuation-in-part of U.S. patent application Ser. No. 11/783,690, filed Apr. 11, 2007 now U.S. Pat. No. 7,685,057, which claims the benefit of U.S. Provisional Application No. 60/791,209, filed Apr. 12, 2006, and U.S. Provisional Application No. 60/899,393, filed Feb. 5, 2007, all of which are herein incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

Field of the Invention

The present invention relates generally to securities trading and to the management and trading of investment portfolios and, in particular, to a system, method, process, software and standards for facilitating a sponsoring organization's unified trading and control of a money management process.

The present invention also relates to a system (e.g., a hosted application), method (organization of activity), process (division of responsibilities), software (computer-based systems), and standards (systems, connectivity and communications protocols) supporting a real-time process inclusive of computer interfaces, order entry, compliance analysis, market impact analysis, order routing discretion, execution cost and quality analysis, trade processing, communications engines, communications networks, and communications protocols that facilitate centralized portfolio management and directed brokerage control. This system and method creates, for the first time for sponsoring organizations, direct, pre-trade and automated compliance monitoring of trading activity by sub-advisors providing asset management services to sponsoring organizations while also creating substantial and recurring savings in brokerage costs for shareholders and beneficiaries in sub-advised investment portfolios. This system (referred to as the unified trading and control system), method, process, software, and standards are applicable to registered mutual funds, non-registered mutual funds, and institutional investment portfolios and could be, for example, utilized by: (1) insurance companies with single or multi-manager sub-advised variable insurance, mutual fund, and defined contribution portfolios; (2) mutual fund companies utilizing sub-advisors for managing their mutual fund offerings, education funding, and defined contribution portfolios; (3) defined benefit plan pension funds, trusts, and endowments that utilize externally managed or unaffiliated money management services; (4) large company investment portfolios and separate accounts of insurance companies that utilize outsourced or unaffiliated money management services for their institutional investment accounts; and (5) non-registered mutual funds such as hedge funds, group annuities, and collective investment funds that utilize outsourced or unaffiliated money management services.

More particularly, the present invention relates generally to the management and trading of investment portfolios and to a system and method for a sponsoring organization to:

(1) Utilize a rules-based computer system to capture trade orders from sub-advisors (money management firms) in order to implement a pre-trade compliance review process, thereby enabling the advisor to prevent the execution of trade orders by a sub-advisor that violates securities laws, account restrictions, or prohibited transactions. The embodiment of the present invention enables a sponsoring organization to properly implement, for the first time, its own single, centralized, real-time, rules-based pre and post trade compliance process across all of its sub-advisors and the sub-advisors' trading activity.

(2) Determine and assign, for the first time, based on expected market impact of a trade order to buy or sell securities, whether responsibility (discretion over the decisions related to how, when, and with whom a trade order is executed) for executing a trade order is assigned to the sub-advisor (money management firm) for an investment portfolio for high touch trade orders or to the sponsoring organization of that investment portfolio for low touch trade orders.

(3) Minimize, through a real-time, computer-based optimization analysis, the expected total execution cost of securities trades in order to lower brokerage costs and improve investment performance for the sub-advised investment portfolios. The system and method also generates additional savings in brokerage costs through a real-time analysis and optimization process incorporating: (a) the currently offered share price and number of shares available (liquidity) in the securities markets; (b) execution costs as input in real-time by executing brokers; (c) expected price improvement based on current and recent trading data; (d) time required to execute an order by an executing broker (time to execute); and (e) the current rate of change in the share price of a security during the time required to execute the transaction.

(4) Provide a number of previously unavailable improvements in business processes for sponsoring organizations utilizing sub-advised asset management for their investment portfolios, including greater control and lower brokerage costs related to the process of replacing a sub-advisor to an investment portfolio; lower brokerage costs for model portfolio rebalancing activity; improved reporting for asset segregation requirements related to forward settlements; and enhanced governance reporting as real-time, up-to-the-minute data is available to sponsoring organizations across their sub-advised investment portfolios pertaining to holdings, trading activity, compliance violations, and brokerage and other costs.

DEFINITIONS

For purposes of describing the present invention, FIG. 1 lists components of the present invention and compares the corresponding terminology used in the investment products within the registered mutual fund, unregistered mutual fund, and institutional investment portfolio markets. FIG. 1 shows that similar structures and responsibilities in various product categories have different names.

As used herein, the terms "advisor" and "board of trustees" in the context of registered and non registered mutual funds can be considered the equivalent of the "administrator" and "board of trustees" in the context of pension plan, endowment, or trust investment portfolios; the term "sub-advisor" in the context of registered and non registered mutual funds can be considered the equivalent of a "money manager" or "externally managed" in the context of pension plan, endowment, or trust investment portfolios; and the term "sub account" in the context of a variable insurance product can be considered equivalent to a "mutual fund" in a defined contribution plan (such as a 401(k) product) and a pension plan's "account" with a money manager. In addition, the retail investors (for example, the individual persons whose personal accounts aggregate and are commingled into the assets comprising a fund's investment portfolio) are referred to as "shareholders" in registered and unregistered mutual funds and as "beneficiaries" in institutional accounts, pension plans, etc. It is important to note that the advisor or administrator and associated board of trustees (boards) have a fiduciary responsibility to the shareholders and beneficiaries to properly control (minimize) fund and plan operating expenses, as these expenses reduce the returns (performance) of the investment portfolios to these same fund shareholders and plan beneficiaries. The use herein of any of these terms, as shown in FIG. 1, implies a similar underlying method and process applicable across registered mutual funds, unregistered mutual funds, and institutional investment portfolios.

BACKGROUND OF THE INVENTION

The system of the present invention relates to the sub-advised industry. The sub-advised industry consists of large financial organizations, such as insurance companies, 401k providers, pension plans, endowments, trusts and certain mutual fund companies, that operate an investment complex consisting of, but not limited to, mutual funds and institutional investment accounts, but do not have money management (asset management) capabilities within their organizational structure to manage these investments. As a result, these organizations (as the sponsoring organization of one or a plurality of investment portfolios in the investment complex) utilize outside money management firms (usually mutual fund companies or institutional investment management firms) to manage their investment portfolios.

The sub-advised industry, as described above, employs the following structure: The financial institution (as the sponsoring organization) acts as the "advisor" with respect to Securities and Exchange Commission (SEC) registration and supervisory requirements or Department of Labor (DOL) oversight and, has fiduciary and regulatory governance responsibility for the investment portfolios. The money management firm acts as the "sub-advisor" and is responsible for the investment management decisions and, as addressed below, the trading activity of the investment portfolio they are hired to manage. The sponsoring organization, as advisor, is responsible for marketing, sales, administrative functions, regulatory filings, compliance supervision and client services in addition to hiring the sub-advisors, monitoring the performance and expenses of the investment portfolios, and if necessary, firing the sub-advisors and selecting their replacements.

As of Dec. 31, 2006, the total assets managed on a sub-advised basis, according to Pension & Investments (P&I) magazine, equaled $2.98 TR. Sub-advised assets grew, according to data from Financial Research Corporation (FRC), at a 27% annual rate during the years 2003 to 2006.

Sub-advised asset management dates its inception to the mid 1970s, when mutual fund companies such as Vanguard began marketing their own brand of mutual funds with the asset management function outsourced to external asset management organizations. Shortly thereafter, insurance companies also began to employ a sub-advised asset management structure in their investment products in order to reduce overhead and to leverage the brand recognition and investment performance of the leading mutual fund companies.

Additionally, large financial organizations, such as insurance companies, may acquire a money management firm and utilize the acquired firm's capabilities to manage a number of their investment portfolios on a sub-advised basis. In this type of scenario, the large financial organization may wish to maintain the separate identity and operations of the acquired money management firm. Examples of acquisitions of this type include the acquisition of Delaware Investments by Lincoln Life, Putnam Investments by Great West Life, MFS by Sun Life of Canada, and Alliance Bernstein by AXA Equitable.

In the prior art, there are two significant operational deficiencies in the sub-advised asset management structure. These deficiencies have been present since the inception of the sub-advised industry in the mid-1970s. Now, several decades later, industry participants view these deficiencies as unavoidable and unsolvable. In fact, these deficiencies are no longer actively discussed as problematic and are now ingrained in commonly accepted business practices. It could be said that the sub-advised industry, without a practical and workable solution, gave up on its efforts to address these deficiencies and moved on to addressing new challenges in a growing industry. However, a commonly accepted business practice, irrespective of length of usage, does not equate into regulatory approval by or exemptive relief from agencies such as the SEC or DOL. Examples of recent scrutiny of decades-long commonly accepted business practices include mutual fund timing and shelf space marketing agreements, which ultimately became subject to considerable regulatory focus resulting in substantial penalties, fines, and adverse publicity.

Thus, when a sponsoring organization utilizes an external or affiliated money management firm to manage its investment portfolios, the current industry practice is for the sponsoring organization to delegate the responsibility for executing the resulting trade orders (to buy and sell securities) to the sub-advisor (external) money management firm.

The challenges in the prior art that sponsoring organizations face when using external money management firms as sub-advisors include:

(1) There is no mechanism through which the sponsoring organization, as advisor, can implement a compliance process whereby the advisor (sponsoring organization) is able to perform a compliance supervisory review, prior to execution in the market, of the trade orders generated by the sub-advisors. Therefore, the advisor, with whom resides regulatory responsibility over all of their sub-advised investment portfolios, is unable to prevent the execution of a trade order by a sub-advisor that would otherwise violate a securities law, account restriction, or prohibited transaction. This omission is particularly onerous in light of:

a) the SEC's and the Department of Labor's (DOL) heightened regulatory and supervision requirements placed on fund and plan advisors requiring prevention of violations along with proper supervision and monitoring of all brokerage and operational expenses incurred by the advisor's investment portfolios; and b) more frequent and increasingly larger rogue trader scandals costing companies billions of dollars (including a $7.2 BB loss reported by Sogen in early 2008 for unauthorized trading by a rogue trader).

(2) Sub-advisors have complete control over all phases of the execution of trade orders, including selection of the execution venue (such as the various stock exchanges) or broker and the associated cost to execute the trades. The result is that the sponsoring organization cannot exert direct and positive control over their sub-advisors' decisions related to execution venue or broker selection, trade costs, and execution quality without undermining the portfolio managers' (at the sub-advisors) investment process and/or creating undue and unnecessary complexity in the trade operations of their sub-advisor money management firms. Thus, sub-advised investment portfolios often incur considerably higher brokerage (trading) costs and experience lower execution quality than what is otherwise commonly available in the market for securities trading. This disparity between incurred and available brokerage costs often exceeds two cents per share. This cost disparity assumes far greater gravity, from the fiduciary perspective of the advisor, when considering that many of these fund trusts and pension plans trade multiple billion shares of equity order flow annually. As such, a sponsoring organization may incur double-digit millions of dollars in unnecessary brokerage costs paid entirely by the fund shareholders and plan beneficiaries who own the sub-advised funds or accounts in their retirement plans. These additional and unnecessary brokerage costs incurred by sub-advised investment portfolios result in a dollar-for-dollar equivalent reduction in investment performance in the year they are incurred, along with the loss of the compounded benefit in investment performance over longer periods of time.

The prior art therefore does not provide a means whereby the sponsoring organization can assume responsibility for order execution for their investment portfolios while simultaneously: (1) implementing a pre-trade compliance process across all their sub-advisors; (2) exercising appropriate control over and minimization of brokerage costs resulting from sub-advisor trading activity; (3) enabling the portfolio manager to have sufficient control over trade orders where the portfolio manager has very specific and detailed instructions as to how an order is executed; (4) protecting the anonymity (or source) of the order from leaking to other executing brokers; and (5) minimizing the market impact of a trade order on the price of a security. Significant market impact is detrimental as, for example, a large buy order may push up the price of a stock only to see the stock price fall as soon as the buy order is completed. Likewise, a large sell order may depress the price of a stock only to see the price rise as soon as the sell order is completed.

Despite the clear deficiencies in the prior art, the fact is that the sponsoring organization, as the advisor, is and always has been the owner of all trade orders generated by their investment portfolios, whether or not they are sub-advised by a money management firm. The sponsoring organization, as a result, retains complete authority and ultimate fiduciary and regulatory responsibility as to determining how these trade orders should be executed. However, in recognition of the absence of an acceptable, reliable, and practical solution in the prior art, sponsoring organizations have: (1) forfeited, and continue to forfeit, all pre-trade compliance review processes by the advisor over the trading activity of their sub-advisors while incurring incur substantial fiduciary and regulatory liability; and (2) delegated all trade order execution responsibilities over their trade orders to the sub-advisors for their investment portfolios, even when they are not satisfied with certain aspects of the results (such as considerably higher than necessary brokerage costs or poor execution quality) based on the sponsoring organization's concern that they not interfere with the portfolio manager's execution of their responsibilities nor create unnecessary complexity in the money management firm's trade operations process.

When trading securities, as stated above, asset managers (money managers) often incur additional trading costs that are over and above the cost of the trade alone. For example, referring to FIG. 2, asset managers 201 (such as mutual fund companies or institutional asset management firms) usually maintain a network of approximately twenty-five executing brokers 202 (including broker-dealers (such as Merrill Lynch or UBS Paine Webber), market makers (such as Knight Capital or Schwab Capital Markets), exchanges (such as the New York Stock Exchange or NASDAQ), electronic communication networks (ECNs) (such as INET or TRAC), direct market access (DMA) vendors (such as Lava Trading, Sonic or UNX), and block trading systems (such as LiquidNet or Premier)).

Executing brokers 202 are often selected for the additional services (beyond executing the trade) that they can provide to the asset manager 201 (mutual fund company or institutional asset manager). The cost of these additional goods and services from executing brokers 202 (such as company and market research, market data feeds, trade analytics, and software) is added over and above the trade's cost of execution and results in a higher trade cost than what would otherwise be incurred by the fund or investment portfolio. Thus, a trade may have an execution cost of $0.01 (one cent) per share and have an additional $0.025 cents (two and one-half cents) per share added to result in a total brokerage cost of $0.035 (three and one-half cents) per share. Since many asset managers trade billions of shares per year, these additional few cents per share in trade costs cumulatively create a substantial pool of revenue for the asset manager. The higher brokerage costs for these additional services utilized by the asset managers 201 (referred to as "soft dollars") are paid for by the shareholders or beneficiaries as they are penalized by the lower returns (lower performance) of their funds or accounts. This utilization of "soft dollars," as illustrated in FIG. 2, is not only a long-standing industry practice, but these brokerage costs are not included, for example, in the operating expenses of a mutual fund (such as a quoted 1.10% annual operating expense) that are disclosed in the fund prospectus. As such, a fund's trades are often directed to executing brokers 202 as to maximize the benefits received by the mutual fund company or institutional asset manager 201. In the event of any doubt, the practices associated with "soft dollars" have long been, and continue to be) utilized by sub-advisors managing a sponsoring organization's investment portfolios.

An exemplary process 200 for trading by asset management firms, which generates "soft dollars," is shown in FIG. 2 and described below in the following steps corresponding to the arrows and their adjacent reference numerals shown in FIG. 2:

211) Asset management firm (or money manager or sub-advisor) 201 contracts with executing broker 202 for research.

212) The executing broker 202 sends the research to the asset management 201.

213) The executing broker 202 presents the invoice to the asset management firm 201 for confirmation.

214) The asset management firm 201 records the invoice into a soft dollar administration system 203.

215) The asset management firm 201, through the soft dollar administration system 203, derives the trade obligations for paying the invoice.

216) The asset management firm 201 directs trades to the executing broker 202 to generate sufficient commission volume to offset the costs associated with the confirmed invoice.

217) The executing broker 202 reports the trade executions and associated trading costs back to the asset management firm 201.

218) The asset management firm 201 updates the soft dollar administration system 203.

219) The executing broker 202 confirms payment of the invoice to the asset management firm's soft dollar administration system 203.

The practice of adding to the cost of trading of securities to create "soft dollars" is a common and longstanding practice in sub-advisory relationships, where money managers (asset managers) are hired (and paid an annual fee) to manage pools of assets that belong to external or unaffiliated products or organizations. Furthermore, the sub-advisory contracts with the sponsoring organization usually contain a clause that eliminates any requirement that "soft dollar" costs incurred by a specific fund (and its shareholders or beneficiaries) benefit the fund or account paying the additional "soft dollar" costs for their trades. As such, a sub-advised fund or account often pays substantial brokerage costs for services that do not benefit the shareholders or beneficiaries paying the additional "soft dollar" expense.

In fact, most shareholders in mutual funds are not aware that a fund's brokerage (trading) costs are in addition to the fund's annual operating expense (as disclosed in the prospectus) and, as such, serve to lower the investment performance (return) of their funds. These same fund shareholders are also usually not aware that the mutual fund companies and institutional asset managers are using the additional "soft dollar" costs for trades in their mutual funds as a vaguely disclosed and unaccountable pool of cash to offset the money manager's operating expenses in order to increase their corporate profits.

Overall, the current process utilized by sub-advisors to direct trades in order to generate "soft dollar" revenue is complex, expensive to shareholders and beneficiaries, and requires that the sponsoring organization (such as an insurance company or pension plan) surrender control over trade execution cost, the selection of executing brokers, and pre-trade compliance with regulatory requirements, even though the insurance company (as the sponsoring organization) retains primary regulatory responsibility for the funds (as the advisor for regulatory purposes) whose assets are being traded. In essence, the sponsoring organization responsible for regulatory compliance is notified of the trades only after their execution, usually well after the close of the trading day.

FIG. 3 illustrates a current process 300 for trading by sub-advisors 301 (e.g., money managers) in a sponsoring organization's 304 (e.g., insurance company) investment portfolios (sub accounts). Typically, the complex process shown in FIG. 3 occurs for each trade (usually ten to twenty trades per day per fund) in each of the thirty to sixty investment portfolios (sub accounts) offered by a sponsoring organization (such as a variable annuity product or pension plan).

The process 300 in FIG. 3 works in the following steps corresponding to the arrows and their adjacent reference numerals shown in FIG. 3:

310) The sub-advisors 301 create, enter, and direct orders (trades) to their preferred network of executing brokers 302 (shown as "Bs") as a single buy or sell order or may break up an order into smaller orders for execution among several brokers. The motivation to break orders up among several brokers can be driven by a sub-advisor's desire to remain anonymous in the market (as no single broker can discern the sub-advisor's overall investment strategy), the specific strengths of each executing broker, and/or the desire to use the fund or plan assets to generate soft dollars.

311) The executing broker(s) 302 execute (fill) the orders and the sub-advisor 301 is notified electronically that the trade has been executed along with the price per share. The data for each trade, such as number of shares, price per share, total value, execution costs, and contra broker, is transmitted through a number of electronic communications networks.

312) The executing broker(s) 302 also report the trade fill data to a number of industry organizations and this data is transmitted to the custodial firm 303 for the sponsoring organization's 304 assets.

313) After the close of trading, the custodial firm 303 for the sponsoring organization's 304 assets sends a file of the day's transaction activity and holdings for each fund and investment portfolio to the sponsoring organization 304.

314) In their overnight processing cycle 305, the sponsoring organization 304 reconciles all activity and holdings for updating account values and in preparation for the next day's trading activity.

In 2007, the industry average costs for executing equity trades, according to Plexus research was 3.00 cents to 3.50 cents per share.

The back office system, through the overnight batch processing cycle, will reconcile the trades, calculate updated portfolio account values or fund NAVs (Net Asset Values), and subsequently update the holdings and values for each client investing in their products. At the conclusion of this process, the sponsoring organization may implement some form of compliance review of the portfolio and its activity as part of a nightly, weekly, monthly or quarterly process (as the frequency of the compliance review practice varies widely). Most importantly, the sponsoring organization 304 has little, if any, direct control over the sub-advisor's 301 choice of executing broker 202 and the associated additional brokerage costs incurred by their funds or accounts through the use of soft dollars. Likewise, the sponsoring organization 304 has no opportunity to conduct a pre-trade compliance review of the trades in order to prevent violations of securities laws, account restrictions or prohibited transactions. Overall, the current process was established decades ago when the sub-advised industry was in its infancy and, despite its impressive $2.98 TR in assets, the sub-advised industry still does not provide the proper governance practices, comprehensive risk management methods and full fiduciary control that the practice of utilizing sub-advised asset management demands from all participants.

BRIEF SUMMARY OF THE INVENTION

An embodiment of the present invention provides a system (e.g., referred to as the unified trading and control system), method, process, software, and standards that simplify the sub-advisor (money manager) trading process, and for the first time, provides pre-trade compliance review by the sponsoring organization over sub-advisor trading activity, increases control over the trading process by a sponsoring organization, and substantially lowers brokerage (trading) costs on an annual and recurring basis for the shareholders and beneficiaries investing in the funds and investment portfolios. In particular, the present invention provides a superior trading and control method for the sub-advised industry. The system, method, process, software, and standards of the present invention address the major operational deficiencies in the current trading and operational processes in the sub-advised industry, resulting in, for the first time, the ability of sponsoring organizations to: (1) implement a pre-trade compliance review process that prevents violations in trading activity by their sub-advisors; (2) substantially lower brokerage (trading) expenses on a recurring basis; (3) improve investment performance; (4) improve business processes; and (5) improve governance reporting.

Addressing the shortcomings in the prior art, an embodiment of the present invention empowers the sponsoring organization to utilize a rules-based computer system to capture trade orders from sub-advisors in order to implement a pre-trade compliance review process, thereby enabling the advisor to prevent the execution of trade orders by a sub-advisor that violate securities laws, account restrictions, or prohibited transactions. The embodiment of the present invention enables a sponsoring organization to properly implement, for the first time, its own centralized, real-time, rules-based pre and post trade compliance process across all of its sub-advisors and the sub-advisors' trading activity. Given that a sponsoring organization may employ in excess of fifty sub-advisor relationships across hundreds of funds or accounts, the embodiment of the present invention represents a dramatic improvement over the prior art.

In addition, assuming the trade order passes the pre-trade compliance process without a violation, the system of the present invention categorizes, utilizing a plurality of customizable rules incorporating the analysis of real-time and historical market data, trade orders as high touch orders or low touch orders and subsequently assigns responsibility (discretion over the decisions related to how, when, with whom and the cost that a trade order is executed) over the execution of these orders to the sponsoring organization when the order is low touch (that is, the order is not expected to impact the market price of the security being traded and does not require significant time and effort by a trader) and to the money management firm when the order is high touch (that is, the order is likely to adversely impact the market price of the security being traded and is expected to require significant time and effort by a trader). Through an embodiment of the present invention, the sponsoring organization is thus able, for the first time, to capture and subsequently direct, in real-time, low touch trade orders to their selected low cost, high quality execution venues or brokers, which benefits the shareholders and beneficiaries in these investment portfolios by minimizing execution costs and improving the quality of execution (rapid speed of execution and realized price improvement) for those orders. Simultaneously, this embodiment of the present invention empowers the sponsoring organization to benefit from the portfolio manager's favored execution strategies and the expertise of the sub-advisor's trading group in situations where an order is high touch and needs to be carefully "worked" to protect anonymity and minimize market impact. Finally, the portfolio manager retains control over how a high touch order is executed in circumstances where such control is desirable while also benefiting from the improved performance of the investment portfolio that results from the lower brokerage costs of low touch orders.

An embodiment of the present invention provides a system and method for enhancing the sponsoring organization's, as advisor, regulatory supervision over the trading activity of the sub-advisor through a pre-trade compliance review process while determining, based on expected market impact of a trade order to buy or sell securities, whether the responsibility (discretion over the decisions related to how, when, with whom and the cost that a trade order is executed) for executing a trade order is assigned to the sub-advisor (money management firm) for an investment portfolio or to the advisor (sponsoring organization) that is the regulatory entity responsible for the operation of and compliance requirements for that investment portfolio. Referred to herein as the hi touch-low touch engine, or "HiLo Engine," or execution discretion assignment software engine, an embodiment of the present invention is a rules-based computer system that categorizes trade orders, using real-time market data, into either: (1) "high touch" orders, whereby a trade order requires significant time and effort by a trader and where the order is expected to have a significant market impact on the price of the stock; or (2) "low touch" orders, whereby the order does not require significant time and effort by a trader and where the order is not expected to have any significant market impact. As such, the HiLo Engine assigns responsibility (discretion over the decisions related to how, when, with whom and the cost that a trade order is executed) for the execution of high touch orders and routes the high touch orders to the sub-advisor (money management firm), who is able to carefully "work" the order by implementing sophisticated trading strategies and/or selecting one or more executing venues or brokers to complete the transaction with minimal market impact. Likewise, the HiLo Engine assigns responsibility (discretion) for execution of low touch orders and routes the low touch orders to the sponsoring organizations to execute by selecting one or more executing venues or brokers so as to minimize execution costs and improve the quality of execution (rapid speed of execution and realized price improvement) for those orders. The plurality of rules employed by the HiLo Engine for categorization of trade orders as high touch or low touch is flexible, utilizes real-time and historical market data, and is established and revised in real-time by either the sub-advisor (money management firm) and/or the sponsoring organization, according to their agreed procedures. The percentage of orders categorized as high touch or low touch depends on the parameters utilized in the rules employed by the HiLo Engine. However, given that many sponsoring organizations trade billions of equity shares annually, it is likely that a substantial portion of this order flow is categorized as low touch, is executed by the sponsoring organization, and generates substantial annual savings in brokerage costs and improved investment performance for investment portfolios of sponsoring organizations.

The HiLo Engine, as an embodiment of the present invention, incorporates functions as a real-time, rules-based market liquidity analytical tool; an access and request facility to real-time and historical market data and specified market data packages; an order discretion assignment decision-making engine; a manual user override of order discretion assignment decisions capability; a rules creation, updating and rules-exception depository; a rules and rules-exception testing facility; an extensive real-time reporting system; a rules, data, decision and order execution discretion assignment audit facility; a multilevel user and organizational access and rights control and updating facility; an account activation facility; a multiple venue message transfer facilitator connectivity system; and an implementation of specialized message formats. The HiLo Engine integrates a plurality of sub-advisors (money management firms), sponsoring organizations, and execution venues and brokers into a single and effective communication, compliance, and low cost order routing and execution network. The HiLo Engine's communications network also enables sponsoring organizations to benefit from a plurality of additional compliance and regulatory supervisory capabilities that result in significantly improved business processes including: lower brokerage costs and greater control associated with the process of replacing one sub-advisor to a fund or account with another sub-advisor; lower brokerage costs resulting from model portfolio asset allocation rebalancing activity; improved governance process through real-time and historical holdings, activity, brokerage and other costs reporting and oversight capabilities; enhanced reporting on asset segregation requirements related to forward settlements on derivative positions; and stronger, real-time, enterprise-level risk management controls.

A further embodiment of the present invention conducts a real-time analysis of multiple market-based factors in such a manner as to optimize the execution process in order to achieve the lowest total execution cost for the participants in a securities transaction. This optimization process, through the inclusion of multiple factors in addition to share price ("Best Ex"), results in a significant savings to participants as important factors are analyzed in real-time in order to create an optimized list of executing brokers (including the exchanges, ECNs and alternative trading systems (ATS)) that provide the lowest expected total execution cost for a transaction.

An embodiment of the present invention provides a system (e.g., a hosted application) and method (organization of activity) for creating a customizable, computerized, real-time analysis and optimization process providing for and facilitating the selection of executing brokers for a securities transaction to provide the lowest expected total execution cost for that transaction, inclusive of: (1) the share price and liquidity (number of shares at a quoted share price from an executing broker) for a security; (2) the execution costs as specified by executing brokers through a real-time process of setting and adjusting execution costs according to the business needs of the executing broker; (3) the real-time analysis of price improvement in recent trades in a security or group of securities (as determined over a selected time period, number of trades, number of shares traded, type of orders or other similar such parameters); (4) time required to execute an order by an executing broker (time to execute); and (5) the current rate of change in the share price of a security during the time required to execute the transaction.

The expected total execution cost is the sum of all of these factors (share price, execution cost, price improvement, time to execute, and rate of change in the price of a security), converted into a single dollar and cents number (or in another desired currency) for purposes of comparing a single executing broker with one or a plurality of executing brokers and ranking the plurality of executing brokers from lowest to highest expected total execution costs. The initiating party to the securities transaction is thus able to select the executing broker(s) providing the lowest expected total execution cost and to generate cost savings over other alternative avenues for executing the transaction.

As such, the system and method of the present invention enable a party initiating a securities transaction (the initiating party) to scan the market for price quotes and the associated executing brokers quoting liquidity (a number of shares) for the transaction and, based on the customizable factors selected by that party, to quickly conduct an analysis and optimization process that determines the "hot hitters" among a plurality of executing brokers in terms of creating the lowest expected total execution cost with respect to: (1) share price; (2) execution cost; (3) expected price improvement (the difference between actual share price of the security transaction relative to the currently quoted bid and offer (ask)); (4) time required to execute an order by an executing broker; and (5) the current rate of change in the share price of a security during the time required to execute the transaction.

A specific implementation of the above inventions is what is referred to as a unified compliance and control system (UCCS). The UCCS is a highly sophisticated, scalable and reliable risk management, compliance supervision, and order management system for utilization by sponsoring organizations with their sub-advised and externally managed investment portfolios.

A key component of UCCS is the HiLo Engine. The HiLo Engine analyzes trade orders, in real-time relative to an issue's current and historical liquidity and trading volume, in order to categorize an order relative to potential market impact and, subsequently, assigns discretion over the execution of an order as follows: (1) orders with significant expected market impact are categorized as "high touch" orders and discretion over the execution of high touch orders is assigned to the sub-advisor (money management firm) for the account; and (2) orders with little or no expected market impact are categorized as "low touch" orders and discretion over the execution of low touch orders is assigned to the advisor (sponsoring organization) for the account.

The HiLo Engine also, in the process of capturing an order from a money management firm (sub-advisor), routes that order to the sponsoring organization's rules-based compliance system for a pre trade, rules-based compliance supervisory review to ensure that the proposed order does not violate any securities laws, prohibited transactions, or account restrictions that the sponsoring organization has set up for the account. Thus, for the first time, a sponsoring organization is able to prevent the execution of an order that would otherwise result in a violation of any securities laws, prohibited transactions, or account restrictions that the sponsoring organization established for the account.

Through the implementation of UCCS and its HiLo Engine component, sponsoring organizations, such as insurance companies, pension plans, 401k providers, mutual fund companies, bank trust departments, and other such organizations that utilize sub-advised (external) asset management services, realize additional desirable benefits, including:

Improved risk management, including improved control over the manager replacement process, lower model portfolio rebalancing costs, comprehensive real-time reporting (including the most recent up-to-the-minute transactions), real-time aggregate positions for the master portfolio, model portfolios and individual funds or accounts;

Comprehensive compliance, trading and 18f3 segregation reporting; and

Lower brokerage costs and improved investment performance for their fund shareholders and plan beneficiaries.

For purposes of communication with external organizations, the HiLo Engine utilizes a "web services" communications process to create, receive, and send messages to order management systems (OMS) employed by both the sub-advisors and the sponsoring organizations. As such, the HiLo Engine (HLE) functions in several different manners, including as a: (a) real-time and rules-based analytical tool; (b) rules depository for determining high touch and low order orders; (c) order execution discretion assignment vehicle between sponsoring organizations and their sub-advisors (money management firms); (d) comprehensive reporting system; and (e) transaction message transfer facilitator. As such, the HiLo Engine also serves as a mission-critical component within an integrated network providing instant two-way connectivity among sponsoring organizations, sub-advisors (money management firms), compliance systems, order management systems and domestic and international execution exchanges, venues, and brokers.

The web services interface enables users of the HiLo Engine to instantaneously create a message, open a connection, send the message, and close the connection. As such, the utilization of the HiLo Engine does not require database integration with compliance and order management systems utilized by the sub-advisor or sponsoring organization. The web services functionality provides instant and effective communication and responsiveness among all entities without sacrificing the critical elements of system security and data integrity.

Each order entered by a money management firm for a sub-advised account is routed to the HiLo Engine, which in turn routes the order to the sponsoring organization's order management system for rules-based compliance review.

HiLo Engine, for each order submitted to it, returns a message to the sub-advisor consisting of two reports: a high touch versus low touch report and a compliance status report.

For the high touch versus low touch report, the categorization of an order as high touch or low touch represents the result of a rules-based, real-time analysis of current and historical liquidity and trading volume in order to determine the expected market impact of an order. The money management firm establishes, and can modify in real-time, the parameters for the rules utilized to categorize an order as high touch or low touch. The money management firm can also, in real-time, activate or deactivate a rule(s) or set up or remove an exception for an account, symbol, or group of symbols.

The rules and associated parameters selected by the money management firm results in the HiLo Engine assigning an order into one of the following five categories for execution, as follows:

High touch: The execution of a "high touch" order is expected to have significant market impact and thus, the order should be "worked" by the money management firm's trading desk.

Low touch: The execution of a "low touch" order, such as Buy 500 IBM, is unlikely to create a significant market impact and whose execution is directed by the sponsoring organization.

Low touch algo: The execution of a "low touch algo" order is unlikely to create a significant market impact. However, the use of an algorithm (such as TWAP or VWAP) may be considered by the sponsoring organization in order to electronically slice the parent order into several smaller child orders.

Low Touch TRO: The execution of a "low touch TRO" order is unlikely to create a significant market impact. However, the "TRO" or trade rotation order is applied to a group of orders that may cumulatively create a significant market impact. Thus, "low touch TRO" indicates that money management firm may consider a trade rotation order (TRO) when sending this group of orders to sponsoring organizations.

Low Touch Algo TRO: A "low touch algo TRO" report suggests that, as a trade rotation order is implemented for a group of orders, the sponsoring organization executing a given order may consider one the use of an algorithm (such as TWAP or VWAP) in order to electronically slice the order into smaller pieces.

For the compliance status report, the result of the sponsoring organization's compliance review consists of one of three discrete compliance status states for each order submitted:

Compliance OK: The "OK" message means that the order is approved for execution.

Under review: The "under review" message means that the order has violated one or more compliance rules. No further processing of the order occurs until a review of the order is satisfactorily concluded.

Order released from compliance: An order that was held as "under review" is now approved for execution.

An order held as "under review" may ultimately fail to obtain approval. In this case, the sub-advisor cancels or replaces the order through their trading system and the HiLo Engine carries the "order canceled" message to the sponsoring organization's order management system.

Finally, the HiLo Engine does not function as a compliance system. Rather, the HiLo Engine performs the task of communicating the compliance status, and any changes in the compliance status, of an order (as determined by the sponsoring organization's compliance system) to the money management firm. As such, the HiLo Engine does not modify nor compromise the fall functionality of the sponsoring organization's and the money management firm's compliance systems.

The HiLo Engine can provide the two reports (high touch vs. low touch and compliance status) simultaneously in a single message to the money management firm's order management system, as the following events occur:

The money management firm executes ("works") each high touch order through their normal trading relationships and processes;

The sponsoring organization executes all low touch and low touch algo orders; and The money management firm implements any trade rotation order for the low touch TRO orders in the course of routing these orders to the sponsoring organization. The sponsoring organization directs the execution of these orders.

As the sponsoring organization receives the low touch, low touch algo, and the low touch TRO algo orders from the sub-advisor through the HiLo Engine, the sponsoring organization evaluates each low touch algo and low touch TRO algo in order to determine if an algorithm is desirable in order to reduce any potential market impact, with the following possible outcomes:

If an algorithm is desirable, the sponsoring organization selects the algorithm and sets the operational parameters for the order.

If an algorithm is not necessary, then the order is routed to the market for execution in the same manner as a low touch order.

Also, additional functionality supported by the HLE includes:

Execution (fill) reports to the money management firm for trades by the sponsoring organization, Order cancellations by the money management firm, and Override of high touch orders by the money management firm to low touch orders.

In essence, the HiLo Engine functions as a message service to relay messages and orders as well as an analytical engine to assign discretion over order execution based on a real-time analysis of market data. The HiLo Engine provides an integrated network providing instant two-way connectivity among sponsoring organizations, sub-advisors (money management firms), compliance systems, order management systems, and domestic and international execution exchanges, venues, and brokers. As such, the HiLo Engine is the mission-critical communications hub at the center of an effective communication, compliance, and order execution network. Finally, the web services integration process and the connectivity to the HiLo Engine, once in place for a money management firm, provides full integration with all of their sponsoring organizations.

Overall, the system of present invention provides an ongoing optimization process that has the potential to generate additional savings for the initiating party on each securities transaction it engages in and, as such, the system of the present invention has the potential to generate significant and recurring cost savings when employed by a single or plurality of actively traded investment portfolios.

A further embodiment of the present invention provides the optimization process in forms of trading other than the above described equity process using shares in equities as the unit of trading. For example, the system of the present invention could also be used across multiple forms of trading such as fixed income, options, futures, currency, commodities, derivatives, and other such instruments that utilize a standard category of unit (such as shares, units, bonds, contracts, etc.) on an exchange for purposes of implementing an automated and efficient trading process.

BRIEF DESCRIPTION OF THE DRAWINGS

FIG. 1 is a table that defines the terminology utilized in a number of investment industry products across numerous markets in registered mutual funds, non-registered mutual funds, and institutional investment portfolios.

FIGS. 8A, 8B, and 8C illustrate exemplary logical rules in terms of regulatory, prospectus, and board restrictions, and requirements for a real-time compliance engine, as implemented by an operating fund trust.

FIG. 11B is a schematic diagram illustrating an exemplary structure of a sub-advised investment management process, including the sponsoring organization (advisor) and a plurality of sub-advisors (money management firms) providing asset management services across a plurality of different investment portfolios, according to an embodiment of the present invention.

FIG. 11Cii is an exemplary schematic diagram illustrating an alternative embodiment of the sponsoring organization unified trading and control system, in which trade orders originate (are entered) by one or a plurality of portfolio managers employed by one or a plurality of money management firms (sub-advisors) responsible for the investment management process for a sponsoring organization's investment portfolios, according to an embodiment of the present invention. These orders are sent to the HiLo Engine, where they are categorized as high touch or low touch according to the appropriate rules and routed for compliance review by the advisor. Subsequently, the sponsoring organization executes the low touch orders while the money management firm executes the high touch orders. Finally, the sponsoring organization and money management firm engage in a reconciliation process of their trading activity with one another.

FIG. 11F is a screen shot that illustrates an exemplary HiLo Engine graphical user interface (GUI) employed by a system administrator to institute a plurality of system-wide pre set levels provided to system users as a one-button implementation of complete sets of tests, measures, and parameters employed to categorize an order as high touch or low touch, according to an embodiment of the present invention.

FIG. 11L is a screen shot that illustrates an exemplary HiLo Engine graphical user interface (GUI) employed to create roles for a plurality of sponsoring organization, money management, or system administration users along with their user rights in the HiLo Engine, according to an embodiment of the present invention.

FIG. 11M is a screen shot that illustrates an exemplary HiLo Engine graphical user interface (GUI) employed to create a plurality of user organizations, as sponsoring organizations or money managers (sub-advisors), in the HiLo Engine, according to an embodiment of the present invention.

FIG. 11O is a screen shot that illustrates an exemplary HiLo Engine graphical user interface (CG) employed to provide a summary of the current tests, measures, and parameters used by sub-advisors (money management firms) to categorize orders as high touch or low touch, according to an embodiment of the present invention.

FIG. 11R is a schematic diagram illustrating an exemplary structure for creating user roles and assigning various permissions and responsibilities to these user roles, according to an embodiment of the present invention.

FIG. 12C is a set of tables that illustrate exemplary market parameters and resulting execution costs for a securities transaction with a single stock price.

FIG. 12D is a set of tables that illustrate the selection of executing brokers, the associated execution costs, and the resulting cost savings for three different methods for selecting executing brokers, including an embodiment of the present invention, for a securities transaction occurring at a single stock price.

FIG. 12E is a set of tables that illustrate exemplary market parameters and resulting execution costs for a securities transaction with multiple stock prices.

FIG. 12F is a set of tables that illustrate the selection of executing brokers, the associated execution costs, and the resulting cost savings for three different methods for selecting executing brokers, including an embodiment of the present invention, for a securities transaction occurring at multiple stock prices.

FIGS. 12G(i) and 12G(ii) are a schematic diagram illustrating an alternative embodiment of an exemplary system and method of the present invention creating a customizable, computerized, real-time analysis and optimization process providing for and facilitating the selection of executing brokers for a securities transaction in such manner as to determine the executing brokers providing the lowest expected total execution cost for that transaction, according to an embodiment of the present invention.

FIG. 14 is a table that highlights the impact on the sub-advisor according to the prior art and according to an embodiment of the system of the present invention, according to an embodiment of the present invention.

FIG. 15 is a list of exemplary sponsoring organizations offering variable insurance products.

FIGS. 16A and 16B are a list of exemplary money management firms (mutual fund companies) that currently provide or potentially could provide sub-advisory services to sponsoring organizations through registered mutual funds, unregistered mutual funds, and institutional investment accounts.

FIG. 17 is a list of exemplary firms providing order management systems (OMS).

FIGS. 18A and 18B are a list of many exemplary executing broker firms providing trade execution services.

FIG. 23 is a table providing a compilation of research demonstrating estimated exemplary savings available to fund trusts (groups of funds) showing the name of the fund trust, the total sub-advised equity assets of the fund trust, the current execution costs for trading (in cents per share), the annual turnover rate for the trust, the effective (total) turnover rate for the trust, and the number of shares traded in 2005 by the trust. FIG. 23 also shows the estimated exemplary annual savings in millions of dollars and basis points (b.p.) of annual savings realized by the fund trust at execution costs of 1.00 cent per share. The data for estimates in this table was compiled from publicly available documents filed by each fund trust with the SEC, including the prospectus, annual report, and statement of additional information.

FIGS. 24A, 24B, 24C, and 24D are tables providing a compilation of research calculating estimated exemplary annual savings for four popular fund trusts (group of funds) and the individual funds (with their sub-advisor) comprising the trust, showing the annual cost savings (at an execution cost of 1.00 cent per share) both in dollars and percentages. FIGS. 24A-24D also show an estimated exemplary beneficial effect of the annual compounding of these recurring savings for a 1, 3, 5, and 10 year period. The data for estimates in these tables were compiled from publicly available documents filed by each fund trust with the SEC, including the prospectus, annual report, and statement of additional information.

DETAILED DESCRIPTION OF THE INVENTION

Figure 2:
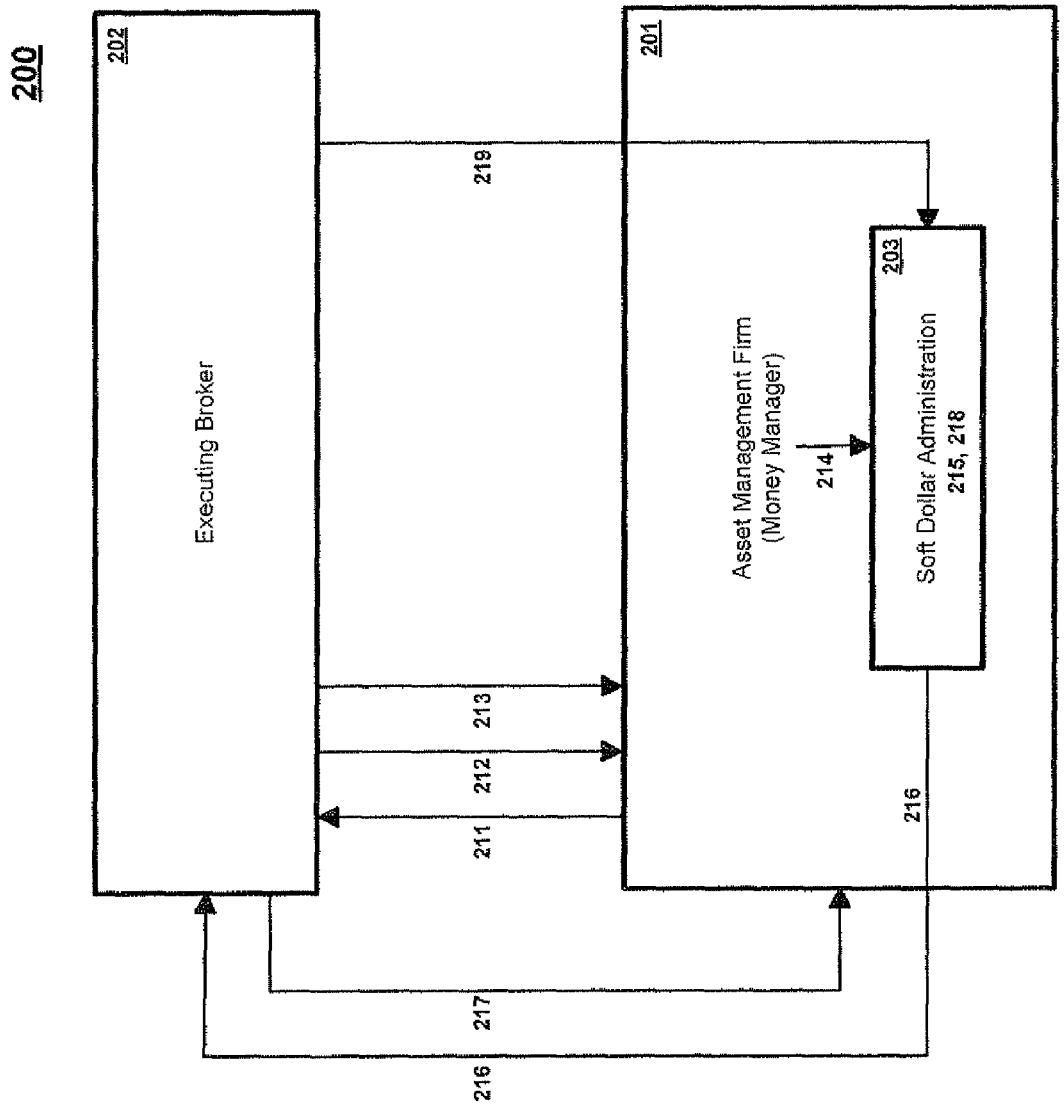
FIG. 2 is a schematic diagram illustrating a prior art process for trading by asset management firms (or money managers or sub-advisors) that generates "soft dollars."
Figure 3:
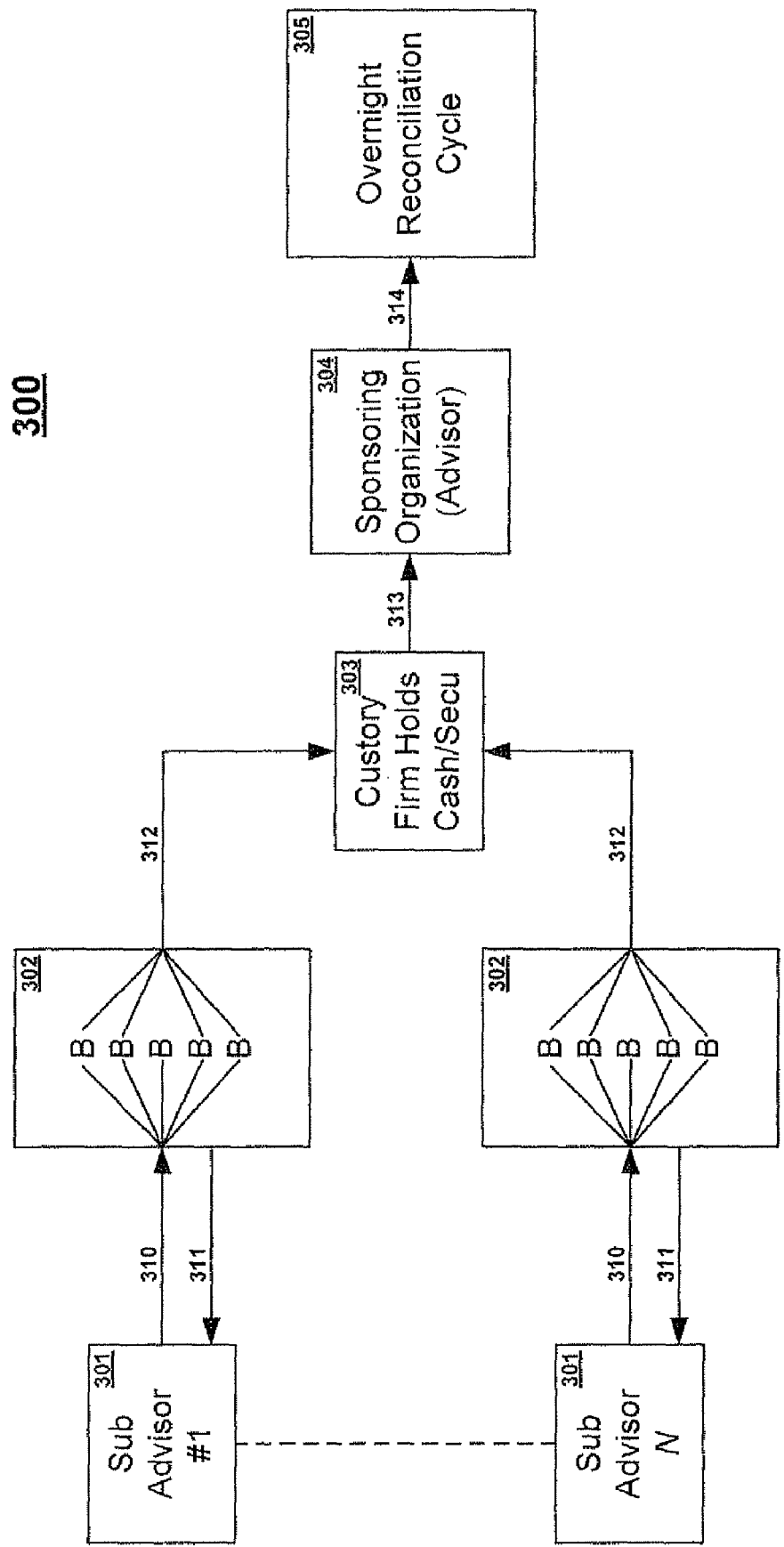
FIG. 3 is a schematic diagram illustrating a conventional process, as embodied in the prior art, for trading by asset managers in sub-advised investment portfolios.
Figure 4:
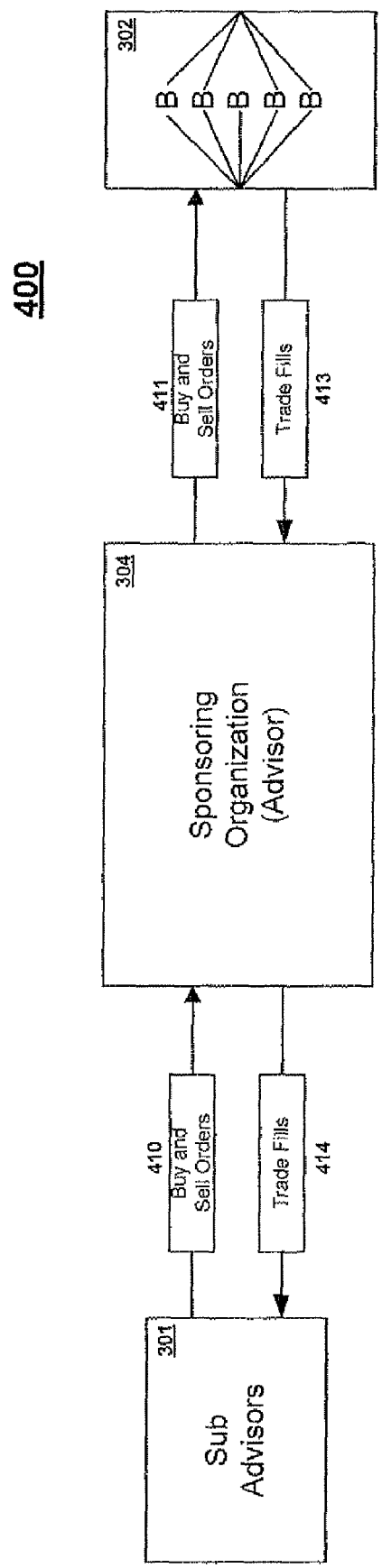
FIG. 4 is a schematic diagram illustrating an exemplary process for facilitating a sponsoring organization's money management process as the sponsoring organization receives trade orders from the sub-advisor and selects the executing brokers, according to an embodiment of the present invention.

An embodiment of the present invention provides a unified trading and control system. FIG. 4 illustrates an exemplary sub-advisor (money manager) trading process 400 according to an embodiment of the present invention. The following numbered steps correspond to the arrows and their associated reference numerals shown in FIG. 4.

410) The sub-advisor 301 (or money manager) for each investment portfolio provides the changes (buy and sell orders) in the sub-advised fund or investment portfolio to the sponsoring organization 304 (acting as the advisor or administrator) as to the sub-advisor's decisions regarding, for example: (1) employing the daily net cash contribution or withdrawal (a decision usually made prior to the opening of trading); (2) changing the percentage, share, or dollar allocations of each security in the investment portfolio (decisions that can occur at the beginning of and throughout the day); (3) changing how the current model (the percentage allocation by security totaling to 100%) compares to the target model; and (4) other money management and trading decisions.

Once these decisions (and the resulting orders) are determined by the sub-advisor or money manager 301, the sub-advisor calculates the resulting number of shares to buy or sell for each security and communicates the desired orders to the sponsoring organization 304. (As needed, selected orders could be executed or "worked" by the sub-advisor 301 according to criteria agreed to by the sponsoring organization and sub-advisor.)

411) The sponsoring organization 304 maintains (separate and apart from the sub-advisors 301) its own group of relationships with executing brokers 302. The sponsoring organization routes the orders to executing broker(s) 302 of their own choice for execution, thereby enabling the sponsoring organization 304 to seek out and utilize the lowest cost source of execution, and thereby eliminate the "soft dollar" related brokerage charges (and the resulting additional expense to the fund shareholders and plan beneficiaries) incurred when the sub-advisor is directing the trades. Through an embodiment of the present invention, the sponsoring organization 304 is able to select executing brokers 302 providing the lowest possible execution cost (which presently could be one cent or less per share) consistent with regulatory requirements for Best Execution (best share price), thereby generating additional savings for the fund shareholders and plan beneficiaries and improving fund performance.

413) The executing brokers 302 report the trade fills back to the sponsoring organization 304.

414) The sponsoring organization reports the trade fills back to the sub-advisor 301.

The sponsoring organization 304 also, in an embodiment of the present invention, implements a pre-trade compliance review and an immediate post execution review to ensure the trade is compliant with prospectus, SEC, and board requirements. If the trade is not compliant with these regulatory requirements, the sponsoring organization 304 (as advisor for regulatory purposes) is able to prevent the order from being executed or immediately address any violations following execution.

FIG. 4 illustrates the areas of operational responsibility according to an embodiment of the present invention, as summarized in Table 1 below.

TABLE 1

| | Areas of Operational Responsibility |
|---|---|
| Sub-advisors 301 | Create Buy and Sell Orders |
| | Execute or "Work" Orders per Agreed Criteria |
| Sponsoring Organizations 304 | Maintain Network of Executing Brokers |
| | Select Executing Brokers for Orders |
| | Seek Lowest Cost Execution |
| | Maintain Order Routing Table |
| | Eliminate "Soft Dollars" from Trade Costs |
| | Pass Savings Through to Shareholders or Beneficiaries |
| | Single and Comprehensive Compliance System and Methodology for all Sub-advisors to Utilize for Trading |
| | Pre and Post Trade Compliance Review Option |
| Executing Brokers 302 | Execute Trades at Lowest Possible Cost |
| | Compete: Cost, Coverage, Liquidity, Technology and Service |

Figure 5:
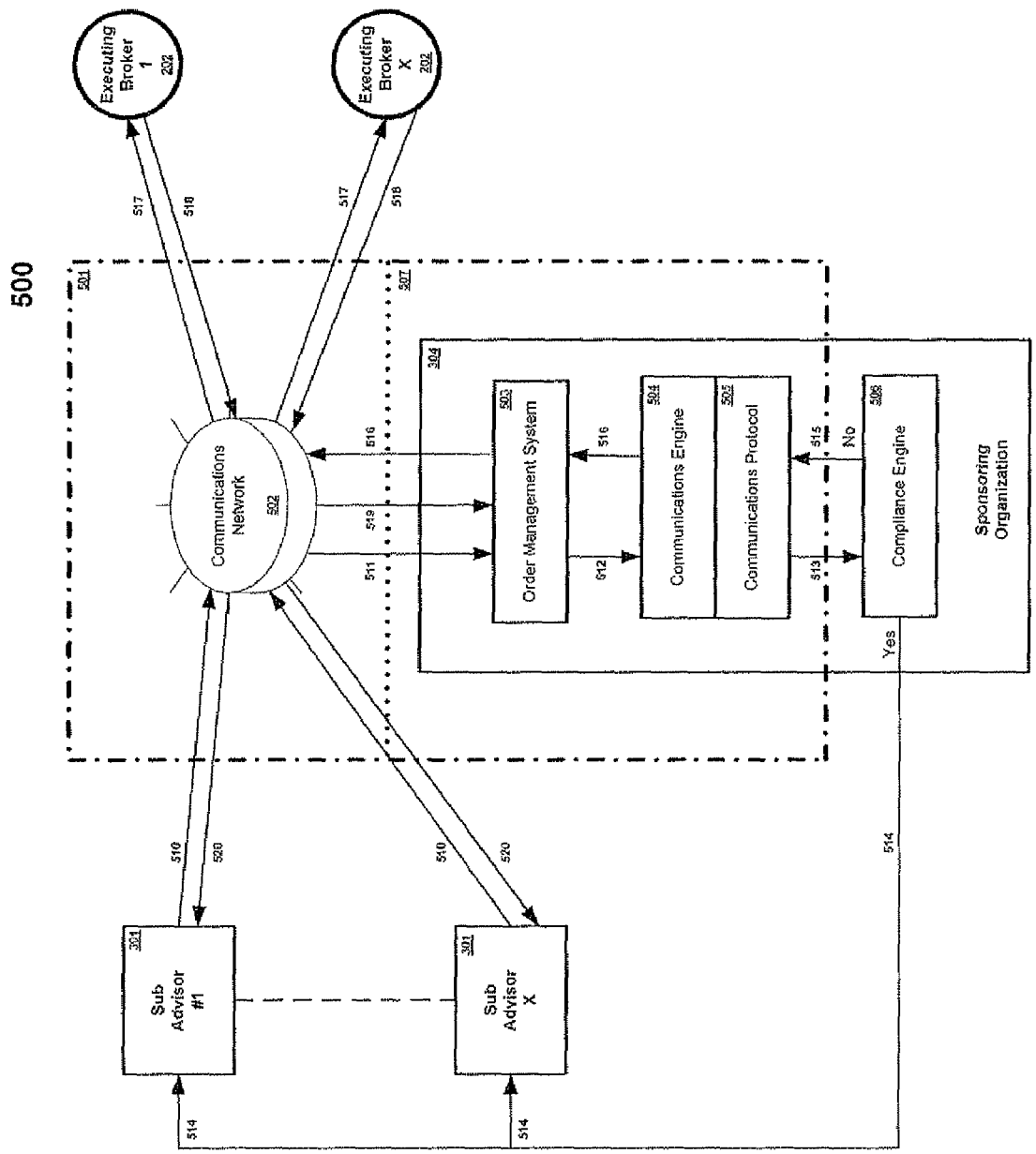
FIG. 5 is a schematic diagram illustrating an exemplary system and method for facilitating a sponsoring organization's money management process utilizing a standard trading system, messaging engine, communications protocol, and communications network, according to an embodiment of the present invention.

An embodiment of the present invention is shown in FIG. 5 as exemplary process 500, whereby the sponsoring organization utilizes a standard system along with a plurality of other sponsoring organizations to implement a standard method and process that enables the sub-advisors and executing brokers, through the creation of a single operational structure with one sponsoring organization, to easily and rapidly duplicate that same operating structure with a plurality of sponsoring organizations across multiple industries. This standardization eliminates the potential for unmanageable complexity created for sub-advisors and executing brokers as a multiplicity of sponsoring organization select and implement their own individual method and process utilizing a wide variety of vendors, systems, procedures, communications engines, communications protocols, and communications networks.

FIG. 5 illustrates the exemplary process 500 according to an embodiment of the present invention. The process 500 works in the following steps corresponding to the arrows and their associated reference numerals shown in FIG. 5.

510) A plurality of sub-advisors 301 direct orders to the sponsoring organization 304 through the communications network 502.

511) The sponsoring organization's order management system 503 receives a plurality of orders from the sub-advisor 301.

512) The sponsoring organization's order management system 503 utilizes a communications engine 504 that incorporates a communications protocol 505 that translates each order into a usable format.

513) Each order is directed to the compliance engine 506 that reviews the order with respect to prospectus, board, and SEC regulations and requirements.

514) If a violation occurs (Violation=Yes), the order is routed to the sub-advisor 301 for further evaluation and review.

515) If a violation does not occur (Violation=No), the order is routed to the order management system (OMS) 503, which, utilizing the communications engine 504 and communications protocol 505, translates the order into a format acceptable to the executing brokers 202.

516) The sponsoring organization's order management system 503 routes the order to the executing brokers 202 through the communications network 502.

517) The executing broker 202 receives the order and executes the trade.

518) The executing broker 202 sends the trade fills report to the sponsoring organization 304 and sub-advisor 301 through the communications network 502.

519) The sponsoring organization 304 receives the trades fill report.

520) The sub-advisor 301 receives the trade fills report.

The standard system 501 for facilitating the sponsoring organization's 304 unified trading and control of their money management process consists of the following components in an integrated format: order management system 503, communications engine 504, communications protocol 505, and communications network 502. An alternative embodiment of the present invention with an alternative standard system 507 consists of the following components in an integrated format: order management system 503, communications engine 504, and communications protocol 505.

Figure 6:
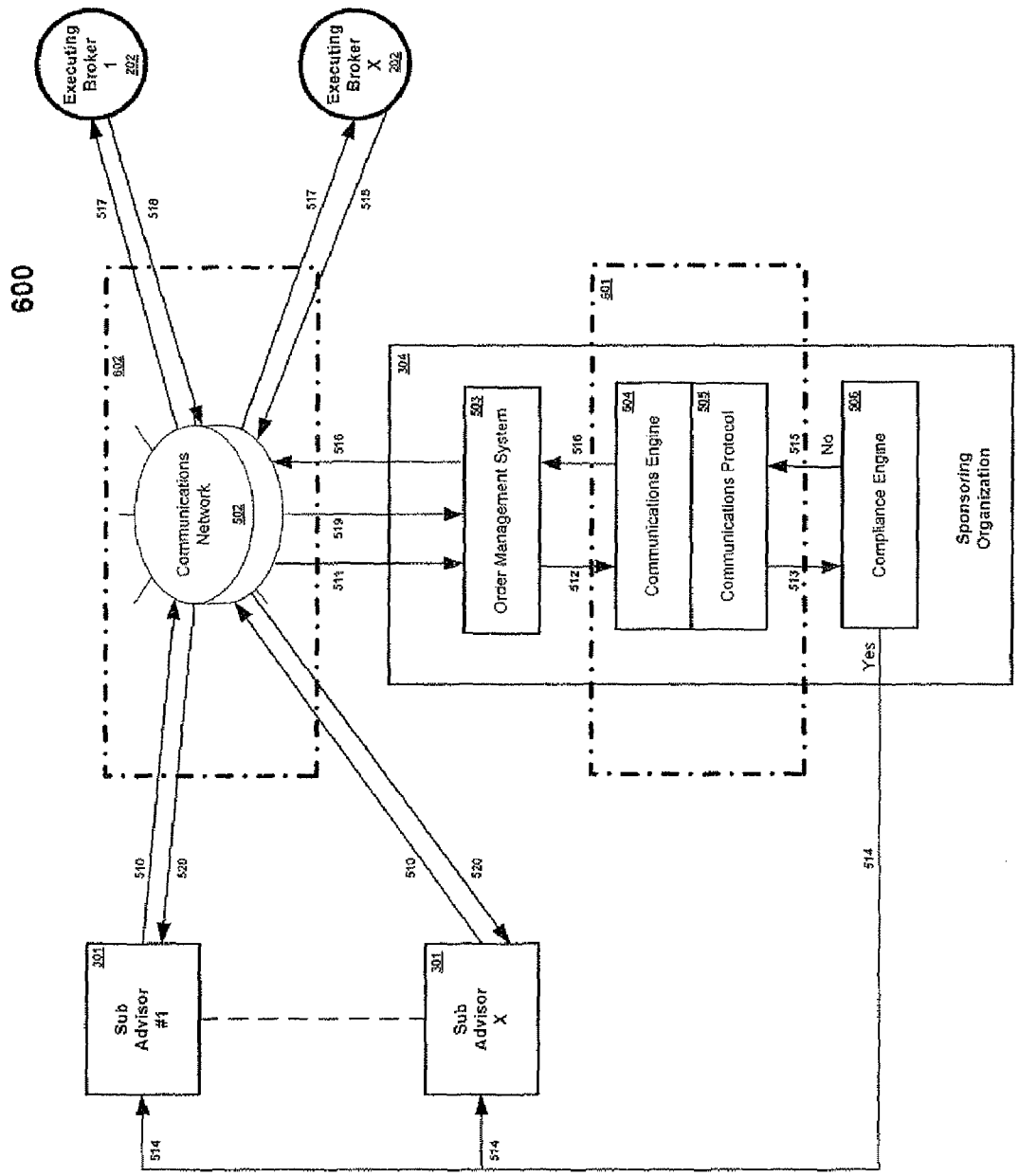
FIG. 6 is a schematic diagram illustrating an alternative exemplary system and method for facilitating a sponsoring organization's money management process utilizing a standard messaging engine, communications protocol, and communications network, according to an alternative embodiment of the present invention.

An alternative embodiment of the present invention is shown in FIG. 6 as exemplary process 600, whereby the sponsoring organization 304 utilizes a variance on the common standard system with other sponsoring organizations to provide a standard method and process that enables the sub-advisors 301 and executing brokers 202, through the creation of a single operational structure with one sponsoring organization, to easily and rapidly duplicate that same operating structure with a plurality of sponsoring organizations across multiple industries. The likelihood of increasing compatibility of systems over time, and increased industry acceptance of the system of the present invention, could potentially ease the standardization requirement and allow these additional options to become feasible. The standard system 601 and 602 comprises the following standard components in an integrated format: communications engine 504, communications protocol 505, and communications network 502. An alternative embodiment of the standard system 601 consists of a communications engine 504 and communications protocol 505. Finally, it is conceivable that, over time, communications integration across the industry evolves to the point where the standard consists solely of a communications protocol 505.

The present invention, in the embodiments illustrated in FIGS. 4, 5, and 6, provides a simpler process, lower trade execution costs, and enhanced pre-trade trade compliance and prevention of violations in trading by the sub-advisor, whereby the sponsoring organization (the advisor with direct regulatory responsibility for the investment portfolios), not the sub-advisor or money manager, exercises controls over the sub-advisor trading process and where and how the trades are executed (the order flow) on behalf of their fund shareholders and plan beneficiaries.

I. Exemplary System and Process of the Present Invention

The present invention provides a system, method, process, software, and standards for achieving a desired social utility of improving regulatory compliance, risk management and fiduciary control while also generating significant and recurring cost savings (and the resulting improved investment performance) for fund shareholders and plan beneficiaries.

A. System

An exemplary system is based on a number of components and includes an order entry system, compliance engine, order management system, a hi touch-low touch engine (HLE), a price-liquidity-cost-quality engine (PLCQ), trade reconciliation system, communications engines, communications protocols, and communications networks, as further described below.

1) Order Entry System

Figure 7:
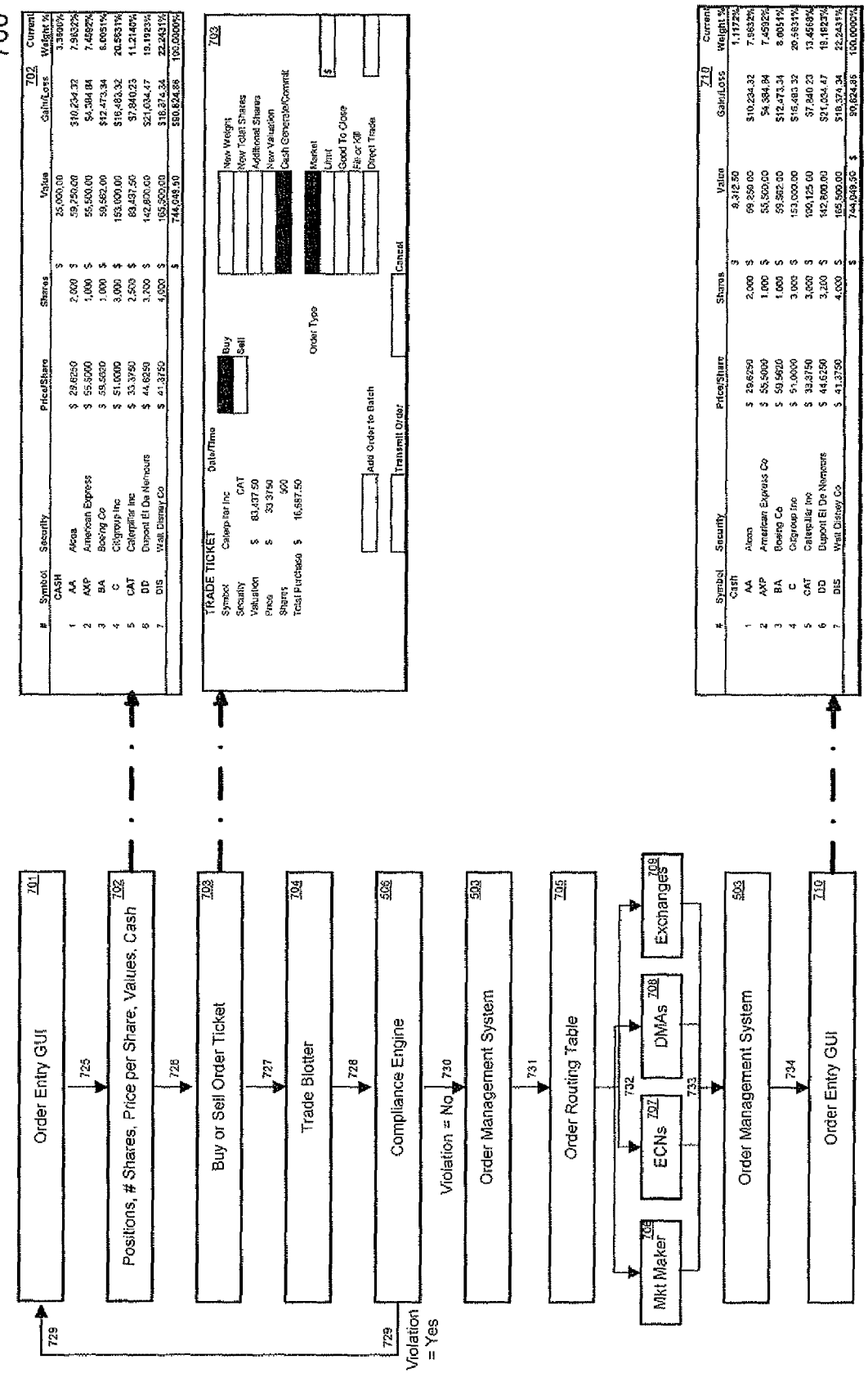
FIG. 7 is a schematic diagram illustrating an exemplary order entry system and process, according to an embodiment of the present invention.

FIG. 7 is a schematic diagram illustrating an order entry system and process 700, according to an embodiment of the present invention. The process 700 works in the following steps corresponding to the arrows and their adjacent reference numerals in FIG. 7.

725) The order entry system is a computer-based graphical user interface (GUI) and associated software program(s) that can be customized to fit the preferences of the individual portfolio manager and his or her personal style of managing money. (The individual who is the portfolio manager for the investment portfolio is typically an employee of the mutual fund company or institutional asset manager acting as sub-advisor.) The order entry GUI 701 displays, among other data, the investment portfolio's total value, cash, and securities along with the number of shares, share price, and dollar value of each position 702. FIG. 7 shows an exemplary order entry GUI 702 providing this exemplary data. The order entry system provides important functionality in two respects:

a) Daily Net Cash: The order entry system provides data on the daily net contribution or withdrawal of cash from the investment portfolio, and enables the portfolio manager to implement decisions such as maintain this cash, sell specific securities to cover any net withdrawal, buy certain securities, buy/sell the current model, buy/sell the target model, or buy/sell as to move the current model closer to the target model.

b) Order Execution Options: The order entry system provides options for the order type for each trade, for example: market, limit, good to closing, and fill or kill. Also, the system can allow a portfolio manager to freeze a security's current shares, that is, exclude the security from any and all future trading.

726) The portfolio manager utilizes the order entry system to implement the buy and sell orders for securities through the creation of a trade ticket 703. The responsibility for entering the buy and sell orders into the order entry system remains with the sub-advisor (the portfolio manager or their associated trading desk/operations group) in an embodiment of the present invention. FIG. 7 shows an exemplary trade ticket 703 accessible through the order entry GUI.

727) As the order is entered by the sub-advisor (who hits, e.g. ENTER on the order entry screen), the order entry system calculates the necessary number of shares and dollars for each security to buy or sell. Given that the order is determined at the investment portfolio level, the order entry system does not have nor require access to information at the account level for individual fund shareholders or plan beneficiaries. The record of the order is entered into the trade blotter 704. Thus, for example, when an asset manager increases the allocation by 1% in IBM in a $100 MM investment portfolio, the result is an aggregate buy of $1 MM of IBM. Given a price of $80 per share for IBM, the buy order is 12,500 shares. This process is repeated for each buy and sell order implemented by the portfolio manager.

728) The order is routed to the compliance engine 506.

729) If a violation occurs (Violation=Yes), the order is routed to the order entry GUI 701 for review and evaluation by the portfolio manager, trade desk and/or compliance officer.

730) If a violation does not occur (Violation=No), the order is routed to the order management system (OMS) 503, 731) The order management system 503 utilizes the order routing table 705 to direct the order for execution.

732) The order routing table 705 directs the order to, among other venues, a market maker 706, an electronic commerce network (ECN) 707, a direct market access (DMA) vendor 708, or an exchange 709.

733) Once the order is executed, the trade fill report is sent back to the order management system 503.

734) The order entry GUI is updated with the revised positions, number of shares, price per share, values, and cash data. FIG. 7 shows an exemplary screen image of the updated order entry GUI 710.

2) Compliance Engine

The compliance engine, also referred to as a rules-based compliance violation detection engine, is a graphical user interface (GUI) and associated software program(s) linked to a computerized rules-based logic engine that enables each buy or sell order (or combinations of buy and sell orders) to be analyzed in real-time, according to a set of customizable logical rules, such as rules specifying that foreign securities cannot exceed 15% of a portfolio's total value or that the portfolio cannot hold the securities of the sub-advisor nor the sponsoring organization. The compliance analysis occurs both prior to and immediately following the execution of each trade (or group of trades) as well as at the close of each trading day for compliance with prospectus, regulatory, and board requirements. Any pending order or group of pending orders that may result in any type of violation of securities laws, account restriction or prohibited transaction are held in suspense (and not executed) and tagged with a warning flag, and a violation notice is sent to the compliance group, portfolio manager, and trade/operations group. The order or group of orders in question, subsequent to the review of the violation, may be amended, canceled, or approved for execution. Trades (or groups of trades) that are executed are also analyzed to ensure that the resulting trades do not violate any requirements for the portfolio. (Post-execution price changes that occur later during the trading day could subsequently trigger a violation not present at the time of execution.) Approved orders are routed to the order management system (OMS) to begin the execution process.

FIGS. 8A, 8B, and 8C illustrate exemplary logical rules in terms of regulatory, prospectus, and board restrictions and requirements for a real-time compliance engine, as specified in the disclosure documents of an operating fund trust.

Figure 9:
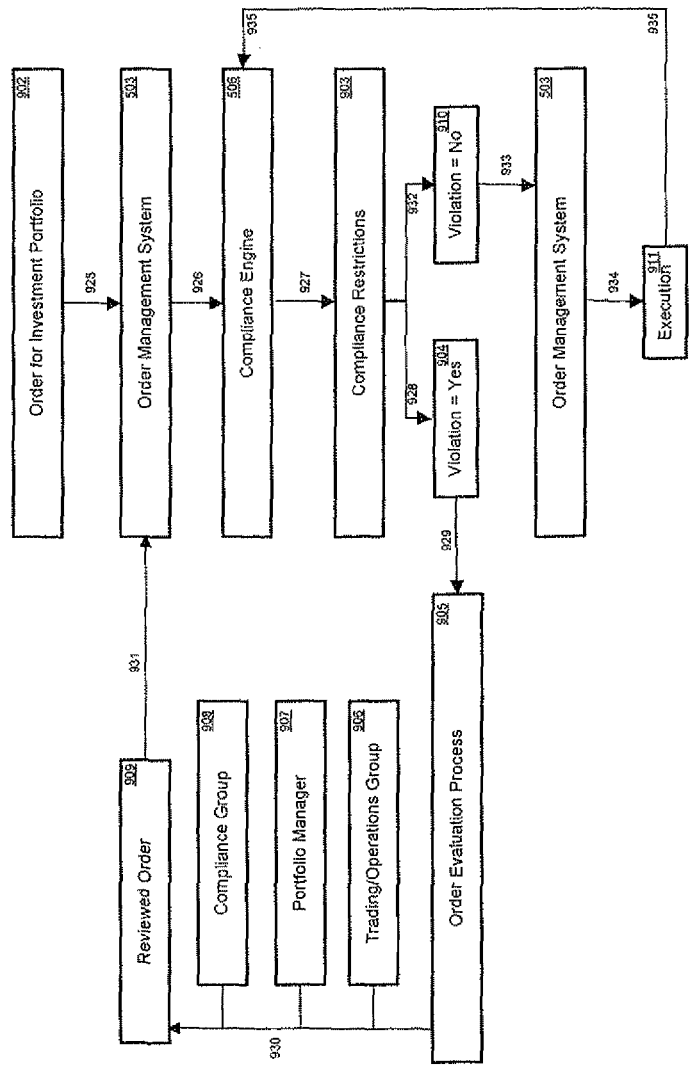
FIG. 9 is a schematic diagram illustrating the number and types of restrictions for a plurality of investment portfolios along with an exemplary computer process for implementing a compliance engine for an investment portfolio, according to an embodiment of the present invention.

FIG. 9 is a schematic diagram illustrating an exemplary compliance review process 900, according to an embodiment of the present invention, for implementing a compliance engine for a plurality of investment portfolios. In the instance for this operating fund trust, there are a total of 274 individual restrictions that could apply to all, many, or a single investment portfolio or fund. FIG. 9 shows the actual restrictions by category for five of the fund trust's investment portfolios, with the number of the individual restrictions shown in a breakdown of five categories, ranging from 41 to 63 compliance and regulatory restrictions per investment portfolio.

The exemplary compliance review process 900 works as described in the following steps corresponding to the arrows and their adjacent reference numerals as shown in FIG. 9.

925) An order for an investment portfolio 902 is entered into the order management system 503, which records the transaction in the trade blotter.

926) The order management system 503 routes the order to the compliance engine 506 for pre-trade review.

927) The compliance engine 506 matches the order to the restrictions for that particular investment portfolio 903 and conducts an analysis to determine if the order will result in a violation of any applicable restriction. Exemplary restrictions and their frequencies are illustrated in table 901 of FIG. 9.

928) If Violation=Yes 904, the order is not executed and requires a review.

929) The rejected order is then routed into the order evaluation process 905.

930) The reviewed order evaluation process 905 gathers input from at least one of the compliance group 908, portfolio manager 907, and the trading/operations group 906. The order may be canceled at this point, revised, or allowed to be executed in its existing form 909.

931) If the order is to be executed, the reviewed order 909 is routed to the order management system 503 for updating the trade blotter and resubmission to the compliance engine 506.

932) If, in step 927, Violation=No 910, the order is routed to the order management system 503.

933) The order management system 503 routes the order for execution 911.

934) The order is executed and the trade fill report is generated.

935) The trade fill report is routed back to the compliance engine 506 for post trade and ongoing compliance review and analysis.

Overall, in an embodiment of the present invention, the sponsoring organization (the advisor with direct regulatory responsibility for the investment portfolios) has the option, which is not available in the prior art, to review all pending orders and prevent violations of prospectus, regulatory, and board requirements prior to the orders being executed. The sponsoring organization, in an embodiment of the present invention, also has the option, which is not available in the prior art, to review all executed trades on a real-time basis to prevent post-execution violations of prospectus, regulatory, or board requirements. Finally, for the first time, the sponsoring organization, as advisor or plan administrator, has the means to place each fund or account and each sub-advisor on the sponsoring organization's implementation of a common, centrally operated compliance engine, process and set of restrictions (as opposed to each different sub-advisor or money manager performing compliance reviews on as many different systems.) The sponsoring organization, as advisor to the fund or administrator to the pension plan, has a regulatory (SEC) responsibility to ensure compliance of its funds and plan with all regulatory requirements and to certify, in writing, that these investment portfolios do not violate the securities laws. Thus, in contrast to the prior art, the present invention enables the advisor or administrator to fulfill such responsibilities prior to execution of an order, enables an immediate review of all executed trades, and allows a single standardized compliance review process to be implemented across all sub-advisors and the funds or accounts. The present invention therefore empowers the advisor or administrator to properly fulfill their regulatory responsibility by their preventing the execution of orders that violate securities laws, account restrictions or prohibited transactions.

3) Order Management System

Figure 10:
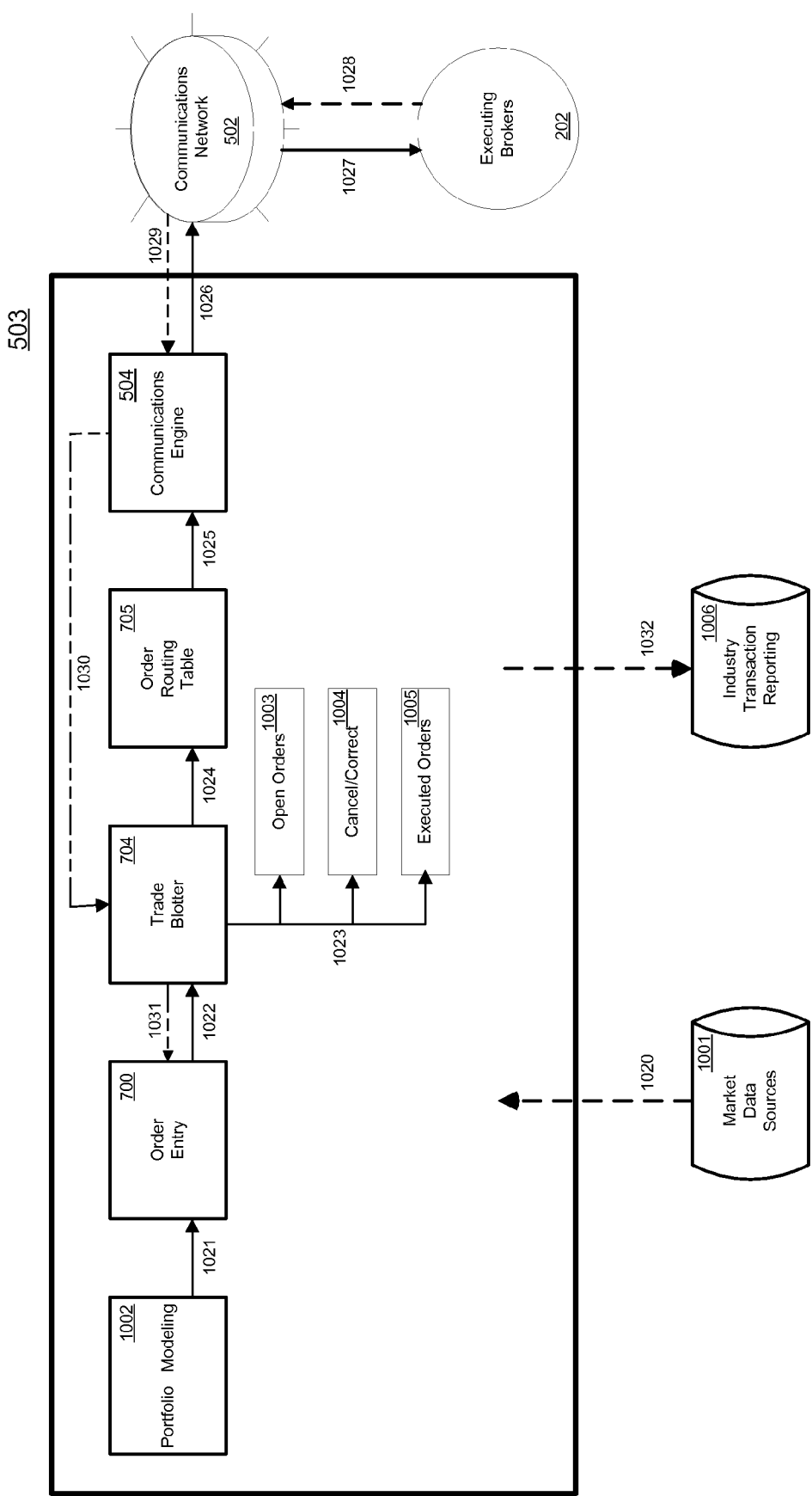
FIG. 10 is a schematic diagram illustrating an exemplary order management system (OMS), according to an embodiment of the present invention.

FIG. 10 is a schematic diagram illustrating the order management system (OMS) 503, according to an embodiment of the present invention. The order management system is a computerized processing system with a graphical user interface (GUI) and associated software program(s) enabling the organization conducting the trading activity to maintain a real-time trade blotter for all their pending orders and executed trades. An order management system can comprise one or more of the following nodules: portfolio modeling engine 1002, order entry 700, trade blotter 704, order routing table 705, and communications engine 504. The portfolio modeling engine 1002 enables a money manager to evaluate "what if" scenarios with the portfolio prior to implementing any trade orders. The trade blotter 704 enables real-time monitoring of all trading activity such as open orders 1003, cancel/correct orders 1004, and executed orders 1005. The OMS 503 enables the utilization of various trading strategies, keeping track of positions, P&L, order acceptance and release, sending IOI's (Indications of Interest), and amending orders. The order routing table 705 is a central database for maintaining the instructions for directing orders to selected executing brokers. The communications engine 504 is used to create data formats acceptable to other order management systems.

The order management system 503 also provides logical workflow solutions to assist in maintaining proper communication between the various front, middle, and back office functions and systems for allocations of large orders as well as keeping track of partial fills of trade orders. Finally, the order management system 503 utilizes market data sources 1001 and provides robust and flexible compliance, regulatory and audit reporting capabilities 1006, including NYSE Rule 123, OATs, ACT, Short Sale, and Limit Order Handling Rule reports, as well as capturing, time-stamping, and archiving all activity for timely reconciliation and trouble-shooting.

The order management system 503 functions as described in the following steps, which correspond to the arrows and their associated reference numerals shown in FIG. 10.

1020) The order management system 503 links with a plurality of real-time and batch market data feeds 1001.

1021) The portfolio manager utilizes the portfolio modeling engine 1002 to perform "what if" analyses for the investment portfolio and enters orders into the order entry module 700.

1022) The orders are recorded in the trade blotter 704.

1023) The trade blotter 704 enables views of the trade data such as open orders 1003, cancel and correct orders 1004, and executed trades 1005. (The compliance review process, as illustrated in FIG. 9, can occur at this point in the process, but is not shown.)

1024) The orders are sent to order routing table 705 for selecting executing brokers and receiving directions to those executing brokers 202.

1025) The order routing table 705 transmits the order to the communications engine 504, which translates the order into a format accepted by executing brokers 202.

1026) The order is routed to the communications network 502.

1027) The communications network 502 routes the order to the selected executing broker(s) 202.

1028) The executing broker(s) execute the order and send the trade fill report(s) through the communications network 502.

1029) The communications network 502 directs the trade fill report back to the order management system 503 and the communications engine 504 translates the order into a format used by the order management system 503.

1030) The trade fill report updates the trade blotter 704 with the details of the trade fill report(s).

1031) The trade report data is used to update the portfolio holdings for the order entry module 700.

1032) The order management system 503 submits transaction reporting 1006 to the appropriate industry transaction processing and reporting entities.

4) Hi Touch-Low Touch Engine (HiLo Engine or HLE)

The hi touch-low touch engine, which may also be referred to as the high low engine, HiLo Engine, HLE, or execution discretion assignment software engine (EDASE), is a graphical user interface (GUI) and associated software program(s) linked to a computerized rules-based logic engine that enables each buy or sell order (or combinations of buy and sell orders) to be analyzed in real-time, according to a set of customizable logical rules, to: (1) determine the expected market impact of an order and categorize an order as high touch or low touch; and (2) accordingly route the low touch orders for execution by the sponsoring organization and the high touch orders for execution by the sub-advisor. In a preferred embodiment, these logical rules can be adjusted in real-time.

Orders are categorized as high touch or low touch orders depending on their expected market impact. For example, the immediate execution in the market of an order to buy 500,000 shares for an equity that currently trades 100,000 shares daily at $40.00 per share will almost certainly result in an increase in the share price of that equity. As such, the large order could drive up the price of the equity by several dollars per share. Once the execution of that order is completed, the trading volume will likely return to its original 100,000 shares per day trading volume and the share price could return to the pre-trade level of $40.00 per share. A possible result is that the purchasers of the 500,000 shares will experience an immediate loss on their investment. The phenomenon of driving up the share price through a very large buy order or lowering the share price through a very large sell order is referred to as "market impact." It is usually desirable to "work" orders with significant expected market impact. By "working" orders, traders are able to utilize a variety of tools, such as institutional trading desks, trade algorithms, crossing networks, dark pools of liquidity, sending IOIs (indications of interest), and other such techniques (including manually watching the market for the appropriate times to execute small portions of the total order) to eliminate or reduce the expected market impact of a large order. The orders that require special handling ("working") are referred to as "high touch trades."

On the other hand, there may be situations in which an order represents a small percentage of a measure such as daily trade volume. For example, an order to buy 1,000 shares for an equity trading several million shares daily will have little or no expected market impact on the price of that equity. Once entered, such an order is transmitted, executed, and reported as the electronic systems and computers (also referred to as "black boxes") communicate with each other with little or no human interaction. The orders with low or no expected market impact are referred to as "low touch trades."

Finally, once an execution strategy is selected for a high touch order, the order may be broken up into several smaller orders that are executed over a period of time. These smaller orders may now qualify as low touch orders, as each individual order, when executed over a period a time, may now result in little or no market impact.

An embodiment of the present invention provides a system and method for:

(1) Enabling the sponsoring organization, as advisor, to implement, for the first time, its own centralized, real-time, rules-based pre and post trade compliance process across all of its sub-advisors and the sub-advisors' trading activity in order to prevent the execution of a trade order by a sub-advisor that would otherwise result in a violation of the securities laws, account restrictions, or prohibited transactions; and (2) Enabling the sponsoring organization, for the first time, to assign responsibility (discretion over the decisions related to how, when, with whom and the cost that a trade order is executed) for executing a trade order based on a rules-based analysis using real-time and historical market data to determine the expected market impact of a trade order to buy or sell securities, to the sub-advisor (money management firm) hired to manage an investment portfolio or to the advisor (sponsoring organization) of that investment portfolio.

(3) Implementing a standard and specialized communications methodology and system inclusive of a specialized communications protocol as a communications message delivery method, a specialized communications format for creating messages, a dedicated communications network for sending and receiving messages, specialized message transfer facilitation software and dedicated computer processor for supporting the message creation and delivery function.

The current technology available for sending trade related messages, as represented in the prior art, has several significant deficiencies that result in the prior art's inability to support the functionality required by the HiLo Engine. As a result, an exemplary HiLo Engine of the present invention provides specialized communication protocols, communications format, communications network, message transfer facilitation software and dedicated computer processors to achieve the desired functionality. The prior art is represented by an industry-wide standard message protocol and format that is available to all firms in the securities trading industry. This standard, called the Financial Information eXchange (FIX) format and protocol, is employed by trading systems around the globe to transmit trade related messages among money management firms and executing brokers. However, that prior art, as embodied by FIX, does not, and cannot be modified to, support the functionality requirements of the HiLo Engine, as follows:

(1) The FIX message formats do not support the high touch versus low touch decisions generated by the HiLo Engine.

(2) The FIX message formats do not support the Algo, TRO, or Algo TRO decisions generated by the HiLo Engine.

(3) The FIX message formats do not support the compliance status messages, such as hold orders or release orders, generated by the HiLo Engine.

(4) The FIX message communications methodology requires that the money management firm maintain a FIX session (an open and operational communications loop) with each executing broker selected by each of their sponsoring organizations. Most large money management firms maintain a list of twenty or fewer executing brokers with whom they maintain an open FIX session. The deficiency with the prior art FIX session technology is that, since the money management firm does not know in advance the sponsoring organization's selection of the executing broker for the low touch orders, the money management firm thus needs to maintain hundreds of open FIX sessions with the universe of executing brokers. Such an expansive communications structure, via FIX sessions, is simply not feasible given the limitations of the current FIX protocol and technology.

(5) Many firms implement their own unique "dialect" as to the specific implementation and of the FIX protocol in one of its many versions that have been released over time along with modifications customized to that firm's specific business needs. These variations in FIX dialect result in increasing the challenges associated with the already difficult and potentially troublesome process of matching an order directed by the sponsoring organization to an executing broker with the FIX session operated by the sub-advisor searching for results related to that specific order. As a result, these orders and their related communications could easily get lost in the vast global volume of FIX-based transmissions.

Overall, given the limitations inherent in the prior art, an embodiment of the HiLo Engine of the present invention, in order to properly achieve the required functionality, implements a specialized communication protocol, communications format, communications network, message transfer facilitation software, and dedicated computer processors. The communications protocol utilized in the present embodiment of the HiLo Engine (HLE) incorporates a web services-based messaging system between all participants. This messaging system is fast, effective and reliable. The present embodiment also protects the database integrity and security for systems employed by all participants as these user databases avoid any direct integration with the HiLo Engine (HLE) or with other system of other users. Future embodiments of the present invention could employ various database integration methods as new technology develops.

An embodiment of the present invention, referred to as the hi touch-low touch engine or "HiLo Engine" is a computer system that employs a plurality of rules to categorize trade orders, in real-time incorporating real-time market data, as high touch orders, whereby a trade order requires significant time and effort by a trader and where the order is expected to have a significant market impact on the price of the stock; or low touch orders, whereby the order does not require significant time and attention by a trader and where the order is not expected to have any significant market impact. As such, the HiLo Engine assigns responsibility (discretion) for the execution of high touch orders to the sub-advisor (money management firm), who is able to carefully "work" the order by selecting one or more executing venues or brokers to complete the transaction with minimal market impact. Likewise, the HiLo Engine assigns responsibility (discretion) for execution of low touch orders to the sponsoring organizations to execute by selecting one or more executing venues or brokers as to minimize execution costs and improve the quality of execution (rapid speed of execution and realized price improvement) for those orders. The rules for categorization are flexible and are established and revised by either the money management firm or the sponsoring organization as a real-time process, according to their agreed procedures.

The HiLo Engine, as an embodiment of the present invention, incorporates functions as a real-time, rules-based market liquidity analytical tool; an access and request facility to real-time market data and specified market data packages; an order discretion assignment decision-making engine; a manual user override of order discretion assignment decisions capability; a rules creation, updating and rules-exception depository; a rules and rules-exception testing facility; an extensive real-time reporting system; a rules, data, decision and order execution discretion assignment audit facility; a multi-level user and organizational access and rights control and updating facility; an account activation facility; a multiple venue message transfer facilitator connectivity system;

and an implementation of specialized message formats. The HiLo Engine integrates a plurality of sub-advisors (money management firms), sponsoring organizations and execution venues and brokers into a single and effective communication, compliance, and low cost order routing and execution network. The HiLo Engine's communications network also enables sponsoring organizations to benefit from a plurality of additional compliance and regulatory supervisory capabilities that result in significantly improved business processes including: lower brokerage costs and greater control over the process of replacing one sub-advisor to a fund or account with another sub-advisor; lower brokerage costs resulting from model portfolio asset allocation rebalancing activity; improved governance process through reporting of real-time and historical holdings, activity, brokerage and other costs; enhanced reporting on asset segregation requirements related to forward settlements on derivative positions; and stronger, real-time, enterprise-level risk management controls.

The percentage of orders categorized as high touch or low touch depends on the parameters utilized in the rules employed by the HiLo Engine. Given that many sponsoring organizations trade billions of equity shares annually, it is likely that most of this order flow is categorized as low touch, executed by the sponsoring organizations and resulting in substantial annual savings in brokerage costs and improved investment performance for their investment portfolios.

Figure 11A:
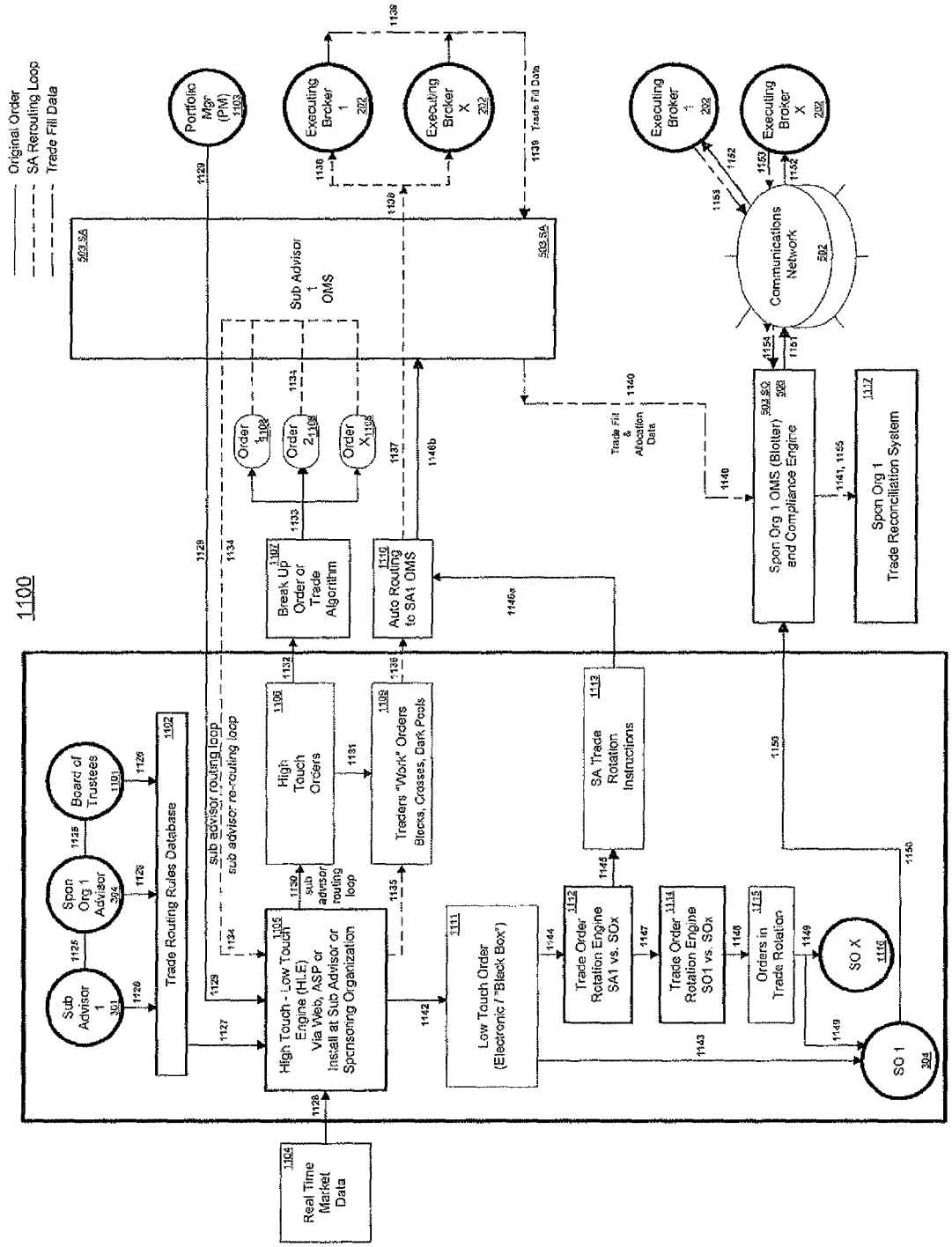
FIG. 11A is a schematic diagram illustrating an exemplary high touch low touch engine (HLE) system and process, according to an embodiment of the present invention.

FIG. 11A is a schematic diagram illustrating an exemplary HiLo Engine (HLE) system and process 1100, according to an embodiment of the present invention. The process 1100 works as described in the following steps, which correspond to the arrows and their adjacent reference numerals shown in FIG. 11A.

1125) The sub-advisor 301, sponsoring organization 304, and board of trustees 1101 determine the rules for categorizing an order as high touch or low touch.

1126) The rules for categorizing an order as high touch or low touch are input into the trade routing rules database 1102. These rules can be changed in real-time.

1127) The HiLo Engine (HLE) 1105 utilizes the rules from the trade routing rules database 1102 to categorize orders as high or low touch orders.

1128) The HiLo Engine (HLE) 1105 incorporates a real-time feed of market data 1104 for use in analyzing and determining the expected market impact of an order.

1129) The portfolio manager 1103, using the sub-advisor's order management system 503 SA, enters an order that is routed, via the sub-advisor routing loop, to the HiLo Engine 1105 for real-time analysis and categorization as a high touch or low touch order. Although the HiLo Engine 1105 is illustrated as located within the unified trading and control system, one of ordinary skill in the art would appreciate that the HiLo Engine 1105 could be located elsewhere, such as at the sub-advisor 301 or sponsoring organization 306.

1130) The HiLo Engine 1105 determines the expected market impact of orders received from the sub-advisor order management system (OMS) 503 SA and categorizes orders with significant expected market impact as "high touch" orders 1106.

1131) The high touch order 1106 is further categorized as orders to be "worked" by a block trading desk, crossing system, matching system, dark pool of liquidity, or some other form of institution to institution trading system or exchange 1109. These worked orders are routed for review by the sponsoring organization's compliance engine 506 and, once approved, are ready for execution.

1132) As an alternative to step 1131, the high touch order 1106 is divided into a series of smaller orders 1108 by a trading algorithm or a set of manual decisions 1107.

1133) The trading algorithm or set of manual decisions divides the order into a series of smaller orders 1108 for execution over a period of time.

1134) Each of the smaller orders 1108 resulting from the original high touch order are re-routed to the HiLo Engine 1105 via the sub-advisor re-routing loop.

1135) The HiLo Engine 1105 evaluates the re-routed smaller orders 1108 and categorizes the orders with significant market impact as high touch orders 1109.

1136) High touch orders 1109, from both the original and re-routed orders, are directed via auto routing 1110 to the sub-advisor's order management system 503 SA.

1137) The sub-advisor's order management system 503 SA receives the high touch order 1109 and selects the executing broker(s) 202.

1138) The sub-advisor order management system 503 SA routes the high touch orders to the executing broker(s) 202 for execution.

1139) Once the orders are executed by the executing brokers 202, the trade fill data for the high touch trades 1106 is routed to the sub-advisor order management system 503 SA.

1140) The sub-advisor order management system 503 SA determines, when applicable, the allocation of shares for the sponsoring organization and routes the trade allocation data along with the trade fill data (for trades not requiring a special allocation) for the high touch trades to the sponsoring organization's order management system 503 SO.

1141) The sponsoring organization's order management system 503 SO routes the trade allocation data for the sponsoring organization's allocation of shares of the high touch trade and the trade fill data for the high touch trades (not requiring a special allocation) to the sponsoring organization's trade reconciliation system 1117. Steps 1130 through 1141 constitute the high touch order processing loop.

1142) Returning to steps 1129 and 1134, when the high touch-low touch engine 1105 receives orders from the sub-advisor order management system (OMS) 503 (as either the original and re-routed orders) that it determines will have little or no significant expected market impact, the hi touch-low touch engine 1105 categorizes those orders as "low touch" orders 1111 that can be processed as "electronic" or "black box" orders, which computer systems can execute with virtually no human intervention. The "low touch" order can be either original orders or re-routed orders from the sub-advisor order management system 503 SA.

1143) The HiLo Engine 1105 directs trades that do not require a trade rotation order to the sponsoring organization 304. For example, a single order for a single fund would not require a trade rotation order.

1144) The HiLo Engine 1105 routes trades requiring a trade order rotation to the trade order rotation engine 1112 in order to determine a trade order rotation between the sub-advisor 301 and the sponsoring organization(s) 304 and 1116. For example, when an asset manager places a plurality of orders in a given security for execution across a plurality of investment portfolios, trade order rotation is required. Such trade order rotation is preferably random. The trade order rotation could be, for example, a defined procedure comprising random selection, sequential selection, or algorithmic random selection.

1145) The trade order rotation engine 1112 prepares trade rotation instructions 1113 for the sub-advisor 301.

1146) The trade rotation instructions 1113 are communicated to the sub-advisor's order management system 503 SA via auto routing 1110 (along steps 1146a and 1146b).

1147) The trade rotation engine 1114 determines the trade rotation order between a plurality of sponsoring organizations, such as the sponsoring organization 304 and any number of additional sponsoring organizations as represented by sponsoring organization ($SO_x$) 1116. The trade rotation order could also be determined as a single trade rotation order between the sub-advisor 301 and sponsoring organizations 304 and 1116.

1148) The trade rotation engine 1114 prepares trade rotation instructions 1115 for the sponsoring organizations 304 and 1116.

1149) The trade rotation instructions 1115 are communicated to the sponsoring organizations 304 and 1116.

1150) The trade orders are routed to the sponsoring organization's order management system (OMS) 503 SO.

1151) The sponsoring organization's order management system (OMS) 503 SO routes the orders for review by the sponsoring organization's compliance engine 506 and, once approved, selects the executing brokers 202 and routes the orders through the communications network 502 for execution.

1152) The communications network 502 directs the orders to the designated executing brokers 202 for execution.

1153) The executing brokers 202 execute the trade and report the trade fills back to the communications network 502.

1154) The communications network 502 reports the trade fill reports back to the sub-advisor's order management system (OMS) 503 SO.

1155) The sponsoring organization's order management system (OMS) 503 SO routes the orders to the sponsoring organization's trade reconciliation system 1117. Although, for clarity, FIG. 11A shows the trade compliance, execution, and reconciliation process (steps 1150-1155) only for sponsoring organization (SO 1) 304, the same or similar process would occur for the additional sponsoring organizations ($SO_x$) 1116. Steps 1142 through 1155 constitute the low touch order processing loop.

FIG. 11B is a schematic diagram illustrating an exemplary structure of a sub-advised investment management process whereby a sponsoring organization 304, as advisor, hires and supervises a plurality of sub-advisors 301 to manage, for example, large cap growth, large cap value, mid cap growth, and small cap growth investment portfolios. In the prior art of this industry structure, the sub-advisors are responsible for making investment decisions and the buying and selling (trading) for the securities held by these investment portfolios.

Figure 11C:
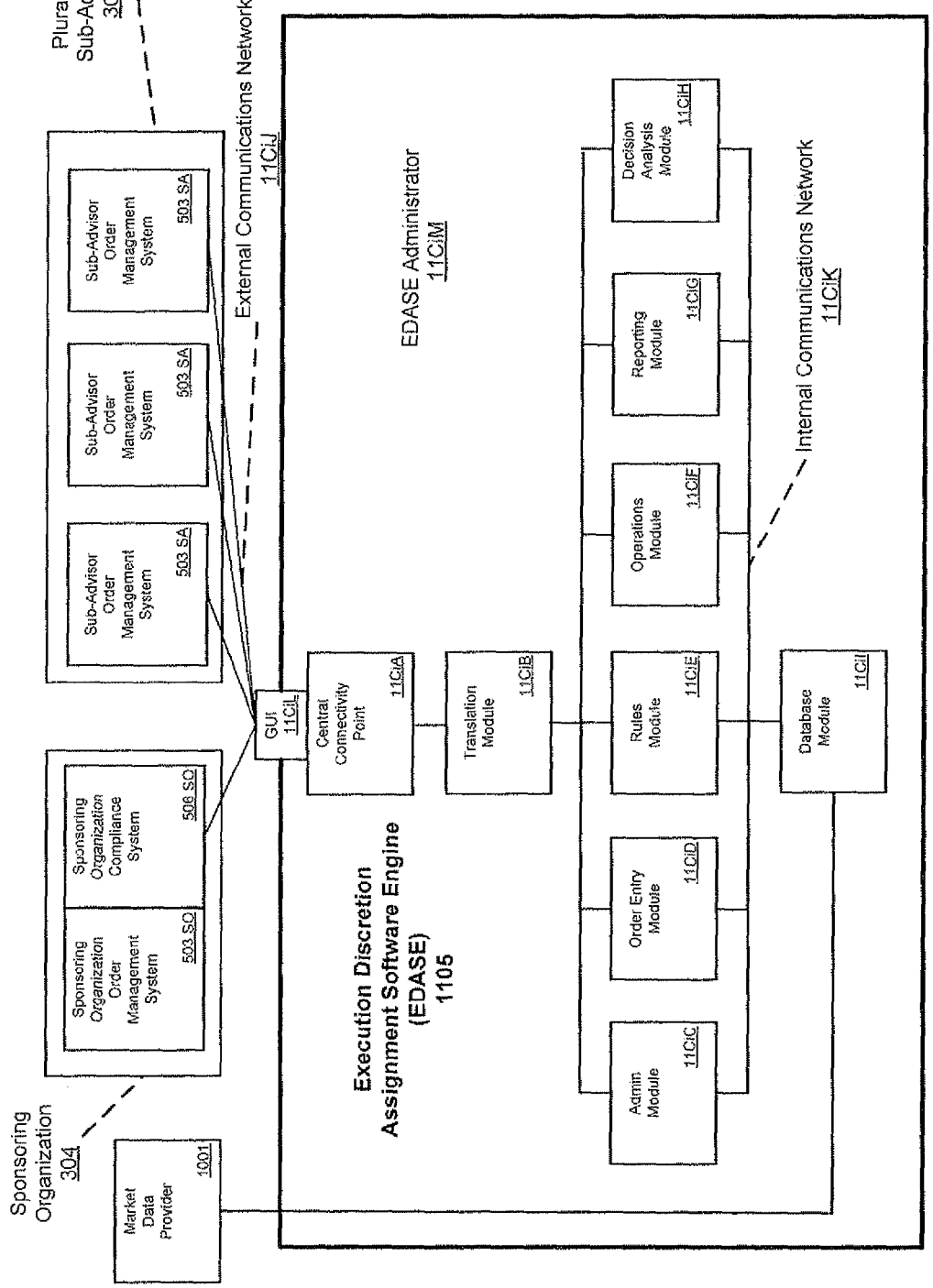
FIG. 11Ci is a schematic diagram illustrating the exemplary design, functional modules, connectivity, data feeds, database and data processing of the HiLo Engine (HLE) also referred to as the execution discretion assignment software engine (EDASE), according to an embodiment of the present invention.

FIG. 11Ci is a schematic diagram illustrating the exemplary design, functional modules, connectivity, data feeds, database and data processing of the HiLo Engine (HLE), a computer processor and software application also referred to as the execution discretion assignment software engine (EDASE), according to an embodiment of the present invention.

FIG. 11Ci illustrates a sponsoring organization 304 and a plurality of sub-advisors 301 maintaining a single connection, through the EDASE's external communications network 11CiJ, to the EDASE's central connectivity point 11CiA. The central connectivity point 11CiA enables the sponsoring organizations 304 and sub-advisors 301 to utilize a single connection to the EDASE 1105, regardless of how many other of their associated users (a plurality of sub-advisors 301 for a sponsoring organization 304 and a plurality of sponsoring organizations 304 for a sub-advisor 301). This single connection 11CiA to all associated users is a point of novelty for the EDASE 1105.

The central connectivity point 11CiA represents a computer processor and software application that receives all communication to and from the sponsoring organization 304 and the sub-advisors 301 as input from the graphical user interface (GUI) 11CiL. The graphical user interface 11CiL is the primary means through which users send and receive communications from the EDASE 1105. The graphical user interface 11CiL represents: a) EDASE's specialized graphical user interface; b) in an alternative embodiment, the integration of the EDASE's messages into the graphical user interface of the sponsoring organizations order management system SO 503 and sub-advisors order management system SA 503; or c) a combination of both the EDASE 1105 or the user's order management system's graphical user interfaces, depending on the desired function.

The central connectivity point 11CiA, using the EDASE's internal communications network 11CiK, routes or receives the messages from the translation module 11CiB, a computer processor and software application responsible for: a) normalizing all inbound communications messages from to the EDASE's 1105 internal format and routing the normalized message to the appropriate EDASE 1105 functional module; and b) translating all outbound communications to the EDASE's 1105 specialized message formats and routing the outbound messages to the central connectivity point 11CiA. The translation module 11CiB also, using the internal communications network 11CiK, requests and sends updates to the EDASE's database module 11CiI for purposes of updating the E-DASE's 1105 database records.

The translation module 11CiB reads the message header and routes the message to the appropriate EDASE 1105 functional module, as follows:

The admin module 11CiC represents a computer processor and software application that, through the EDASE's internal connectivity network 11CiK, accepts messages from the EDASE's graphical user interface (GUI) 11CiL and enables users to set up user roles and permission schema, including users and viewers for the sponsoring organization 304, sub-advisors 301, and EDASE administrator 11CiM. The admin module 11CiC accepts a data feed from the sponsoring organization's order management system 503 SO to set up, modify or remove investment portfolios in the EDASE 1105. The admin module 11CiC also enables users to activate submission of orders from the investment account to the EDASE 1105. The admin module 11CiC, using the internal connectivity network 11CiK, requests and sends updates to the EDASE's database module 11CiI for purposes of updating the EDASE's 1105 database records.

With reference to FIG. 11R, the HiLo Engine supports a wide variety of users and their required functionality needs. There are three categories of users: sponsoring organizations, money management firms (sub-advisors), and system administrators.

The HiLo Engine, to properly support the sponsoring organizations, money management firms and system administrative functions, provides seven user roles as defined below.

The money management firm (sub-advisor) has three roles, including administrators, traders, and viewers.

Administrator: The money manager administrator performs the following functions:

Adds, changes rights and removes trader and viewer users;

Controls rule activation, governing parameters and rule exceptions;

Create exception rules for accounts, securities or groups of securities; and

Activates and deactivates accounts to submit orders to the HiLo Engine.

Trader: The trader is authorized to interact with the HiLo Engine in the normal trading process supporting sub-advised accounts, including submitting orders, cancel requests and overrides of touch levels. Traders (similar to the money management firm administrator) are also able to:

Controls rule activation, governing parameters and rule exceptions; and

Create exception rules for accounts, securities or groups of securities.

The money manager trader is not able to activate and deactivate accounts to submit orders to the HiLo Engine. The money management firm determines whether the money manager administrator money manager trader or both are responsible to create and maintain the HiLo Engine rules and parameters.

Viewer: The viewer is authorized to utilize the HiLo Engine's reporting functionality for the sub-advisor's sub-advised accounts.

The sponsoring organization has two roles, including administrator and viewer.

Administrator: The sponsoring organization administrator is the single user that performs the following functions:

Adds and removes viewers; and

Assigns money management firms (sub-advisors) to the sponsoring organization's accounts.

Viewer: The viewer is authorized to utilize the HiLo Engine's reporting functionality for the sponsoring organization's sub-advised accounts.

The system administrator has two roles, including administrator and viewer.

System Administrator: The system administrator has the following functionality:

Controls the parameters for the pre set levels,

Add sponsoring organizations and money management firms to the HiLo Engine (HLE);

Create and remove users within sponsoring organizations and money management firms; and Assign money management firms to accounts.

Viewer: The viewer enables system personnel to utilize the HiLo Engine's (HLE). Reporting functionality.

The order entry module 11CiD represents a computer processor and software application that, through the EDASE's internal connectivity network 11CiK, accepts messages from the EDASE's graphical user interface (GUI) 11CiL, or in an alternative embodiment, is integrated directly with the sponsoring organization's order management system SO 503 and the money management firm's order management system SA 503, and enables users to engage in transactions related to the entry and execution of orders by the EDASE 1105 through the following functions: submission of a single order or group of orders, order cancel requests, order cancel request status, order execution fill, order execution fill corrections, order cancel confirmations, order cancel partial fills, order replace, compliance review hold order, compliance review approve order, compliance review release order for execution and updating of open Good Til Cancel (GTC) orders. The order entry module 11CiD allows order entry for the purposes of testing rules and their parameters for categorizing orders as high touch or low touch. The order entry module 11CiD also, using the internal communications network 11CiK, requests and sends updates to the EDASE's database module 11CiI for purposes of updating the EDASE's database records.

In an exemplary embodiment of the HiLo Engine, there are two destinations for messages from the HiLo Engine. These destinations, in an exemplary embodiment, are organized between the money management firm order management system and the sponsoring organization order management system as follows.

Money management firm order management system (OMS): The money management firm's OMS utilizes a Master HLE Trading Desk composed of three sub trading desks to process the various order categorization messages from the HiLo Engine (HLE):

High Touch Desk: The money management firm executes the high touch orders.

Low Touch Desk: The money manager does not execute the low touch orders. Rather, the sponsoring organization executes the low touch orders and the resulting fill reports are sent by the HiLo Engine (HLE) to the money management firm's order management system (OMS) and shown on the Low Touch Desk.

Low Touch TRO Desk: The low touch TRO orders are not executed by the money management firm. Rather, the money management firm implements the trade rotation order (TRO) among the sponsoring organizations, which in turn execute the low touch orders. The resulting fill reports are sent by the HiLo Engine (HLE) to the money management firm's order management system (OMS) and shown on the Low Touch desk.

Sponsoring organization order management system (OMS): The sponsoring organization's OMS utilizes a Master HLE Trading Desk composed of four sub trading desks to process the various order categorization messages from the HiLo Engine:

High Touch Desk: The money management firm executes the high touch orders. The sponsoring organization receives the fills through the HiLo Engine (HLE) for the allocations at the end of the trading day from their custodian.

TRO Desk: The money management firm implements the trade rotation order (TRO) needed among their sponsoring organization's accounts. This desk tracks the low touch TRO orders until the money management firm releases the orders for execution by the sponsoring organizations.

Low Touch Desk: The sponsoring organization executes the low touch orders. The resulting fill reports are sent by the HiLo Engine (HLE) to the money management firm's order management system (OMS).

Low Touch Algo Desk: Low touch algo orders are executed by the sponsoring organizations, who evaluate whether the order requires the use of a trading algorithm (such as TWAP or VWAP). The resulting fill reports are sent by the HiLo Engine (HLE) to the money management firm's order management system (OMS).

The rules module 11CiE represents a computer processor and software application that enables users, through the EDASE's graphical user interface 11CiL at the sponsoring organizations 304 and sub-advisors 301, according to their agreed procedures, to create, modify activate, deactivate and eliminate rules for the assignment of discretion over the execution of order through the categorization of orders as high touch or low touch. Thus, through the rules module 11CiE, the user can specify the tests, measures and parameters for categorizing orders as high touch or low touch, create and modify pre set levels as well as create exceptions to the rules for accounts, group of accounts, individual issues (symbols) and groups of issues. The rules module 11CiE also enables creation of parameter for the algorithm and trade rotation order tests for low touch orders. The rules module 11CiE also, using the internal communications network 11CiK, requests and sends updates to the EDASE's database module 11CiI for purposes of updating the EDASE's database records.

There are three "primary" rules utilized by the HiLo Engine in categorizing an order as high touch or low touch. Money management firms (sub-advisors) are assigned control over the selection of the rules to utilize and their associated governing parameters (such as percentages and time periods). In alternative embodiments, the sponsoring organization of both firms could control the rules, according to an agreed procedure. If an order fails one or more of the activated primary rule tests, then the order is categorized as high touch.

In an exemplary embodiment of the present invention, the money management firm can select any one, two, or all three of the following three primary rules (top of book, average hourly liquidity, and average daily trading volume), and make changes in real-time with respect to the rules and associated parameters, for categorizing orders as high touch or low touch:

Top of book (current liquidity): The top of book rule examines the current liquidity available in shares of an issue across the exchanges and leading ECNs (protected markets) on the side (buy or sell) of the order in comparison to the number of shares in each order. The governing parameters are: Percentage, such as 300%.

Average hourly liquidity: The average hourly liquidity rule examines the average top of book liquidity over specified time period, such as a number of hours. The average hourly liquidity data captures the average top of book liquidity for the time period specified. The governing parameters are: Percentage, such as 300%, and number of hours, such as two (most recent) hours.

Average daily trading volume: The average daily trading volume rule examines the average daily trading volume for a specified number of the most recent trading days. The governing parameters are: Percentage, such as 5%, and number of trading days, such as 20 days.

The three rules can be activated in any combination of one, two, or three rules, as desired by the sub-advisor. The money manager administrator and/or money manager trader can change, in real-time, the selection and activation of rules and the associated parameters.

A further aspect of the present invention uses secondary rules. Secondary rules provide valuable, but not mandatory, suggestions to assist with the proper execution of low touch orders. Money management firms can control the governing parameters (such as percentages and time periods) for these rules. The money management firms can determine the governing parameters for two secondary rules (low touch algo and low touch trade rotation order):

Low touch algo: The low touch algo rule provides a suggestion that the sponsoring organization's order routing desk consider employing an algorithm in the execution of an order. The governing parameters are: The top of book (%), average hourly liquidity (% and number of hours) and average daily volume (% and number of days) parameter structure is identical to the primary rules. However, it is expected that the parameters utilized for the low touch algorithm rules may be equal to or less the parameters for an individual order.

Low touch TRO (trade rotation order): The low touch TRO rule provides a suggestion that a trade rotation order be considered by the sub-advisor's trading desk in the execution of a group of orders on the same side of the same security. This analysis excludes high touch orders in the group. The governing parameters are: The top of book (%), average hourly liquidity (% and number of hours) and average daily volume (% and number of days) parameter structure is identical to the primary rules. However, it is expected that the parameters utilized for the TRO rules may be equal or exceed the parameters for an individual order.

Orders can be categorized as both low touch algo and low touch TRO; thus, an order can be categorized as "low touch TRO algo." This order requires a trade rotation order as part of a group of orders. The sponsoring organization, once receiving the individual order, may consider utilizing an algorithm to execute the order.

In a further aspect of the present invention, as an option for quickly setting and changing the parameters for rules, the HiLo Engine provides five pre set levels for governing parameters for the primary and secondary rules. The money manager admin or trader can change the selected levels with the click of a button, for example, from Level 1 to Level 3 or from Level 3 to Level 5, and the HiLo Engine immediately changes the governing parameters for the rules. The system administrator controls the parameters for the five pre set levels. The higher levels increase the percentage of orders categorized as low touch.

In a further aspect of the present invention that provides touch overrides, the money manager trader can override the touch level for an order from a high touch order (executed by the money management firm) to low touch (executed by the sponsoring organization).

In a further aspect of the present invention, the HiLo Engine enables money management firms to create exceptions to the primary rules utilized for categorizing orders. Exceptions are easy to create, administer and review. The primary rules are as follows:

Primary Rules: Primary rules govern the categorization of orders as high touch or low touch in the absence of exceptions.

The exception rules are as follows:

Account rules: Account rules enable users to set up exceptions to primary rules for designated accounts.

Symbol rules: Symbol rules enable users to set up exceptions to primary or account rules for designated individual securities.

Symbol group rules: Symbol group rules enable users to set up exceptions to primary or account rules for designated groups of individual securities.

The hierarchy among exception rules is as follows:

Symbol group rules override symbol, account and primary rules.

Symbols rules override account and primary rules.

Account rules override primary rules.

Primary rules are utilized when there are no symbol, symbol group or account exceptions.

The operations module 11CiF represents a computer processor and software application that enables users, through the EDASE's graphical user interface 11CiL at the sponsoring organizations 304 and sub-advisors 301, to perform the following operations functions: start and stop the EDASE 1105, recover from lost data feed, monitor current operating status, login and log out, track order and internal processing errors and utilize a heartbeat function to check on connectivity with external users. The operations module 11CiF is monitored by the EDASE administrator 11CiM and using the internal communications network 11CiK, requests and sends updates to the EDASE's database module 11CiI for purposes of updating the EDASE's database records.

The reporting module 11CiG represents a computer processor and software application that enables users, through the EDASE's graphical user interface 11CiL, at the sponsoring organizations 304 and sub-advisors 301, to perform real-time queries of the database module 11CiI for following reporting functions: View rules and their related tests, measures, parameters and exceptions related to high and low touch, trade rotation order and algorithm orders; routing statistics for orders, order discretion assignment audit reports and archives, overrides of order discretion assignments by users, lost and incomplete orders and open Good Til Cancel (GTC) orders. The reporting module 11CiG provides a data export facility and, using the internal communications network 11CiK, requests and receives reports from the EDASE's database module 11CiI.

The decision analysis module 11CiH represents a computer processor and software application that functions as the "brain" of the EDASE 1105 for purposes of, for a specific order, gathering the necessary market data, compiling the necessary rules, performing the required calculations, evaluating the results, categorizing the order as high touch, low touch, low touch algo, low touch TRO or low touch algo TRO, adding the compliance review status and creating the message for the users to receive the output of the EDASE 1105. This message is routed, using the internal communications network 11CiK, to the translation module 11CiB for purposes of creating the desired message format for the users. The decision analysis module 11CiH also, using the internal communications network 11CiK, requests and sends updates to the EDASE's database module 11CiI for purposes of updating the E-DASE's database records.

The database module 11CiI represents a computer processor and software application that functions as the primary repository for all current and historical data and archiving of necessary data for the EDASE 1105. The database module's 11CiI field structure includes data on: securities; accounts; organizations including sponsoring organizations, money management firms and EDASE administrators; rules with tests, measures and parameters; pre set levels; exceptions by accounts, groups of accounts, symbols and groups of symbols; users, roles and permissions; active and deactivated accounts; order routing decisions and overrides; canceled and replaced orders; lost orders and operational statistics such as CPU utilization. The database module 11CiI is updated, using the internal communications network 11CiK, through communication with the other functional modules within the EDASE 1105 and serves as an archive for all EDASE 1105 data and activity.

Data feeds represent critical inputs to EDASE 1105. A market data feed 1001, using a dedicated line in the external communications network 11CiJ, is incorporated into the functions of the EDASE 1105. Messages originating from the sponsoring organizations 304 and sub-advisors 301, utilizing the external communications network 11CiJ, also represent important data feeds regarding new organizations, order entry, cancel and correct of orders, compliance status, new and activated accounts, trade fill reports, changes in the rules, user updates and associated operational information.

Messages perform a critical function in the EDASE 1105. Messages represent database records composed of various fields in a format that is specialized to the EDASE 1105 as these messages are utilized to communicate various events to the users. The EDASE 1105, through the external communications network 11CiJ, utilizing the following messages: new orders, new orders with high touch-low touch decision, high touch to low touch override, high touch Good Til Cancel (GTC) updates, compliance=OK, compliance under review, order released from compliance, cancel order request, cancel response-cancel confirmed, cancel response-cancel rejection, cancel response-cancel unfilled portion of order, sponsoring organization initiated cancel, execution fill, execution fill modification, empty message (heartbeat) and order error.

FIG. 11Cii is a schematic diagram illustrating an exemplary sponsoring organization trading process in which trade orders originate (are entered) by a portfolio manager or a plurality of portfolio managers employed by a money management firm or a plurality of money management firms responsible for the investment management process for a sponsoring organization's investment portfolios, according to an embodiment of the present invention. The process shown in FIG. 11Cii is an alternative to the embodiment of FIG. 22, discussed below.

As shown in FIG. 11Cii, the sub-advisor's (money management firm's) order management system (OMS) 503 SA routes the orders to the HiLo Engine 1105. The HiLo Engine 1105 performs two functions:

(1) Routes the trade orders to the sponsoring organization's 304 rules-based compliance system 506 SO for a compliance supervisory review prior to the execution of the trade order. If there is a violation of the securities laws, account restrictions, or prohibited transactions, then the order is held by the sponsoring organization's 304 compliance system 506 SO pending resolution between the sponsoring organization compliance group 1180 and the sub-advisor's compliance group 2202; and (2) Utilizes a rules-based engine, and the agreed rules of the sponsoring organization 304 and sub-advisor (money management firm) 301 for determining whether an order is high touch or low touch, to categorize each trade order as high touch or low touch. The high touch orders are routed back to the sub-advisor 301, who has responsibility (discretion) over the execution of the high touch orders by selecting one or more executing venues or brokers 202. The low touch orders are routed to the sponsoring organization 304, who directs the low touch orders for execution by selecting one or more low cost, high quality executing venues or brokers 202.

FIG. 11Cii is an exemplary illustration of an alternative embodiment of the unified trading and control system 2200 with respect to a real-time computerized process involving a sponsoring organization 304 and a plurality of trade orders, trading or order management systems (OMS) 503 SA and 503 SO, the HiLo Engine 1105, sub-advisors 301, portfolio managers 1103, and executing brokers 202.

An exemplary workflow utilization process is as follows (where the numbered steps below correspond to the numbers indicated in FIG. 11Cii):

11Cii1) The portfolio manager 1103 at the sub-advisor 301 creates trade orders as to buy and sell securities and sends the orders to order entry system 700. The portfolio manager(s) for an investment portfolio communicates orders (such as buy or sell a security or a plurality of securities) via means such as electronic order entry, telephone discussions, text messages, personal conversations, written instructions, or other means to the money management firm's trading desk.

11Cii2) Orders are entered into order entry system 700 and added to the sub-advisor's 301 order management system (OMS) 503 SA.

11Cii3) The sub-advisor's 301 order management system (OMS) 503 SA routes the order to the sub-advisor's compliance system 506 SA for compliance review according to the compliance rules established by the sub-advisor 301.

11Cii4) The orders passing the compliance review process (OK) are sent to the sub-advisor's trading desk operating the order management system (OMS) 503 SA.

11Cii5) An order violating the sub-advisor's 301 compliance rules is routed to the sub-advisor's compliance department 2202 for further review.

11Cii6) The sub-advisor's order management system (OMS) 503 SA sends all orders for a sponsoring organization's 304 accounts to the HiLo Engine 1105. The HiLo Engine 1105 applies the appropriate rules set agreed upon by the sponsoring organization 304 and sub-advisor 301 to analyze each order relative to current and historical liquidity and trading volume for the issue represented in the order as to categorize an order as high touch or low touch. The set of rules for categorizing orders is customizable by firm, portfolio manager, investment portfolio, trader, or individual security, group of securities, or through an alternative schema.

11Cii7) The HiLo Engine 1105 routes all orders for a sponsoring organization 304 to that sponsoring organization's compliance system 506 SO for review prior to execution according to the compliance rules established by the sponsoring organization 304.

11Cii8) An order violating the sponsoring organization's 304 compliance rules is routed to the sponsoring organization's compliance department 1180 for further review.

11Cii9) The sponsoring organization's compliance department 1180 contacts the sub-advisor's compliance department 2202 for resolution of the order triggering the violation in the sponsoring organization's 304 compliance review process. The order may be canceled, replaced, modified, or subsequently approved for execution.

11Cii10) The high touch orders passing the sponsoring organization's 304 compliance review process (OK) are routed to the HiLo Engine 1105.

11Cii11) The high touch orders are routed by the HiLo Engine 1105 to the sub-advisor's order management system (OMS) 503 SA.

11Cii12) The high touch orders are directed by the sub-advisor's order management system (OMS) 503 SA to executing brokers 202.

11Cii13) The orders are executed by the executing broker 202 and the executing broker 202 sends trade fill reports to the sub-advisor's order management system (OMS) 503 SA.

11Cii14) The executing broker 202 sends trade details for the high touch executed orders to the Depository Trust Clearing Corporation (DTCC) 1181.

11Cii15) DTCC 1182 transmits the details of all trade executions by the sub-advisor 301 to the sub-advisor's custodian 1182.

11Cii16) On the trade date, the sub-advisor's custodian 1182 transmits the details of all trade executions to the sub-advisor's trade reconciliation, or fund accounting, group 1183.

11Cii17) The HiLo Engine 1105 sends low touch orders passing the sponsoring organization's 304 compliance review process (OK) to the sponsoring organization's order management system (OMS) 503 SO.

11Cii18) The low touch orders are routed by the sponsoring organization's order management system (OMS) 503 SO to an executing broker 202.

11Cii19) The low touch orders are executed by the executing broker 202 and the executing broker 202 sends trade fill reports to the sponsoring organization's order management system (OMS) 503 SO.

11Cii20) The sponsoring organization's order management system 503 SO sends the trade fill data for low touch order executions to the HiLo Engine 1105.

11Cii21) The HiLo Engine 1105 sends the trade fill data for the low touch order executions to the sub-advisor's order management system (OMS) 503 SA.

11Cii22) The executing broker 202 sends trade details for low touch executed orders to the Depository Trust Clearing Corporation (DTCC) 1181.

11Cii23) DTCC 1181 transmits the details of all trade executions by the sponsoring organization 304 to the sponsoring organization's custodian 303.

11Cii24) On the trade date plus one day, the sponsoring organization's custodian 303 transmits the details of all trade executions to the sponsoring organization's fund accounting group 1184.

11Cii25) On the trade date plus two, the sponsoring organization's fund accounting group 1184 sends a comparison file to the sub-advisor's fund accounting group 1183. Any errors in transactions by either the sponsoring organization 303 or the sub-advisor 301 are reconciled.

According to an embodiment of the present invention, the HiLo Engine performs as follows. With orders whereby the expected market impact is significant, the order is categorized as high touch and routed back to the money management firm's OMS. The sub-advisor's (money management firm's) trade desk may "work" the order by selecting one or more executing venues or brokers to act upon specific instructions by the portfolio manager, to protect the anonymity of the money management firm as the source of the order and/or to minimize the market impact of the order. For orders whereby the expected market impact is not significant, then the order is categorized as low touch and routed to the sponsoring organization's OMS. The sponsoring organizations execute the trade order by selecting one or more executing venues or brokers so as to minimize execution costs and improve the quality of execution (rapid speed of execution and realized price improvement). The execution of trade orders by the sponsoring organization also protects the anonymity of the money management firm as the source of the order.

The HiLo Engine may also add additional considerations to low touch orders (which can be referred to as low touch special orders) such as whether:

(a) The HiLo Engine may suggest the sponsoring organization consider utilizing an electronic trading algorithm with the low touch order in order to divide a parent order into a plurality of smaller child orders for execution according to a predetermined strategy. If so, the sponsoring organization can select the specific algorithm (such as TWAP, VWAP, arrival price, or implementation shortfall) and the associated parameters (such as start time, finish time, and level of aggressiveness) for the selected algorithm for execution through one or more executing venues or brokers. Also, a money management firm may utilize a trading algorithm for a high touch order and, as a result, divide the high touch order into a number of high touch and low touch orders. The low touch orders generated by the money management firm's algorithm could be executed by the sponsoring organization.

(b) In circumstances where an individual order does not have a significant expected market impact, but the cumulative impact of a group of orders for the same side (buy or sell) of the same security for a plurality of accounts managed by a sub-advisor being executed simultaneously could potentially have a greater than desired market impact, the HiLo Engine may suggest that a trade rotation order (TRO) be implemented for such a group of low touch orders. The sub-advisor (or the system administrator or another party) determines the timing of the release of the orders for execution by the sponsoring organization. Each sponsoring organization, upon receiving the order once it is released within the trade rotation order (TRO), executes the order as it would any low touch or low touch algorithm order.

Figure 11D:
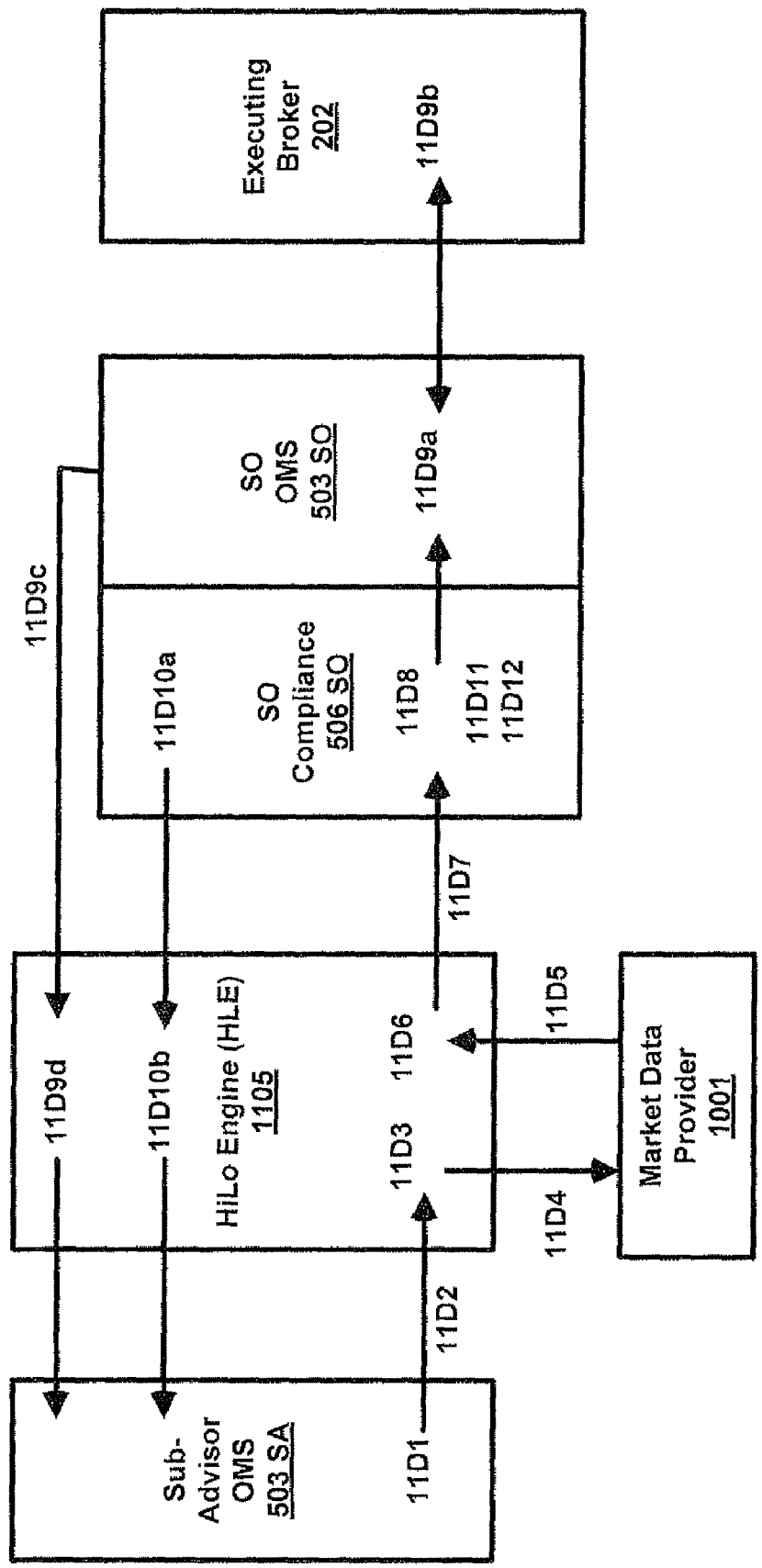
FIG. 11D is a schematic diagram illustrating an alternative embodiment of FIG. 11A according to which the HiLo Engine captures orders from the sub-advisor (money management firm), categorizes the order as high touch or low touch, routes the order for compliance review by the sponsoring organization (advisor), and routes high touch orders to the sub-advisor (money management firm) for execution while routing the low touch orders to the sponsoring organization for execution, according to an embodiment of the present invention.

FIG. 11D is a schematic diagram illustrating an alternative embodiment of FIG. 11A according to which the HiLo Engine captures orders from the sub-advisor, categorizes the orders as high touch or low touch, routes the order to compliance review by the sponsoring organization, and routes the low touch orders to either the sponsoring organization (advisor) and the high touch orders to the sub-advisor (money management firm), according to an embodiment of the present invention.

Referring to FIG. 11D, an exemplary HiLo Engine utilization process is as follows (where the numbered steps below correspond to the numbers indicated in FIG. 11D):

11D1) The sub-advisor 301 enters an order into the sub-advisor's order management system (OMS) 503 SA.

11D2) The sub-advisor's order management system (OMS) 503 SA creates a message to route the order to the HiLo Engine 1105.

11D3) The HiLo Engine 1105 receives the message from the sub-advisor 301 and reads the order.

11D4) The HiLo Engine 1105 prepares a data packet request for the order and sends the request to the real-time market data provider 1001.

11D5) The real-time market data provider 1001 creates and routes the requested data packet to the HiLo Engine 1105.

11D6) The HiLo Engine 1105 receives the market data packet for the order and, applying the appropriate customizable rules, categorizes the order as high touch or low touch.

11D7) The HiLo Engine 1105 creates a message to route the order and high touch or low touch decision to the sponsoring organization's compliance system 506 SO.

11D8) The sponsoring organization's compliance system 506 SO receives the message containing the order from the HiLo Engine 1105 and performs a compliance check of the order for any violation of securities laws, account restrictions, or prohibited transactions.

11D9a) If the order is low touch and compliance=OK, the sponsoring organization's compliance system 506 SO routes order to the sponsoring organization's order management system (OMS) 503 SO.

11D9b) The sponsoring organization's order management system (OMS) 503 SO determines order routing and sends the order to the executing broker 202. The executing broker 202 fills the order and sends the fill report to the sponsoring organization's order management system (OMS) 503 SO.

11D9c) The sponsoring organization's order management system (OMS) 503 SO creates a message to send the fill report to HiLo Engine 1105.

11D9d) The HiLo Engine 1105 sends the fill report message to the sub-advisor's order management system (OMS) 503 SA.

11D10a) If the order is high touch and compliance=OK, the sponsoring organization's compliance system 506 SO sends a "high touch and compliance=OK" message to the HiLo Engine 1105.

11D10b) The HiLo Engine 1105 sends the "high touch and compliance=OK" message to the sub-advisor's order management system (OMS) 503 SA for the sub-advisor 301 to determine and implement the proper execution strategy for the order.

11D11) If order is high touch or low touch and compliance=violation, the sponsoring organization's compliance system 506 SO holds the order and sends a message to alert the sponsoring organization 304 and sub-advisor 301 of the potential violation. If the order is low touch and the violation is overridden, then the message is compliance=approval and steps 11D9a through 11D9d occur. If the order is high touch and the violation is overridden, then the message is compliance=approval and steps 11D10a through 11D10b occur.

11D12) With compliance=denial of override of violation, the sponsoring organization's compliance system 506 SO holds the order until the order is canceled, replaced by another order, or a final disposition of the order is determined.

Figure 11E:
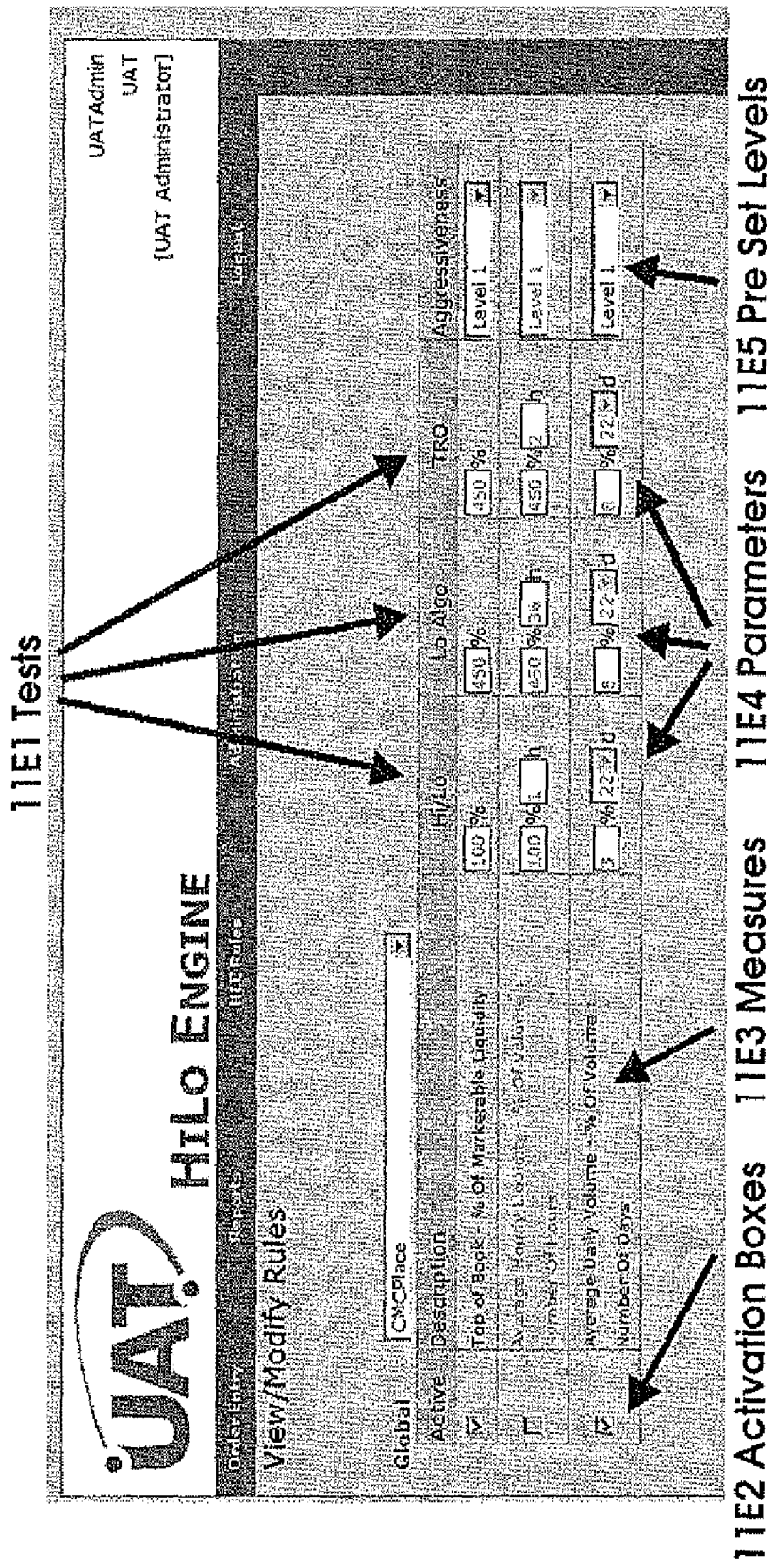
FIG. 11E is a screen shot from an embodiment of the present invention that illustrates the HiLo Engine's exemplary graphical user interface (GUI) providing, as shown in a plurality of tests, activation boxes, measures, parameters, and pre set levels employed to categorize an order as high touch or low touch, according to an embodiment of the present invention.

FIG. 11E is a screen shot from an embodiment of the present invention illustrating the HiLo Engine's exemplary graphical user interface (GUI) providing a plurality of tests 11E1, activation boxes 11E2, measures 11E3, parameters 11E4 and pre set levels 11E5 employed to categorize an order as high touch or low touch, according to step 11D6 of an embodiment of the present invention.

The HiLo Engine provides an exemplary graphical user interface (GUI) referred to as a "TMP Screen" whereby "T" represents the tests 11E1, "M" represents the measures 11E3, and "P" represents the parameters 11E4, as described in the rules module 11CiE, according to an embodiment of the present invention. The activation boxes 11E2 on the TMP screen are utilized to select and activate (or deactivate by unchecking) the boxes representing the plurality of measures available for each test. The TMP screen also allows inputting of the associated parameters utilized by each test. Drop down boxes provide access to pre set levels 11E5 (such as 1 for a lowest percentage of orders categorized as low touch through 5 for the highest percentage of orders categorized as low touch in the present embodiment) for specific combinations of tests 11E1, measures 11E3, and parameters 11E4.

FIG. 11E is an exemplary illustration of how an embodiment of the present invention operates with respect to a real-time computerized process involving a graphical user interface (GUI) for establishing, monitoring, and changing the computerized rules, and real-time market data, utilized to determine if a trade order is high touch or low touch. The HiLo Engine provides a TMP screen for tests 11E1, measures 11E2 and parameters 11E4, as follows:

(1) Tests 11E1 are configured to determine if the trade order is high touch versus low touch, if a trade algorithm is recommended (and categorized as low touch algorithm), and if a trade rotation order (TRO) is recommended for a group of orders that are individually categorized as low touch (and categorized as low touch TRO). Additional and/or alternative tests 11E1 are easily implemented in the HiLo Engine.

Referring to the column headings in FIG. 11B, the Hi/Lo represents the result of the analytical process used to categorize an order as high touch (Hi) or low touch (Lo), whereby the sub-advisor is assigned discretion over the execution of the high touch orders and the sponsoring organization is assigned discretion over the execution of the low touch orders. The HiLo Engine (HLE) also conducts an analytical process to determine if consideration of a trading algorithm for low touch orders is merited (Algo) or if the application of a trade rotation order (TRO) should be considered for a group of orders. An order can also be Lo Algo TRO, which represents a low touch order with a suggestion that a trade rotation order be considered for a group of orders and a suggestion that a trade algorithm be considered for a specific order in the group of orders (2) Activation boxes 11E2 are check boxes to select and activate/deactivate the appropriate measures 11E3 that are utilized by the HiLo Engine for determining whether an order is high touch or low touch. The activation boxes 11E2 allow the HiLo Engine user to select any or all of the measures 11E3 they wish to employ in the HiLo Engine. For example, a user may check the activation boxes 11E2 for "Top of Book" and "Average Daily Volume." In the example shown in FIG. 11E, the unchecked "Average Hourly Liquidity Measure" would not be utilized for any of the tests 11E1. The unchecking of an activation box 11E2 deactivates a measure 11E3. Activation and deactivation of measures 11E3 are implemented by the HiLo Engine in real-time.

(3) Measures 11E3 represent the rules utilized for categorizing orders as high touch or low touch. A plurality of measures 11E3 may be utilized and, in the embodiment of the present invention, if one or more of the measures 11E3 fails according to the parameters 11E4, then the order is categorized as high touch. Thus, in FIG. 11E, three measures 11E3 are shown (Top of Book, Average Hourly Liquidity, and Average Daily Volume) and an order failing any one or more of the activated measures 11E3 could be categorized as high touch. Further embodiments of the present invention could include additional or alternative measures 11E3 (such as a pre-determined maximum number of shares for an order to be low touch) as desired by the user.

(4) Parameters 11E4 are the specific market data values that orders are compared against when categorized as high touch or low touch. For example, a parameter 11E4 could represent an order whose number of shares represents less than 3% of the average daily volume of shares traded for that issue over the last twenty-two trading days is a low touch order. The parameters 11E4 are 3% and twenty-two days. Or, a parameter 11E4 could be that all orders whose number of shares represent less than the average of 100% of the top of book liquidity (the total shares shown available at the best available share price) for that issue over the previous one hour are low touch. The parameters 11E are 100% and one hour.

Therefore, in the representative screen shot of FIG. 11E, a HiLo Engine user utilizes the input boxes and drop down menus to select the measures 11E3 and to specify the parameter 11E4 values for the evaluation of trade orders as high touch or low touch. A user may check activation boxes 11E2 for Top of Book and set the "Hi/Lo" parameters 11E4 at 300% and two minutes, skip the low algorithm test 11E1 by not specifying any parameters 11E4 for it and implement the trade rotation order test 11E1 by specifying 500% and two minutes as parameters 11E4. Likewise, the Average Hourly Liquidity and Average Daily Volume measures 11E3 could be utilized in a similar fashion.

(5) Through the use of pre set levels 11E5, the system administrator of the HiLo Engine provides pre-set groups of parameters 11E4 to categorize an order as high touch or low touch. A selection such as "1" in the present embodiment results in a lower percentage of orders categorized as low touch and routed to the sponsoring organization for execution while a selection such as "5" in the present embodiment results in a higher percentage of orders categorized as low touch. Thus, a user could check any of the five (in the present embodiment) boxes and the measures 11E3, and parameters 11E fields are automatically provided to and utilized by the system.

All of the variables on the TMP screen shown in FIG. 11E can be reviewed and changed in real-time by the user. The HiLo Engine also provides summary and detailed statistical reporting as to the categorization results, including but not limited to, the percentage of orders and number of shares traded determined as high touch, low touch, override of high touch to low touch, override of low touch to high touch, algorithm requirements, trade rotation order requirements and processing errors by sponsoring organization, money management firm, groups of investment portfolios, individual investment portfolios, groups of securities, and individual securities. An audit facility for reviewing rules, data, decisions and discretion assignment is also provided for reviewing the HiLo Engine's (HLE) processing results for a specific or plurality of orders. Alternative and additional user statistics are also available for system performance reporting purposes, including but not limited to, the users and their roles on the system, the availability of the HiLo Engine to the user, down time, connectivity maintenance, processing times, percentage of CPU utilization, and other such performance-related statistics.

FIG. 11F is a screen shot that illustrates an exemplary HiLo Engine graphical user interface (GUI) employed by a system administrator to institute a plurality of system-wide pre set levels 11E5 (in categorizing trade orders as high touch or low touch) that are provided to system users, as described in the rules module 11CiE, as a one-button implementation of complete sets of rules employed to categorize an order as high touch or low touch, according to step 11D6 of an embodiment of the present invention. Measures 11E3 and tests 11E1 are shown along with a plurality of pre set levels 11E5 (with five levels available in this embodiment) along with the desired parameters 11E4. Users can select a pre set level 11E5 and thereby utilize the combination of measures 11E3, tests 11E1, and parameters 11E4 associated with the selected pre set level 11E5. The pre set levels 11E5 are established and modified by the system administrator and are customizable in real-time.

Figure 11G:
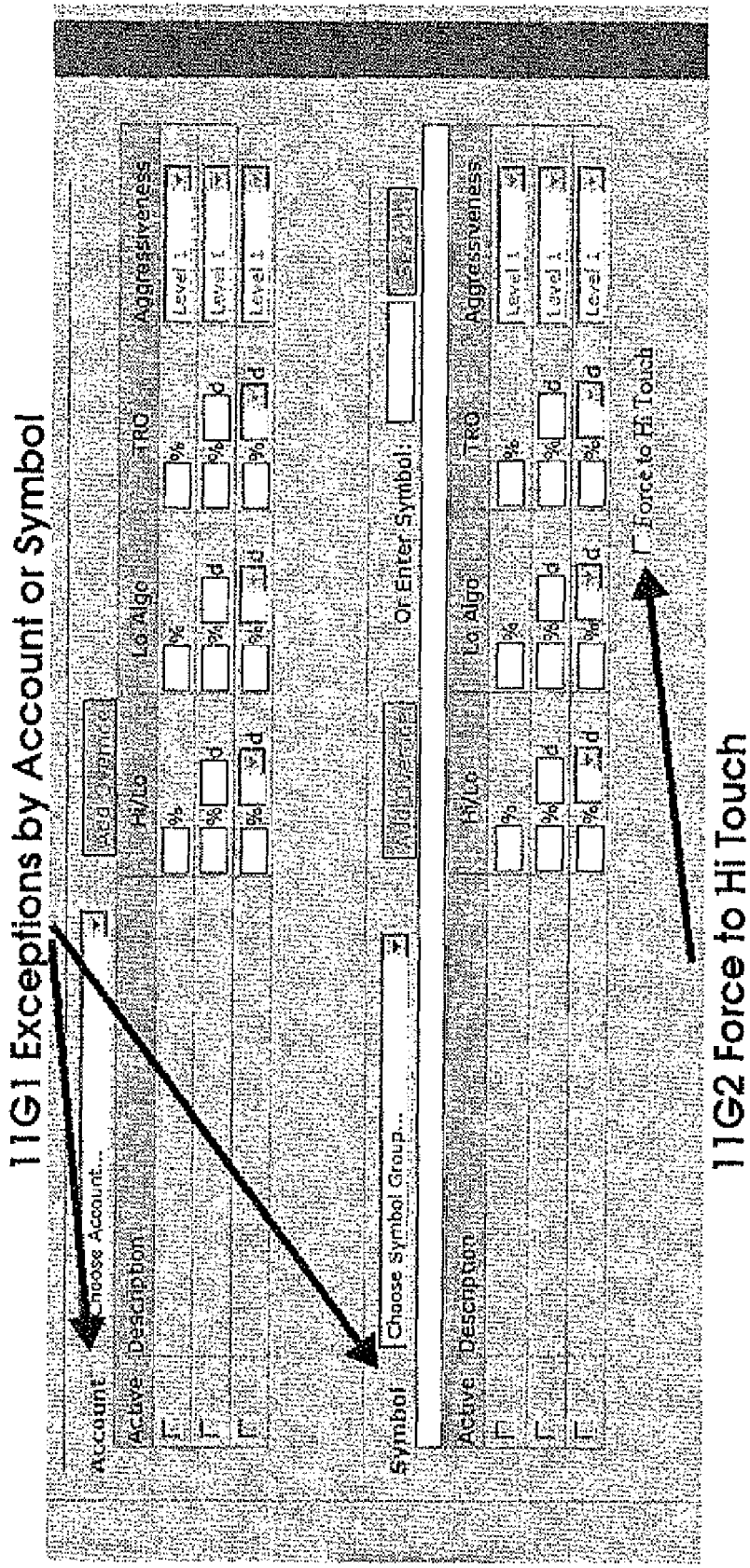
FIG. 11G is a screen shot that illustrates an exemplary HiLo Engine graphical user interface (GUI) employed to institute a plurality of exceptions to currently employed tests, measures, and parameters, such as an exception by account or symbol, employed to categorize an order as high touch or low touch, according to an embodiment of the present invention.

FIG. 11G is a screen shot illustrating an exemplary HiLo Engine graphical user interface (GUI) employed to institute a plurality of exceptions, as described in the rules module 11CiE, by accounts or symbols (such as an individual security) to the measures 11E3 employed to categorize an order as high touch or low touch, according to step 11D6 of an embodiment of the present invention. Exceptions by account or symbol 11G1 are implemented in the HiLo Engine though the "Exception to Rules" GUI of FIG. 11G by selecting the activation box and creating a separate set of measures 11E3, tests 11E1, and parameters 11E4 associated with the account or symbol exception. The "Force to Hi Touch" button 11G2 enables the HiLo Engine user to automatically categorize all orders for an account or symbol as high touch.

Figure 11H:
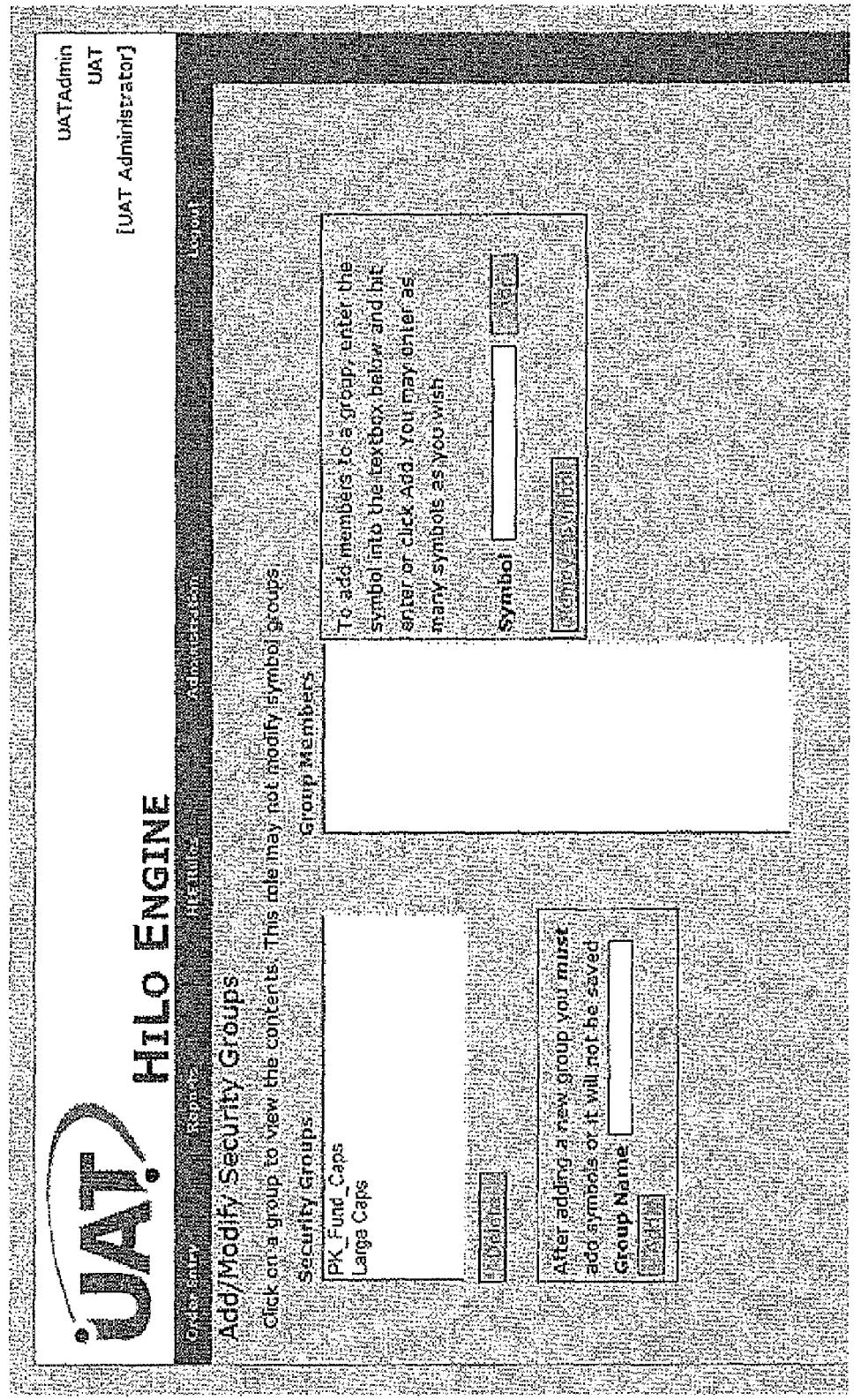
FIG. 11H is a screen shot that illustrates an exemplary HiLo Engine graphical user interface (GUI) employed to create and name groups of symbols for use as exceptions to the currently employed tests, measures, and parameters used to categorize orders as high touch or low touch, according to an embodiment of the present invention.

FIG. 11H is a screen shot illustrating an exemplary HiLo Engine graphical user interface (GUI) employed to create groups of symbols for use as exceptions, as described in the rules module 11CiE, to the rules used to categorize orders as high touch or low touch, according to step 11D6 of an embodiment of the present invention. Through this GUI, a user is able to create exceptions to the measures 11E3, tests 11E1, and parameters 11E4 for a group of symbols and name the exception group for future reference.

Figure 11I:
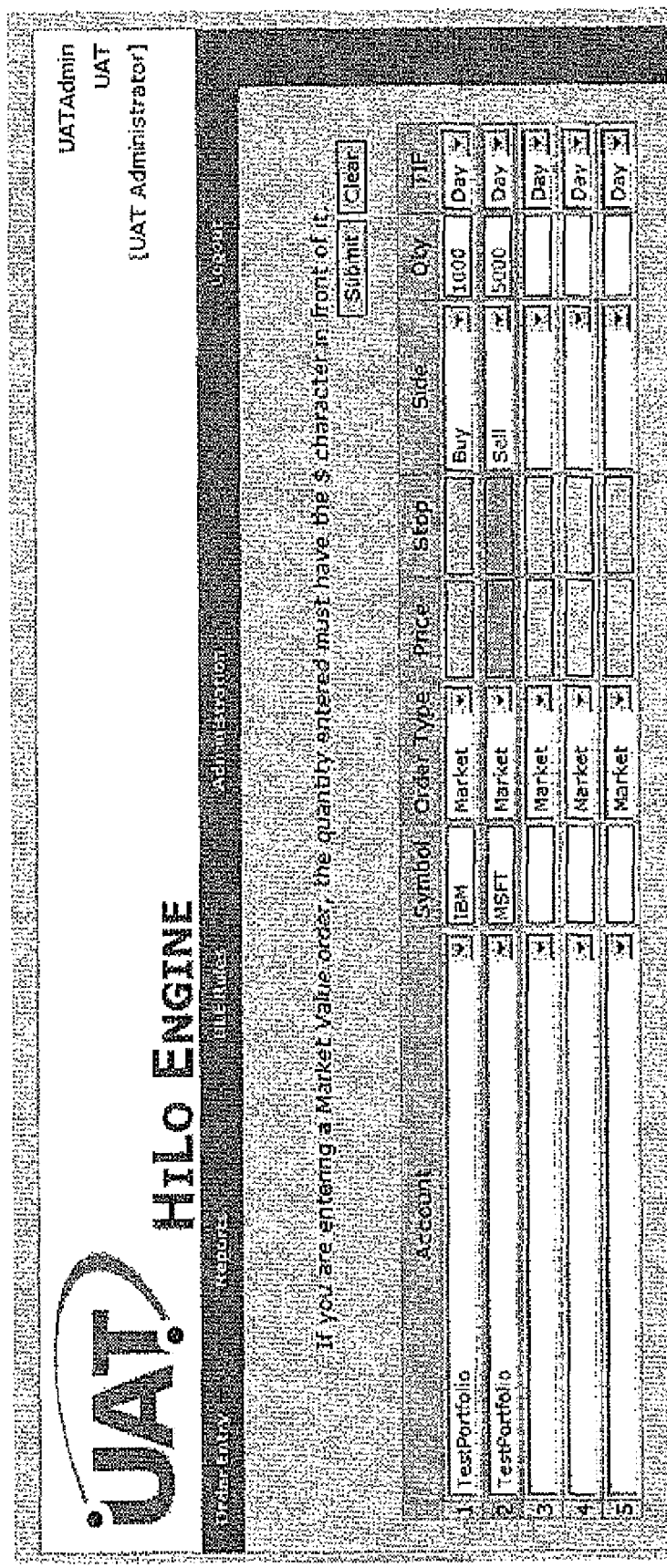
FIG. 11I if is a screen shot that illustrates an exemplary HiLo Engine graphical user interface (GUI) employed to transmit an order or plurality of orders from the sub-advisor to the HiLo Engine for categorization of trade orders as high touch or low touch, according to an embodiment of the present invention.

FIG. 11I is a screen shot that illustrates an exemplary HiLo Engine graphical user interface (GUI) employed to transmit an order from the money management firm (sub-advisor) to the HiLo Engine, as described in the order entry module 11CiD, for categorization of the trade order as high touch or low touch, according to steps 11D1 and 11d2 of an embodiment of the present invention. Such a facility provides a direct link between the money manager and the HiLo Engine and also can enable the HiLo Engine user to test scenarios with various combinations of tests 11E1, measures 11E3, and parameters 11E in order to become more familiar with the operation of the HiLo Engine. In an alternative embodiment, the sub-advisor's trading system utilizes an electronic integration and messaging process to submit trade orders to the HiLo Engine as the sub-advisor's trading groups enters the orders into their trading system.

Figure 11J:
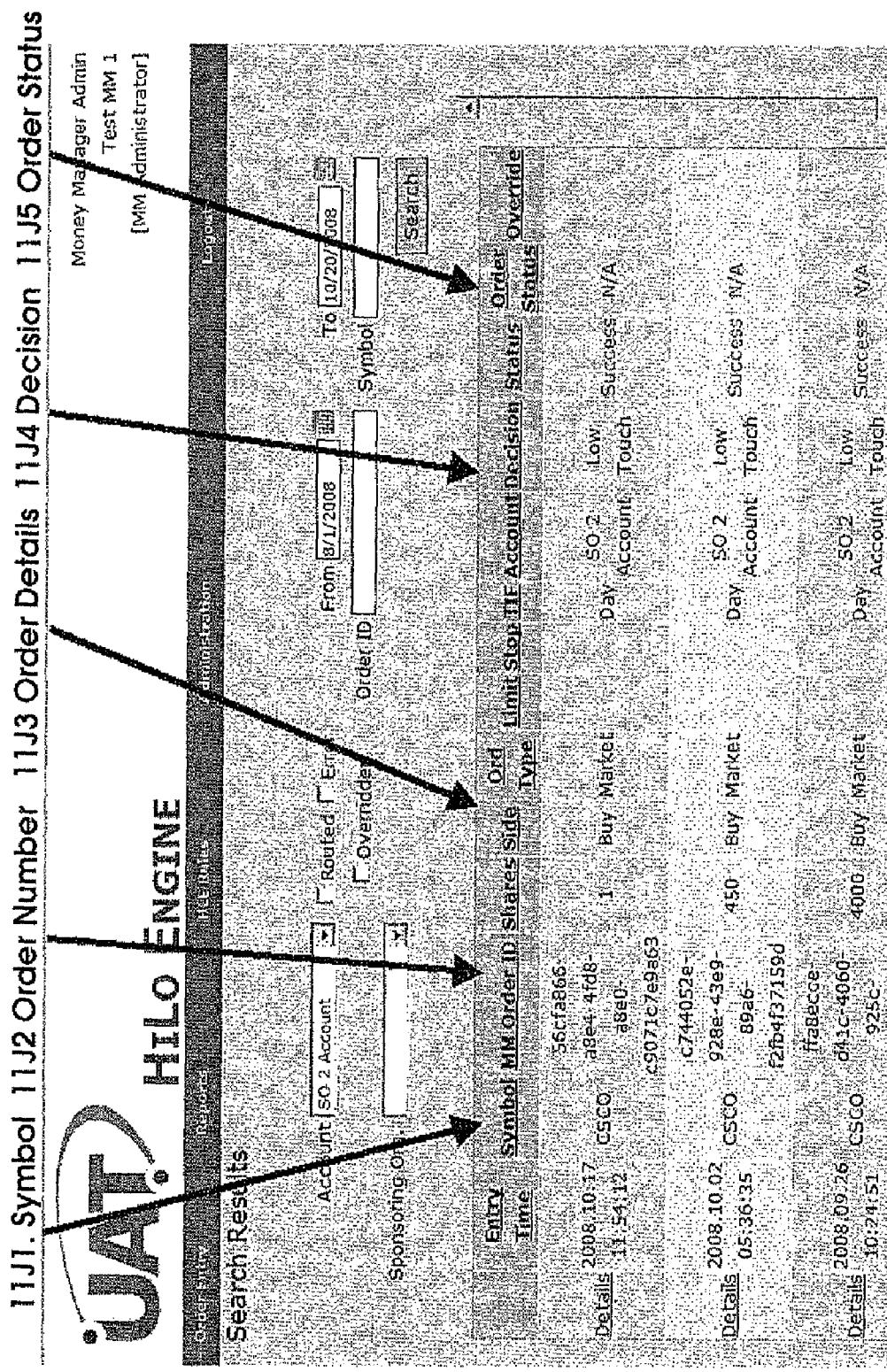
FIG. 11J is a screen shot that illustrates an exemplary HiLo Engine graphical user interface (GUI) employed to communicate the results of the HiLo Engine's categorization of trade orders as high touch or low touch for one or a plurality or orders, according to an embodiment of the present invention.

FIG. 11J is a screen shot that illustrates an exemplary HiLo Engine graphical user interface (GUI) employed to report the results, as described in the reporting module 11CiG and in the decision analysis module 11CiH, of the HiLo Engine's analysis and categorization of an order as high touch or low touch, according to step 11D6 of an embodiment of the present invention. Symbol 11J1 and order number 11J2 represent a specific order while order details 11J3 refers to the number of shares, the side (buy or sell), and the order type (such as market or limit). The decision 11J4 (such as high touch, low touch, low touch algo, and low touch TRO) and order status 11J5 (such as success or error) show the results of the HiLo Engine's categorizing an order as high touch or low touch.

Figure 11K:
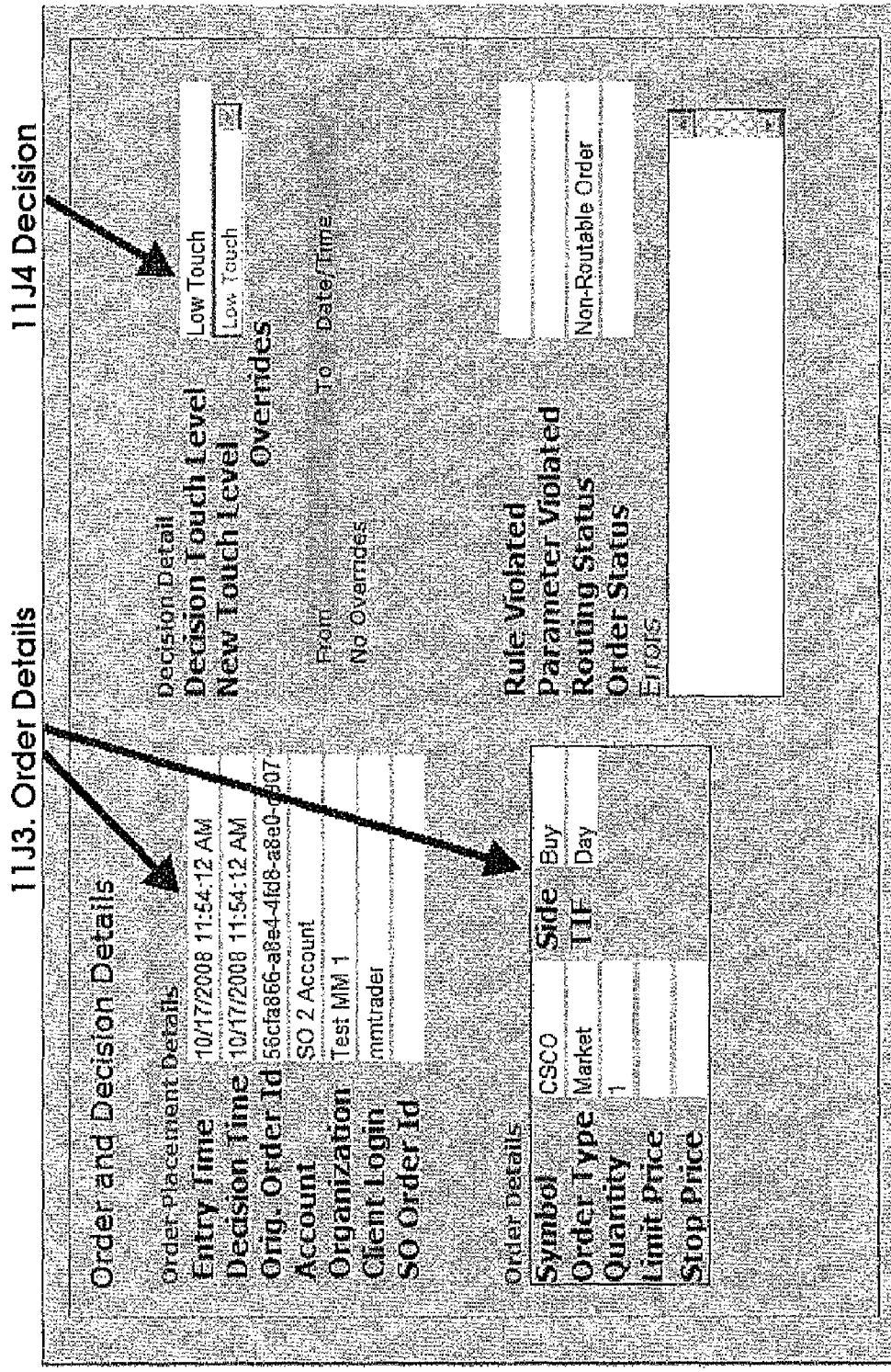
FIG. 11K is a screen shot that illustrates an exemplary HiLo Engine graphical user interface (Gut) employed to transmit the order, placement, and decision details for an individual order, according to an embodiment of the present invention.

FIG. 11K is a screen shot that illustrates an exemplary HiLo Engine graphical user interface (GUI) employed to provide the user, as described in the reporting module 11CiG, with data as to the order details 11J3 (such as entry time, decision time, order ID, account, sponsoring organization, symbol, order type, quantity, side, and time in force (TIF)) and high touch or low touch decision 11J4 for an individual order, according to step 11D6 of an embodiment of the present invention.

FIG. 11L is a screen shot illustrating an exemplary HiLo Engine graphical user interface (GUI) employed to create roles for a plurality of users, as described in the admin module 11CiC, along with their rights in the HiLo Engine, according to step 11D6 of an embodiment of the present invention. User name 11L1 and security role 11L2 control the access, rights, and responsibilities for each of a plurality of users of the HiLo Engine.

FIG. 11M is a screen shot that illustrates an exemplary HiLo Engine graphical user interface (GUI) employed to create a plurality of user organizations, as described in the admin module 11CiC, as either sponsoring organizations or sub-advisors (money management firms), in the HiLo Engine, according to, according to step 11D6 of an embodiment of the present invention. The system administrator utilizes organization ID 11M1 and organization name 11M2 to identify the organization accessing the HiLo Engine. Money manager 11M3 identifies the user organization as a money management firm and ascribes the associated money management rights to an organization. Add new organization 11M4 enables the system administrator to add a new organization as a user of the HiLo Engine.

Figure 11N:
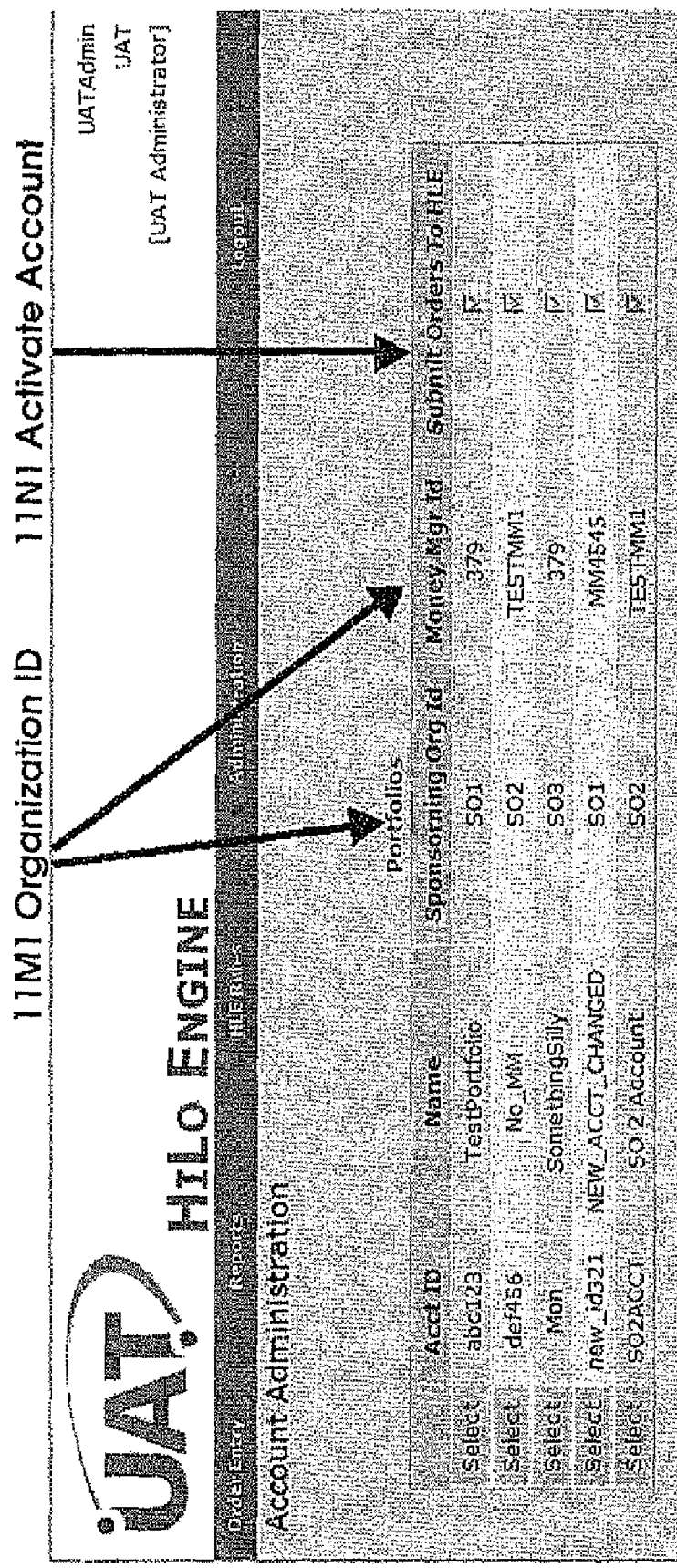
FIG. 11N is a screen shot that illustrates an exemplary HiLo Engine graphical user interface (GUI) employed to provide a system administrator with account administration capabilities, including the activation of an account's electronic submission of trade orders to the HiLo Engine, according to an embodiment of the present invention.

FIG. 11N is a screen shot illustrating an exemplary HiLo Engine graphical user interface (GM) employed to provide account (investment portfolio) administrative capabilities, as described in the admin module 11CiC, including the activation of an account's electronic submission of trade orders to the HiLo Engine, according to step 11D6 of an embodiment of the present invention. The sponsoring organization administrator utilizes the account administration screen to create accounts (investment portfolios) on the HiLo Engine, including the name and number of the account (investment portfolio). The money manager administrator activates the account for submitting orders to the HiLo Engine. Organization ID 11M1 denotes the sponsoring organization's name along with the associated identification number of the sub-advisor (money management firm) while activate account 11N1 activates the electronic integration between the sub-advisor and the HiLo Engine for the selected account to enable the sub-advisor to electronically submit orders to the HiLo Engine and to receive communications from the HiLo Engine for the activated account regarding categorization as high touch or low touch, compliance status, trade fill reports, and order cancellations.

FIG. 11O is a screen shot illustrating an exemplary HiLo Engine graphical user interface (GUI) employed to provide a sponsoring organization with a summary of the rules and parameters, as described in the rules module 11CiE and in the reporting module 11CiG, used by their sub-advisors (money management firms) to categorize orders as high touch or low touch, according to step 11D6 of an embodiment of the present invention. Money manager ID 11O1 identifies the money management firm. Measures 11E3 show the selected measures 11E3. Pre set level 11E5 shows if a pre set level 11E5 is utilized in categorizing an order as high touch or low touch. Tests 11E1 show the HiLo, TRO, and algo tests 11E1 and their customized parameters 11E4 for the measure 11E3. Active status 11O1 shows whether a measure is currently activated and utilized by the HiLo Engine.

Figure 11P:
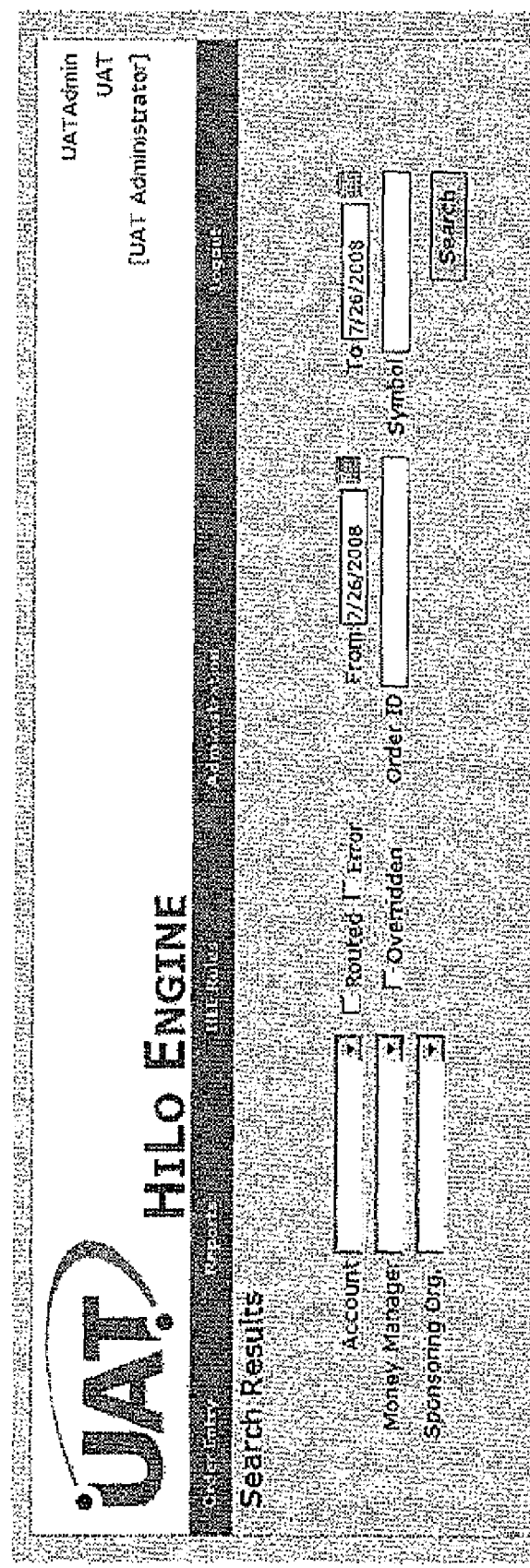
FIG. 11P is a screen shot that illustrates an exemplary HiLo Engine graphical user interface (GUI) employed to provide a search capability for real-time and archival reporting and usage statistics for the HiLo Engine, according to an embodiment of the present invention.

FIG. 11P is a screen shot illustrating an exemplary HiLo Engine graphical user interface (GUI) employed to provide customizable and real-time search capability, as described in the reporting module 11CiG, for real time and archival reporting and usage statistics for the HiLo Engine, according to step 11D6 of an embodiment of the present invention. The HiLo Engine's search capability can include the following customizable parameters: account, money manager, sponsoring organization, routed, error, overridden, date from, date to, order ID, and symbol.

Figure 11Q:
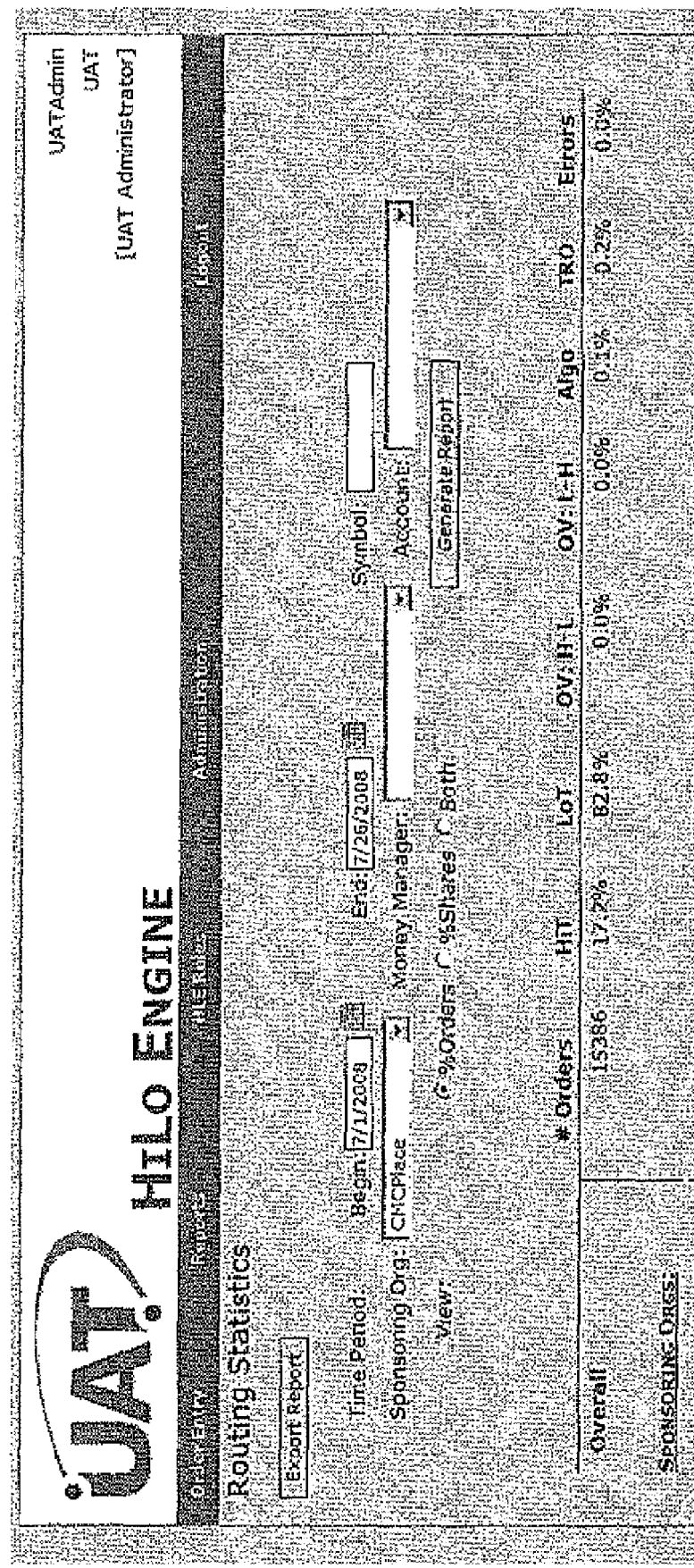
FIG. 11Q is a screen shot that illustrates an exemplary HiLo Engine graphical user interface (GUI) employed to provide detailed usage statistical reports summarizing the numbers and percentages of orders categorized as high touch or low touch, according to an embodiment of the present invention.

FIG. 11Q is a screen shot that illustrates an exemplary HiLo Engine graphical user interface (GUI) employed to provide detailed usage statistical reports, as described in the reporting module 11CiG, summarizing the number and percentage orders as categorized as high touch or low touch, according to step 11D6 of an embodiment of the present invention. Organized by sponsoring organization and account for the money management firms, and by money management firm and account for the sponsoring organization, the report shows the following data by percentage of orders, number of orders, or both: number of orders, high touch orders, low touch orders, overrides of high touch to low touch, overrides of low touch to high touch, order suggesting the use of a trade algorithm, orders suggesting the use of a trade rotation order, and the errors experienced by the system.

FIG. 11R is a schematic diagram illustrating an exemplary structure for creating user roles ad assigning various permissions and responsibilities to these user roles, according to an embodiment of the present invention.

Additional functionality included in the HiLo Engine (HLE) 1105 consists of: post trade and post compliance processes whereby passive violations (violations due to changes in market prices, rather than trading activity) are highlighted and appropriate action taken to return the investment portfolio to proper compliance; release of previously suspended orders by the sponsoring organizations; execution fill reports, modification to execution fill reports; notices regarding trade errors; transaction summary reports by the sponsoring organization and money management firms to each other; trade reconciliation process between the sponsoring organization and money management firms; order cancel and cancel and replace process; cancel unexecuted shares; deny cancel order requests; sponsoring organization initiated order cancel; and real-time checks on communications links between the HLE and the sponsoring organizations and money management firms.

The HiLo Engine (HLE) is unique in that it provides a real-time, pre-trade compliance review process that enables sponsoring organizations, for the first time, to prevent violations in trading activity by sub-advisors, and performs an expected market impact analysis and assigning of discretion over order execution and selection of executing brokers to different organizations utilizing real-time market data and customizable rules. The result of the HiLo Engine's discretion assignment process, also for the first time, is lower brokerage costs and improved investment performance for sub-advised investment portfolios. The innovative capabilities and functionality of the HiLo Engine (HLE) are absent from the prior art.

An example of the present invention provides, in a method for facilitating unified trading and control for a sponsoring organization's money management process using a plurality of money management firms to manage the sponsoring organization's investment portfolios, a method for assigning responsibility for trade order execution comprising:

defining a plurality of investment portfolios containing securities, each portfolio having a particular investment strategy;

assigning at least one money management firm for each investment portfolio, wherein the at least one money management firm provides at least one portfolio manager to make investment recommendations for the each investment portfolio;

receiving at the sponsoring organization from the money management firms investment recommendations for the plurality of investment portfolios in the form of orders comprising a number of units to trade for each security based on the recommendations;

receiving from the sponsoring organization, for each of the plurality of investment portfolios, compliance review parameters comprising at least one of the regulatory laws, regulatory rules, account restrictions, prohibited transactions, prohibited holdings, and prospectus requirements applicable to the each investment portfolio;

determining, according to the compliance review parameters, and prior to execution of an order, if the execution of the order would result in a violation of at least one of the compliance review parameters;

suspending, pending examination of the order, the execution of the order if execution of the order would result in a violation of the compliance review parameters for the associated investment portfolio;

examining the suspended order to determine whether the suspended order is canceled, modified, replaced, or approved for execution;

determining, at any time, for each investment portfolio, whether the each investment portfolio is in compliance with compliance review parameters associated with the each investment portfolio, and if at least one violation of the each investment portfolio's compliance review parameters is found, determining actions needed to return the each investment portfolio into compliance with the compliance review parameters of the each investment portfolio and implementing the actions to return the each investment portfolio to compliance with its compliance review parameters;

identifying market impact parameters upon which to determine whether expected market impact of an order is high or low;

determining, for each order, an organization given discretion for executing a trade for the each order, wherein determining the organization given discretion for executing an order depends on whether an expected market impact of an order is low or high;

if the order is in compliance with the compliance review parameters for the associated investment portfolio and the expected market impact of the order is low such that the order is a low touch order:

identifying any other low touch orders on the same side of a trade transaction for the same security, assessing, if such low touch orders are identified, a cumulative expected market impact of all of the low touch orders, determining, for the low touch orders, a set of trade rotation order parameters to determine an expected market impact of the low touch orders, identifying, if the expected market impact for the low touch orders on the same side of the trade transaction for the same security exceeds the trade rotation order parameters, a trade rotation order among the low touch orders, according to a defined procedure for the trade rotation order that is in compliance with regulatory requirements, determining, for the low touch order, a set of algorithm parameters to determine if the expected market impact of an order is sufficient to utilize a trading algorithm, determining, for the low touch order, if expected market impact exceeds the parameters for using a trading algorithm, identifying, if the low touch order exceeds the trade algorithm parameters, a trade algorithm in the execution of the order, routing the low touch trade to the sponsoring organization, and selecting at least one executing venue or broker according to a determination of the most cost effective strategy for the low touch trade, wherein the sponsoring organization selects the at least one executing venue or broker;

routing the low touch order, by the sponsoring organization, to the at least one selected executing venue or broker for execution, if the order is in compliance with the compliance review parameters for the associated investment portfolio and the expected market impact of the order is high such that the trade for the each order is a high touch order:

routing the high touch order to the money management firm for selection of at least one executing venue or broker for the high touch order, and routing the high touch order, by the money management firm, to the at least one selected executing venue or broker for execution.

A further aspect of this example of the present invention provides that wherein for a high touch order, the money management firm formulates a trade strategy for the high touch order that results in a modified order comprising high touch orders and low touch orders, and wherein the each resulting order is in compliance with compliance review parameters for the associated investment portfolio, and wherein the method further comprises.

routing at least one resulting low touch order to the sponsoring organization, wherein the sponsoring organization selects at least one executing venue or broker for the resulting low touch orders;

routing each resulting low touch order, by the sponsoring organization, to the at least one selected executing venue or broker for execution;

routing at least one resulting high touch order to the money management firm, wherein the money management firm selects the at least one executing venue or broker for the resulting high touch orders; and routing each resulting high touch order, by the money management firm, to the at least one selected executing venue or broker for execution.

A further aspect of this example of the present invention provides that wherein for a low touch order, the method further comprises dividing the low touch order into a plurality of smaller orders for execution and routing each low touch order to the at least one selected executing venue or broker for execution.

A further aspect of this example of the present invention provides that wherein identifying the trade rotation order comprises:
  determining the trade order rotation for execution between a sub advisor initiating the trade and the at least one sponsoring organization acting as advisor or administrator for the respective investment portfolio or plurality of investment portfolios; and
  determining the trade order rotation among the plurality of sponsoring organizations acting as advisor or administrator for the respective investment portfolio or plurality of investment portfolios.

A further aspect of this example of the present invention provides that the method further comprises aggregating low touch orders, wherein low touch orders on the same side of a trade for an issue for at least one sponsoring organization are aggregated into a single block for trading and, once executed, units are allocated among the sponsoring organizations.

A further aspect of this example of the present invention provides that wherein the sponsoring organization crosses orders on one side of an issue generated by the investment portfolios of the sponsoring organization against orders on the opposite side of the same issue generated by additional investment portfolios of the sponsoring organization.

A further aspect of this example of the present invention provides that the method further comprises providing updates to the sponsoring organization on remaining open orders for the sponsoring organization's investment portfolios, wherein the money management firm provides data to the sponsoring organization with respect to at least one partially-filled open orders that remain eligible for further trading activity on trading days following the current trading day.

A further aspect of this example of the present invention provides that the method further comprises overriding assignment of execution discretion of high and low touch orders, wherein one of the money management firm and the sponsoring organization override the execution discretion assignment of an order in order for one of:
  the money management firm to assign execution discretion over the execution of the high touch order to the sponsoring organization;
  the money management firm to assign execution discretion over the execution of the low touch order to money management firm;
  the sponsoring organization to assign execution discretion over the execution of the low touch order to the money management firm; and
  the sponsoring organization to assign execution discretion over the execution of the high touch order to the sponsoring organization.

A further aspect of this example of the present invention provides that the method further comprises assigning and updating execution assignment parameters, wherein the rules and procedures implemented to determine assignment of discretion over an order to one of the sponsoring organization and the money management firm are created, modified and maintained, in real-time, in an agreed procedure by the money management firm and the sponsoring organization.

A further aspect of this example of the present invention provides that the method further comprises assigning and updating, in real-time, by the sponsoring organization for the at least one investment portfolio, the compliance review parameters.

A further aspect of this example of the present invention provides that the method further comprises receiving an order cancellation request by the money management firm, receiving a denial of the order cancellation request from the sponsoring organization, and denying the order cancellation request.

A further aspect of this example of the present invention provides that the method further comprises receiving an order cancellation request by the money management firm, and implementing, by the sponsoring organization, the order cancellation request for remaining unexecuted units of the original order.

A further aspect of this example of the present invention provides that the method further comprises receiving an order cancellation request initiated by the sponsoring organization for an order from the money management firm.

A further aspect of this example of the present invention provides that wherein assets of the each investment portfolio comprise one of registered mutual funds, non-registered mutual funds, institutional investment portfolios, variable insurance funds, variable fund LLCs, regulated investment company funds, defined contribution plans, 529 plans, hedge funds, group annuities, collective investments, deferred compensation plans, separately managed accounts (SMAs), institutional funds, separate accounts of insurance companies, pension plans, endowments, and trusts.

A further aspect of this example of the present invention provides that the method further comprises determining a cost effective strategy for a trade order using an optimization analysis of share price, liquidity, execution cost or mark-up, expected price improvement, and execution speed.

Another example of the present invention provides, in a system for facilitating unified trading and control for a sponsoring organization's money management process using a plurality of money management firms to manage the sponsoring organization's investment portfolios, a method for assigning responsibility for trade order execution comprising.
  defining a plurality of investment portfolios containing securities, each portfolio having a particular investment strategy;
  assigning at least one money management firm for each investment portfolio, wherein the at least one money management firm provides at least one portfolio manager to make investment recommendations for the each investment portfolio;
  receiving at the sponsoring organization from the money management firms investment recommendations for the plurality of investment portfolios in the form of orders comprising a number of units to trade for each security based on the recommendations;
  receiving from the sponsoring organization, for each of the plurality of investment portfolios, compliance review parameters comprising at least one of the regulatory laws, regulatory rules, account restrictions, prohibited transactions, prohibited holdings, and prospectus requirements applicable to the each investment portfolio;
  determining, according to the compliance review, and prior to execution of an order, if the execution of the order would result in a violation of at least one of the compliance review parameters;

suspending, pending examination of the order, the execution of the order if execution of the order would result in a violation of the compliance review parameters for the associated investment portfolio;

examining the suspended order to determine whether the suspended order is canceled, modified, replaced, or approved for execution;

identifying market impact parameters upon which to determine whether expected market impact of an order is high or low;

determining, for each order, an organization given discretion for executing a trade for the each order, wherein determining the organization given discretion for executing an order depends on whether an expected market impact of an order is low or high;

if the order is in compliance with the compliance review parameters for the associated investment portfolio and the expected market impact of the order is low such that the order is a low touch order:

identifying any other low touch orders on the same side of a trade transaction for the same security, assessing, if such low touch orders are identified, a cumulative expected market impact of all of the low touch orders;

determining, for the low touch orders, a set of trade rotation order parameters to determine an expected market impact of the low touch orders;

identifying, if the expected market impact for low touch orders on the same side of the trade transaction for the same security exceeds the trade rotation order parameters, a trade rotation order among the low touch orders, according to a defined procedure for the trade rotation order that is in compliance with regulatory requirements, determining, for the low touch order, a set of algorithm parameters to determine if the expected market impact of an order is sufficient to utilize a trading algorithm, assessing, for the low touch order, if expected market impact exceeds the parameters for using a trading algorithm, identifying, if the low touch order exceeds the trade algorithm parameters, a trade algorithm in the execution of the order, routing the low touch trade to the sponsoring organization, and selecting at least one executing venue or broker according to a determination of the most cost effective strategy for the low touch trade, wherein the sponsoring organization selects the at least one executing venue or broker;

routing the low touch order, by the sponsoring organization, to the at least one selected executing venue or broker for execution, if the order is in compliance with the compliance review parameters for the associated investment portfolio and the expected market impact of the order is high such that the trade for the each order is a high touch order:

routing the high touch order to the money management firm for selection of at least one executing venue or broker for the high touch order, and routing the high touch order, by the money management firm, to the at least one selected executing venue or broker for execution.

A further aspect of this example of the present invention provides that wherein for a high touch order, the money management firm formulates a trade strategy for the high touch order that results in a modified order comprising high touch orders and low touch orders, and wherein the each resulting order is in compliance with compliance review parameters for the associated investment portfolio, and wherein the method further comprises:

routing at least one resulting low touch order to the sponsoring organization, wherein the sponsoring organization selects at least one executing venue or broker for the resulting low touch orders;

routing each resulting low touch order, by the sponsoring organization, to the at least one selected executing venue or broker for execution;

routing at least one resulting high touch order to the money management firm, wherein the money management firm selects the at least one executing venue or broker for the resulting high touch orders; and routing each resulting high touch order, by the money management firm, to the at least one selected executing venue or broker for execution.

A further aspect of this example of the present invention provides that wherein for a low touch order, the method further comprises dividing the low touch order into a plurality of smaller orders for execution and routing each low touch order to the at least one selected executing venue or broker for execution.

A further aspect of this example of the present invention provides that wherein identifying the trade rotation order comprises:

determining the trade order rotation for execution between a sub advisor initiating the trade and the at least one sponsoring organization acting as advisor or administrator for the respective investment portfolio or plurality of investment portfolios; and determining the trade order rotation among the plurality of sponsoring organizations acting as advisor or administrator for the respective investment portfolio or plurality of investment portfolios.

A further aspect of this example of the present invention provides that the method further comprises aggregating low touch orders, wherein low touch orders on the same side of a trade for an issue for at least one sponsoring organization are aggregated into a single block for trading and, once executed, units are allocated among the sponsoring organizations.

A further aspect of this example of the present invention provides that wherein the sponsoring organization crosses orders on one side of an issue generated by the investment portfolios of the sponsoring organization against orders on the opposite side of the same issue generated by additional investment portfolios of the sponsoring organization.

A further aspect of this example of the present invention provides that the method further comprises providing updates to the sponsoring organization on remaining open orders for the sponsoring organization's investment portfolios, wherein the money management firm provides data to the sponsoring organization with respect to at least one partially-filled open orders that remain eligible for further trading activity on trading days following the current trading day.

A further aspect of this example of the present invention provides that the method further comprises overriding assignment of execution discretion of high and low touch orders, wherein one of the money management firm and the sponsoring organization override the execution discretion assignment of an order in order for one of;

the money management firm to assign execution discretion over the execution of the high touch order to the sponsoring organization;

the money management firm to assign execution discretion over the execution of the low touch order to money management firm;

the sponsoring organization to assign execution discretion over the execution of the low touch order to the money management firm; and the sponsoring organization to assign execution discretion over the execution of the high touch order to the sponsoring organization.

A further aspect of this example of the present invention provides that the method further comprises assigning and updating execution assignment parameters, wherein the rules and procedures implemented to determine assignment of discretion over an order to one of the sponsoring organization and the money management firm are created, modified and maintained, in real-time, in an agreed procedure by the money management firm and the sponsoring organization.

A further aspect of this example of the present invention provides that the method further comprises assigning and updating, in real-time, by the sponsoring organization for the at least one investment portfolio, the compliance review parameters.

A further aspect of this example of the present invention provides that the method further comprises receiving an order cancellation request by the money management firm, receiving a denial of the order cancellation request from the sponsoring organization, and denying the order cancellation request.

A further aspect of this example of the present invention provides that the method further comprises receiving an order cancellation request by the money management firm, and implementing, by the sponsoring organization, the order cancellation request for remaining unexecuted units of the original order.

A further aspect of this example of the present invention provides that the method further comprises receiving an order cancellation request initiated by the sponsoring organization for an order from the money management firm.

A further aspect of this example of the present invention provides that wherein assets of the each investment portfolio comprise one of registered mutual funds, non-registered mutual funds, institutional investment portfolios, variable insurance funds, variable fund LLCs, regulated investment company funds, defined contribution plans, 529 plans, hedge funds, group annuities, collective investments, deferred compensation plans, separately managed accounts (SMAs), institutional funds, separate accounts of insurance companies, pension plans, endowments, and trusts.

Another example of the present invention provides a system for facilitating unified trading and control for a sponsoring organization's money management process using a plurality of money management firms to manage the sponsoring organization's investment portfolios, and for assigning responsibility for trade order execution, the system comprising:

a computer user interface configured to receive a designation of a plurality of investment portfolios containing securities, each portfolio having a particular investment strategy, receive instructions from money management firms to create, enter, modify and cancel orders for the plurality of investment portfolios, and receive orders to trade securities of the plurality of investment portfolios;

a communications computer module configured to communicate through an external communications network with a sponsoring organization order management system and a money management firm order management system;

a translation computer module configured to translate communications from the sponsoring organization order management system and the money management firm order management system into a standard data format;

a rules-based compliance computer module configured to store and apply compliance review parameters of the plurality of investment portfolios; and a decision analysis computer module configured to determine an organization given discretion for executing a trade for a particular order based on market impact parameters that define whether expected market impact of the particular order is low or high, wherein the computer user interface is configured to receive from the money management firm order management system an order to trade a security and transmit the order to the translation computer module, wherein the translation computer module is configured to translate the order into the standard data format and transmit the translated order to the rules-based compliance computer module, wherein the rules-based compliance computer module is configured to determine if a violation of the compliance review parameters of the associated investment portfolio would occur as a result of execution of the order, suspend execution of the order until receiving one of a cancel instruction from the money management firm order management system, a replace instruction from the money management firm order management system, and a release instruction from the sponsoring organization order management system, and determine, at any time, if an investment portfolio is in compliance with its compliance review parameters, and if a violation is found, forward instructions to the money management firm order management system outlining actions needed to return the investment portfolio back to compliance with its compliance review parameters, wherein the decision analysis computer module is configured to receive the order after the order has been determined to be in compliance with applicable compliance review parameters, and determine, based on the market impact parameters, whether expected market impact of the order is high or low, wherein, if the decision analysis computer module determines the expected market impact to be low such that the order is a low touch order, then the decision analysis computer module is configured to identify any other low touch orders on the same side of a trade transaction for the same security, determine, if such low touch orders are identified, a cumulative expected market impact of all of the low touch orders;

determine, for the low touch orders, a set of trade rotation order parameters;

determine if the expected market impact for the low touch orders on the same side of a trade transaction for the same security exceeds the trade rotation order parameters, identify, if the expected market impact for the low touch orders on the same side of the trade transaction for the same security exceeds the trade rotation order parameters, a need for a trade rotation order among the low touch orders, according to a defined procedure for the trade rotation order that is in compliance with regulatory requirements, determine, for the low touch order, a set of algorithm parameters to determine if expected market impact of an order is sufficient to use a trading algorithm, determine, for the low touch order, if the expected market impact exceeds the parameters for using a trading algorithm, identify, if the low touch order exceeds the trade algorithm parameters, a need for a trade algorithm in the execution of the order, create a message containing instructions that the order is approved, that the order is categorized as low touch, and, for a low touch order or group of low touch orders exceeding at least one of the applicable trade rotation and trade algorithm parameters, a recommendation of at least one of a trade rotation order, an algorithm, and a trade rotation order and algorithm, and forward the message to the translation computer module, the translation computer module is configured to translate the message into a data format accepted by the sponsoring organization order management system and forward the translated message to the communications computer module, the communications computer module configured to forward the translated message to the sponsoring organization order management system, so that the sponsoring organization order management system can select at least one executing venue or broker according to a determination of the most cost effective strategy for the low touch order and route the low touch order to the selected executing venue or broker, wherein, if the decision analysis computer module determines the expected market impact to be high such that the order is a high touch order, then the decision analysis computer module is configured to create a message containing instructions that the order is approved and categorized as high touch, and forward the message to the translation module, the translation computer module is configured to translate the message into a data format accepted by the money management firm order management system and to forward the translated message to the communications computer module, and the communications computer module configured to forward the translated message to the money management firm order management system, so that the money managements firm can select at least one executing venue or broker according to a determination of the most cost effective strategy for the high touch order and route the high touch order to the selected executing venue or broker.

A further aspect of this example of the present invention provides that the system further comprises an administrative computer module configured to accept messages from a computer user interface and enable users to: set up user roles and permission schema, including users and viewers for sponsoring organization, sub-advisors and system administrator; accept a data feed from the sponsoring organization order management system to set up, modify or remove investment portfolios; activate submission of orders from the investment account; and request and send updates to the database module for purposes of updating database records.

A further aspect of this example of the present invention provides that the system further comprises a software order entry module configured to accept messages from a computer user interface and enables users to engage in transactions related to entry and execution of orders through: submission of a single order or group of orders; order cancel requests; order cancel request status; order execution fill; order execution fill corrections; order cancel confirmations; order cancel partial fills; order replace; compliance review hold order; compliance review approve order; compliance review release order for execution; updating of open Good Til Cancel (GTC) orders; testing rules and their parameters for categorizing orders as high touch or low touch; and requesting and sending updates to a database module for purposes of updating database records.

A further aspect of this example of the present invention provides that the system further comprises a software rules module that enables users, through a computer user interface at sponsoring organizations and sub-advisors, to: create, modify activate, deactivate and eliminate rules, according to their agreed procedures, for the assignment of discretion over the execution of order through the categorization of orders as high touch or low touch; specify tests, measures, and parameters for categorizing orders as high touch or low touch; create and modify pre set levels; create exceptions to rules for accounts, group of accounts, individual issues and groups of issues; create parameters for algorithms and trade rotation order suggestions for low touch orders; and request and send updates to a database module for purposes of updating database records.

A further aspect of this example of the present invention provides that the system further comprises a software operations module that enables users, through a computer user interface at the sponsoring organizations and sub-advisors, to perform operations comprising: start and stop the system; recover from lost data feed; monitor current operating status; login and log out of the system; track orders and internal processing errors; utilize a heartbeat function to check on connectivity with external users; and request and send updates to a database module for purposes of updating database records.

A further aspect of this example of the present invention provides that the system further comprises a software reporting module that enables users, through a computer user interface, at the sponsoring organizations and sub-advisors, to perform reporting functions comprising: viewing rules and related tests, measures, parameters, and exceptions; viewing routing statistics for orders; performing real-time queries of a database module; viewing order discretion assignment audit reports and archives; viewing overrides of order discretion assignments by users; viewing lost and incomplete orders; viewing open Good Til Cancel (GTC) orders; operating a data export facility; and viewing reports from a database module.

A further aspect of this example of the present invention provides that, wherein, for a specific order, the decision analysis computer module is configured to: gather market data; compile rules; perform required calculations; evaluate results of the calculations; categorize the specific order as one of high touch, low touch, low touch algo, low touch TWO, and low touch algo TRO; add compliance review status; create a message for users to receive the categorization and compliance review status; route the message to a translation module; and request and send updates to a database module for purposes of updating database records.

A further aspect of this example of the present invention provides that the system further comprises a software database module that functions as a primary repository for all current and historical data and archiving of necessary data and whose field structure includes data on: securities, accounts; organizations including sponsoring organizations, money management firms and system administrators; rules with tests, measures, and parameters; pre set levels; exceptions by accounts, groups of accounts, symbols, and groups of symbols; users, roles, and permissions; active and deactivated accounts; order routing decisions and overrides; canceled and replaced orders; lost orders and operational statistics such as CPU utilization; updates with the other functional modules within the system; and archived data and activity.

A further aspect of this example of the present invention provides that wherein the system is configured to receive data feeds comprising:
  market data feed, and
  messages originating from sponsoring organizations and sub-advisors regarding new organizations, order entry, cancellation and correction of orders, compliance status, new and activated accounts, trade fill reports, changes in rules, user updates, and associated operational information.

A further aspect of this example of the present invention provides that wherein the system is configured to create messages composed of various fields within database records in the standard data format, and to utilize the messages to communicate events to users comprising: new orders; new orders with high touch-low touch decision; high touch to low touch override; high touch Good Til Cancel (GTC) updates; compliance=OK; compliance under review; order released from compliance; cancel order request; cancel response-cancel confirmed; cancel response-cancel rejection; cancel response-cancel unfilled portion of order; sponsoring organization initiated cancel; execution fill; execution fill modification; empty message (heartbeat); and order error.

A further aspect of this example of the present invention provides that wherein if a trade strategy for the high touch order results in a modified order comprising high touch orders and low touch orders and the each resulting order is in compliance with the compliance review parameters for the investment portfolio,
  the system is configured to
    route the low touch orders to the sponsoring organization order management system for selection of at least one executing venue or broker and to route the low touch orders to the selected at least one executing venue or broker for execution, and
    route the high touch orders to the money management firm order management system for selection of at least one executing venue or broker and to route the high touch orders to the selected at least one executing venue or broker for execution.

A further aspect of this example of the present invention provides that wherein the sponsoring organization order management system is configured to transform a low touch order into a plurality of smaller orders and to route each smaller order to the selected at least one executing venue or broker for execution.

A further aspect of this example of the present invention provides that wherein the system is configured to implement a trade order rotation according to a computer-defined procedure that is applicable when a money management firm places a plurality of orders on the same side of a buy or sell order in a given security for execution across a plurality of investment portfolios belonging to a plurality of sponsoring organizations.

A further aspect of this example of the present invention provides that wherein the system is configured to determine trade order rotation by:
  determining the trade order rotation for execution between a sub advisor initiating the trade and the sponsoring organization or plurality of sponsoring organizations acting as advisor or administrator for the respective investment portfolio or plurality of investment portfolios; and
  determining the trade order rotation among the plurality of sponsoring organizations acting as advisor or administrator for the respective investment portfolio or plurality of investment portfolios.

A further aspect of this example of the present invention provides that wherein the system is configured to implement a trade rotation order comprising one of random selection, sequential selection, and algorithmic random selection.

A further aspect of this example of the present invention provides that wherein the system is configured to aggregate trades, wherein low touch orders on the same side of a buy or sell for the same security for the at least one sponsoring organization are aggregated into a single block for trading and, once executed, units are allocated among the at least one sponsoring organization.

A further aspect of this example of the present invention provides that wherein the sponsoring organization order management system is configured to cross orders for a security generated by investment portfolios of at least one sponsoring organization against orders for the opposite side of the security generated by additional investment portfolios of at least one sponsoring organization.

A further aspect of this example of the present invention provides that wherein the system is configured to transmit a communications message from the money management firm order management system to the sponsoring organization order management system comprising data records summarizing status individual or a plurality of open or partially filled orders (Good Til Cancel or GTC) that remain eligible for further trading activity on trading days following the current or recently concluded trading day.

A further aspect of this example of the present invention provides that wherein the system is configured to receive a message overriding execution discretion authority from one of the money management firm order management system and the sponsoring organization order management system, wherein the message overrides a discretion assignment of a trade order in order for one of:
  the money management firm to assign discretion over the execution of the trade order to the sponsoring organization;
  the money management firm to assign discretion over the execution of the trade order to the money management firm;
  the sponsoring organization to assign discretion over the execution of the trade order to the money management firm; and
  the sponsoring organization to assign discretion over the execution of the trade order to the sponsoring organization.

A further aspect of this example of the present invention provides that wherein the system is configured to receive assignments and updates of market impact parameters through a computer user interface, wherein the market impact parameters are created, modified, activated, deactivated and maintained, in real-time.

A further aspect of this example of the present invention provides that wherein the system is configured to
  receive an order cancellation request from the money management firm order management system requesting cancellation of an order submitted by the money management firm, receiving instructions from the sponsoring organization order management system to deny the order cancellation request, and denying the order cancellation request.

A further aspect of this example of the present invention provides that wherein the system is configured to receive an order cancellation request from the money management firm order management system requesting cancellation of an order submitted by the money management firm, wherein the submitted order is partially executed, and issue instructions to the sponsoring organization order management system implement the order cancellation request for the remaining unexecuted shares of the submitted order.

A further aspect of this example of the present invention provides that wherein the system is configured to receive an order cancellation request from the sponsoring organization order management system requesting cancellation of an order submitted by the money management firm, and forward a message to the money management firm order management system to initiate a cancel request for the submitted order from the money management firm.

A further aspect of this example of the present invention provides that wherein the system is configured to implement standards for communications with the sponsoring organization order management system and the money management firm order management system, the standards comprising a designated communications protocol, a designated message format, and a designated communications network.

A further aspect of this example of the present invention provides that wherein the sponsoring organization software order management system determines the most cost effective strategy for a trade order using an optimization analysis of share price, liquidity, execution cost or mark-up, expected price improvement, and execution speed.

Another example of the present invention provides a system for facilitating unified trading and control for a sponsoring organization's money management process using a plurality of money management firms to manage the sponsoring organization's investment portfolios, and for assigning responsibility for trade order execution, the system comprising:

a computer user interface configured to receive a designation of a plurality of investment portfolios containing securities, each portfolio having a particular investment strategy, receive instructions from money management firms to create, enter, modify and cancel orders for the plurality of investment portfolios, and receive orders to trade securities of the plurality of investment portfolios;

a communications computer module configured to communicate through an external communications network with a sponsoring organization order management system and a money management firm order management system;

a translation computer module configured to translate communications from the sponsoring organization order management system and the money management firm order management system into a standard data format;

a rules-based compliance computer module configured to store and apply compliance review parameters of the plurality of investment portfolios; and a decision analysis computer module configured to determine an organization given discretion for executing a trade for a particular order based on market impact parameters that define whether expected market impact of the particular order is low or high, wherein the computer user interface is configured to receive from the money management firm order management system an order to trade a security and transmit the order to the translation computer module, wherein the translation computer module is configured to translate the order into the standard data format and transmit the translated order to the rules-based compliance computer module, wherein the rules-based compliance computer module is configured to determine if a violation of the compliance review parameters of the associated investment portfolio would occur as a result of execution of the order, suspend execution of the order until receiving one of a cancel instruction from the money management firm order management system, a replace instruction from the money management firm order management system, and a release instruction from the sponsoring organization order management system, and wherein the decision analysis computer module is configured to receive the order after the order has been determined to be in compliance with applicable compliance review parameters, and determine, based on the market impact parameters, whether expected market impact of the order is high or low, wherein, if the decision analysis computer module determines the expected market impact to be low such that the order is a low touch order, then the decision analysis computer module is configured to identify any other low touch orders on the same side of a trade transaction for the same security, determine, if such low touch orders are identified, a cumulative expected market impact of all of the low touch orders;

determine, for the low touch orders, a set of trade rotation order parameters;

determine if the expected market impact for the low touch orders on the same side of a trade transaction for the same security exceeds the trade rotation order parameters, identify, if the expected market impact for the low touch orders on the same side of the trade transaction for the same security exceeds the trade rotation order parameters, a need for a trade rotation order among the low touch orders, according to a defined procedure for the trade rotation order that is in compliance with regulatory requirements, determine, for the low touch order, a set of algorithm parameters to determine if expected market impact of an order is sufficient to use a trading algorithm, determine, for the low touch order, if the expected market impact exceeds the parameters for using a trading algorithm, identify, if the low touch order exceeds the trade algorithm parameters, a need for a trade algorithm in the execution of the order, create a message containing instructions that the order is approved, that the order is categorized as low touch, and, for a low touch order or group of low touch orders exceeding at least one of the applicable trade rotation and trade algorithm parameters, a recommendation of at least one of a trade rotation order, an algorithm, and a trade rotation order and algorithm, and forward the message to the translation computer module, the translation computer module is configured to translate the message into a data format accepted by the sponsoring organization order management system and forward the translated message to the communications computer module, the communications computer module configured to forward the translated message to the sponsoring organization order management system, so that the sponsoring organization order management system can select at least one executing venue or broker according to a determination of the most cost effective strategy for the low touch order and route the low touch order to the selected executing venue or broker, wherein, if the decision analysis computer module determines the expected market impact to be high such that the order is a high touch order, then the decision analysis computer module is configured to create a message containing instructions that the order is approved and categorized as high touch, and forward the message to the translation module, the translation computer module is configured to translate the message into a data format accepted by the money management firm order management system and to forward the translated message to the communications computer module, and the communications computer module configured to forward the translated message to the money management firm order management system, so that the money managements firm can select at least one executing venue or broker according to a determination of the most cost effective strategy for the high touch order and route the high touch order to the selected executing venue or broker.

5) Price-Liquidity-Cost-Quality (PLCQ) Engine

The price-liquidity-cost-quality (PLCQ) engine is a graphical user interface (GUI) and associated software program(s) linked to a computerized, real-time and customizable rules-based logic engine that enables each buy or sell order (or combinations of buy and sell orders) to be analyzed, according to a set of customizable logical rules, to determine, through an optimization process, the most cost effective order composition in terms of one or more of share price, number of shares, execution cost or mark-up, expected price improvement, and execution speed. The output of the price-liquidity-cost-quality (PLCQ) engine is a list of the executing brokers, share price, number of shares, execution cost or mark-up, expected price improvement, and execution speed for the sponsoring organizations and sub-advisor to utilize in selecting executing brokers for their orders.

The price per share, number of shares and execution costs or mark-ups are based on actual data gathered through real-time market data feeds and inputs from executing brokers. The price per share and number of shares reflect current market data. The execution cost or mark-up per share reflects the real-time cost entered into the price-liquidity-cost-quality (PLCQ) engine by the executing brokers and can vary on a security-by-security basis and over time (as executing brokers adjust their executions costs or mark-ups to reflect their desire to accumulate, reduce, or liquidate their position in a security).

The trade quality analysis engine provides a real-time and customizable analysis of the historical and expected price improvement for each security, by executing broker, in an order. Currently, orders are executed at the National Best Bid and Offer (Ask) or NBBO. As such, an equity issue may be available to buy at $42.25 per share (ask or offer) and to sell at $42.00 per share (bid). The difference between the bid and offer (ask) is the spread ($0.25). As such, the ideal price point between the bid and offer is the Mid Point between Bid and Offer (MPBO). For this security, the midpoint between bid and offer is $42.125 per share. The trade quality engine performs a real-time analysis of the share prices and times of execution for recently executed trades to determine how close the share price for a trade was to the MPBO. The range of such a calculation could range from a trade occurring at a $42.125 (at the MPBO, which is a 0% effective to quoted spread.) (While it is possible, orders are rarely executed below the MPBO.) A buy order occurring at $42.25 or a sell order occurring at $42.00 is considered 100% of the NBBO and does not provide any price improvement, which equates to a 100% effective-to-quoted spread. Unfortunately, orders can also be executed above the spread (above $42.25 on a buy or below $42.00 on a sell). These transactions are considered "outside the spread" and, as a result, these trades have an effective-to-quoted spread that exceeds 100%. The effective-to-quoted analysis is performed for each order and the time period utilized for this analysis is customizable and performed for periods of time ranging from sub-seconds to minutes hours, days, and longer, according to the desires of the user. An optimization engine that calculates the most cost effective group of executing brokers for the order, then utilizes this data. This data is then transmitted to the order management system of the sub-advisor or sponsoring organization.

The quality data can also include factors such as speed of execution, which reflects the time that is required for an executing broker, upon receipt of the order, to complete the execution of the order.

Currently, the securities industry focuses on share price and liquidity ("best execution") when determining the optimal order composition. The price-cost-liquidity-quality (PLCQ) engine's capacity to factor in additional real-time and customizable factors, such as execution cost and expected price improvement, represents a considerable step forward in providing shareholders and plan beneficiaries with the lowest total execution cost in a routine and automated manner.

Figure 12A:
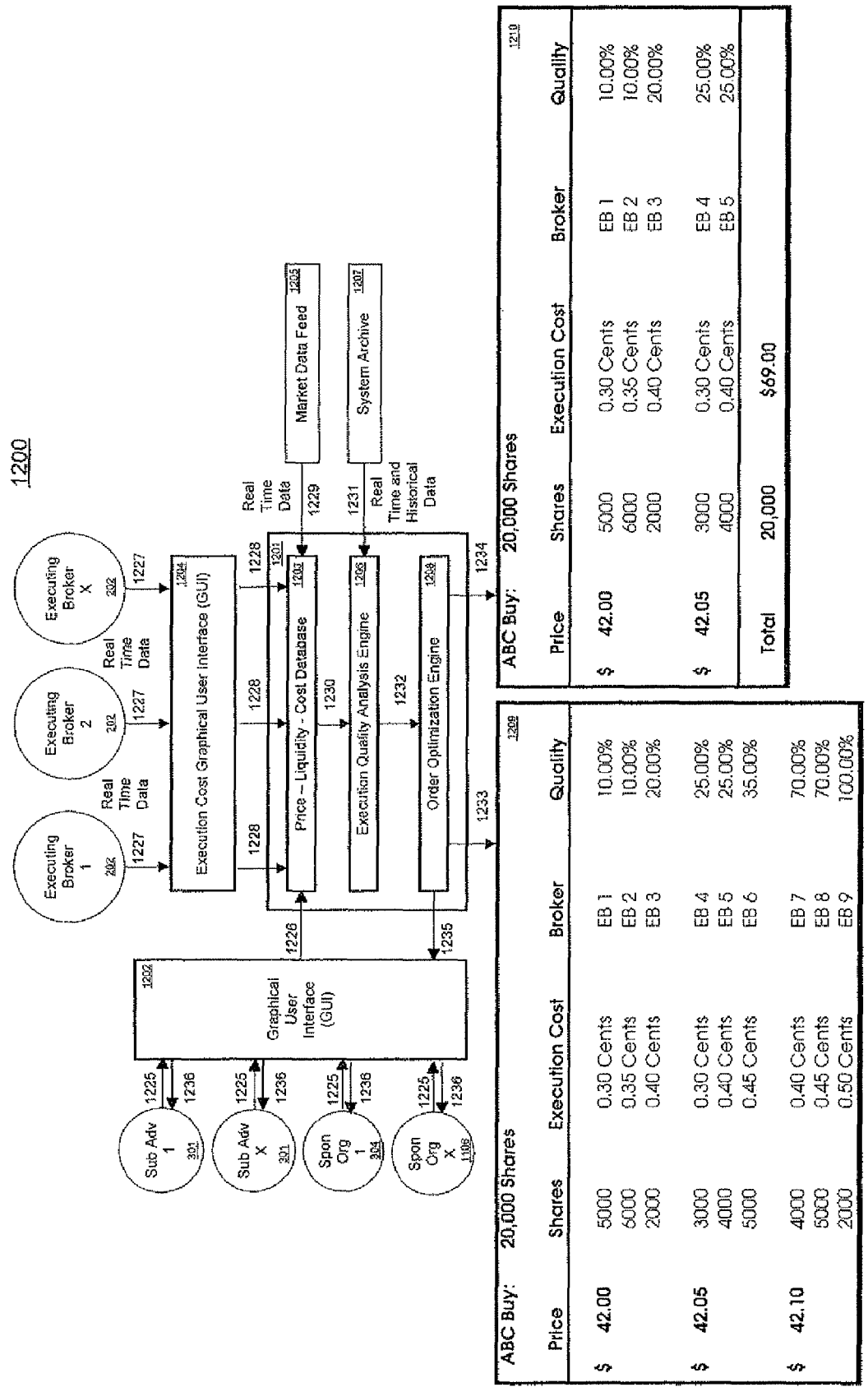
FIG. 12A is a schematic diagram illustrating an exemplary price-cost-liquidity-quality engine, according to an embodiment of the present invention.

FIG. 12A is a schematic diagram illustrating the price-cost-liquidity-quality (PLCQ) engine's 1201 system and process 1200, according to an embodiment of the present invention. The process 1200 works as described in the following steps, which correspond to the arrows and their adjacent reference numerals shown in FIG. 12.

1225) Sub-advisors 301 and sponsoring organizations 304 and 1116 transmit their individual orders to the price-liquidity-cost-quality (PLCQ) engine through the graphical user interface (GUI) 1202 or through a data feed from their order management system 503 (not shown).

1226) The order is entered into the price-cost-liquidity database 1203.

1227) Executing brokers 202 utilize a graphical user interface (GUI) 1204 to enter the execution costs 1204 for orders into the price-cost-liquidity-quality (PLCQ) engine 1201. The execution cost data 1204 can be changed on a real-time basis for each security.

1228) The execution cost data 1204 is incorporated into the price-liquidity-cost database 1203.

1229) Real-time market data 1205 is delivered to the price-cost-liquidity-quality engine 1201 and incorporated into the price-liquidity-cost database 1203.

1230) The price-liquidity-cost data is incorporated into the execution quality analysis engine 1206.

1231) The system archive 1207 for the execution quality analysis engine 1206 provides real-time and historical data on the quality of execution, that is, the effective-to-quoted spread to the execution quality analysis engine 1206.

1232) The execution quality analysis engine 1206 combines the price-liquidity-cost data and the real-time and historical data and delivers the data to the order optimization engine 1208.

1233) The data 1209 incorporates the share price, number of shares available from each executing broker, execution cost or mark-up, broker identification, and quality of execution (calculated effective-to-quoted spread).

1234) The order optimization engine 1208 combines the lowest execution cost based on the price-liquidity-cost data and factors in the expected price improvement data to determine, through the optimization process, the most cost effective combination of executing brokers for the order. For this order, the most cost effective group of brokers combine for an execution cost of $69.00 with an expected price improvement resulting from an effective-to-quoted spread of 10% for 11,000 shares, 20% for 2,000 shares, and 25% for 7,000 shares.

1235) The order optimization engine 1208 routes the optimized executing broker combination to the graphical user interface 1202.

1236) The sub-advisors 301 and sponsoring organizations 304 and 1116 (or any asset manager 201) utilizes the graphical user interface 1202 (or data feed) to review the optimized executing broker combination for that order for use in the order entry process 700 (not shown).

The price-cost-liquidity-quality (PLCQ) engine 1201 is unique in that it performs a real-time computer analysis and subsequent assigning of execution costs and expected execution quality relative to current share price and liquidity offered by a network of executing brokers. This automated, real-time, and customizable capability does not exist in the prior art and represents a technology innovation in the system of the present invention.

Further aspects of a price-cost-liquidity-quality (PLCQ) engine (e.g., as disclosed in FIG. 12A and steps 1225 through 1236 above) are as follows.

An embodiment of the present invention provides a real-time optimization process that enables an initiating party to a securities transaction (such as a mutual fund company, institutional money manager, hedge fund, insurance company, pension plan, individual investor, etc.) to conduct a real-time optimization analysis for determining the "hot hitter" among executing broker(s) (and the optimal order among a plurality of executing brokers) expected to provide the lowest expected total execution cost for a securities transaction, inclusive of share price, liquidity, execution costs, price improvement, time to execute, and rate of change in the price of a security. This optimization also provides the optimal order among a plurality of executing brokers expected to provide the lowest expected total cost for the securities transaction until the desired number of instruments is bought or sold. As the initiating party to the transaction directs orders to the executing brokers with the lowest expected total cost for their securities transaction (and implements such an optimization process as part of a routine operating procedure for trading securities), the initiating party realizes significant and recurring cost savings that would not otherwise be realized in its securities transactions. An embodiment of the present invention is applicable to a single order or, in an alternative embodiment, to each individual order created through a trading algorithm that divides a single larger order into a series of smaller sub-orders. Indeed, the present invention is especially well suited for optimizing the execution of small orders.

For example, the concept of selecting the "hot hitter" in executing brokers has a logical resemblance to the process through which a manager of a baseball team selects a pinch hitter during the late innings of a close baseball game. The manager for a baseball team will examine all the relevant statistics among the players available for pinch-hitting duty. One statistic that is likely to weigh heavily in the selection process is the individual batting averages of the available players over the last five to ten games. A manager would be more likely to select to pinch hit, all other factors being equal, a player hitting over 0.300 over the last five games than a player hitting under 0.200 over the last five games. In the same manner, an initiating party would desire to send a securities transaction to such a "hot hitting" executing broker, as is made possible by the system and process of the present invention, which facilitate an optimization analysis and inform the initiating party of the identity and associated statistics of the "hot hitting" executing broker(s).

An embodiment of the present invention incorporates an optimization process analyzing real-time and recent data to determine the executing brokers who are the "hot hitters"—that is, the executing brokers providing the lowest expected total execution cost for a transaction in a given security at a particular moment in time (the time in which the order is ready for execution in the market). Given the nature of this type of analysis, the "hot hitter" (or "hit hitters" for larger orders) among executing brokers is likely to vary over time according to: (1) the individual security and the security type in the transaction; (2) the most recent trades in the security; (3) the time period utilized in this analysis; (4) the number of shares recently traded in the security; (S) the number of orders executed recently in the security; (6) the speed in which the share price of a security is moving up or down (the market velocity); (7) by buy or sell orders; (8) the order size; (9) the speed in which the executing broker can complete the trade (time to execute); and (10) other similar factors that impact the overall quality of execution for a securities transaction.

The result of the optimization analysis is that a given securities transaction (such as a buy or sell order) is analyzed according to real-time and recent market data including:

The most favorable quoted share price for the security;

The number of shares available from an executing broker (or a plurality of executing brokers) at the most favorable quoted share prices (liquidity);

The execution cost (usually in cents per share, although sometimes basis points are utilized) posted by executing brokers;

The recent price improvement provided by the various executing brokers;

The speed of execution (time to execute) by the executing brokers; and

The current rate of change in the price of a security.

As a final output, an embodiment of the present invention conducts an optimization analysis that incorporates the above parameters through real-time and recent data inputs and produces the executing broker or a list of executing brokers that provides the lowest expected total execution cost for a securities transaction. The embodiment of the present invention is a real-time process that strives to minimize any latency effect by utilizing: (1) the most current market data available with respect to shares prices, shares available and the executing broker; and (2) the fastest possible analytical process involving the market data. The result of this quest for speed and accuracy is that, before another party can buy or sell the desired shares, the party initiating the securities transaction is able to automatically route orders to the designated lowest cost executing brokers or, if such integration is unavailable, either electronically or manually upload the orders to another system capable of routing orders to these designated executing brokers.

The data for the most favorable quote for a security, for the quotes for the subsequent most favorable share prices (known as the depth of the market), and for the number of shares available per price from various executing brokers (liquidity) is provided through a real-time market data feed. There are numerous vendors providing this type of data.

In an embodiment of the present invention, the execution costs (usually cents and/or fractions of cents per share) are determined by the executing broker and communicated through a graphical user interface (GUI) that enables an executing broker to set and change prices on a real-time basis. (Execution costs could also be set contractually and not changed in real-time). Alternatively, the executions costs can be communicated through other means, such as through reports on paper. An executing broker's pricing could be determined by: (1) security; (2) groups of securities; (3) buy or sell orders; (4) orders that add or remove liquidity from their order books; and (5) size of orders. The execution costs can also vary according to the following mutually exclusive conventions, including: (1) listed or OTC securities; (2) domestic or international securities; (3) market or limit orders; (4) day or good-to-cancel orders; (5) orders executed by the broker or passed through to another broker for execution; and (6) other similar conventions.

The total expected execution cost could be customized based on the different types of orders, which types each affect pricing differently. For example, determining the total expected execution cost can be customized, in real-time, based on customized parameters such as whether the order involves listed securities or OTC securities, whether the order is domestic or international, whether the order is a market order or a limit order, whether the order is a good-to-cancel order or a day order, whether the order involves a large quantity of units or a small quantity of units, or whether the order must be passed through to another venue for execution (e.g., for regulatory reasons).

An executing broker, through the real-time capability to update execution costs, has the capability to respond to its business needs and circumstances through real-time alterations to its execution cost schedule. The result of any change is an immediate impact on the optimization analysis to determine lowest expected total execution cost for a securities transaction. For example, an executing broker who desires to liquidate excess inventory in a given security may lower the executing cost for an order or, alternatively, pay a rebate for order flow to the initiating party until such inventory has been sold. An executing broker could also acquire inventory in a security through a similar process of customizing execution costs (or paying for order flow). In both examples, an embodiment of the present invention immediately incorporates the revised (more favorable) execution cost in the optimization analysis for determining the executing brokers providing the lowest expected total execution cost for a particular securities transaction, with the result that this executing broker appear more favorably in the rankings of executing brokers providing the lowest expected total cost execution.

The executing brokers are enabled, through an embodiment of the present invention, to use a real-time marketplace for execution costs to conduct a wide variety of real-time sales strategies (such as discounts, inventory acquisition and liquidation, etc.) across a wide swath of securities in order to attract order flow to their company. This flexibility with respect to sales strategies enables the executing broker to more efficiently attract vital order flow to its organization. Order flow (the volume of shares directed to its organization for execution) is critical to the financial well-being of an executing broker, as order flow is a necessary precondition to generating revenues for its organizations. An embodiment of the present invention immediately and automatically incorporates the changes in their execution costs into the optimization analysis.

An embodiment of the present invention also incorporates a real-time calculation of expected price improvement in securities transactions. Such an analysis reflects the variation of share prices executed relative to the National Best Bid and Offer (NBBO).

Figure 12B:
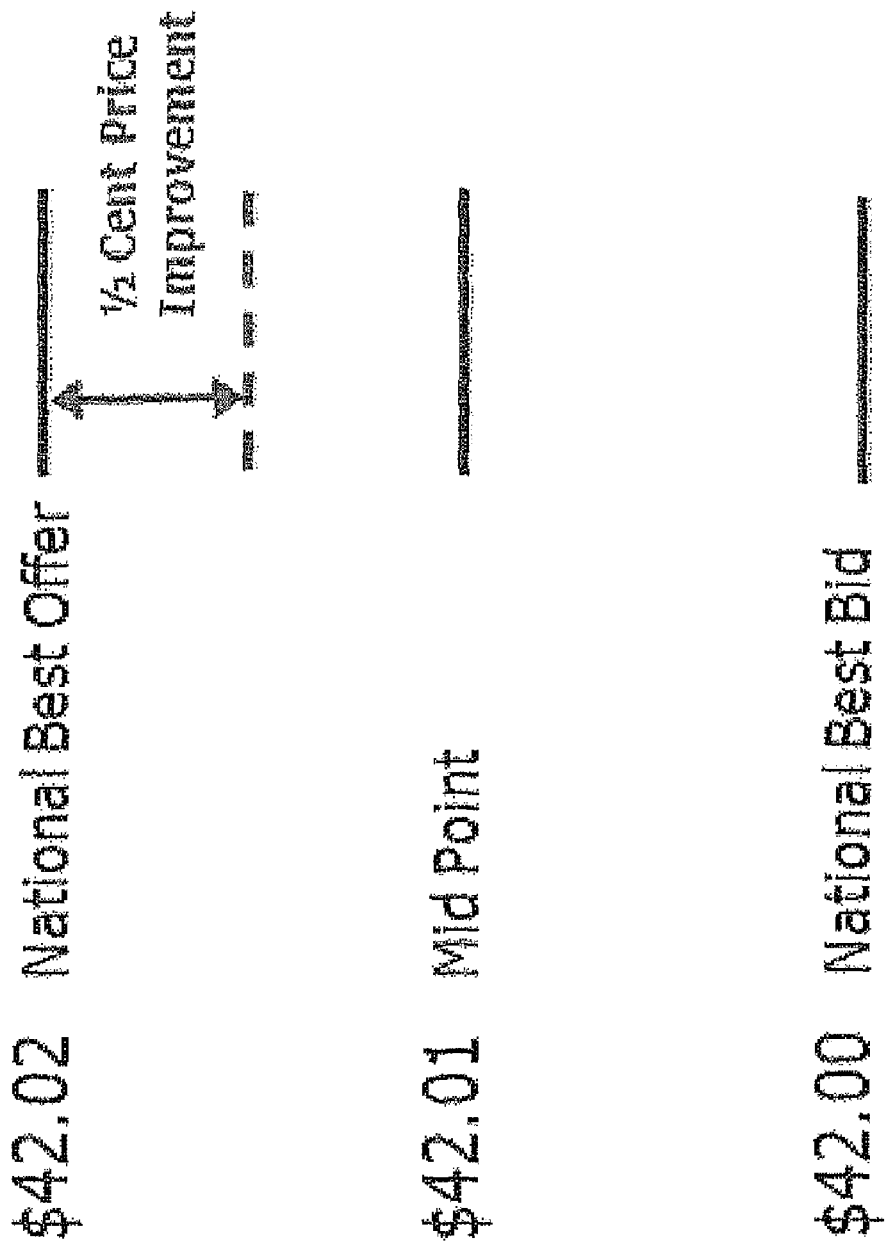
FIG. 12B is a schematic diagram illustrating an exemplary National Best Bid and Offer (NBBO) for a security, along with an exemplary Midpoint Between Bid and Offer (MBBO) and an exemplary price improvement.

FIG. 12B illustrates an example of a National Best Bid and Offer 1225 with a security trading at a National Best Offer (the price at which a buyer may acquire the security) of $42.02 per share and a National Best Bid (the price at which a seller may sell the security) of $42.00 per share. The spread (the difference between Bid and Offer is $42.02 less $42.00, or $0.02 per share (two cents per share)). Ideally, the spread (two cents per share) is retained by the executing broker (or exchange) as compensation for providing the service of executing the transaction (acting as a broker) between the buyer and seller of the security.

A buyer and seller of a security, in order to get the best possible share price (a higher share price for the seller and a lower share price for the buyer), will endeavor to obtain the closest possible share price to the Midpoint Between Bid and Offer (MBBO). In FIG. 12B, the MBBO is $42.01 per share. As a result, when a purchase of a security occurs at a share price lower that the National Best Offer ($42.02 per share in this example) or the sale of a security occurs at a higher price than the National Best Bid ($42.00 per share in this example), the corresponding benefit is referred to as price improvement.

In FIG. 12B, the MBBO is $42.01 per share and, in this example, a transaction price of $42.015 would represent a one-half cent per share price improvement over the National Best Offer of $42.02 per share. Obviously, such a difference is small on an individual share basis, but such a benefit has the potential to accumulate to significant amounts for a multi-billion dollar, actively traded investment portfolio over the course of a significant time period, such as a year or longer.

An embodiment of the present invention incorporates an analysis of the transactions executed by individual executing brokers relative to the NBBO on a security by security basis in order to determine what amount, if any, of price improvement was achieved by the initiating party (the actual buyer or seller of securities) to the transaction. A customizable optimization analysis examines the price improvement achieved in a security by each executing broker over data groups such as: (1) time periods in terms of seconds, minutes, hours, days, etc.; (2) recent trades such as the last five, ten, twenty-five, fifty, etc. transactions; (3) recent trades such as specific volumes of shares traded; (4) buy or sell transactions; and (5) other similar such grouping mechanisms. Finally, the initiating party and the executing broker may negotiate an agreed level of price improvement for their transactions.

With such data on price improvement by executing brokers for a security, the financial benefit in terms of cents (or fractions of a cent per share) is calculated and incorporated into the optimization process for determining the executing broker providing the lowest expected total execution cost for a transaction in a specific security.

Overall, the price improvement analysis enables the initiating party to analyze and determine the executing brokers showing favorable price quotes and liquidity in order to determine the executing brokers that are the "hot hitters" with respect to price improvement. As stated earlier, the optimization analysis also responds in real-time to changes in execution costs as the executing brokers change them during the trading day. The result is that the optimization analysis, to determine the "hot hitting" executing brokers with respect to price improvement (and execution costs), responds to actual recent performance in terms of price improvement by the executing brokers. In the event more than one executing broker provides the lowest expected total execution cost, then an embodiment of the present invention can allocate the shares among these executing brokers according to methods such as pro rata, an even division, or taking the shares from the executing broker offering the largest to the smallest number of shares. As such, the present invention creates a real-time accountability process for price improvement (and execution costs) that serves the best interests of the initiating party while simultaneously rewarding those executing brokers that provide the greatest price improvement (and lowest execution costs) by automatically directing significant order flow to their organizations.

An embodiment of the present invention also evaluates and ranks the time required to execute an order by the executing brokers. The time to execute for executing brokers (which currently range from milliseconds to multiple seconds) becomes an important factor in: (1) obtaining the most favorable quote (as other parties may step up to buy or sell the available shares at the most favorable quote); and (2) preventing the quoted prices from moving away from the initiating party (higher prices for a buyer and lower prices for a seller) in times of high market volatility or rapid market movement (such as often happens at the opening 30 minutes or closing 30 minutes of the market).

An embodiment of the present invention also evaluates and incorporates the rate of change in the price of a security (market velocity). As such, the velocity (the rate of change in the price of a security is moving) can become a disadvantage to an initiating party in the event when an order is entered for a security where: (1) the velocity is high; and (2) the quoted price is moving away from the initiating party's desired price.

An embodiment of the present invention determines and ranks the time required to execute an order for securities and order types by executing broker. These results are combined with the current market velocity calculations (the rate of change in cents per second per share of a security) to create an expected execution speed cost factor. The execution speed cost factor can be expressed as the market velocity (rate in change of price, e.g., cents per second) multiplied by the execution time (e.g., in seconds). For example, if a security's price is dropping at the rate of one-half cent per second and the executing broker requires two seconds to execute the order, the execution speed cost factor for this hypothetical buy order is one cent per share. Obviously, the execution speed cost factor becomes more important in times of high market volatility and less important in times of low market volatility. Still, an executing broker with a fast execution speed can expect to consistently rank higher than an executing broker with a considerably slower execution speed.

Overall, an embodiment of the PLCQ engine of the present invention combines the factors listed in the following Table 2 in a real-time optimization process that utilizes real-time market data and recent trading history to determine the executing broker(s) that provides the lowest expected total execution cost:

TABLE 2

| | | PLCQ Optimization Process Factors | |
|---|---|---|---|
| P | Price | Lowest Share Price From Most Favorable Quote(s) | Real-time Market Data Feed |
| L | Liquidity | Shares Available From an Executing Broker at a Quoted Price | Real-time Market Data Feed |
| C | Cost | Execution Cost per Share as Input by an Executing Broker | Real-time Entry by Executing Broker |
| Q | Quality | Price Improvement Provided on a Security by an Executing Broker | Calculated From Recent Trade Data |
| | Quality | Execution Speed (Time Required to Execute an Order) | Calculated From Recent Trade Data |
| | Quality | Rate of Change in the Price of a Security | Calculated From Recent Trade Data |

FIG. 12C is an exemplary illustration of how an embodiment of the present invention operates with respect to real-time market parameters and three executing brokers (A, B, and C). The market parameters 1226 at the time an initiating party enters an order are as follows:

(1) The share price is $42.00 per share.

(2) The order size is buy 4,500 shares.

(3) The spread on the security (the difference between the bid and offer) is one and one half cents ($0.0015).

(4) The security velocity (the current rate of change in the price of the bid and offer) is one quarter of a cent per second ($0.0025/second).

FIG. 12C also provides the executing broker parameters 1227 for executing brokers A, B, and C with respect to their following respective parameters: number of shares available at the quoted share price (liquidity); their respective cost per share to execute the order; their most up-to-date price improvement statistics (e.g., including executing broker A's trades executed outside the spread at 110%—a poor quality of execution); and time to execute an order.

FIG. 12C further provides the expected total execution cost per share 1228 for all available shares for each executing broker. As such, when utilizing the most favorable quote price and adjusting for execution cost per share, price improvement, and execution speed by converting these factors into cents per share, expected total execution cost per share can be calculated using the following exemplary formula:

Expected Total Execution Cost Per Share=
 Share price+−/−execution cost per share+/−
 expected price improvement+/−
 execution speed(time to execute the trade*
 rate of change in the price of the security).

The result of this calculation is as shown in the following Table 3:

TABLE 3

Expected Total Execution Cost Per Share

| Executing Broker | Total Execution Cost per Share |
|---|---|
| A | $42.0340 |
| B | $42.0025 |
| C | $42.0210 |

In different embodiments of the present invention, various weightings and probabilities could be assigned to the factors and the manner in which the factors (e.g., quoted unit price, current execution costs, expected price improvement, and expected execution speed) are combined and incorporated into the calculation of this formula. In one embodiment, total expected execution cost is customized based on customized input received, in real-time, from the party initiating the securities transaction. That customized input can include, for example, weightings, statistical analysis, probabilities, types of orders, and numerical parameters determining the calculation of expected price improvement and expected execution cost, as well as instructions as to how the factors are combined and incorporated into a calculation of the total expected execution cost.

FIG. 12D provides an exemplary illustration of the result of the optimization analysis with respect to the determination of the executing broker(s) providing the lowest expected total execution cost. FIG. 12D also illustrates how the choice of executing broker can vary according to three different selection methods: (1) liquidity—the executing broker(s) with the highest number of shares available; (2) broker execution cost—the executing broker(s) willing to execute the order at the lowest per share charge; and (3) expected total execution cost—which represents an embodiment of the present invention optimizing real-time and recent data on share price, liquidity, execution cost, price improvement, and execution speed in order to determine the executing brokers(s) providing lowest expected total execution cost for an order.

FIG. 12D shows that the executing broker selection 1229 and optimal rankings are as follows: by liquidity, the optimal broker rankings are A, B, and C; by execution cost, the optimal broker rankings are B, A, and C; and by total execution cost, the optimal broker rankings are B, C, and A.

FIG. 12D also compares expected total execution cost 1230 and calculates the cost penalties from using the liquidity method and/or execution cost method to select executing brokers compared to using the expected total execution cost method (an embodiment of the present invention). At a buy order of 2,000 shares, the cost penalty for the liquidity method is $53.75 and for the execution cost method is $6.50. At 3,500 shares, the cost penalty for both the liquidity and execution cost method is $13.00. Thus, even on a single small order, there are substantial savings to be realized in favor of the initiating party. These savings accrue to far more significant amounts when utilized by large fund groups trading several billion shares annually. The cost savings in basis points are shown in Table 4 below, which may provide a more meaningful measurement of cost savings:

TABLE 4

Cost Savings In Basis Points

| Number of Shares | Liquidity (bps) | Exec Cost (bps) |
|---|---|---|
| 500 | 7.50 | 0.00 |
| 1,000 | 7.50 | 0.00 |
| 1,500 | 7.50 | 0.00 |
| 2,000 | 6.40 | 0.77 |
| 2,500 | 4.24 | 1.24 |
| 3,000 | 2.28 | 1.03 |
| 3,500 | 0.88 | 0.88 |
| 4,000 | 0.39 | 0.39 |
| 4,500 | 0.00 | 0.00 |

The above savings begin to move lower as the liquidity in the example is exhausted. In essence, this phenomenon reflects the principle that, when all the liquidity is consumed by an order, the selection of executing broker becomes less important than in circumstances when an order consumes part of the available liquidity at quoted prices. Thus, the present invention represents an optimization of the small order execution process. In addition, the system of the present invention provides the capability to slice an order up among multiple executing brokers when the initiating party desires greater anonymity from the executing brokers, with the added benefit that the system of the present invention slices and routes these orders to multiple executing brokers in such a manner as to also minimize the total execution cost for the order.

FIG. 12E is an exemplary illustration of an embodiment of the present invention in which the optimal group of executing brokers providing the lowest expected total execution cost, when factoring in all variables, may not always utilize all the executing brokers providing the lowest quoted price for a security.

The market parameters 1231 and executing broker parameters 1232 in FIG. 12E are similar to FIG. 12C, except that they are shown for five executing brokers (A, B, C, D, and E) that are quoting liquidity at two different share prices ($42.00 and $42.02). The method for calculating expected total execution cost per share 1233 is identical to FIG. 12C, with the results shown in Table 5 as follows:

TABLE 5

Expected Total Execution Cost Per Share

| Executing Broker | Total Execution Cost per Share |
|---|---|
| A | $42.0340 |
| B | $42.0025 |
| C | $42.0210 |
| D | $42.0290 |
| E | $42.0200 |

FIG. 12F provides an exemplary illustration of the result of the optimization analysis with respect to the determination of the executing broker(s) providing the lowest total cost execution. FIG. 12F shows that the executing broker selection 1234 and optimal rankings are as follows: by liquidity, the optimal broker rankings are A, B, C, D, and E; by execution cost, the optimal broker rankings are B, A, C, E, and D; and by total execution cost, the optimal broker rankings are B, F, C, D, and A.

FIG. 12F also compares expected total execution cost 1235 and calculates the cost penalties from using the liquidity method and/or execution cost method to select executing brokers compared to using the total execution cost method (an embodiment of the present invention). At a buy order of 2,000 shares, the cost penalty for the liquidity method is $54.25 and for the execution cost method is $7.00. At 3,500 shares, the cost penalty for both the liquidity and execution cost method is $27.00. At a buy order of 5,500 shares, the cost penalty for the liquidity method is $19.00 and for the execution cost method is $10.00. Again, even on a single small order, there are substantial savings to be realized in favor of the initiating party. These savings accrue to far more significant amounts when utilized by large fund groups trading several billion shares annually, as shown by the savings in basis points shown in Table 6 below:

TABLE 6

Savings In Basis Points

| Number of Shares | Liquidity (bps) | Exec Cost (bps) |
|---|---|---|
| 500 | 7.50 | 0.00 |
| 1,000 | 7.50 | 0.00 |
| 1,500 | 7.50 | 0.00 |
| 2,000 | 6.46 | 0.83 |
| 2,500 | 4.33 | 1.33 |
| 3,000 | 2.88 | 1.63 |
| 3,500 | 1.84 | 1.84 |
| 4,000 | 1.37 | 1.37 |
| 4,500 | 1.00 | 1.00 |
| 5,000 | 0.90 | 0.69 |
| 5,500 | 0.82 | 0.43 |
| 6,000 | 0.65 | 0.30 |
| 6,500 | 0.51 | 0.18 |
| 7,000 | 0.24 | 0.08 |
| 7,500 | 0.00 | 0.00 |

FIG. 12F also provides an exemplary illustration that, under the lowest expected total execution cost analysis, executing brokers providing lower quoted share prices may drop in the optimized broker rankings while lower ranked executing brokers providing higher quoted share prices may rise in the optimized broker rankings to achieve the lowest expected total execution cost. Both types of events are a direct result of utilizing execution cost and quality considerations in determining the lowest expected total execution cost for the initiating party.

In providing a price-cost-liquidity-quality (PLCQ) engine, an embodiment of the present invention preferably includes the following systems, services, and data:

Order management system (and/or execution management system).

Connectivity network between initiating parties and executing brokers.

FIX engines for translating orders into a standard data protocol.

Network of executing brokers.

GUI for executing brokers to establish and change their execution costs in the PLCQ engine.

Real-time market data feeds.

Archive of market data on trade executions.

As a further embodiment of the system 1200 and price-cost-liquidity-quality (PLCQ) engine 1201 shown in FIG. 12A, FIGS. 12G(i) and 12G(ii) illustrate an exemplary implementation of a price-cost-liquidity-quality (PLCQ) engine 1201, according to an embodiment of the present invention. The actors include a system administrator managing the price-cost-liquidity-quality (PLCQ) engine 1201, an initiating party for the securities transaction 1236, and a plurality of executing brokers 202 able to provide quotes and liquidity for the security in the transaction. The systems include a GUI (graphical user interface) 1202 for the party initiating the securities transaction and a GUI (graphical user interface) 1204 for the plurality of executing brokers 202 to establish execution costs, a real-time feed for current market data 1205, and an archive for market execution data 1207.

FIGS. 12G(i) and 12G(ii) also illustrate an exemplary process of the present invention having the following steps, which correspond to the reference numerals shown in FIGS. 12G(i) and 12G(ii).

In step 1260 in FIG. 12G(i), an initiating party 1236 utilizes a GUI 1202 to create (or receive) an order 1250 to buy or sell a security.

In step 1261, utilizing the price-liquidity-cost database 1203, the initiating party 1236 requests real-time market quotes 1251 through a market data feed 1205 from a plurality of executing brokers 202, including share price and number of shares available (liquidity) for the transaction.

In step 1262, the initiating party 1236 requests data on execution costs 1252 uploaded through the execution cost GUI 1204 for the plurality of executing brokers 202 to establish and change, in real-time, execution costs for various securities. The execution costs are usually quoted in cents (and/or fractions thereof) per share. Execution costs can also be quoted in basis points on the transaction amount.

In step 1263, utilizing the execution quality analysis engine 1206, the system of the present invention conducts an analysis of price improvement 1253 according to the customized parameters established by the initiating party, to determine the price improvement (if any) provided by the plurality of executing brokers quoting liquidity for the security in the transaction. This analysis accesses the system archives 1207 for historical data for a plurality of transactions executed by a plurality of executing brokers 202. The results of the price improvement analysis are converted to cents per share.

In step 1264, the system of the present invention conducts an analysis of time required to execute an order by examining, for individual executing brokers, trade execution data to compare the time the executing broker received an order to the time the order was actually executed. This difference represents the execution time for the executing broker. The system of the present invention also examines real-time transaction data to determine the current velocity for the security (the current rate of change in the price of the security). The execution time data (in number of seconds and/or fractions thereof) is multiplied by the velocity of the security (the current rate of change in the price of the security) to determine the cent per share cost of the execution speed 1254 for the plurality of executing brokers 202 have executed a plurality of transactions.

Referring now to FIG. 12G(ii), in step 1265, utilizing the order optimization engine 1208, the system of the present invention combines the share price (e.g., in dollars and cents) offered by each executing broker 202 along with their current execution cost in cents per share, the expected price improvement in cents per share, and the execution speed cost in cents per share. The resulting total is the expected total execution cost per share 1255 for the security, in cents per share, for each executing broker 202 that is quoting liquidity (in numbers of shares) for the security in the transaction.

In step 1266, the system of the present invention ranks the plurality of executing brokers 202, for example, in order from the lowest total execution cost to the highest expected total execution cost 1256.

In step 1267, the system of the present invention, using the expected total execution cost, develops rankings 1257 to specify the executing broker 202 or plurality of executing brokers 202 and the order in which the executing brokers 202 should be utilized so as to ensure the lowest total execution cost is achieved 1257.

In step 1268, the optimized broker selection order is communicated to the initiating party 1236 through the GUI 1202 or the optimized broker selection order is implemented through the system of the present invention, through tangible output such as an electronic feed or upload of the executing broker rankings, or a manual conversion of the data into another system to route the orders to the desired executing brokers. The order routing can also be printed on paper or displayed in a graphical user interface.

In one embodiment of the present invention, the tangible output of the optimized broker selection order comprises issuing instructions to route all or part of the order for the current securities transaction to the executing broker having the lowest total expected execution cost. In addition, in some cases, more than one executing broker may have the lowest total expected execution cost. Accordingly, an embodiment of the method comprises determining a plurality of executing brokers having the lowest total expected execution cost, and issuing instructions to route the order for the current securities transaction among those plurality of executing brokers having the lowest total expected execution cost based on customized parameters. Customized parameters can include, for example, an even division among the plurality of executing brokers, a pro rata allocation among shares available, or an allocation based on the largest to smallest quantity of shares available from each of the plurality of executing brokers.

In a further embodiment of the present invention, the methods described above for selecting executing brokers are repeated, for example, to accommodate a large order that, if executed in one transaction, might undesirably impact the price of the security. Thus, for example, a large order can be divided into many small sub-orders executed at certain frequencies over a period of time. The methods for selecting executing brokers for an order can be repeated over time based on customized parameters determining the number, timing, and frequency of the repeated selection of executing brokers for an order. The customized parameters can, for example, include one or more of: (1) a specified interval until an order is completely filled or filled to a specified percentage; (2) a specified number of repetitions; (3) a specified time interval; (4) a specified duration; (5) a specified change in unit price; (5) a specified percentage within a target price; and (6) a specified unit price.

For purposes of description, the above system and process utilizes equity shares as the unit of trading. However, the system of the present invention could also be utilized across multiple forms of trading such as fixed income, options, futures, currency, commodities, derivatives, and other such instruments that utilize a standard category of unit (such as shares, units, bonds, contracts, etc.) for purposes of implementing an automated and efficient trading process.

As one of ordinary skill in the art would appreciate, in addition to the components of (1) the share price multiplied by the number of shares and (2) the execution cost multiplied by the number of shares, the total transaction cost may also include charges for additional items such as confirmation delivery ("postage"), SIPC charges, and transaction taxes. These additional items have not been included in the above analyses in order to focus on the market-based factors in determining the total cost of a securities trade to the participants in the transaction. However, in a further embodiment of the present invention, the costs of these additional items are factored into the total execution cost.

6) Trade Reconciliation System

Figure 13:
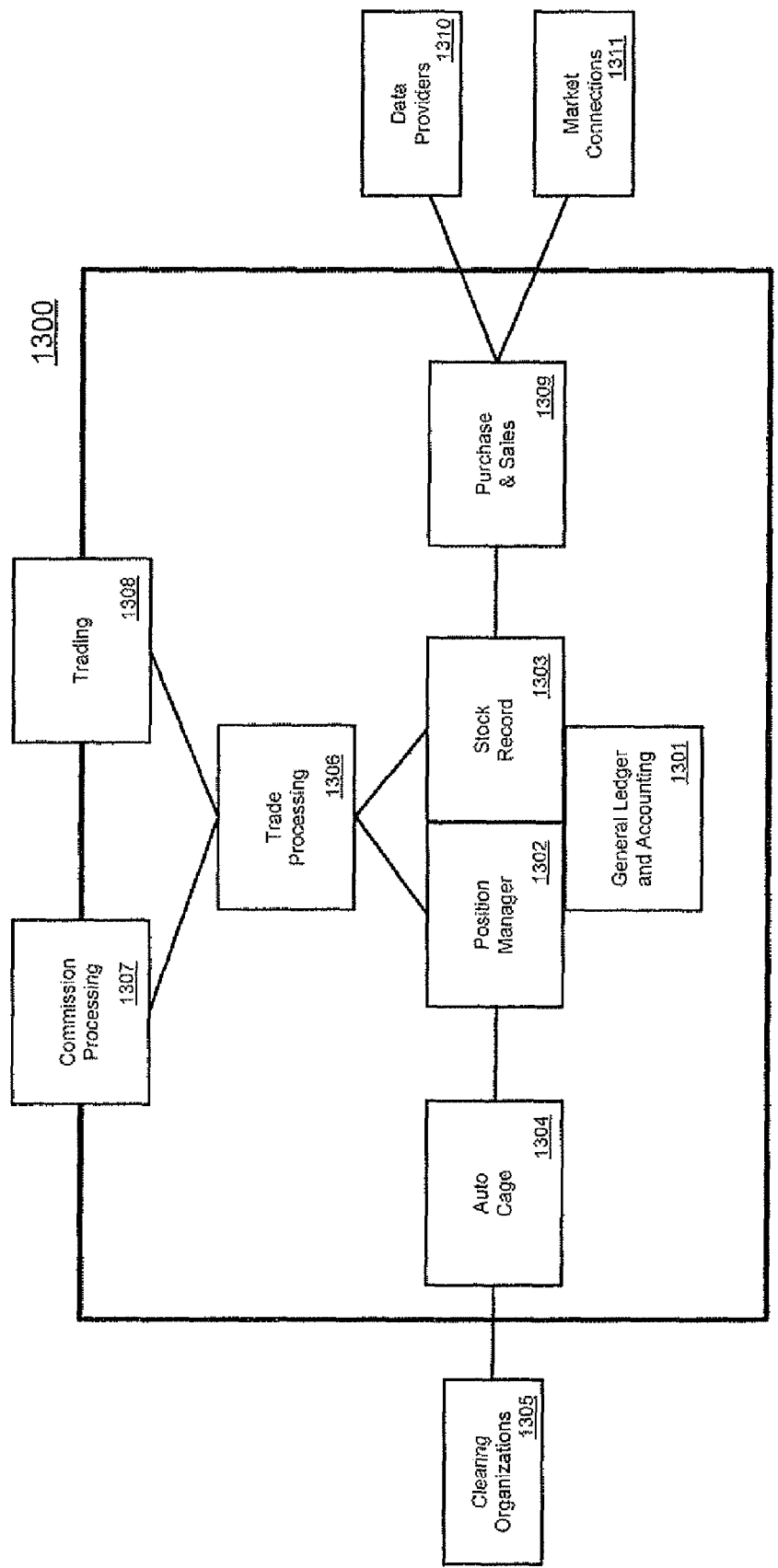
FIG. 13 is a schematic diagram illustrating exemplary component modules of a trade reconciliation system, according to an embodiment of the present invention.

FIG. 13 is a schematic diagram illustrating a trade reconciliation system 1300, according to an embodiment of the present invention. The trade reconciliation system is a computerized trade processing system that functions in the back office system for the investment portfolios. The trade reconciliation system can comprise general ledger and accounting 1301, position manager 1302, and stock record 1303 modules. The position manager 1302 can comprise an auto cage 1304 that connects to clearing organizations 1305. The position manager module 1302 and stock record module 1303 support the trade processing module 1306 that provides commission accounting 1307 and trade processing 1308. The stock record also supports the purchase and sales module 1309, which incorporates data through external data providers 1310 and market connections 1311. The trade reconciliation system 1300 provides real-time, multi-currency trade settlement rules, trade comparisons, trade confirmation and affirmations, purchases and sales, trade exception processing, commission calculations, accruals, cash flows, and trial balances. In essence, the trade reconciliation system 1300 operates in an automated fashion through the incorporation of real-time and batch data feeds from a variety of different sources. In its simplest form, the trade reconciliation process ensures that: (1) all trades are property accounted; (2) all trading, pricing, and processing errors have been identified and addressed; and (3) all accounts are in balance. At the conclusion of this process, the entire system is ready for the next day's trading activity.

In the prior art, the trade reconciliation process is the responsibility of both the sub-advisor and the sponsoring organization while the balancing of accounts is the responsibility of the sponsoring organization. In an embodiment of the present invention, the responsibility for both the trade reconciliation process and the balancing of accounts shifts to the sponsoring organization.

7) Additional Systems

The system of the present invention can also include additional systems to support order execution processing. These systems include a communications engine to translate and direct all messages between the appropriate parties; a communications protocol for directing the message generation and transmission process; a message format for various message types, headers, fields names, field data formats and acceptable parameters as to eliminate confusion as to message content, instructions, and destination; and a communications network to connect all sub-advisors, sponsoring organizations, and executing brokers with real-time, reliable, and scalable connectivity B. Process In an embodiment of the present invention, the functional responsibilities, personnel requirements, system requirements, regulatory responsibilities, and data flows are dramatically different from the prior art. From a perspective of responsibility for the sub systems, Table 7 below illustrates how the operating responsibilities for the various systems change from the prior art to an embodiment of the present invention.

TABLE 7

Operating Responsibilities of the Present Invention

| System Responsibility | Prior Art | Present Invention |
| --- | --- | --- |
| Order Entry | Sub-advisor | Sub-advisor |
| Compliance Engine | Sub-advisor | Sponsoring Organization and Sub-Advisor |
| Order Management System | Sub-advisor | Sponsoring Organization and Sub-Advisor |

TABLE 7-continued

Operating Responsibilities of the Present Invention

| System Responsibility | Prior Art | Present Invention |
| --- | --- | --- |
| High Touch - Low Touch Engine | Not Applicable | Sponsoring Organization Real-Time Automated Process |
| Price - Liquidity - Cost - Quality Engine | Not Applicable | Sponsoring Organization Real-Time Automated Process |
| Trade Reconciliation | Sub-advisor | Sponsoring Organization |
| Communications Engine | Sub-advisor | Sponsoring Organization |
| Communications Protocol | Sub-advisor | Sponsoring Organization |
| Communications Network | Sub-advisor | Sponsoring Organization |

With respect to the responsibilities of the sub-advisor, there are substantial differences between the prior art and the present invention. These differences are summarized in FIG. 14, which is a table that highlights the impact on the sub-advisor according to an embodiment of the present invention. The unified trading and control system is flexible in its implementation in that implementation can proceed on a fund by fund or manager by manager basis even as trading responsibility for certain funds or portfolios, such as an emerging markets or micro cap stocks, may remain with the sub-advisors (assuming the sub-advisor has proficiency with these less liquid issues that the sponsoring organization may not possess.) Also, the money manager (or portfolio manager) may desire more control over the trading of specific assets or issues, the utilization of certain trade strategies or the direction of orders to a specific executing broker. The authorization of such exceptions remains with the sponsoring organization as the sponsoring organization can authorize those exceptions that benefit the fund shareholders or plan beneficiaries. Overall, in an embodiment of the present invention, there are multiple benefits for the sub-advisor with respect to lower operating expenses, less operating and trade error risk and, of course, superior fund performance.

Finally, an important user group that must be comfortable with the system implementation of the present invention is the portfolio managers making the daily buy and sell decisions in the fund or investment portfolio. The system of the present invention addresses the portfolio managers' concern that their asset management process is not interfered with as new systems, processes, and procedures are implemented.

C. Rationale for Implementation of Standards in the System of the Present Invention An embodiment of the present invention provides a standard system comprising one or more of the following components: communications protocol, communications format, communications network, message transfer facilitation software, and dedicated computer processor. The standard for the system of the present invention provides simplicity, reliability, scalability, and cost effectiveness in contrast to the complexity, expense, and potentially chaotic processing caused a plurality of sponsoring organizations making individual systems decisions without regard to the burden that the plurality of systems and configuration places on their sub-advisors and executing brokers. As such, the standard represents a single group of specific components for use by all parties, in which a sub-advisor or executing broker implementing the system of the present invention with a single sponsoring organization is able to duplicate, as a "cookie cutter" type process, the initial implementation, inclusive of process, procedures, protocols, and connectivity, with each subsequent sponsoring organization that requires their implementation of the system of the present invention. The result is that the standard, as a single group of specific components for use by all parties, vastly simplifies the implementation process for all parties and creates a far more reliable, cost effective, and scalable system.

For example, a single mutual fund company (such as AIM, Janus, or Oppenheimer) may act as a sub-advisor to ten to twenty different sponsoring organizations (usually managing between one and five funds per sponsoring organization). As such, a mutual fund company may manage twenty to sixty separate sub-advised funds alongside their thirty to fifty proprietary mutual funds (and as many or more institutional and private accounts). A money manager at a mutual fund company making a single trade (such as: buy IBM) in a single strategy (such as large cap growth) could easily impact ten to twenty separate individual portfolios utilizing the large cap growth strategy. These orders are communicated to the sponsoring organizations through standard communications messages sent through a communications protocol, communications format, communications network, message transfer facilitation software, and dedicated computer processors. It is clear that the money manager achieves a high level of automation and significant reduction in operating risk (and associated trading losses), as trading across a plurality of accounts is implemented through a single standard and integrated system.

In comparison, the potential complexity of the various implementations of the system of the present invention reflects the following factors.

The National Association of Variable Annuities (NAVA), the variable insurance industry trade group, indicates that it has over fifty members acting as sponsoring organizations for their mutual fund, variable annuity, and defined contribution (401k, 403b and 457) financial products (see FIG. 15). The number of additional sponsoring organizations, such as private and public pension funds, easily adds several hundred more sponsoring organizations to the list shown in FIG. 15.

The Investment Company Institute (ICI), the mutual fund industry trade group, has over three hundred member mutual fund companies suitable to provide money management services to sub-advised funds (see FIGS. 16A and 16B) and there are hundreds of additional institutional managers capable of functioning as a sub-advisor to an investment portfolio.

There are also over forty providers of order management systems (see FIG. 17) and there are several hundred firms offering their services as executing brokers (see FIGS. 18A and 18B for a partial list).

In addition, there are over 75 companies offering over 115 different communications engines for trade order messaging, translation, and destination routing. These communications engines usually utilize a common industry communications protocol (usually the Financial Information eXchange format or "FIX"). However, each communications engine has its own unique "dialect" as to the specific implementation of the protocol. As such, despite the common industry protocol, there remain substantial challenges in the interoperability and ease of communications between the pluralities of communications engines. Finally, there are over 25 communications networks available for sponsoring organizations to utilize as their means of connectivity to sub-advisors and executing brokers, thereby requiring each sub-advisor and executing brokers to link as a node to each system selected by at least one sponsoring organization.

Given the plurality of sponsoring organizations (as shown in FIG. 15 and inclusive of additional sponsoring organizations such as mutual funds utilizing sub-advisors, defined contribution plan sponsors, pension and defined benefit sponsors, and other user groups of considerable size), sub-advisors (as shown in FIGS. 16A and B), order management systems (as shown in FIG. 17), executing brokers (as shown in FIGS. 18A and 18B) along with the 115 communications engine with each utilizing a specific "dialect" reflecting its original time and purpose of creation, several communications protocols for messaging and 25 communications networks, the number of potential unique configurations of these organizations and systems is so overwhelming as to create such complexity and chaos as to prevent an implementation of the system of the present invention based on the well-justified concerns that any level of industry acceptance could result in unacceptable complexity, operating costs, personnel costs, order entry errors, trade processing errors, and associated reduced performance of investment portfolios. Given that the sub-advisor is required to compensate an investment portfolio for all losses resulting from their errors of any kind, the likely result of an absence of a standard is the refusal by sub-advisors to cooperate with an implementation of the system of the present invention.

Figure 19:
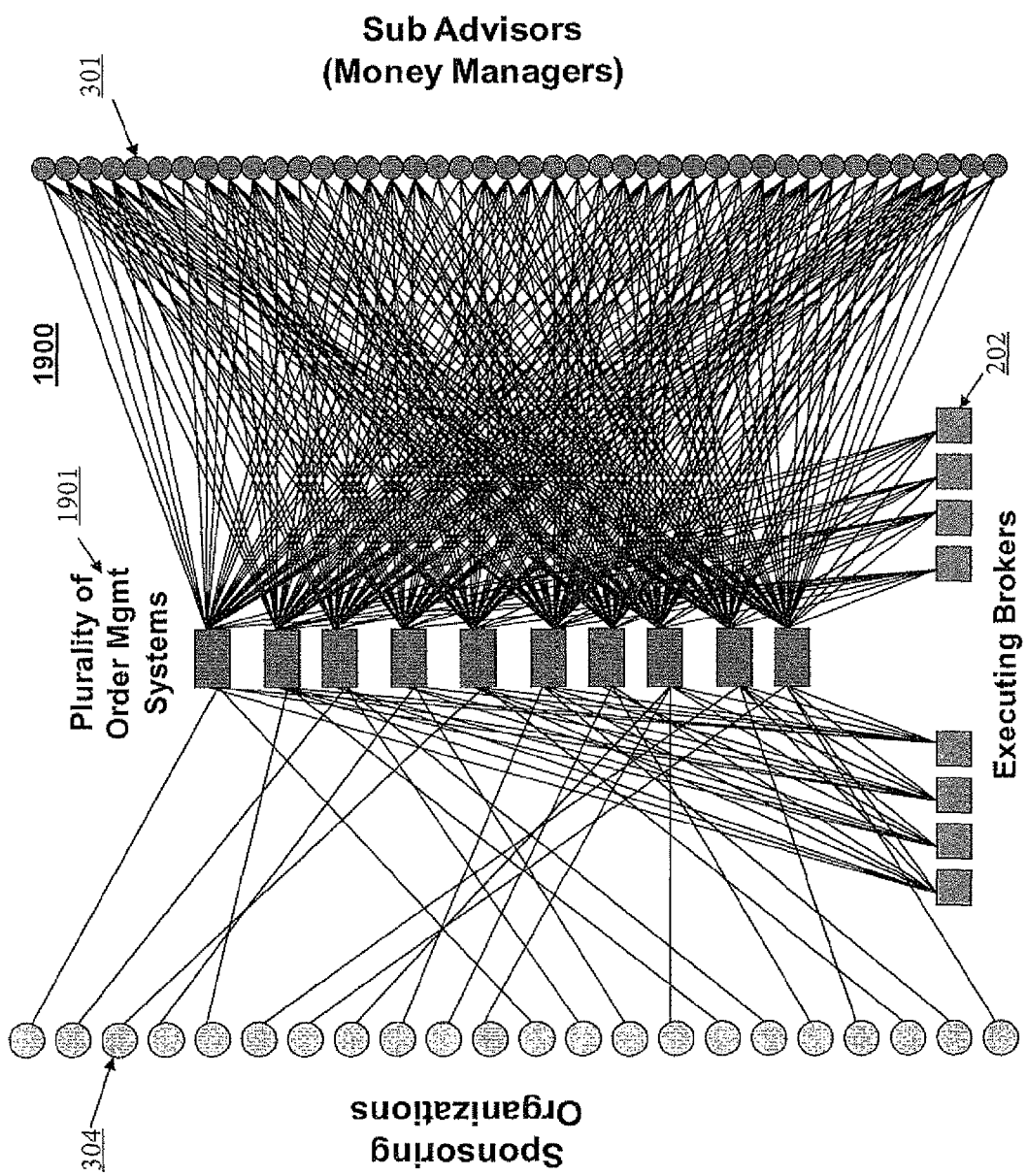
FIG. 19 is a schematic diagram illustrating an embodiment of the present invention in which a plurality of sponsoring organizations and a plurality of sub-advisors (money managers) utilize a plurality of order management systems (OMSs) to execute orders with a plurality of executing brokers.

FIG. 19 provides an exemplary structure 1900 illustrating the complexity created by a plurality of sponsoring organizations 304 deciding to implement the embodiment of the present invention without a standard system 1901. In this illustration, twenty-two different sponsoring organizations 304 select ten different order management systems 1901. The sponsoring organizations 304 utilize a total of forty-two different sub-advisors 301 in their financial product or pension portfolios along with eight different executing brokers 202 (while in actual practice the actual number of sponsoring organizations 304, sub-advisors 301, and executing brokers 202 would be considerably higher than the illustration in FIG. 19). Each sub-advisor 301 is asked to move from a single system to a plurality of systems 1901 (as there are over forty systems available to a sponsoring organization as shown in FIG. 17) selected by each sponsoring organization. As a result, a single trade by a single sub-advisor 301 may require order entry into ten or more different systems selected by sponsoring organizations. Such a process could be complex, chaotic, costly, and rife with errors. The associated expense for resolving the errors (as the fund shareholders and plan beneficiaries are not responsible for such errors and must be reimbursed for any losses) could make sub-advisors 301 unwilling to implement such a process.

Figure 20:
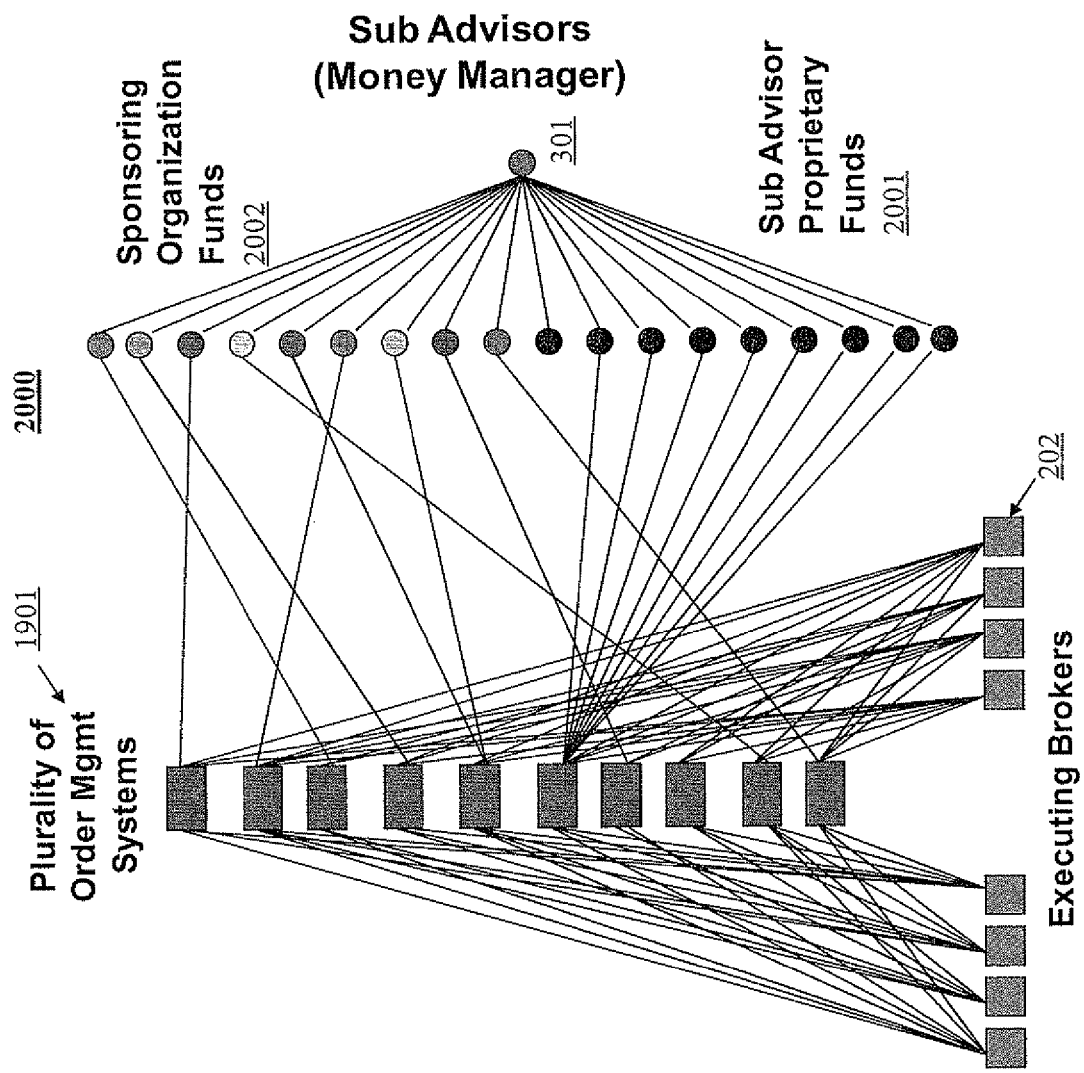
FIG. 20 is a schematic diagram illustrating an embodiment of the present invention in which a sub-advisor utilizes a plurality of manager order management systems to execute orders for a plurality of funds or investment portfolios with a plurality of executing brokers.

FIG. 20 illustrates the complexity of such an embodiment 2000 without a standard 1901 through a focus on the complexity facing a single sub-advisor 301 managing nine proprietary funds 2001 utilizing a single system 1901 and nine sponsoring organization funds or investment portfolios for sponsoring organizations 2002 utilizing a plurality of systems 1901. The illustration demonstrates, even at the small scale of a single sub-advisor, the inherent complexity and potential chaos of such an implementation without the use of a standard system.

Figure 21:
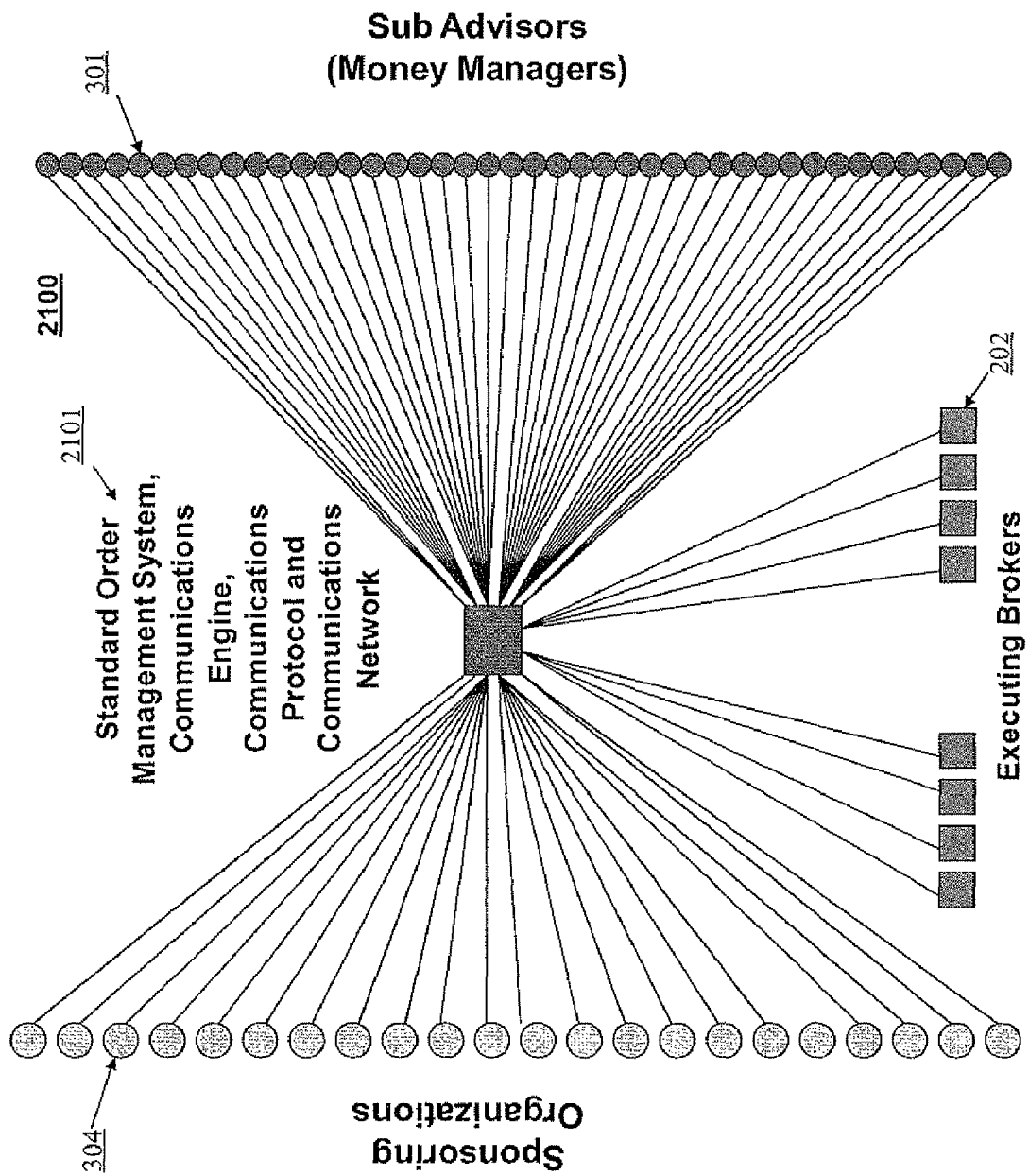
FIG. 21 is a schematic diagram illustrating an embodiment of the present invention in which a plurality of sponsoring organizations use a standard order management system, communications engine, communications protocol, and communications network to communicate with a plurality of sub-advisors (money managers) in order to execute orders with a plurality of executing brokers.

Therefore, to reduce this complexity, an embodiment of the present invention provides a single standard. FIG. 21 illustrates the simplicity, ease of use, and efficiency resulting from an embodiment 2100 utilizing a designated standard single manager order management system 2101 for use by all sponsoring organizations 304. The standard order management system and single network node connection by a single party to all parties reflects a vast improvement in the operating reliability, costs, and ease of implementation and operation. As shown, a single system 2101 (e.g., in this illustration, a standard order management system, communications engine, communications protocol, communications format, and/or communications network; however, an embodiment could require fewer of the listed standard components) can be used as an easily and rapidly duplicated image used by sponsoring organizations 304. A standard—implemented through, for example, a designated order management system, communications engine, or communications protocol—creates the leverage for allowing rapid industry adoption of the system of the present invention.

II. Exemplary System Components, Services, and Data of a Sponsoring Organization In an embodiment of the present invention, the following systems, services, and data are preferably in place for a sponsoring organization's investment portfolios:

Custody firm to hold the securities and cash for benefit of the funds and plans.

Daily net cash contribution or withdrawal per investment portfolio—e.g., can be provided by the sponsoring organization to the system administrator.

Security master data service.

Best execution monitoring service.

Transaction cost accounting system.

System administrator for the HiLo Engine (HLE).

HiLo Engine (HLE).

Sponsoring organization (advisors).

Investment portfolios of the sponsoring organization.

Money management firms (sub-advisors).

Portfolio manager or teams of portfolio managers for the investment portfolio.

Order management systems (and/or execution management systems) at the sponsoring organization and money management firms.

Compliance systems at the sponsoring organization and money management firms.

Connectivity network between sponsoring organization, money management firms, and executing venues or brokers.

Standard message format and transmission protocol for communication with the HiLo Engine.

Network of executing venues or brokers.

Real-time market data feeds.

Archive of market data on trade executions.

Trade reconciliation systems at the sponsoring organization and money management firms.

III. Exemplary Implementation of the Present Invention

Figure 22:
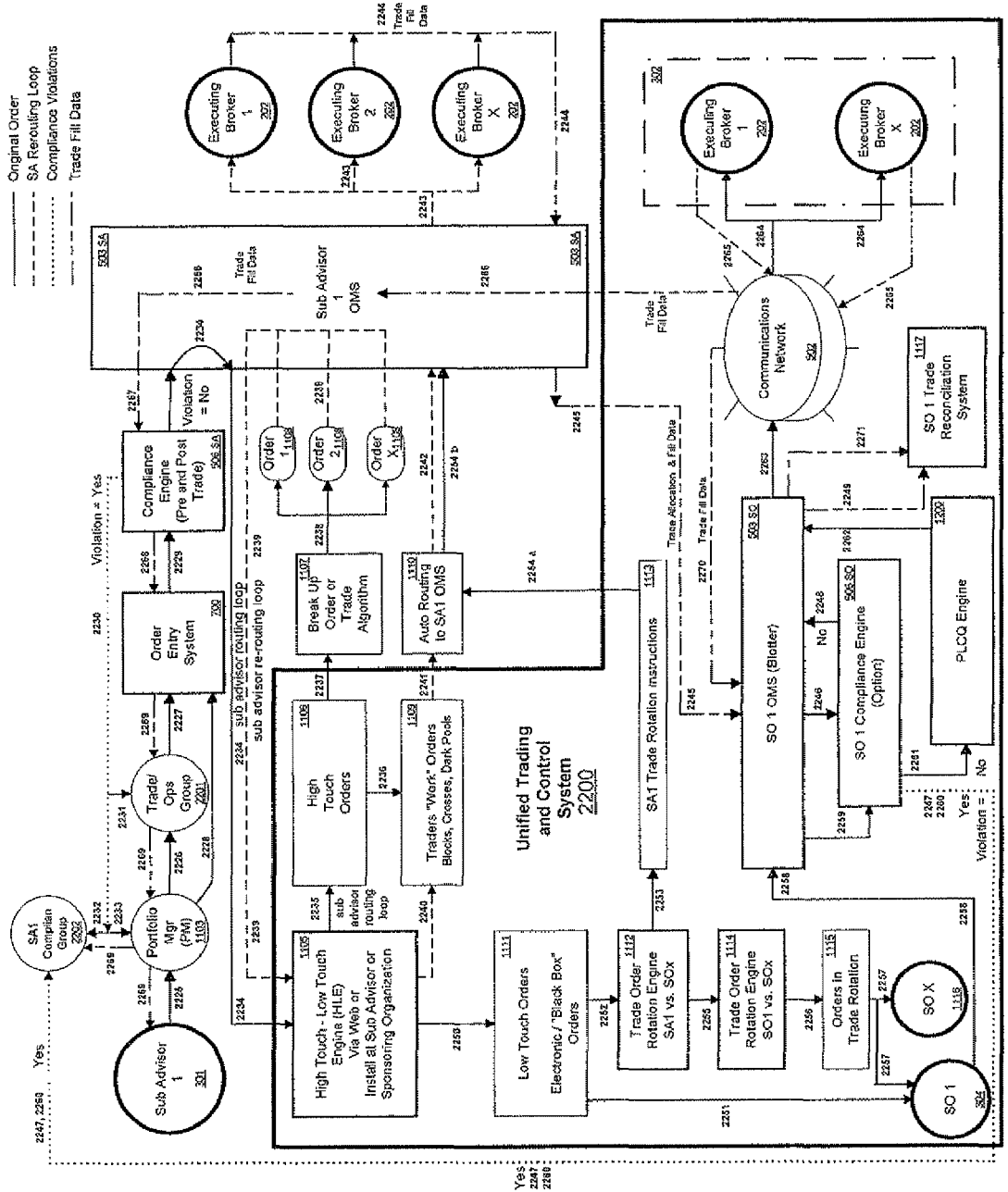
FIG. 22 is a schematic diagram illustrating a use case analysis of an exemplary implementation of a system, method, process, software, and standards for facilitating the unified trading and control of a sponsoring organization's money management process, according to an embodiment of the present invention.

With reference to FIG. 22, which is an alternative to the embodiment shown in FIG. 11Cii, an exemplary system of the present invention is as follows. The actors include a system administrator administering the unified trading and control system 2200, a sub-advisor 301 acting as money manager for the investment portfolios, a portfolio manager (money manager) 1103 responsible for making investment decisions for a fund or investment portfolio, a sub-advisor trade/operations group 2201, a sub-advisor compliance group 2202, a sponsoring organization compliance group (not shown), a sponsoring organization 304 controlling party for the assets and responsible for client books and records, a custodial firm holding all securities and cash (not shown), and executing brokers 202 as the parties to whom the buy or sell order is directed to be executed (filled).

The system includes a unified trading and control system 2200 including a portfolio modeling system 1103, an order entry system 700, a sub-advisor compliance engine 506 SA, a sub-advisor order management system (OMS) 503 SA, the hi touch-low touch engine 1105, the trade order rotation engine 1112 and 1113, the sponsoring organization standard order management system (OMS) 503 SO, a sponsoring organization compliance system 506 SO, the price-liquidity-cost-quality engine 1200, the sponsoring organization's communications network 502, the network of executing brokers supporting the sponsoring organization 302, the individual executing brokers 202, and the trade reconciliation system 1117.

FIG. 22 also illustrates an exemplary process of the present invention having the following steps, which correspond to the arrows and their adjacent reference numerals shown in FIG. 22.

2225) Sub-advisor 301 provides a portfolio manager 1103 for the fund or investment portfolio.

2226) Portfolio manager 1103 sends the trade order to the trade/operations group 2201 for order entry.

2227) Trade/operations group 2201 enters the order into the order entry system 700.

2228) As an alternative to step 2226 and 2227, the portfolio manager 1103 enters the trade order directly into the order entry system 700.

2229) The order entry system 700 routes the order to the compliance engine 506 SA for evaluating the order relative to regulatory and prospectus requirements and restrictions.

2230) If a violation occurs (Violation=Yes), the order is stopped from execution and routed for review by the sub-advisor. The violation is also reported to the sponsoring organization compliance group (not shown) and to any or all of the sub-advisor groups shown in steps 2231, 2232, and 2233.

2231) If a violation occurs (Violation=Yes), the order can be routed to the trade/ops group 2201.

2232) If a violation occurs (Violation=Yes), the order can be routed to the compliance group 2202.

2233) If a violation occurs (Violation=Yes), the order can be routed to the portfolio manager 1103.

2234) If a violation does not occur (Violation=No), the order is routed to the order management system (OMS) 503 SA, which, through the sub-advisor routing loop, directs the order for sub-advised funds or accounts to the HiLo Engine (HLE) 1105. Although FIG. 22 depicts the HiLo Engine 1105 as located within the unified trading and control system, one of ordinary skill in the art would appreciate that the HiLo Engine 1105 could be located elsewhere, such as at the sub-advisor 301 or sponsoring organization 306.

2235) The HiLo Engine 1105 determines the expected market impact of orders received from the sub-advisor order management system (OMS) 503 and categorizes orders with significant expected market impact as "high touch" orders 1106.

2236) The high touch order 1106 is further categorized as orders to be "worked" by a block trading desk, crossing system, matching system, dark pool of liquidity, or some other form of institution to institution trading system or exchange 1109. These high touch trades are routed to the sponsoring organization's compliance engine 506 SO for pre-execution review and approval and, once approved, are ready for execution. (The sponsoring organization compliance review step is not shown).

2237) As an alternative to step 2236, the high touch order 1106 is divided into a series of smaller orders 1108 by a trading algorithm or a set of manual decisions 1107.

2238) The trading algorithm or set of manual decisions divides the order into a series of smaller orders 1108 for execution over a period of time.

2239) Each of the smaller orders 1108 resulting from the original high touch order is re-routed, via the sub-advisor re-routing loop, to the HiLo Engine 1105. Step 2239 starts the sub-advisor rerouting loop.

2240) The HiLo Engine evaluates the re-routed smaller orders 1108, categorizes the orders with significant market impact as high touch orders 1109, and routes these orders to be "worked" 1109.

2241) High touch orders 1109 are directed via auto routing 1110 to the sub-advisor's order management system 503 SA. Although FIG. 22 depicts the HiLo Engine 1105 as located within the unified trading and control system, one of ordinary skill in the art would appreciate that the HiLo Engine 1105 could be located elsewhere, such as at the sub-advisor 301 or sponsoring organization 306.

2242) The sub-advisor's order management system 503 SA receives the high touch order 1106 and selects the executing broker(s) 202.

2243) The sub-advisor order management system 503 SA routes the high touch orders 1106 to the executing broker(s) 202 for execution.

2244) Once the orders are executed by the executing brokers 202, the trade fill data for the high touch trades 1106 is routed to the sub-advisor order management system 503 SA.

2245) The sub-advisor order management system 503 SA determines, when applicable, the allocation of shares for the sponsoring organization and routes the trade allocation data along with the trade fill data (for trades not requiring a special allocation) for the high touch trades to the sponsoring organization's order management system 503 SO.

2246) The sponsoring organization's order management system 503 SO routes the trade allocation data for the sponsoring organization's allocation of shares of the high touch trade and the trade fill data (for trades not requiring a special allocation) to the sponsoring organization's compliance engine 506 SO.

2247) If a violation occurs (Violation=Yes), the trade allocation data for the sponsoring organization's allocation of shares of the high touch trade is routed for review by both the sponsoring organization 306 and the sub-advisor 301.

2248) If a violation does not occur (Violation=No), the trade allocation data for the sponsoring organization's shares of the high touch trade is routed to the sponsoring organization's order management system (OMS) 503 SO.

2249) The sponsoring organization's order management system (OMS) 503 SO routes the trade allocation data for the sponsoring organization's shares of the high touch trade to the sponsoring organization's trade reconciliation system 1117. Steps 2235 through 2249 constitute the high touch order processing loop.

2250) Returning to steps 2234 and 2239, when the HiLo Engine 1105 receives orders from the sub-advisor order management system (OMS) 503 SA (as either the original and re-routed orders) that it determines will have little or no significant expected market impact, the HiLo Engine (HLE) 1105 categorizes those orders as "low touch" orders 1111 that can be processed as "electronic" or "black box" orders, which computer systems can execute with virtually no human intervention. The "low touch" order 111 can be either original orders or rerouted orders from the sub-advisor order management system 503.

2251) The HiLo Engine 1105 directs low touch orders 1111 that constitute an exemplary order for an exemplary fund (and thus does not require a trade rotation order) to the sponsoring organization 304. For example, a single order for a single fund would not require a trade rotation order.

2252) The HiLo Engine 1105 routes trades requiring a trade order rotation to the trade order rotation engine 1112 in order to determine a trade rotation order between the sub-advisor 301 and the sponsoring organization(s) 304 and 1116. For example, an order involving several sub-advisor funds and several sponsoring organization funds would require a trade rotation order. As another example, when an asset manager places a plurality of orders in a given security for execution across a plurality of investment portfolios, trade order rotation is required.

2253) The trade order rotation engine 1112 prepares trade rotation instructions 1113 for the sub-advisor 301.

2254) The trade rotation instructions 1113 are communicated to the sub-advisor's order management system 503 SA via auto routing 1110 (along steps 2254a and 2254b).

2255) The trade rotation engine 1114 determines the trade rotation order between a plurality of sponsoring organizations, such as the sponsoring organization 304 and any number of additional sponsoring organizations as represented by sponsoring organization (SO$_x$) 1116. The trade rotation order could also be determined as a single trade rotation order between the sub-advisor 301 and sponsoring organizations 304 and 1116.

2256) The trade rotation engine 1114 prepares trade rotation instructions 1115 for the sponsoring organizations 304 and 1116.

2257) The trade rotation instructions 1115 are communicated to the sponsoring organizations 304 and 1116.

2258) The orders are routed to the sponsoring organization's order management system (OMS) 503 SO. This step is illustrated for an exemplary sponsoring organization 306 with a similar process implemented by all sponsoring organizations (SO$_x$) 1116.

2259) The sponsoring organization's order management system (OMS) 503 SO routes the order to the compliance engine 506 SO for evaluating the order relative to regulatory and prospectus requirements and restrictions.

2260) If a violation occurs (Violation=Yes), the order is stopped from execution and routed for review by the sponsoring organization's compliance group (not shown) and the sub-advisor's compliance group 2202.

2261) If a violation does not occur (Violation=No), the order is routed to the price-liquidity-cost-quality (PLCQ) engine 1200, which examines the current market share prices, liquidity, execution cost, and quality factors such as expected price improvement (and execution speed) to determine the optimal combination of executing brokers providing the most cost effective execution options.

2262) The price-liquidity-cost-quality (PLCQ) engine 1200 communicates the optimal cost effective order composition of executing brokers to the sponsoring organization's order management system (OMS) 503 SO.

2263) The sponsoring organization's order management system (OMS) 503 SO selects the executing brokers 202 and routes the orders for execution through the communications network 502.

2264) The communications network 502 directs the orders to the network of executing brokers 302 and to the designated executing brokers 202 for execution.

2265) The executing brokers 202 execute the trade and report the trade fills back to the communications network 502.

2266) The communications network 502 reports the trade fill reports back to the sub-advisor's order management system (OMS) 503 SA.

2267) The sub-advisor's order management system (OMS) 503 SA sends the trade fill reports back to the compliance engine 506 SA for post trade compliance review. If a violation occurs (Violation=Yes), the process as shown in steps 2230, 2231, 2232, and 2233 is implemented.

2268) If a violation does not occur (Violation=No), the compliance engine 506 SA routes the trade fill reports to the order entry system 700.

2269) The order entry system 700 provides the trade fill reports to the sub-advisor's trade/operations group 2201, portfolio manager 1103, compliance group 2202, and the sub-advisor's 301 business support systems.

2270) The communications network 502 reports the trade fill reports back to the sponsoring organization's order management system (OMS) 503 SO. The sponsoring organization also performs a post-execution compliance check through the compliance engine 506 SO. If a violation occurs (Violation=Yes), the process is implemented as shown in steps 2246, 2247, and 2248 and the sponsoring organization's compliance group (not shown) is notified.

2271) If a violation does not occur (Violation=No), the sponsoring organization's order management system (OMS) 503 SO routes the orders to the sponsoring organization's trade reconciliation system 1117. Steps 2250 through 2271 constitute the high touch order processing loop.

Additional aspects of the present invention provide more functionality to the unified trading control system 2200 as described below.

One aspect of the present invention, provides a post trade and post close compliance review processes that occur after the execution of trade or after the close of the market whereby passive violations, consisting of violations due to changes in market prices, rather than trading activity are highlighted and appropriate action taken to return the investment portfolio to proper compliance with the compliance review parameters for that investment portfolio. A post trade compliance review process may also occur when pre-trade compliance review of an order is not feasible, such as when shares of an Initial Public Offering (IPO) are allocated to the money management firm who subsequently allocates a portion of these shares across a plurality of sub-advised accounts.

Another aspect of the present invention provides, pending the review of an order by the sponsoring organization, the release of previously suspended orders by the sponsoring organizations for execution and routing, for execution, the low touch orders to the sponsoring organization and the high touch orders to the sub-advisor.

Another aspect of the present invention provides the cancellation of an order by the money management firm along with the cancellation and replacement, by the money management firm, of an order with a modified order. This process may involve the sponsoring organization, if the order is partially filled, cancelling the unexecuted shares or possibly denying the money management firm's cancel order requests. Finally, the sponsoring organization may initiate an order cancel process for an order initiated by the money management firm.

Another aspect of the present invention provides that the execution of an order by the sponsoring organization requires that the sponsoring organization have a process to provide notice of the executed trade to the money management firm though execution fill reports along with associated notices involving modifications to execution fill reports and notices regarding trade errors. Furthermore, a further aspect provides that at the closing of the market at the end of the trading day, records of transaction activity are sent, as transaction summary reports, by the sponsoring organization and money management firms to each other to assist in the daily trade reconciliation process between the sponsoring organization and money management firms.

Another aspect of the present invention provides that the sponsoring organization may participate in more sophisticated trading activity by aggregating their orders, among their accounts or with a plurality of other sponsoring organizations or market participants, into a single block trade; crossing their orders with a plurality of other sponsoring organizations or market participants, or crossing both side of their own orders internally when they hold simultaneous buy and sell orders for the same security (as may occur when rebalancing model portfolios).

Another aspect of the present invention provides the implementation of new rules for categorizing orders with respect to expected market impact, and the introduction of new methods for measuring market impact, such as alternative tests, measures and parameters. For example, a maximum number of shares could be implemented for determining orders as low touch. The present invention specifies a number of methods, but this list is certainly not considered exhaustive and the present invention is not limited to any specific methods for determining expected market impact.

Another aspect of the present invention provides the utilization of a real-time communications system that provides real-time checks, such as a heartbeat function, on communications links between the HLE and the sponsoring organizations and money management firms.

Overall, as shown by the various embodiments described above, the system and process of the present invention provide a comprehensive pre-trade compliance process that prevents the execution of orders that violates securities laws, account restrictions and prohibited transactions along with clear, substantial, quantifiable, recurring, and compounding cost savings and the resulting improved investment performance to fund shareholders and plan beneficiaries. The present invention provides a highly desirable social utility of considerable, recurring, and compounding shareholder and plan beneficiary savings. Indeed, a reasonably effective implementation of the embodiment of the present invention could easily benefit millions of Americans through substantially improved performance of their investment portfolios.

FIG. 23 shows estimated exemplary projected annual savings, based on 2005 trade data, potentially generated by an embodiment of the present invention for a number of fund trusts in the variable insurance industry for average trade execution costs of 1.00 cent per share. Given that sponsoring organizations (as advisor for regulatory purposes) and the associated fund board of directors and plan investment consultants have a fiduciary responsibility to control (minimize) operating expenses, there exists a fiduciary obligation to evaluate and, if appropriate, implement any process (such as those provided by the system of the present invention) that provides substantial, recurring, and quantifiable cost savings and improved performance to fund shareholders and plan beneficiaries. The data for estimates in this table was compiled from publicly available documents filed by each fund trust with the SEC, including the prospectus, annual report, and statement of additional information.

Furthermore, the savings to the fund shareholder and plan beneficiaries occur each year that the funds and accounts utilize the system and process of the present invention. Thus, these benefit of these savings compound and become increasingly more valuable over time. FIGS. 24A, 24B, 24C, and 24D represent a compilation of research for four popular fund trusts (groups of funds) with $38.7 BB, $12.7 BB, $6.7 BB, and $5.3 BB in assets, and shows estimated exemplary total compounded shareholder savings and resulting improved investment performance, at an average execution cost of 1.00 cent per share, over a 1, 3, 5, and 10 year period. The data for estimates in these tables were compiled from publicly available documents filed by each fund trust with the SEC, including the prospectus, annual report, and statement of additional information. Such improved performance could, potentially, improve the decile (ranking by tenths) or quartile (ranking by quarter) performance ratings of these funds relative to their peers (who are not utilizing the embodiment of the present invention). Given that these investment portfolios are associated with personal goals for each fund shareholder and plan beneficiary such as a comfortable retirement, higher education, and improved health care, the social utility created by the embodiment of the present invention is potentially dramatic for millions of Americans.

For illustration purposes, portions of this specification describe the present invention in the context of variable insurance (including variable fund LLCs and registered investment companies (RICs), mutual fund, or pension plan market). However, as one of ordinary skill in the art would appreciate, the systems and methods described herein apply equally well to other similar markets, such as a sub-advised mutual fund market, the defined contribution market, 529 plans, hedge funds, collective investments, deferred compensation plans, institutional accounts, separate accounts of insurance companies, defined benefit pension plans, endowments, and trusts. For that reason, and notwithstanding the particular benefits associated with using the present invention in connection with the variable insurance or pension plan markets, the system and method described herein should be considered broadly applicable to any market in need of centralized portfolio management, directed brokerage control, and/or direct and automated compliance monitoring by the sponsoring organization with primary regulatory responsibility for a given sub-advised pool of assets.

In accordance with an embodiment of the present invention, instructions adapted to be executed by a processor to perform a method are stored on a computer-readable medium. The computer-readable medium can be accessed by a processor suitable for executing instructions adapted to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

In the context of this document, a "computer-readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semi-conductor system, apparatus, device, or propagation medium. More specific examples (a non-exhaustive list) of computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. In a method for facilitating unified trading and control for a sponsoring organization's money management process using a plurality of money management firms to manage the sponsoring organization's investment portfolios, a method for assigning responsibility for trade order execution comprising:

defining a plurality of investment portfolios containing securities, each portfolio having a particular investment strategy;

assigning at least one money management firm for each investment portfolio, wherein the at least one money management firm provides at least one portfolio manager to make investment recommendations for the each investment portfolio;

receiving at the sponsoring organization from the money management firms investment recommendations for the plurality of investment portfolios in the form of orders comprising a number of units to trade for each security based on the recommendations;

receiving from the sponsoring organization, for each of the plurality of investment portfolios, compliance review parameters comprising at least one of the regulatory laws, regulatory rules, account restrictions, prohibited transactions, prohibited holdings, and prospectus requirements applicable to the each investment portfolio;

determining, according to the compliance review parameters, and prior to execution of an order, if the execution of the order would result in a violation of at least one of the compliance review parameters;

suspending, pending examination of the order, the execution of the order if execution of the order would result in a violation of the compliance review parameters for the associated investment portfolio;

examining the suspended order to determine whether the suspended order is canceled, modified, replaced, or approved for execution;

determining, at any time, for each investment portfolio, whether the each investment portfolio is in compliance with compliance review parameters associated with the each investment portfolio, and if at least one violation of the each investment portfolio's compliance review parameters is found, determining actions needed to return the each investment portfolio into compliance with the compliance review parameters of the each investment portfolio and implementing the actions to return the each investment portfolio to compliance with its compliance review parameters;

identifying market impact parameters upon which to determine whether expected market impact of an order is high or low;

determining, for each order, an organization given discretion for executing a trade for the each order, wherein determining the organization given discretion for executing an order depends on whether an expected market impact of an order is low or high;

if the order is in compliance with the compliance review parameters for the associated investment portfolio and the expected market impact of the order is low such that the order is a low touch order:

identifying any other low touch orders on the same side of a trade transaction for the same security, assessing, if such low touch orders are identified, a cumulative expected market impact of all of the low touch orders, determining, for the low touch orders, a set of trade rotation order parameters to determine an expected market impact of the low touch orders, identifying, if the expected market impact for the low touch orders on the same side of the trade transaction for the same security exceeds the trade rotation order parameters, a trade rotation order among the low touch orders, according to a defined procedure for the trade rotation order that is in compliance with regulatory requirements, determining, for the low touch order, a set of algorithm parameters to determine if the expected market impact of an order is sufficient to utilize a trading algorithm, determining, for the low touch order, if expected market impact exceeds the parameters for using a trading algorithm, identifying, if the low touch order exceeds the trade algorithm parameters, a trade algorithm in the execution of the order, routing the low touch trade to the sponsoring organization, and selecting at least one executing venue or broker according to a determination of the most cost effective strategy for the low touch trade, wherein the sponsoring organization selects the at least one executing venue or broker;

routing the low touch order, by the sponsoring organization, to the at least one selected executing venue or broker for execution, if the order is in compliance with the compliance review parameters for the associated investment portfolio and the expected market impact of the order is high such that the trade for the each order is a high touch order:

routing the high touch order to the money management firm for selection of at least one executing venue or broker for the high touch order, and routing the high touch order, by the money management firm, to the at least one selected executing venue or broker for execution.

2. The method of claim 1, wherein for a high touch order, the money management firm formulates a trade strategy for the high touch order that results in a modified order comprising high touch orders and low touch orders, and wherein the each resulting order is in compliance with compliance review parameters for the associated investment portfolio, and wherein the method further comprises:

routing at least one resulting low touch order to the sponsoring organization, wherein the sponsoring organization selects at least one executing venue or broker for the resulting low touch orders;

routing each resulting low touch order, by the sponsoring organization, to the at least one selected executing venue or broker for execution;

routing at least one resulting high touch order to the money management firm, wherein the money management firm selects the at least one executing venue or broker for the resulting high touch orders; and routing each resulting high touch order, by the money management firm, to the at least one selected executing venue or broker for execution.

3. The method of claim 1, wherein for a low touch order, the method further comprises dividing the low touch order into a plurality of smaller orders for execution and routing each low touch order to the at least one selected executing venue or broker for execution.

4. The method of claim 1, wherein identifying the trade rotation order comprises:

determining the trade order rotation for execution between a sub advisor initiating the trade and the at least one sponsoring organization acting as advisor or administrator for the respective investment portfolio or plurality of investment portfolios; and determining the trade order rotation among the plurality of sponsoring organizations acting as advisor or administrator for the respective investment portfolio or plurality of investment portfolios.

5. The method of claim 1, further comprising aggregating low touch orders, wherein low touch orders on the same side of a trade for an issue for at least one sponsoring organization are aggregated into a single block for trading and, once executed, units are allocated among the sponsoring organizations.

6. The method of claim 1, wherein the sponsoring organization crosses orders on one side of an issue generated by the investment portfolios of the sponsoring organization against orders on the opposite side of the same issue generated by additional investment portfolios of the sponsoring organization.

7. The method of claim 1, further comprising providing updates to the sponsoring organization on remaining open orders for the sponsoring organization's investment portfolios, wherein the money management firm provides data to the sponsoring organization with respect to at least one partially-filled open orders that remain eligible for further trading activity on trading days following the current trading day.

8. The method of claim 1, further comprising overriding assignment of execution discretion of high and low touch orders, wherein one of the money management firm and the sponsoring organization override the execution discretion assignment of an order in order for one of:

the money management firm to assign execution discretion over the execution of the high touch order to the sponsoring organization;

the money management firm to assign execution discretion over the execution of the low touch order to money management firm;

the sponsoring organization to assign execution discretion over the execution of the low touch order to the money management firm; and the sponsoring organization to assign execution discretion over the execution of the high touch order to the sponsoring organization.

9. The method of claim 1, further comprising assigning and updating execution assignment parameters, wherein the rules and procedures implemented to determine assignment of discretion over an order to one of the sponsoring organization and the money management firm are created, modified and maintained, in real-time, in an agreed procedure by the money management firm and the sponsoring organization.

10. The method of claim 1, further comprising assigning and updating, in real-time, by the sponsoring organization for the at least one investment portfolio, the compliance review parameters.

11. The method of claim 1, further comprising receiving an order cancellation request by the money management firm, receiving a denial of the order cancellation request from the sponsoring organization, and denying the order cancellation request.

12. The method of claim 1, further comprising receiving an order cancellation request by the money management firm, and implementing, by the sponsoring organization, the order cancellation request for remaining unexecuted units of the original order.

13. The method of claim 1, further comprising receiving an order cancellation request initiated by the sponsoring organization for an order from the money management firm.

14. The method of claim 1, wherein assets of the each investment portfolio comprise one of registered mutual funds, non-registered mutual funds, institutional investment portfolios, variable insurance funds, variable fund LLCs, regulated investment company funds, defined contribution plans, 529 plans, hedge funds, group annuities, collective investments, deferred compensation plans, separately managed accounts (SMAs), institutional funds, separate accounts of insurance companies, pension plans, endowments, and trusts.

15. The method of claim 1, further comprising determining a cost effective strategy for a trade order using an optimization analysis of share price, liquidity, execution cost or mark-up, expected price improvement, and execution speed.

16. In a system for facilitating unified trading and control for a sponsoring organization's money management process using a plurality of money management firms to manage the sponsoring organization's investment portfolios, a method for assigning responsibility for trade order execution comprising:

defining a plurality of investment portfolios containing securities, each portfolio having a particular investment strategy;

assigning at least one money management firm for each investment portfolio, wherein the at least one money management firm provides at least one portfolio manager to make investment recommendations for the each investment portfolio;

receiving at the sponsoring organization from the money management firms investment recommendations for the plurality of investment portfolios in the form of orders comprising a number of units to trade for each security based on the recommendations;

receiving from the sponsoring organization, for each of the plurality of investment portfolios, compliance review parameters comprising at least one of the regulatory laws, regulatory rules, account restrictions, prohibited transactions, prohibited holdings, and prospectus requirements applicable to the each investment portfolio;

determining, according to the compliance review, and prior to execution of an order, if the execution of the order would result in a violation of at least one of the compliance review parameters;

suspending, pending examination of the order, the execution of the order if execution of the order would result in a violation of the compliance review parameters for the associated investment portfolio;

examining the suspended order to determine whether the suspended order is canceled, modified, replaced, or approved for execution;

identifying market impact parameters upon which to determine whether expected market impact of an order is high or low;

determining, for each order, an organization given discretion for executing a trade for the each order, wherein determining the organization given discretion for executing an order depends on whether an expected market impact of an order is low or high;

if the order is in compliance with the compliance review parameters for the associated investment portfolio and the expected market impact of the order is low such that the order is a low touch order:

identifying any other low touch orders on the same side of a trade transaction for the same security, assessing, if such low touch orders are identified, a cumulative expected market impact of all of the low touch orders;

determining, for the low touch orders, a set of trade rotation order parameters to determine an expected market impact of the low touch orders;

identifying, if the expected market impact for low touch orders on the same side of the trade transaction for the same security exceeds the trade rotation order parameters, a trade rotation order among the low touch orders, according to a defined procedure for the trade rotation order that is in compliance with regulatory requirements, determining, for the low touch order, a set of algorithm parameters to determine if the expected market impact of an order is sufficient to utilize a trading algorithm, assessing, for the low touch order, if expected market impact exceeds the parameters for using a trading algorithm, identifying, if the low touch order exceeds the trade algorithm parameters, a trade algorithm in the execution of the order, routing the low touch trade to the sponsoring organization, and selecting at least one executing venue or broker according to a determination of the most cost effective strategy for the low touch trade, wherein the sponsoring organization selects the at least one executing venue or broker;

routing the low touch order, by the sponsoring organization, to the at least one selected executing venue or broker for execution, if the order is in compliance with the compliance review parameters for the associated investment portfolio and the expected market impact of the order is high such that the trade for the each order is a high touch order:

routing the high touch order to the money management firm for selection of at least one executing venue or broker for the high touch order, and routing the high touch order, by the money management firm, to the at least one selected executing venue or broker for execution.

17. The method of claim 16, wherein for a high touch order, the money management firm formulates a trade strategy for the high touch order that results in a modified order comprising high touch orders and low touch orders, and wherein the each resulting order is in compliance with compliance review parameters for the associated investment portfolio, and wherein the method further comprises:

routing at least one resulting low touch order to the sponsoring organization, wherein the sponsoring organization selects at least one executing venue or broker for the resulting low touch orders;

routing each resulting low touch order, by the sponsoring organization, to the at least one selected executing venue or broker for execution;

routing at least one resulting high touch order to the money management firm, wherein the money management firm selects the at least one executing venue or broker for the resulting high touch orders; and routing each resulting high touch order, by the money management firm, to the at least one selected executing venue or broker for execution.

18. The method of claim 16, wherein for a low touch order, the method further comprises dividing the low touch order into a plurality of smaller orders for execution and routing each low touch order to the at least one selected executing venue or broker for execution.

19. The method of claim 16, wherein identifying the trade rotation order comprises:

determining the trade order rotation for execution between a sub advisor initiating the trade and the at least one sponsoring organization acting as advisor or administrator for the respective investment portfolio or plurality of investment portfolios; and determining the trade order rotation among the plurality of sponsoring organizations acting as advisor or administrator for the respective investment portfolio or plurality of investment portfolios.

20. The method of claim 16, further comprising aggregating low touch orders, wherein low touch orders on the same side of a trade for an issue for at least one sponsoring organization are aggregated into a single block for trading and, once executed, units are allocated among the sponsoring organizations.

21. The method of claim 16, wherein the sponsoring organization crosses orders on one side of an issue generated by the investment portfolios of the sponsoring organization against orders on the opposite side of the same issue generated by additional investment portfolios of the sponsoring organization.

22. The method of claim 16, further comprising providing updates to the sponsoring organization on remaining open orders for the sponsoring organization's investment portfolios, wherein the money management firm provides data to the sponsoring organization with respect to at least one partially-filled open orders that remain eligible for further trading activity on trading days following the current trading day.

23. The method of claim 16, further comprising overriding assignment of execution discretion of high and low touch orders, wherein one of the money management firm and the sponsoring organization override the execution discretion assignment of an order in order for one of:

the money management firm to assign execution discretion over the execution of the high touch order to the sponsoring organization;

the money management fin to assign execution discretion over the execution of the low touch order to money management firm;

the sponsoring organization to assign execution discretion over the execution of the low touch order to the money management firm; and the sponsoring organization to assign execution discretion over the execution of the high touch order to the sponsoring organization.

24. The method of claim 16, further comprising assigning and updating execution assignment parameters, wherein the rules and procedures implemented to determine assignment of discretion over an order to one of the sponsoring organization and the money management firm are created, modified and maintained, in real-time, in an agreed procedure by the money management firm and the sponsoring organization.

25. The method of claim 16, further comprising assigning and updating, in real-time, by the sponsoring organization for the at least one investment portfolio, the compliance review parameters.

26. The method of claim 16, further comprising receiving an order cancellation request by the money management firm, receiving a denial of the order cancellation request from the sponsoring organization, and denying the order cancellation request.

27. The method of claim 16, further comprising receiving an order cancellation request by the money management firm, and implementing, by the sponsoring organization, the order cancellation request for remaining unexecuted units of the original order.

28. The method of claim 16, further comprising receiving an order cancellation request initiated by the sponsoring organization for an order from the money management firm.

29. The method of claim 16, wherein assets of the each investment portfolio comprise one of registered mutual funds, non-registered mutual funds, institutional investment portfolios, variable insurance funds, variable fund LLCs, regulated investment company funds, defined contribution plans, 529 plans, hedge funds, group annuities, collective investments, deferred compensation plans, separately managed accounts (SMAs), institutional funds, separate accounts of insurance companies, pension plans, endowments, and trusts.

30. A system for facilitating unified trading and control for a sponsoring organization's money management process using a plurality of money management firms to manage the sponsoring organization's investment portfolios, and for assigning responsibility for trade order execution, the system comprising:
  a computer user interface configured to
    receive a designation of a plurality of investment portfolios containing securities, each portfolio having a particular investment strategy,
    receive instructions from money management firms to create, enter, modify and cancel orders for the plurality of investment portfolios, and
    receive orders to trade securities of the plurality of investment portfolios;
  a communications computer module configured to communicate through an external communications network with a sponsoring organization order management system and a money management firm order management system;
  a translation computer module configured to translate communications from the sponsoring organization order management system and the money management firm order management system into a standard data format;
  a rules-based compliance computer module configured to store and apply compliance review parameters of the plurality of investment portfolios; and
  a decision analysis computer module configured to determine an organization given discretion for executing a trade for a particular order based on market impact parameters that define whether expected market impact of the particular order is low or high,
wherein the computer user interface is configured to receive from the money management firm order management system an order to trade a security and transmit the order to the translation computer module,
wherein the translation computer module is configured to translate the order into the standard data format and transmit the translated order to the rules-based compliance computer module,
wherein the rules-based compliance computer module is configured to
  determine if a violation of the compliance review parameters of the associated investment portfolio would occur as a result of execution of the order,
  suspend execution of the order until receiving one of a cancel instruction from the money management firm order management system, a replace instruction from the money management firm order management system, and a release instruction from the sponsoring organization order management system, and
  determine, at any time, if an investment portfolio is in compliance with its compliance review parameters, and if a violation is found, forward instructions to the money management firm order management system outlining actions needed to return the investment portfolio back to compliance with its compliance review parameters,
wherein the decision analysis computer module is configured to
  receive the order after the order has been determined to be in compliance with applicable compliance review parameters, and
  determine, based on the market impact parameters, whether expected market impact of the order is high or low,
wherein, if the decision analysis computer module determines the expected market impact to be low such that the order is a low touch order, then
  the decision analysis computer module is configured to
    identify any other low touch orders on the same side of a trade transaction for the same security,
    determine, if such low touch orders are identified, a cumulative expected market impact of all of the tow touch orders;
    determine, for the low touch orders, a set of trade rotation order parameters;
    determine if the expected market impact for the low touch orders on the same side of a trade transaction for the same security exceeds the trade rotation order parameters,
    identify, if the expected market impact for the low touch orders on the same side of the trade transaction for the same security exceeds the trade rotation order parameters, a need for a trade rotation order among the low touch orders, according to a defined procedure for the trade rotation order that is in compliance with regulatory requirements,
    determine, for the low touch order, a set of algorithm parameters to determine if expected market impact of an order is sufficient to use a trading algorithm,
    determine, for the low touch order, if the expected market impact exceeds the parameters for using a trading algorithm,
    identify, if the low touch order exceeds the trade algorithm parameters, a need for a trade algorithm in the execution of the order, create a message containing instructions that the order is approved, that the order is categorized as low touch, and, for a low touch order or group of low touch orders exceeding at least one of the applicable trade rotation and trade algorithm parameters, a recommendation of at least one of a trade rotation order, an algorithm, and a trade rotation order and algorithm, and forward the message to the translation computer module, the translation computer module is configured to translate the message into a data format accepted by the sponsoring organization order management system and forward the translated message to the communications computer module, the communications computer module configured to forward the translated message to the sponsoring organization order management system, so that the sponsoring organization order management system can select at least one executing venue or broker according to a determination of the most cost effective strategy for the low touch order and route the low touch order to the selected executing venue or broker, wherein, if the decision analysis computer module determines the expected market impact to be high such that the order is a high touch order, then the decision analysis computer module is configured to create a message containing instructions that the order is approved and categorized as high touch, and forward the message to the translation module, the translation computer module is configured to translate the message into a data format accepted by the money management firm order management system and to forward the translated message to the communications computer module, and the communications computer module configured to forward the translated message to the money management firm order management system, so that the money managements firm can select at least one executing venue or broker according to a determination of the most cost effective strategy for the high touch order and route the high touch order to the selected executing venue or broker.

31. The system of claim 30, further comprising an administrative computer module configured to accept messages from a computer user interface and enable users to: set up user roles and permission schema, including users and viewers for sponsoring organization, sub-advisors and system administrator; accept a data feed from the sponsoring organization order management system to set up, modify or remove investment portfolios; activate submission of orders from the investment account; and request and send updates to the database module for purposes of updating database records.

32. The system of claim 30, further comprising a software order entry module configured to accept messages from a computer user interface and enables users to engage in transactions related to entry and execution of orders through: submission of a single order or group of orders; order cancel requests; order cancel request status; order execution fill; order execution fill corrections; order cancel confirmations; order cancel partial fills; order replace; compliance review hold order; compliance review approve order; compliance review release order for execution; updating of open Good Til Cancel (GTC) orders; testing rules and their parameters for categorizing orders as high touch or low touch; and requesting and sending updates to a database module for purposes of updating database records.

33. The system of claim 30, further comprising a software rules module that enables users, though a computer user interface at sponsoring organizations and sub-advisors, to: create, modify activate, deactivate and eliminate rules, according to their agreed procedures, for the assignment of discretion over the execution of order through the categorization of orders as high touch or low touch; specify tests, measures, and parameters for categorizing orders as high touch or low touch; create and modify pre set levels; create exceptions to rules for accounts, group of accounts, individual issues and groups of issues; create parameters for algorithms and trade rotation order suggestions for low touch orders; and request and send updates to a database module for purposes of updating database records.

34. The system of claim 30, further comprising a software operations module that enables users, through a computer user interface at the sponsoring organizations and sub-advisors, to perform operations comprising: start and stop the system; recover from lost data feed; monitor current operating status; login and log out of the system; track orders and internal processing errors; utilize a heartbeat function to check on connectivity with external users; and request and send updates to a database module for purposes of updating database records.

35. The system of claim 30, further comprising a software reporting module that enables users, through a computer user interface, at the sponsoring organizations and sub-advisors, to perform reporting functions comprising: viewing rules and related tests, measures, parameters, and exceptions; viewing routing statistics for orders; performing real-time queries of a database module; viewing order discretion assignment audit reports and archives; viewing overrides of order discretion assignments by users; viewing lost and incomplete orders; viewing open Good Til Cancel (GTC) orders; operating a data export facility; and viewing reports from a database module.

36. The system of claim 30, wherein, for a specific order, the decision analysis computer module is configured to: gather market data; compile rules; perform required calculations; evaluate results of the calculations; categorize the specific order as one of high touch, low touch, low touch algo, low touch TRO, and low touch algo TRO; add compliance review status; create a message for users to receive the categorization and compliance review status; route the message to a translation module; and request and send updates to a database module for purposes of updating database records.

37. The system of claim 30, further comprising a software database module that functions as a primary repository for all current and historical data and archiving of necessary data and whose field structure includes data on: securities; accounts; organizations including sponsoring organizations, money management firms and system administrators; rules with tests, measures, and parameters; pre set levels; exceptions by accounts, groups of accounts, symbols, and groups of symbols; users, roles, and permissions; active and deactivated accounts; order routing decisions and overrides; canceled and replaced orders; lost orders and operational statistics such as CPU utilization; updates with the other functional modules within the system; and archived data and activity.

38. The system of claim 30, wherein the system is configured to receive data feeds comprising:

market data feed, and messages originating from sponsoring organizations and sub-advisors regarding new organizations, order entry, cancellation and correction of orders, compliance status, new and activated accounts, trade fill reports, changes in rules, user updates, and associated operational information.

39. The system of claim 30, wherein the system is configured to create messages composed of various fields within database records in the standard data format, and to utilize the messages to communicate events to users comprising: new orders; new orders with high touch-low touch decision; high touch to low touch override; high touch Good Til Cancel (GTC) updates; compliance=OK; compliance under review; order released from compliance; cancel order request; cancel response-cancel confirmed; cancel response-cancel rejection; cancel response-cancel unfilled portion of order; sponsoring organization initiated cancel; execution fill; execution fill modification; empty message (heartbeat); and order error.

40. The system of claim 30, wherein if a trade strategy for the high touch order results in a modified order comprising high touch orders and low touch orders and the each resulting order is in compliance with the compliance review parameters for the investment portfolio,
the system is configured to
route the low touch orders to the sponsoring organization order management system for selection of at least one executing venue or broker and to route the low touch orders to the selected at least one executing venue or broker for execution, and
route the high touch orders to the money management firm order management system for selection of at least one executing venue or broker and to route the high touch orders to the selected at least one executing venue or broker for execution.

41. The system of claim 30, wherein the sponsoring organization order management system is configured to transform a low touch order into a plurality of smaller orders and to route each smaller order to the selected at least one executing venue or broker for execution.

42. The system of claim 30, wherein the system is configured to implement a trade order rotation according to a computer-defined procedure that is applicable when a money management firm places a plurality of orders on the same side of a buy or sell order in a given security for execution across a plurality of investment portfolios belonging to a plurality of sponsoring organizations.

43. The system of claim 30, wherein the system is configured to determine trade order rotation by:
determining the trade order rotation for execution between a sub advisor initiating the trade and the sponsoring organization or plurality of sponsoring organizations acting as advisor or administrator for the respective investment portfolio or plurality of investment portfolios; and
determining the trade order rotation among the plurality of sponsoring organizations acting as advisor or administrator for the respective investment portfolio or plurality of investment portfolios.

44. The system of claim 30, wherein the system is configured to implement a trade rotation order comprising one of random selection, sequential selection, and algorithmic random selection.

45. The system of claim 30, wherein the system is configured to aggregate trades, wherein low touch orders on the same side of a buy or sell for the same security for the at least one sponsoring organization are aggregated into a single block for trading and, once executed, units are allocated among the at least one sponsoring organization.

46. The system of claim 30, wherein the sponsoring organization order management system is configured to cross orders for a security generated by investment portfolios of at least one sponsoring organization against orders for the opposite side of the security generated by additional investment portfolios of at least one sponsoring organization.

47. The system of claim 30, wherein the system is configured to transmit a communications message from the money management firm order management system to the sponsoring organization order management system comprising data records summarizing status individual or a plurality of open or partially filled orders (Good Til Cancel or GTC) that remain eligible for further trading activity on trading days following the current or recently concluded trading day.

48. The system of claim 30, wherein the system is configured to receive a message overriding execution discretion authority from one of the money management firm order management system and the sponsoring organization order management system, wherein the message overrides a discretion assignment of a trade order in order for one of:
the money management firm to assign discretion over the execution of the trade order to the sponsoring organization;
the money management firm to assign discretion over the execution of the trade order to the money management firm;
the sponsoring organization to assign discretion over the execution of the trade order to the money management firm; and
the sponsoring organization to assign discretion over the execution of the trade order to the sponsoring organization.

49. The methods of claim 30, wherein the system is configured to receive assignments and updates of market impact parameters through a computer user interface, wherein the market impact parameters are created, modified, activated, deactivated and maintained, in real-time.

50. The system of claim 30, wherein the system is configured to
receive an order cancellation request from the money management firm order management system requesting cancellation of an order submitted by the money management firm,
receiving instructions from the sponsoring organization order management system to deny the order cancellation request, and
denying the order cancellation request.

51. The system of claim 30, wherein the system is configured to
receive an order cancellation request from the money management firm order management system requesting cancellation of an order submitted by the money management firm, wherein the submitted order is partially executed, and
issue instructions to the sponsoring organization order management system implement the order cancellation request for the remaining unexecuted shares of the submitted order.

52. The system of claim 30, wherein the system is configured to
receive an order cancellation request from the sponsoring organization order management system requesting cancellation of an order submitted by the money management firm, and
forward a message to the money management firm order management system to initiate a cancel request for the submitted order from the money management firm.

53. The system of claim 30, wherein the system is configured to implement standards for communications with the sponsoring organization order management system and the money management firm order management system, the standards comprising a designated communications protocol, a designated message format, and a designated communications network.

54. The system of claim 30, wherein the sponsoring organization software order management system determines the most cost effective strategy for a trade order using an optimization analysis of share price, liquidity, execution cost or mark-up, expected price improvement, and execution speed.

55. A system for facilitating unified trading and control for a sponsoring organization's money management process using a plurality of money management firms to manage the sponsoring organization's investment portfolios, and for assigning responsibility for trade order execution, the system comprising:

a computer user interface configured to
receive a designation of a plurality of investment portfolios containing securities, each portfolio having a particular investment strategy,
receive instructions from money management firms to create, enter, modify and cancel orders for the plurality of investment portfolios, and
receive orders to trade securities of the plurality of investment portfolios;
a communications computer module configured to communicate through an external communications network with a sponsoring organization order management system and a money management firm order management system;
a translation computer module configured to translate communications from the sponsoring organization order management system and the money management firm order management system into a standard data format;
a rules-based compliance computer module configured to store and apply compliance review parameters of the plurality of investment portfolios; and
a decision analysis computer module configured to determine an organization given discretion for executing a trade for a particular order based on market impact parameters that define whether expected market impact of the particular order is low or high,
wherein the computer user interface is configured to receive from the money management firm order management system an order to trade a security and transmit the order to the translation computer module,
wherein the translation computer module is configured to translate the order into the standard data format and transmit the translated order to the rules-based compliance computer module,
wherein the rules-based compliance computer module is configured to
determine if a violation of the compliance review parameters of the associated investment portfolio would occur as a result of execution of the order,
suspend execution of the order until receiving one of a cancel instruction from the money management firm order management system, a replace instruction from the money management firm order management system, and a release instruction from the sponsoring organization order management system, and
wherein the decision analysis computer module is configured to
receive the order after the order has been determined to be in compliance with applicable compliance review parameters, and
determine, based on the market impact parameters, whether expected market impact of the order is high or low, wherein, if the decision analysis computer module determines the expected market impact to be low such that the order is a low touch order, then
the decision analysis computer module is configured to
identify any other low touch orders on the same side of a trade transaction for the same security,
determine, if such low touch orders are identified, a cumulative expected market impact of all of the low touch orders;
determine, for the low touch orders, a set of trade rotation order parameters;
determine if the expected market impact for the low touch orders on the same side of a trade transaction for the same security exceeds the trade rotation order parameters,
identify, if the expected market impact for the low touch orders on the same side of the trade transaction for the same security exceeds the trade rotation order parameters, a need for a trade rotation order among the low touch orders, according to a defined procedure for the trade rotation order that is in compliance with regulatory requirements,
determine, for the low touch order, a set of algorithm parameters to determine if expected market impact of an order is sufficient to use a trading algorithm,
determine, for the low touch order, if the expected market impact exceeds the parameters for using a trading algorithm,
identify, if the low touch order exceeds the trade algorithm parameters, a need for a trade algorithm in the execution of the order,
create a message containing instructions that the order is approved, that the order is categorized as low touch, and, for a low touch order or group of low touch orders exceeding at least one of the applicable trade rotation and trade algorithm parameters, a recommendation of at least one of a trade rotation order, an algorithm, and a trade rotation order and algorithm, and
forward the message to the translation computer module,
the translation computer module is configured to translate the message into a data format accepted by the sponsoring organization order management system and forward the translated message to the communications computer module,
the communications computer module configured to forward the translated message to the sponsoring organization order management system, so that the sponsoring organization order management system can select at least one executing venue or broker according to a determination of the most cost effective strategy for the low touch order and route the low touch order to the selected executing venue or broker,
wherein, if the decision analysis computer module determines the expected market impact to be high such that the order is a high touch order, then
the decision analysis computer module is configured to
create a message containing instructions that the order is approved and categorized as high touch, and
forward the message to the translation module,
the translation computer module is configured to translate the message into a data format accepted by the money management firm order management system and to forward the translated message to the communications computer module, and the communications computer module configured to forward the translated message to the money management firm order management system, so that the money managements firm can select at least one executing venue or broker according to a determination of the most cost effective strategy for the high touch order and route the high touch order to the selected executing venue or broker.

* * * * *